(12) United States Patent
Lewis et al.

(10) Patent No.: US 11,710,073 B2
(45) Date of Patent: * Jul. 25, 2023

(54) METHOD FOR PROVIDING CORRIDOR METRICS FOR A CORRIDOR OF A ROAD NETWORK

(71) Applicant: Geotab Inc., Oakville (CA)

(72) Inventors: Daniel J. Lewis, Cambridge (CA); Robert Bradley, Oakville (CA)

(73) Assignee: Geo tab Inc., Oakville (CA)

( * ) Notice: Subject to any disclaimer, the term of this patent is extended or adjusted under 35 U.S.C. 154(b) by 2 days.

This patent is subject to a terminal disclaimer.

(21) Appl. No.: 17/381,330

(22) Filed: Jul. 21, 2021

(65) Prior Publication Data

US 2022/0013005 A1 Jan. 13, 2022

Related U.S. Application Data

(63) Continuation of application No. 17/368,171, filed on Jul. 6, 2021, now Pat. No. 11,403,938, which is a
(Continued)

(51) Int. Cl.
*G08G 1/01* (2006.01)
*G06N 20/00* (2019.01)
(Continued)

(52) U.S. Cl.
CPC ......... *G06N 20/00* (2019.01); *G01C 21/3822* (2020.08); *G01S 19/01* (2013.01); *G06F 18/2321* (2023.01); *G06V 20/54* (2022.01); *G06V 20/56* (2022.01); *G07C 5/008* (2013.01); *G07C 5/0808* (2013.01); *G08G 1/0112* (2013.01); *G08G 1/0125* (2013.01);
(Continued)

(58) Field of Classification Search
CPC .. G08G 1/0129; G08G 1/0112; G08G 1/0125; G08G 1/0141; G08G 1/20; G06N 20/00; G01C 21/3822; G01S 19/01; G06K 9/6226; G07C 5/008; G07C 5/0808
USPC ........................................................ 701/117
See application file for complete search history.

(56) References Cited

U.S. PATENT DOCUMENTS 5,488,559 A 1/1996 Seymour
6,496,773 B1 12/2002 Olsson
(Continued)

FOREIGN PATENT DOCUMENTS

EP 2 679 956 A2 1/2014
EP 3 032 454 A1 6/2016
(Continued)

OTHER PUBLICATIONS

Chen et al., City-scale map creation and updating using GPS collections. Proceedings of the 22nd ACM SIGKDD International Conference on Knowledge Discovery and Data Mining. Aug. 13, 2016:1465-74.
(Continued)

*Primary Examiner* — Kerri L McNally
*Assistant Examiner* — Thang D Tran
(74) *Attorney, Agent, or Firm* — Wolf, Greenfield & Sacks, P.C.

(57) ABSTRACT

Disclosed are systems and methods relating to providing corridor metrics based on road network data and telematic data.

20 Claims, 113 Drawing Sheets

Related U.S. Application Data continuation-in-part of application No. 16/877,936, filed on May 19, 2020, now Pat. No. 11,335,189, which is a continuation-in-part of application No. 16/535,527, filed on Aug. 8, 2019, now Pat. No. 10,916,127.

(60) Provisional application No. 63/048,268, filed on Jul. 6, 2020, provisional application No. 62/829,539, filed on Apr. 4, 2019.

(51) Int. Cl.
      G07C 5/00      (2006.01)
      G07C 5/08      (2006.01)
      G01C 21/00     (2006.01)
      G01S 19/01     (2010.01)
      G08G 1/00      (2006.01)
      G06F 18/2321   (2023.01)
      G06V 20/54     (2022.01)
      G06V 20/56     (2022.01)

(52) U.S. Cl.
     CPC ......... *G08G 1/0129* (2013.01); *G08G 1/0141* (2013.01); *G08G 1/20* (2013.01)

(56) References Cited

U.S. PATENT DOCUMENTS

| | | | |
|---|---|---|---|
| 7,970,749 B2 * | 6/2011 | Uhlir | A63F 13/10 707/705 |
| 8,630,958 B2 | 1/2014 | Carlsson et al. | |
| 8,731,808 B2 * | 5/2014 | Tashiro | G09B 29/007 701/414 |
| 8,935,036 B1 * | 1/2015 | Christensen | G08G 1/0129 701/29.3 |
| 9,142,127 B1 | 9/2015 | McDevitt-Pimbley et al. | |
| 9,286,795 B2 * | 3/2016 | Vorona | G08G 1/0104 |
| 9,672,667 B2 | 6/2017 | Mason et al. | |
| 9,759,812 B2 | 9/2017 | Nichols et al. | |
| 9,769,616 B1 | 9/2017 | Pao et al. | |
| 9,773,410 B2 | 9/2017 | Vorona | |
| 9,779,357 B1 | 10/2017 | Dabell | |
| 9,969,386 B1 | 5/2018 | Wang et al. | |
| 10,037,693 B2 | 7/2018 | Ryu et al. | |
| 10,042,359 B1 | 8/2018 | Konrardy et al. | |
| 10,060,751 B1 | 8/2018 | Chen et al. | |
| 10,186,146 B2 | 1/2019 | Hirotsu et al. | |
| 10,216,189 B1 | 2/2019 | Haynes | |
| 10,235,882 B1 | 3/2019 | Aoude et al. | |
| 10,306,430 B1 | 5/2019 | Abari et al. | |
| 10,331,129 B2 | 6/2019 | Iagnemma et al. | |
| 10,352,709 B1 | 7/2019 | Kalenkovich et al. | |
| 10,395,332 B1 | 8/2019 | Konrardy et al. | |
| 10,475,127 B1 | 11/2019 | Potter et al. | |
| 10,579,063 B2 | 3/2020 | Haynes et al. | |
| 10,699,564 B1 | 6/2020 | Lewis et al. | |
| 10,816,981 B2 | 10/2020 | Hazard et al. | |
| 10,891,518 B1 | 1/2021 | Joshi et al. | |
| 10,916,127 B2 | 2/2021 | Lewis et al. | |
| 10,967,862 B2 | 4/2021 | Bonk | |
| 11,403,938 B2 | 8/2022 | Lewis et al. | |
| 11,410,547 B2 | 8/2022 | Lewis et al. | |
| 11,423,773 B2 | 8/2022 | Lewis et al. | |
| 11,443,617 B2 | 9/2022 | Lewis et al. | |
| 11,450,202 B2 | 9/2022 | Lewis et al. | |
| 2002/0082767 A1 | 6/2002 | Mintz | |
| 2002/0198694 A1 | 12/2002 | Yang et al. | |
| 2004/0204819 A1 | 10/2004 | Meng | |
| 2004/0249568 A1 | 12/2004 | Endo et al. | |
| 2005/0084329 A1 | 4/2005 | Myers | |
| 2005/0125146 A1 | 6/2005 | Phuyal et al. | |
| 2005/0128103 A1 * | 6/2005 | Bachelder | G08G 1/087 340/906 |
| 2007/0213922 A1 | 9/2007 | Van Buer et al. | |
| 2008/0094250 A1 | 4/2008 | Myr | |
| 2008/0258880 A1 * | 10/2008 | Smith | H04L 67/12 455/404.2 |
| 2009/0299615 A1 * | 12/2009 | Denaro | G01C 21/26 707/999.107 |
| 2009/0299857 A1 | 12/2009 | Brubaker | |
| 2009/0309758 A1 * | 12/2009 | Gueziec | G01C 21/3492 340/905 |
| 2010/0033338 A1 | 2/2010 | Sverrisson | |
| 2010/0161217 A1 | 6/2010 | Yamamoto | |
| 2010/0299370 A1 | 11/2010 | Otto | |
| 2011/0106416 A1 | 5/2011 | Scofield et al. | |
| 2011/0112760 A1 | 5/2011 | Serbanescu et al. | |
| 2011/0191011 A1 | 8/2011 | McBride et al. | |
| 2011/0224898 A1 | 9/2011 | Scofield et al. | |
| 2011/0298603 A1 | 12/2011 | King et al. | |
| 2012/0054660 A1 | 3/2012 | Marusich et al. | |
| 2012/0239281 A1 | 9/2012 | Hinz | |
| 2012/0271542 A1 | 10/2012 | Arcot et al. | |
| 2012/0310691 A1 * | 12/2012 | Carlsson | G06Q 10/047 705/7.13 |
| 2012/0313755 A1 | 12/2012 | Gutierrez et al. | |
| 2012/0323486 A1 * | 12/2012 | Wartenberg | G01C 21/367 701/428 |
| 2013/0059558 A1 | 3/2013 | Gehlen et al. | |
| 2013/0093757 A1 | 4/2013 | Cornell | |
| 2013/0096731 A1 | 4/2013 | Tamari et al. | |
| 2013/0148855 A1 | 6/2013 | Yasugi et al. | |
| 2013/0204524 A1 | 8/2013 | Fryer et al. | |
| 2014/0074847 A1 | 3/2014 | Martens | |
| 2014/0089036 A1 | 3/2014 | Chidlovskii | |
| 2014/0149029 A1 | 5/2014 | Sakakibara et al. | |
| 2014/0201126 A1 | 7/2014 | Zadeh et al. | |
| 2014/0210645 A1 | 7/2014 | Sharma | |
| 2014/0266800 A1 | 9/2014 | Koukoumidis et al. | |
| 2014/0278031 A1 | 9/2014 | Scofield et al. | |
| 2014/0279707 A1 | 9/2014 | Joshua et al. | |
| 2014/0357295 A1 | 12/2014 | Skomra et al. | |
| 2014/0357312 A1 | 12/2014 | Davis et al. | |
| 2015/0057881 A1 | 2/2015 | Raab et al. | |
| 2015/0287319 A1 | 10/2015 | Cama et al. | |
| 2015/0363828 A1 | 12/2015 | Mantalovos | |
| 2016/0027299 A1 | 1/2016 | Raamot | |
| 2016/0042641 A1 | 2/2016 | Smith et al. | |
| 2016/0086393 A1 | 3/2016 | Collins et al. | |
| 2016/0148507 A1 | 5/2016 | Pittman et al. | |
| 2016/0171886 A1 | 6/2016 | Varona | |
| 2016/0174106 A1 | 6/2016 | Lee et al. | |
| 2016/0364739 A1 | 12/2016 | Dann et al. | |
| 2016/0381325 A1 | 12/2016 | Stumphauzer, II et al. | |
| 2017/0053529 A1 * | 2/2017 | Yokoyama | G08G 1/0145 |
| 2017/0069144 A1 | 3/2017 | Lawrie-Fussey et al. | |
| 2017/0072850 A1 | 3/2017 | Curtis et al. | |
| 2017/0076227 A1 | 3/2017 | Elgie et al. | |
| 2017/0089717 A1 | 3/2017 | White et al. | |
| 2017/0124476 A1 | 5/2017 | Levinson et al. | |
| 2017/0154537 A1 | 6/2017 | Moravek et al. | |
| 2017/0163515 A1 | 6/2017 | Heliker et al. | |
| 2017/0169631 A1 | 6/2017 | Walker et al. | |
| 2017/0268896 A1 | 9/2017 | Bai et al. | |
| 2017/0270785 A1 * | 9/2017 | Umehara | G08G 1/08 |
| 2017/0276499 A1 | 9/2017 | Sun et al. | |
| 2017/0277717 A1 | 9/2017 | Asaad et al. | |
| 2017/0309165 A1 * | 10/2017 | Zhao | G08G 1/096827 |
| 2017/0314934 A1 * | 11/2017 | Averbuch | G01S 19/50 |
| 2017/0316333 A1 | 11/2017 | Levinson et al. | |
| 2017/0349148 A1 | 12/2017 | Bojanowski et al. | |
| 2017/0372431 A1 | 12/2017 | Perl et al. | |
| 2018/0020324 A1 * | 1/2018 | Beauford | H04W 4/025 |
| 2018/0025430 A1 | 1/2018 | Perl et al. | |
| 2018/0053401 A1 | 2/2018 | Martin et al. | |
| 2018/0059672 A1 | 3/2018 | Li et al. | |
| 2018/0061242 A1 | 3/2018 | Bavar et al. | |
| 2018/0066957 A1 | 3/2018 | Stroila et al. | |
| 2018/0074502 A1 | 3/2018 | Holben | |
| 2018/0075309 A1 | 3/2018 | Sathyanarayana et al. | |
| 2018/0075380 A1 | 3/2018 | Perl et al. | |
| 2018/0095977 A1 | 4/2018 | Reddy et al. | |
| 2018/0111633 A1 | 4/2018 | Abrosimov et al. | |

(56) References Cited

U.S. PATENT DOCUMENTS

| | | |
|---|---|---|
| 2018/0113457 A1 | 4/2018 | Iagnemma et al. |
| 2018/0113463 A1 | 4/2018 | Iagnemma et al. |
| 2018/0137759 A1 | 5/2018 | Oh et al. |
| 2018/0144388 A1 | 5/2018 | Mattern et al. |
| 2018/0150764 A1 | 5/2018 | Stenneth |
| 2018/0157257 A1 | 6/2018 | Hashimoto et al. |
| 2018/0174443 A1 | 6/2018 | Fowe et al. |
| 2018/0182248 A1 | 6/2018 | Kanai et al. |
| 2018/0188045 A1* | 7/2018 | Wheeler ............... G01C 21/32 |
| 2018/0204111 A1 | 7/2018 | Zadeh et al. |
| 2018/0210892 A1 | 7/2018 | Stayner et al. |
| 2018/0224866 A1 | 8/2018 | Alonso-Mora et al. |
| 2018/0233035 A1 | 8/2018 | Moreira-Matias et al. |
| 2018/0259967 A1* | 9/2018 | Frazzoli ............. B60W 30/095 |
| 2018/0259969 A1 | 9/2018 | Frazzoli et al. |
| 2018/0276485 A1 | 9/2018 | Heck et al. |
| 2018/0281815 A1 | 10/2018 | Stentz |
| 2018/0286228 A1* | 10/2018 | Xu ...................... G08G 1/0112 |
| 2018/0286238 A1 | 10/2018 | Linder |
| 2018/0299893 A1 | 10/2018 | Qin et al. |
| 2018/0300816 A1 | 10/2018 | Perl et al. |
| 2018/0342034 A1* | 11/2018 | Kislovskiy ....... G06Q 10/06315 |
| 2018/0358033 A1 | 12/2018 | Yu et al. |
| 2018/0365995 A1 | 12/2018 | Murray |
| 2018/0367958 A1 | 12/2018 | Dizdarevic et al. |
| 2018/0374357 A1 | 12/2018 | Hosokawa et al. |
| 2019/0024781 A1 | 1/2019 | Chrungoo et al. |
| 2019/0025843 A1 | 1/2019 | Wilkinson et al. |
| 2019/0049262 A1 | 2/2019 | Grimm et al. |
| 2019/0057314 A1 | 2/2019 | Julian et al. |
| 2019/0068671 A1 | 2/2019 | Mehta et al. |
| 2019/0086928 A1* | 3/2019 | Chen ................ G01C 21/3602 |
| 2019/0088148 A1 | 3/2019 | Jacobus et al. |
| 2019/0101914 A1 | 4/2019 | Coleman et al. |
| 2019/0102840 A1 | 4/2019 | Perl et al. |
| 2019/0113356 A1 | 4/2019 | Fowe et al. |
| 2019/0113927 A1 | 4/2019 | Englard et al. |
| 2019/0120640 A1 | 4/2019 | Ho et al. |
| 2019/0122541 A1 | 4/2019 | Fowe et al. |
| 2019/0122543 A1 | 4/2019 | Matus et al. |
| 2019/0132709 A1 | 5/2019 | Graefe et al. |
| 2019/0135283 A1 | 5/2019 | Bonk |
| 2019/0143967 A1 | 5/2019 | Kutila et al. |
| 2019/0147320 A1 | 5/2019 | Mattyus et al. |
| 2019/0147736 A1 | 5/2019 | Camp et al. |
| 2019/0152492 A1 | 5/2019 | el Kaliouby et al. |
| 2019/0180612 A1* | 6/2019 | Demiryurek ......... G08G 1/0116 |
| 2019/0187720 A1 | 6/2019 | Fowe |
| 2019/0189001 A1 | 6/2019 | Smothers et al. |
| 2019/0197798 A1 | 6/2019 | Abari et al. |
| 2019/0204097 A1 | 7/2019 | Starns |
| 2019/0204100 A1* | 7/2019 | Sharma ................ G08G 1/012 |
| 2019/0213886 A1 | 7/2019 | Noda et al. |
| 2019/0266418 A1 | 8/2019 | Xu et al. |
| 2019/0272747 A1 | 9/2019 | Raamot |
| 2019/0287394 A1 | 9/2019 | Aoude et al. |
| 2019/0287403 A1 | 9/2019 | Aoude et al. |
| 2019/0289282 A1 | 9/2019 | Briggs et al. |
| 2019/0294979 A1* | 9/2019 | Newman ............... G01C 21/26 |
| 2019/0311617 A1 | 10/2019 | Karaoguz |
| 2019/0318620 A1* | 10/2019 | Yang ...................... G08G 1/164 |
| 2019/0325736 A1 | 10/2019 | Zhang et al. |
| 2019/0333232 A1 | 10/2019 | Vallespi-Gonzalez et al. |
| 2019/0333377 A1 | 10/2019 | Malkes et al. |
| 2020/0056892 A1* | 2/2020 | Haque .................. G06V 10/75 |
| 2020/0065711 A1 | 2/2020 | Clément et al. |
| 2020/0073381 A1* | 3/2020 | Wang .................. G05D 1/0088 |
| 2020/0098253 A1* | 3/2020 | Zeplin .................. G08G 1/081 |
| 2020/0117718 A1 | 4/2020 | Lundberg et al. |
| 2020/0135015 A1* | 4/2020 | Kalabic ............... G08G 1/0133 |
| 2020/0150652 A1 | 5/2020 | Urano et al. |
| 2020/0167672 A1 | 5/2020 | Raichelgauz et al. |
| 2020/0192386 A1 | 6/2020 | Stenneth |
| 2020/0193822 A1 | 6/2020 | Lin et al. |
| 2020/0193823 A1* | 6/2020 | Zhang ................. G08G 1/0112 |
| 2020/0209005 A1 | 7/2020 | Hou et al. |
| 2020/0209873 A1 | 7/2020 | Chen |
| 2020/0211370 A1 | 7/2020 | Chen |
| 2020/0211377 A1* | 7/2020 | Chen .................... G08G 1/0133 |
| 2020/0242858 A1 | 7/2020 | Meroux et al. |
| 2020/0242922 A1* | 7/2020 | Dulberg ................ G08G 1/012 |
| 2020/0257317 A1 | 8/2020 | Musk et al. |
| 2020/0258381 A1* | 8/2020 | Fowe ..................... G08G 1/052 |
| 2020/0263995 A1* | 8/2020 | Gaal .................... H04W 4/021 |
| 2020/0275286 A1 | 8/2020 | Keshavamurthy |
| 2020/0290638 A1 | 9/2020 | Damnjanovic et al. |
| 2020/0292338 A1 | 9/2020 | Fowe |
| 2020/0294394 A1* | 9/2020 | Guo ..................... G08G 1/164 |
| 2020/0301419 A1 | 9/2020 | Joseph et al. |
| 2020/0310450 A1* | 10/2020 | Reschka ............... B60W 30/12 |
| 2020/0320861 A1 | 10/2020 | Lewis et al. |
| 2020/0320862 A1 | 10/2020 | Lewis et al. |
| 2020/0320863 A1 | 10/2020 | Lewis et al. |
| 2020/0320865 A1 | 10/2020 | Lewis et al. |
| 2020/0320866 A1 | 10/2020 | Lewis et al. |
| 2020/0320867 A1 | 10/2020 | Lewis et al. |
| 2020/0320868 A1 | 10/2020 | Lewis et al. |
| 2021/0343142 A1 | 11/2021 | Lewis et al. |
| 2021/0350698 A1 | 11/2021 | Lewis et al. |
| 2021/0375129 A1* | 12/2021 | Meng .................. G08G 1/0116 |
| 2022/0051559 A1 | 2/2022 | Lewis et al. |
| 2022/0068121 A1 | 3/2022 | Lewis et al. |

FOREIGN PATENT DOCUMENTS

| | | |
|---|---|---|
| EP | 3 293 489 A1 | 3/2018 |
| EP | 2 638 711 B1 | 5/2018 |
| EP | 3 032 454 B1 | 9/2018 |
| WO | WO 2011/023247 A1 | 3/2011 |

OTHER PUBLICATIONS

Azevedo et al., Real-time road surface mapping using stereo matching, v-disparity and machine learning. IEEE 2013 International Joint Conference on Neural Networks (IJCNN). Aug. 4, 2013:1-8.

Deiotte et al., Comparison of spatiotemporal mapping techniques for enormous ETL and exploitation patterns. ISPRS Annals of Photogrammetry, Remote Sensing & Spatial Information Sciences. Oct. 19, 2017;4:7-13.

Guo et al., Towards high accuracy road maps generation from massive GPS traces data. 2007 IEEE International Geoscience and Remote Sensing Symposium, Jul. 23, 2007:667-70.

Haroun et al., Data fusion in automotive applications. Personal and Ubiquitous Computing. Jun. 2017;21(3):443-55.

Prytz, Machine learning methods for vehicle predictive maintenance using off-board and on-board data. Licentiate Thesis, Halmstad University Dissertations No. 9, 2014, 96 pages.

* cited by examiner

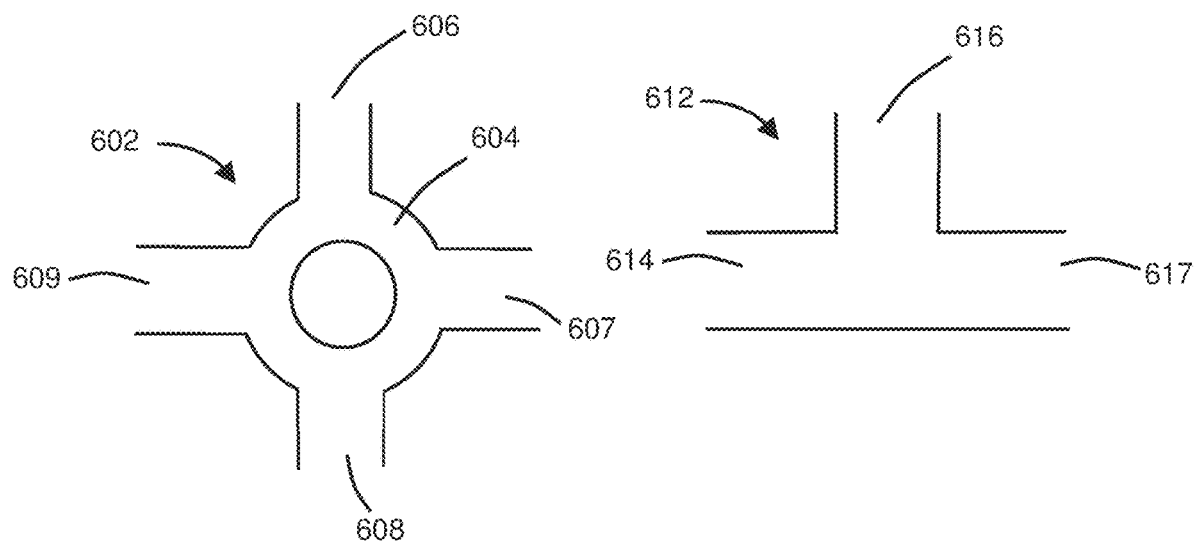
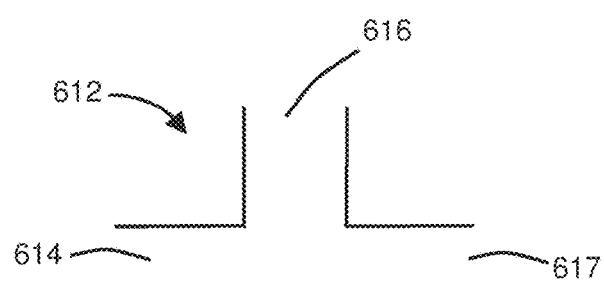
FIG. 6Ai
FIG. 6Aii
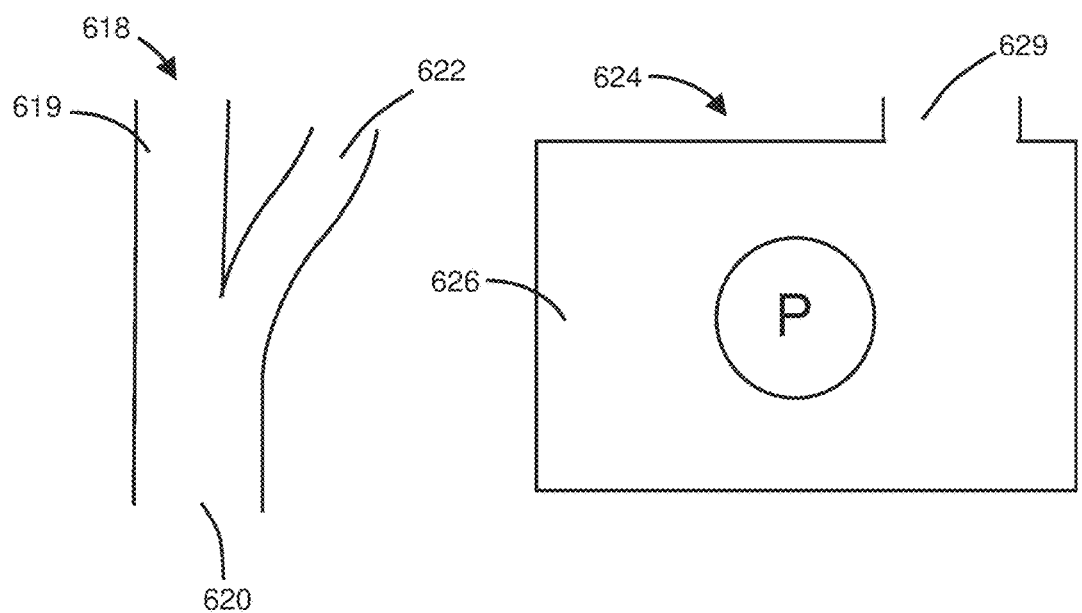
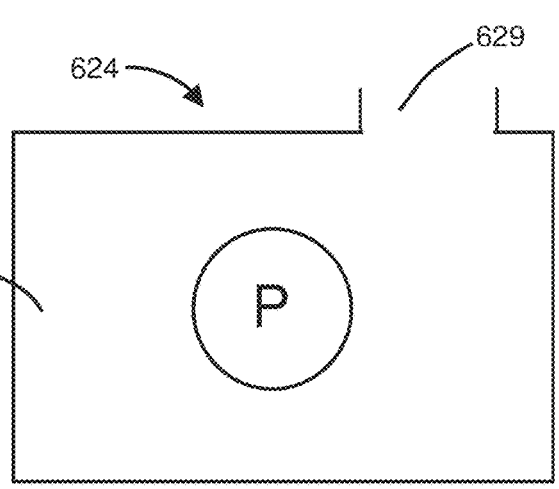
FIG. 6Aiii
FIG. 6Aiv

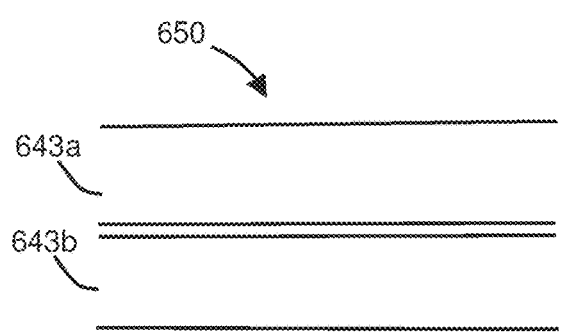
FIG. 6Av
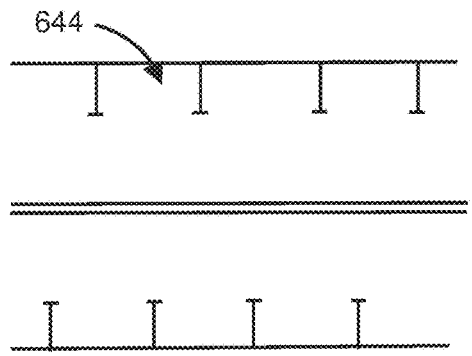
FIG. 6Avi
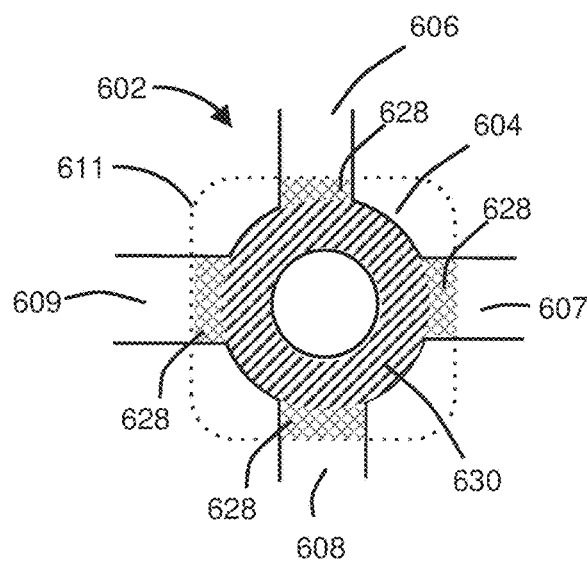
FIG. 6Bi
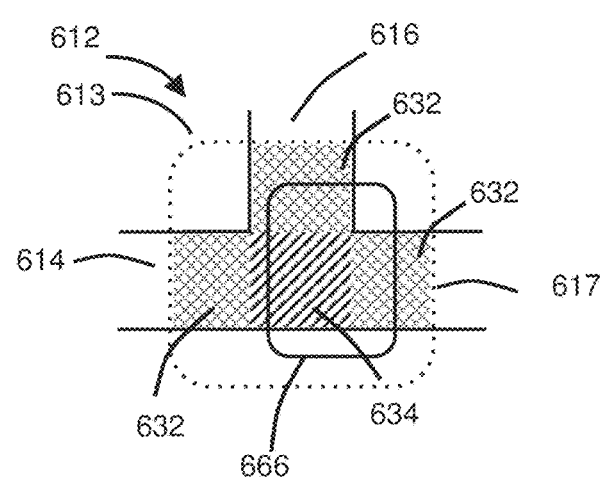
FIG. 6Bii

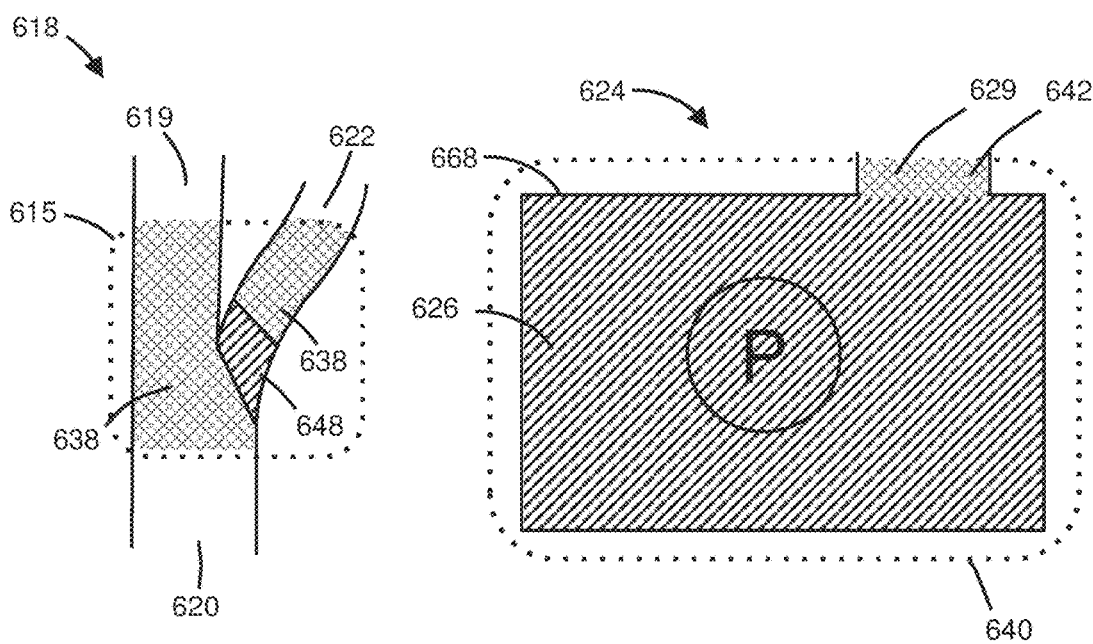
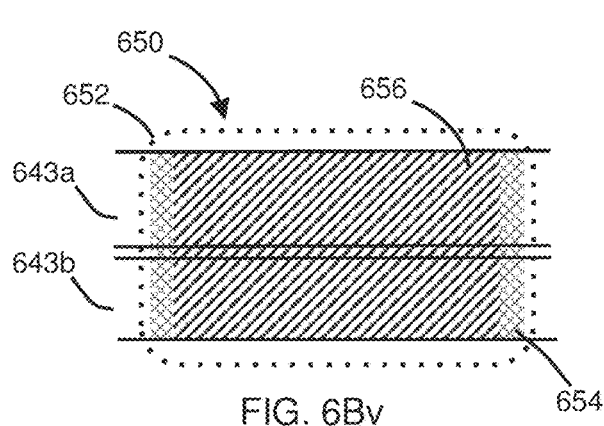
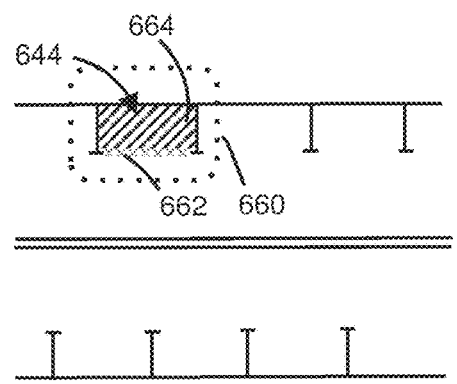
FIG. 6Biii
FIG. 6Biv
FIG. 6Bv
FIG. 6Bvi

1102

| Length | Cell Dimensions |
|---|---|
| 1 | ≤ 5,000km × 5,000km |
| 2 | ≤ 1,250km × 625km |
| 3 | ≤ 156km × 156km |
| 4 | ≤ 39.1km × 19.5km |
| 5 | ≤ 4.89km × 4.89km |
| 6 | ≤ 1.22km × 0.61km |
| 7 | ≤ 153m × 153m |
| 8 | ≤ 38.2m × 19.1m |
| 9 | ≤ 4.77m × 4.77m |
| 10 | ≤ 1.19m × 0.596m |
| 11 | ≤ 149mm × 149mm |
| 12 | ≤ 37.2mm × 18.6mm |

1108

1110

1112

1114

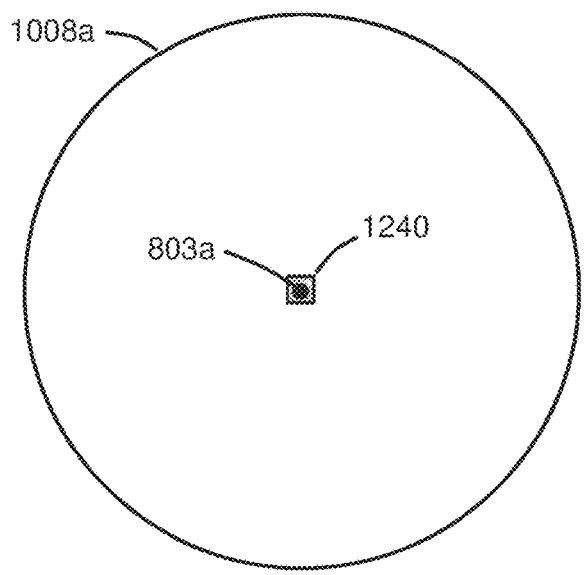
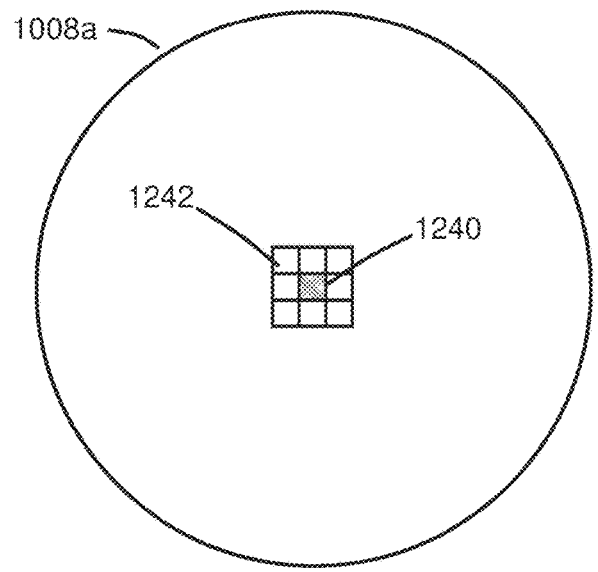
FIG. 12B  FIG. 12C
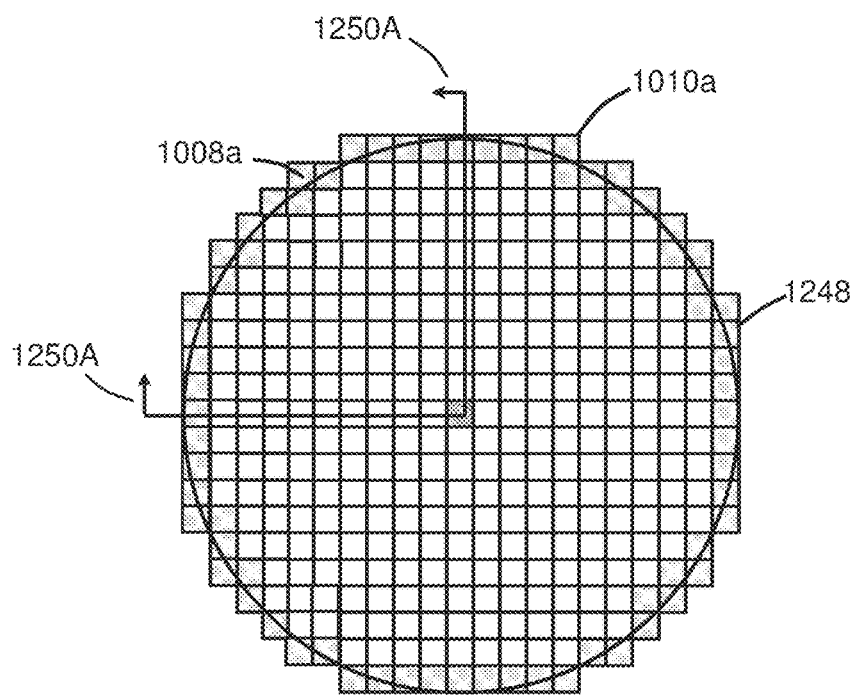
FIG. 12D

1302

| Subzone ID |
|---|
| 'GeohashString1' |
| 'GeohashString2' |
|  |
|  |
|  |
| 'GeohashStringn' |

| Subzone ID | Boundary Coordinates |
|---|---|
| 'GeohashString1' | $(LAT_1, LAT_2), (LONG_1, LONG_2)\ PAIR_1$ |
| 'GeohashString2' | $(LAT_1, LAT_2), (LONG_1, LONG_2)\ PAIR_2$ |
|  |  |
|  |  |
|  |  |
| 'GeohashStringn' | $(LAT_1, LAT_2), (LONG_1, LONG_2)\ PAIR_n$ |

| Device ID | DateTime MMYY-TIME | Speed km/hr | Position LAT/LONG | Ignition State 1 = ON 0 = OFF |
|---|---|---|---|---|
| $ID_1$ | 23/01/18-9:35 | 45 | | 1 |
| $ID_2$ | 23/01/18-9:42 | 30 | | 1 |
| $ID_3$ | 24/01/18-3:03 | 0 | | 1 |
| $ID_3$ | 24/01/18-4:15 | 45 | | 1 |
| $ID_4$ | 24/01/18-15:44 | 30 | | 1 |
| $ID_1$ | 25/01/18-10:35 | 40 | | 1 |
| $ID_2$ | 25/01/18-11:00 | 30 | | 1 |
| $ID_3$ | 25/01/18-12:03 | 0 | | 1 |
| $ID_3$ | 25/01/18-12:8 | 45 | | 1 |
| $ID_4$ | 26/01/18-15:44 | 30 | | 1 |
| $ID_1$ | 26/01/18-19:35 | 40 | | 1 |
| $ID_2$ | 26/01/18-22:22 | 20 | | 1 |
| $ID_3$ | 26/01/18-23:09 | 0 | | 1 |
| $ID_3$ | 27/01/18-13:13 | 45 | | 1 |
| $ID_4$ | 27/01/18-15:44 | 30 | | 1 |

FIG. 20D

| Feature | Value | Feature | Value |
|---|---|---|---|
| Minimum Speed | 0 km/hr | Minimum visits/day | 2 |
| Maximum Speed | 45 km/hr | Maximum Visits/day | 4 |
| Average Speed | 28.7km/hr | Avg. Visits/day | 3 |
| Median Speed | 30km/hr | Median Visits/day | 4 |
| Minimum Ignition | 1 | Minimum Unique Visits/day | 2 |
| Maximum Ignition | 1 | Maximum Unique Visits/day | 4 |
| Total # of Ignitions ON | 15 | Avg. Unique Visits/day | 2.6 |
| Total # of Ignitions OFF | 0 | Median Unique Visits/day | 2 |
| Avg. # of Ignitions | 1 | Total # Vehicle Visits | 4 |
| Ignition Ratio | 0 | Total # Unique Visits | 3.75 |
| | | Avg. # of visits/vehicle | 12.75 |

FIG. 20E

| Device ID | DateTime | Speed km/hr | Position LAT/LONG | Ignition State ON = 1/OFF = 0 |
|---|---|---|---|---|
| ID₂ | T0 | 40 | LAT/LONG0 | 1 |
| ID₂ | T1 | 30 | LAT/LONG1 | 1 |
| ID₂ | T2 | 20 | LAT/LONG2 | 1 |
| ID₂ | T3 | 60 | LAT/LONG3 | 1 |
| ID₂ | T4 | 0 | LAT/LONG4 | 1 |
| ID₂ | T5 | 10 | LAT/LONG5 | 1 |
| ID₂ | T6 | 15 | LAT/LONG6 | 1 |
| ID₂ | T7 | 40 | LAT/LONG7 | 1 |
| ID₂ | T8 | 15 | LAT/LONG8 | 1 |
| ID₂ | T9 | 0 | LAT/LONG9 | 1 |
| ID₂ | T10 | 5 | LAT/LONG10 | 1 |
| ID₂ | T11 | 10 | LAT/LONG11 | 1 |
| ID₂ | T12 | 5 | LAT/LONG12 | 1 |
| ID₂ | T13 | 10 | LAT/LONG13 | 1 |
| ID₂ | T14 | 0 | LAT/LONG14 | 0 |

| Zone | Subzone | Features | | | | Class (Vehicle Way/ Not-Vehicle Way) |
|---|---|---|---|---|---|---|
| | | Subzone-related | Zone-related | Subzone-zone-related | Spatial-related | |
| | | F1 ... ... ... ... ... ... ... ... ... Fn | | | | |
| 1010a | S₁ | | | | | |
| | Sₙ | | | | | |
| 1010b | S₁ | | | | | |
| | Sₙ | | | | | |
| 1010c | S₁ | | | | | |
| | Sₙ | | | | | |
| 1010d | S₁ | | | | | |
| | Sₙ | | | | | |
| 1010e | S₁ | | | | | |
| | Sₙ | | | | | |
| 1010f | S₁ | | | | | |
| | Sₙ | | | | | |

| Device ID | DateTime | Speed Km/h | Position LAT/LONG | Ignition State 1 = ON 0 = OFF |
|---|---|---|---|---|
| ID$_{202}$ | DT10 | s0 | LAT/LONG0 | 1 |
| ID$_{202}$ | DT11 | s1 | LAT/LONG1 | 1 |
| ID$_{202}$ | DT12 | s2 | LAT/LONG2 | 1 |
| ID$_{202}$ | DT13 | s3 | LAT/LONG3 | 1 |
| ID$_{202}$ | DT14 | s4 | LAT/LONG4 | 1 |
| ID$_{202}$ | DT15 | s5 | LAT/LONG5 | 1 |

2804

| Second Subzone ID | Second Subzone |
|---|---|
| 'GeohashString1' | 2802a |
| 'GeohashString2' | 2802b |
|  |  |
|  |  |
|  |  |
| 'GeohashStringn' | 2802n |

2804a — 'GeohashString1'
2804b — 'GeohashString2'
2806n — 'GeohashStringn'

| Second Subzone ID | Boundary | Second Subzone |
|---|---|---|
| 'GeohashString1' | $(LAT_1, LAT_2), (LONG_1, LONG_2)\ PAIR_1$ | 2802a |
| 'GeohashString2' | $(LAT_1, LAT_2), (LONG_1, LONG_2)\ PAIR_2$ | 2802b |
|  |  |  |
|  |  |  |
|  |  |  |
| 'GeohashStringn' | $(LAT_1, LAT_2), (LONG_1, LONG_2)\ PAIR_n$ | 2802n |

| Device ID | DateTime MMYY-TIME | Speed km/hr | Position LAT/LONG | Ignition State 1 = ON 0 = OFF |
|---|---|---|---|---|
| $ID_1$ | 23/01/18-9:35 | 45 | | 1 |
| $ID_2$ | 23/01/18-9:42 | 30 | | 1 |
| $ID_3$ | 24/01/18-3:03 | 0 | | 1 |
| $ID_3$ | 24/01/18-4:15 | 45 | | 1 |
| $ID_4$ | 24/01/18-15:44 | 30 | | 1 |
| $ID_1$ | 25/01/18-10:35 | 40 | | 1 |
| $ID_2$ | 25/01/18-11:00 | 30 | | 1 |
| $ID_3$ | 25/01/18-12:03 | 0 | | 1 |
| $ID_3$ | 25/01/18-12:8 | 45 | | 1 |
| $ID_4$ | 26/01/18-15:44 | 30 | | 1 |
| $ID_1$ | 26/01/18-19:35 | 40 | | 1 |
| $ID_2$ | 26/01/18-22:22 | 20 | | 1 |
| $ID_3$ | 26/01/18-23:09 | 0 | | 1 |
| $ID_3$ | 27/01/18-13:13 | 45 | | 1 |
| $ID_4$ | 27/01/18-15:44 | 30 | | 1 |

FIG. 34B

| Feature | Value | Feature | Value |
|---|---|---|---|
| Minimum Speed | 0 km/hr | Minimum visits/day | 2 |
| Maximum Speed | 45 km/hr | Maximum Visits/day | 4 |
| Average Speed | 28.7km/hr | Avg. Visits/day | 3 |
| Median Speed | 30km/hr | Median Visits/day | 4 |
| Minimum Ignition | 1 | Minimum Unique Visits/day | 2 |
| Maximum Ignition | 1 | Maximum Unique Visits/day | 4 |
| Total # of Ignitions ON | 15 | Avg. Unique Visits/day | 2.6 |
| Total # of Ignitions OFF | 0 | Median Unique Visits/day | 2 |
| Avg. # of Ignitions | 1 | Total # Vehicle Visits | 4 |
| Ignition Ratio | 0 | Total # Unique Visits | 3.75 |
| | | Avg. # of visits/vehicle | 12.75 |

FIG. 34C

| Device ID | DateTime | Speed km/hr | Position LAT/LONG | Ignition State ON = 1/OFF = 0 |
|---|---|---|---|---|
| $ID_2$ | T11 | 30 | LAT/LONG1 | 1 |
| $ID_2$ | T12 | 20 | LAT/LONG2 | 1 |
| $ID_2$ | T13 | 60 | LAT/LONG3 | 1 |
| $ID_2$ | T14 | 0 | LAT/LONG4 | 1 |
| $ID_2$ | T15 | 10 | LAT/LONG5 | 1 |
| $ID_2$ | T16 | 15 | LAT/LONG6 | 1 |
| $ID_2$ | T17 | 40 | LAT/LONG7 | 1 |
| $ID_2$ | T18 | 15 | LAT/LONG8 | 1 |
| $ID_2$ | T19 | 0 | LAT/LONG9 | 1 |
| $ID_2$ | T20 | 5 | LAT/LONG10 | 1 |
| $ID_2$ | T21 | 10 | LAT/LONG11 | 1 |
| $ID_2$ | T22 | 5 | LAT/LONG12 | 1 |
| $ID_2$ | T23 | 10 | LAT/LONG13 | 1 |
| $ID_2$ | T24 | 0 | LAT/LONG14 | 0 |

3800

| Features | | | | |
|---|---|---|---|---|
| Subzone-related | Road Network Zone-related | Subzone-Road Network Zone-related | Spatial-related | Other |
| F1 ... ... ... ... ... ... ... ... ... ... ... ... ... Fn | | | | |

| | Features | | | | |
|---|---|---|---|---|---|
| Subzone | Subzone-related | Road Network Zone-related | Subzone-Road Network zone-related | Spatial-related | Other |
| 2802a | F1 ... ... ... ... ... ... ... ... ... ... ... ... ... Fn | | | | |
| 2802b | F1 ... ... ... ... ... ... ... ... ... ... ... ... ... Fn | | | | |
| | F1 ... ... ... ... ... ... ... ... ... ... ... ... ... Fn | | | | |
| | F1 ... ... ... ... ... ... ... ... ... ... ... ... ... Fn | | | | |
| 2802... | F1 ... ... ... ... ... ... ... ... ... ... ... ... ... Fn | | | | |

FIG. 38B

| Second Subzone | Second Subzone ID | Classification/Label |
|---|---|---|
| 2802a | 'GeohashString1' | 1/0 |
| 2802b | 'GeohashString2' | 1/0 |
| ... | | ... |
| | | |
| | | |
| | | |
| | | |
| 2802... | 'GeohashString' | 1/0 |

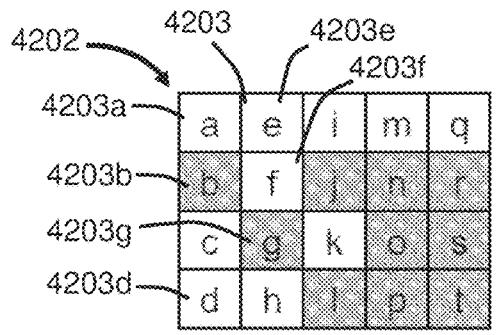

FIG. 42A

| Second Subzone ID | Label/ Classification | Second Subzone ID | Label/ Classification |
|---|---|---|---|
| 'GeohashString_a' | 0 | 'GeohashString_k' | 0 |
| 'GeohashString_b' | 1 | 'GeohashString_l' | 1 |
| 'GeohashString_c' | 0 | 'GeohashString_m' | 0 |
| 'GeohashString_d' | 0 | 'GeohashString_n' | 1 |
| 'GeohashString_e' | 0 | 'GeohashString_o' | 1 |
| 'GeohashString_f' | 0 | 'GeohashString_p' | 1 |
| 'GeohashString_g' | 1 | 'GeohashString_q' | 0 |
| 'GeohashString_h' | 0 | 'GeohashString_r' | 1 |
| 'GeohashString_i' | 0 | 'GeohashString_s' | 1 |
| 'GeohashString_j' | 1 | 'GeohashString_t' | 1 |

FIG. 42B

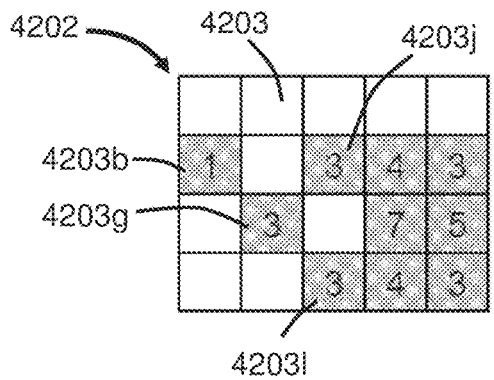
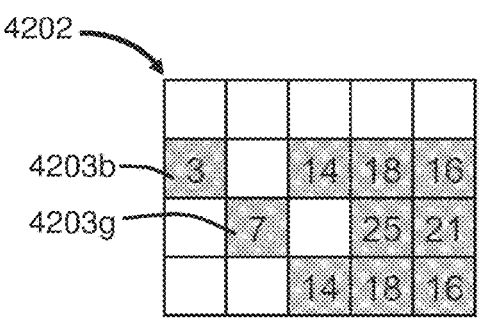

FIG. 42D        FIG. 42E

| Second Subzone ID | Label/Classification | Second Subzone ID | Label/Classification |
|---|---|---|---|
| 'GeohashString_a' | 0 | 'GeohashString_k' | 0 |
| 'GeohashString_b' | 0 | 'GeohashString_l' | 1 |
| 'GeohashString_c' | 0 | 'GeohashString_m' | 0 |
| 'GeohashString_d' | 0 | 'GeohashString_n' | 1 |
| 'GeohashString_e' | 0 | 'GeohashString_o' | 1 |
| 'GeohashString_f' | 0 | 'GeohashString_p' | 1 |
| 'GeohashString_g' | 0 | 'GeohashString_q' | 0 |
| 'GeohashString_h' | 0 | 'GeohashString_r' | 1 |
| 'GeohashString_i' | 0 | 'GeohashString_s' | 1 |
| 'GeohashString_j' | 1 | 'GeohashString_t' | 1 |

FIG. 42F

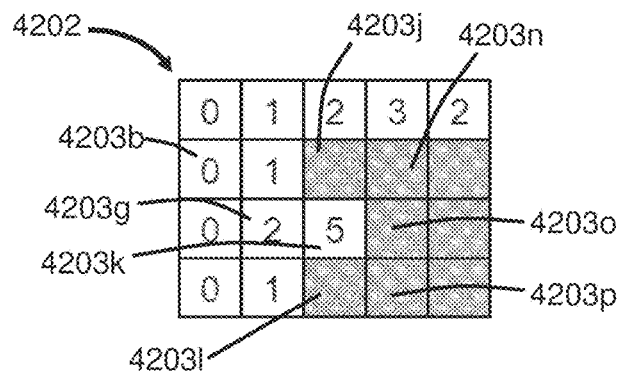

FIG. 42G

| Second Subzone ID | Label/ Classification | Second Subzone ID | Label/ Classification |
|---|---|---|---|
| 'GeohashString_a' | 0 | 'GeohashString_k' | 1 |
| 'GeohashString_b' | 1 | 'GeohashString_l' | 1 |
| 'GeohashString_c' | 0 | 'GeohashString_m' | 0 |
| 'GeohashString_d' | 0 | 'GeohashString_n' | 1 |
| 'GeohashString_e' | 0 | 'GeohashString_o' | 1 |
| 'GeohashString_f' | 0 | 'GeohashString_p' | 1 |
| 'GeohashString_g' | 1 | 'GeohashString_q' | 0 |
| 'GeohashString_h' | 0 | 'GeohashString_r' | 1 |
| 'GeohashString_i' | 0 | 'GeohashString_s' | 1 |
| 'GeohashString_j' | 1 | 'GeohashString_t' | 1 |

FIG. 42H

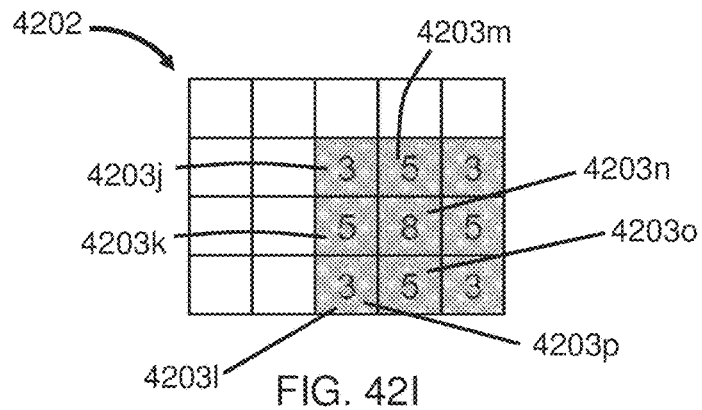

FIG. 42I

| Second Subzone ID | Label/ Classification | Second Subzone ID | Label/ Classification |
|---|---|---|---|
| 'GeohashString_a' | 0 | 'GeohashString_k' | 1 |
| 'GeohashString_b' | 0 | 'GeohashString_l' | 1 |
| 'GeohashString_c' | 0 | 'GeohashString_m' | 0 |
| 'GeohashString_d' | 0 | 'GeohashString_n' | 1 |
| 'GeohashString_e' | 0 | 'GeohashString_o' | 1 |
| 'GeohashString_f' | 0 | 'GeohashString_p' | 1 |
| 'GeohashString_g' | 0 | 'GeohashString_q' | 0 |
| 'GeohashString_h' | 0 | 'GeohashString_r' | 1 |
| 'GeohashString_i' | 0 | 'GeohashString_s' | 1 |
| 'GeohashString_j' | 1 | 'GeohashString_t' | 1 |

FIG. 42J

| Second sterSubzone ID | Classification/Label |
|---|---|
| 2802a | 1/0 |
| 2802b | 1/0 |
| ... | ... |
| | |
| | |
| | |
| | |
| 2802... | 1/0 |

FIG. 43

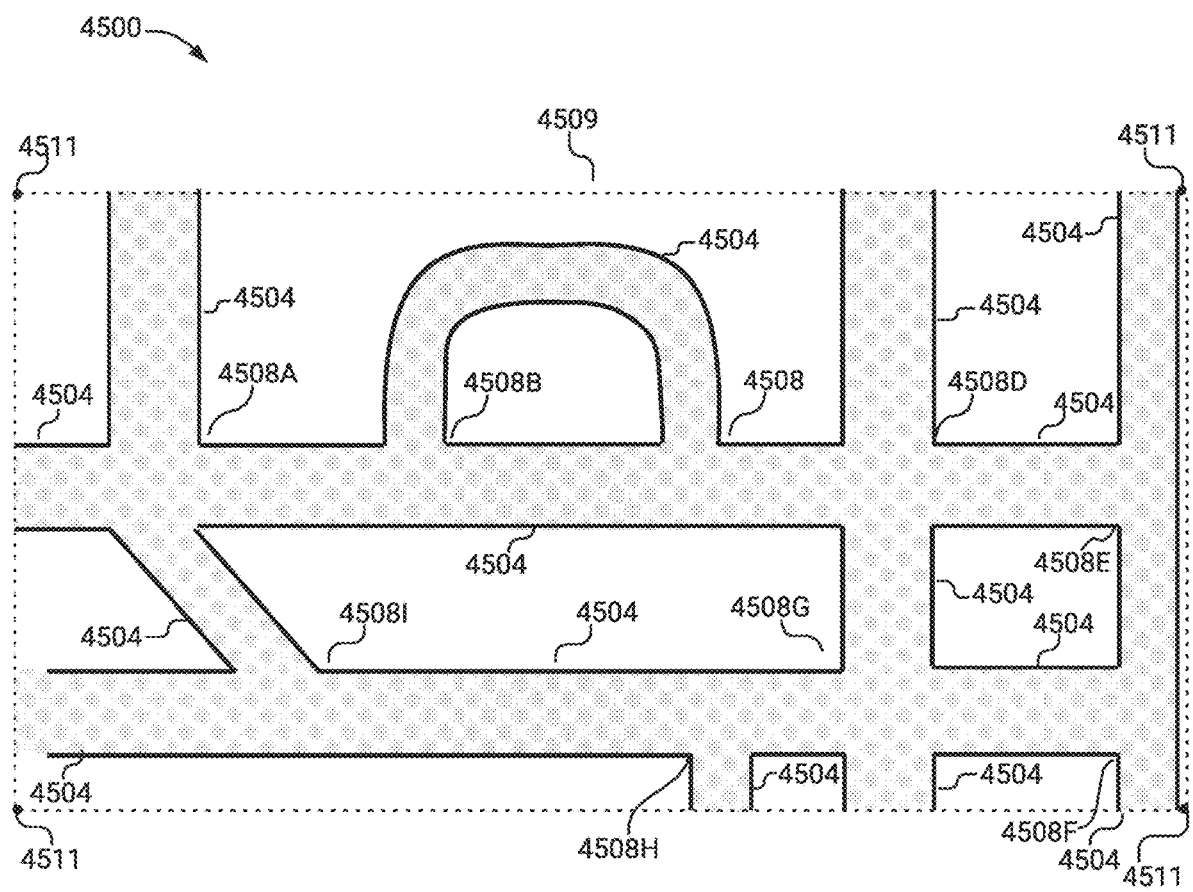

| | Road Network Subzone ID (4514) | Road Network Subzone Location (4512) | Road Network Subzone Label (4902) | Intersection Mapping (4904) | |
|---|---|---|---|---|---|
| 4900-002 → | 001 | GeohashString-001 | non-core | null | ROAD SECTION 4806-1 |
| | 002 | GeohashString-002 | non-core | null | |
| | ... | ... | non-core | null | |
| INTERSECTION 4802A | ### | GeohashString-### | core | 4802A | |
| | ### | GeohashString-### | core | 4802A | |
| | ### | GeohashString-### | core | 4802A | |
| | ### | GeohashString-### | non-core | null | ROAD SECTION 4806-2 |
| | ... | ... | non-core | null | |
| | ### | GeohashString-### | non-core | null | |
| INTERSECTION 4802B | 144 | GeohashString-144 | core | 4802B | ← 4900-144 |
| | ... | ... | core | 4802B | |
| | ### | GeohashString-### | core | 4802B | |
| | ### | GeohashString-### | non-core | null | ROAD SECTION 4806-3 |
| | ... | ... | non-core | null | |
| | ### | GeohashString-### | non-core | null | |
| INTERSECTION 4802C | ### | GeohashString-### | core | 4802C | |
| | ... | ... | core | 4802C | |
| | ### | GeohashString-### | core | 4802C | |
| | ### | GeohashString-### | non-core | null | ROAD SECTION 4806-4 |
| | ... | ... | non-core | null | |
| | ### | GeohashString-### | non-core | null | |
| | ### | GeohashString-### | non-core | null | ROAD SECTION 4806-5 |
| | ... | ... | non-core | null | |
| | ### | GeohashString-### | non-core | null | |
| INTERSECTION 4802B | ### | GeohashString-### | core | 4802D | |
| | ... | ... | core | 4802D | |
| | ### | GeohashString-### | core | 4802D | |

FIG. 49A

| | Road Network Subzone ID (4514) | Road Network Subzone Location (4512) | Road Network Subzone Label (4902) | Intersection Mapping (4904) | |
|---|---|---|---|---|---|
| | ### | GeohashString-### | non-core | null | ROAD SECTION 4806-6 |
| | ... | ... | non-core | null | |
| | ### | GeohashString-### | non-core | null | |
| INTERSECTION 4802E | ### | GeohashString-### | core | 4802E | |
| | ... | ... | core | 4802E | |
| | ### | GeohashString-### | core | 4802E | |
| | ### | GeohashString-### | non-core | null | ROAD SECTION 4806-7 |
| | ... | ... | non-core | null | |
| | ### | GeohashString-### | non-core | null | |
| INTERSECTION 4802F | ### | GeohashString-### | core | 4802F | |
| | ... | ... | core | 4802F | |
| | ### | GeohashString-### | core | 4802F | |
| | ### | GeohashString-### | non-core | null | ROAD SECTION 4806-8 |
| | ... | ... | non-core | null | |
| | ### | GeohashString-### | non-core | null | |
| | ### | GeohashString-### | non-core | null | ROAD SECTION 4806-9 |
| | ... | ... | non-core | null | |
| | ### | GeohashString-### | non-core | null | |
| INTERSECTION 4802G | ### | GeohashString-### | core | 4802G | |
| | ... | ... | core | 4802G | |
| | ### | GeohashString-### | core | 4802G | |
| | ### | GeohashString-### | non-core | null | ROAD SECTION 4806-10 |
| | ... | ... | non-core | null | |
| | ### | GeohashString-### | non-core | null | |
| INTERSECTION 4802H | ### | GeohashString-### | core | 4802H | |
| | ... | ... | core | 4802H | |
| | ### | GeohashString-### | core | 4802H | |

FIG. 49B

| Road Network Subzone ID (4514) | Road Network Subzone Location (4512) | Road Network Subzone Label (4902) | Intersection Mapping (4904) | |
|---|---|---|---|---|
| ### | GeohashString-### | non-core | null | ROAD SECTION 4806-11 |
| ### | GeohashString-5492 | non-core | null | |
| ### | GeohashString-### | core | 4802A | INTERSECTION 4802I |
| ... | ... | core | 4802A | |
| ### | GeohashString-### | core | 4802A | |
| ### | GeohashString-### | non-core | null | ROAD SECTION 4806-12 |
| ... | ... | non-core | null | |
| ### | GeohashString-### | non-core | null | |
| ### | GeohashString-### | non-core | null | ROAD SECTION 4806-13 |
| ... | ... | non-core | null | |
| ### | GeohashString-### | non-core | null | |
| ### | GeohashString-### | non-core | null | ROAD SECTION 4806-14 |
| ... | ... | non-core | null | |
| ### | GeohashString-### | non-core | null | |
| ### | GeohashString-### | non-core | null | ROAD SECTION 4806-15 |
| ... | ... | non-core | null | |
| ### | GeohashString-### | non-core | null | |
| ### | GeohashString-### | non-core | null | ROAD SECTION 4806-16 |
| ... | ... | non-core | null | |
| ### | GeohashString-### | non-core | null | |

Table 4900

FIG. 49C

| | Road Network Subzone ID | Road Network Subzone Location | Road Network Subzone Label | Intersection Mapping | |
|---|---|---|---|---|---|
| | 001 | GeohashString-001 | non-core | 4802A | ROAD SECTION 4806-1 |
| | 002 | GeohashString-002 | non-core | 4802A | |
| | ... | ... | non-core | 4802A | |
| INTERSECTION 4802A | ### | GeohashString-### | core | 4802A | |
| | ### | GeohashString-### | core | 4802A | |
| | ### | GeohashString-### | core | 4802A | |
| | ### | GeohashString-### | non-core | 4802A, 4802B | ROAD SECTION 4806-2 |
| | ... | ... | non-core | 4802A, 4802B | |
| | ### | GeohashString-### | non-core | 4802A, 4802B | |
| INTERSECTION 4802B | 144 | GeohashString-144 | core | 4802B | |
| | ... | ... | core | 4802B | |
| | ### | GeohashString-### | core | 4802B | |
| | ### | GeohashString-### | non-core | 4802B, 4802C | ROAD SECTION 4806-3 |
| | ... | ... | non-core | 4802B, 4802C | |
| | ### | GeohashString-### | non-core | 4802B, 4802C | |
| INTERSECTION 4802C | ### | GeohashString-### | core | 4802C | |
| | ... | ... | core | 4802C | |
| | ### | GeohashString-### | core | 4802C | |
| | ### | GeohashString-### | non-core | 4802B, 4802C | ROAD SECTION 4806-4 |
| | ... | ... | non-core | 4802B, 4802C | |
| | ### | GeohashString-### | non-core | 4802B, 4802C | |
| | ### | GeohashString-### | non-core | 4802C, 4802D | ROAD SECTION 4806-5 |
| | ... | ... | non-core | 4802C, 4802D | |
| | ### | GeohashString-### | non-core | 4802C, 4802D | |
| INTERSECTION 4802D | ### | GeohashString-### | core | 4802D | |
| | ... | ... | core | 4802D | |
| | ### | GeohashString-### | core | 4802D | |

FIG. 52A

| | Road Network Subzone ID (4514) | Road Network Subzone Location (4512) | Road Network Subzone Label (4902) | Intersection Mapping (4904) | |
|---|---|---|---|---|---|
| | ### | GeohashString-### | non-core | 4802D | |
| | ... | ... | non-core | 4802D | ROAD SECTION 4806-6 |
| | ### | GeohashString-### | non-core | 4802D | |
| INTERSECTION 4802E | ### | GeohashString-### | core | 4802E | |
| | ... | ... | core | 4802E | |
| | ### | GeohashString-### | core | 4802E | |
| | ### | GeohashString-### | non-core | 4802D, 4802E | |
| | ... | ... | non-core | 4802D, 4802E | ROAD SECTION 4806-7 |
| | ### | GeohashString-### | non-core | 4802D, 4802E | |
| INTERSECTION 4802F | ### | GeohashString-### | core | 4802F | |
| | ... | ... | core | 4802F | |
| | ### | GeohashString-### | core | 4802F | |
| | ### | GeohashString-### | non-core | 4802E, 4802F | |
| | ... | ... | non-core | 4802E, 4802F | ROAD SECTION 4806-8 |
| | ### | GeohashString-### | non-core | 4802E, 4802F | |
| | ### | GeohashString-### | non-core | 4802E, 4802F | |
| | ... | ... | non-core | 4802E, 4802F | ROAD SECTION 4806-9 |
| | ### | GeohashString-### | non-core | 4802E, 4802F | |
| INTERSECTION 4802G | ### | GeohashString-### | core | 4802G | |
| | ... | ... | core | 4802G | |
| | ### | GeohashString-### | core | 4802G | |
| | ### | GeohashString-### | non-core | 4802E, 4802F | |
| | ... | ... | non-core | 4802E, 4802F | ROAD SECTION 4806-10 |
| | ### | GeohashString-### | non-core | 4802E, 4802F | |
| INTERSECTION 4802H | ### | GeohashString-### | core | 4802H | |
| | ... | ... | core | 4802H | |
| | ### | GeohashString-### | core | 4802H | |

| | 4514 | 4512 | 4902 | 4904 | |
|---|---|---|---|---|---|
| | Road Network Subzone ID | Road Network Subzone Location | Road Network Subzone Label | Intersection Mapping | |
| | ### | GeohashString-### | non-core | 4802F | ROAD SECTION 4806-11 |
| | ### | GeohashString-5492 | non-core | 4802F | |
| INTERSECTION 4802I | ### | GeohashString-### | core | 4802I | |
| | ... | ... | core | 4802I | |
| | ### | GeohashString-### | core | 4802I | |
| | ### | GeohashString-### | non-core | 4802G, 4802F | ROAD SECTION 4806-12 |
| | ... | ... | non-core | 4802G, 4802F | |
| | ### | GeohashString-### | non-core | 4802G, 4802F | |
| | ### | GeohashString-### | non-core | 4802I, 4802H | ROAD SECTION 4806-13 |
| | ... | ... | non-core | 4802I, 4802H | |
| | ### | GeohashString-### | non-core | 4802I, 4802H | |
| | ### | GeohashString-### | non-core | 4802A, 4802B | ROAD SECTION 4806-14 |
| | ... | ... | non-core | 4802A, 4802B | |
| | ### | GeohashString-### | non-core | 4802A, 4802B | |
| | ### | GeohashString-### | non-core | 4802I | ROAD SECTION 4806-15 |
| | ... | ... | non-core | 4802I | |
| | ### | GeohashString-### | non-core | 4802I | |
| | ### | GeohashString-### | non-core | 4802A | ROAD SECTION 4806-16 |
| | ... | ... | non-core | 4802A | |
| | ### | GeohashString-### | non-core | 4802A | |

FIG. 52C

| Device ID | Position LAT/LONG | Ignition State 1 = ON 0 = OFF | DateTime DDMMYY-TIME | Speed | Vehicle-position point |
|---|---|---|---|---|---|
| $ID_{111}$ | (N/S)°/(W/E)° | 0 | ddmmyy-time | 0 | 5333A |
| $ID_{111}$ | (N/S)°/(W/E)° | 1 | ddmmyy-time | 2 | 5333B |
| $ID_{111}$ | ... | ... | ... | ... | ... |
| $ID_{111}$ | (N/S)°/(W/E)° | 1 | ddmmyy-time | 30 | ... |
| $ID_{111}$ | ... | ... | ... | ... | ... |
| $ID_{111}$ | (N/S)°/(W/E)° | 1 | ddmmyy-time | 1 | ... |
| $ID_{111}$ | (N/S)°/(W/E)° | 0 | ddmmyy-time | 0 | 5333E |
| $ID_{112}$ | (N/S)°/(W/E)° | 0 | ddmmyy-time | 0 | 5338 |
| $ID_{112}$ | (N/S)°/(W/E)° | 1 | ddmmyy-time | 3 | 5350 |
| $ID_{112}$ | ... | ... | ... | ... | ... |
| $ID_{112}$ | (N/S)°/(W/E)° | 1 | ddmmyy-time | 0 | ... |
| $ID_{112}$ | ... | ... | ... | ... | ... |
| $ID_{112}$ | (N/S)°/(W/E)° | 1 | ddmmyy-time | 2 | ... |
| $ID_{112}$ | (N/S)°/(W/E)° | 0 | ddmmyy-time | 0 | 5337 |
| $ID_{113}$ | (N/S)°/(W/E)° | 0 | ddmmyy-time | 0 | 5342A |
| $ID_{113}$ | (N/S)°/(W/E)° | 1 | ddmmyy-time | 1 | 5342B |
| $ID_{113}$ | ... | ... | ... | ... | ... |
| $ID_{113}$ | (N/S)°/(W/E)° | 1 | ddmmyy-time | 2 | ... |
| $ID_{113}$ | (N/S)°/(W/E)° | 0 | ddmmyy-time | 0 | 5342D |
| $ID_{113}$ | (N/S)°/(W/E)° | 1 | ddmmyy-time | 3 | 5342E |
| $ID_{113}$ | ... | ... | ... | ... | ... |
| $ID_{113}$ | (N/S)°/(W/E)° | 1 | ddmmyy-time | 2 | 5342F |
| $ID_{113}$ | (N/S)°/(W/E)° | 0 | ddmmyy-time | 0 | 5342G |

FIG. 53D

| | 5341B | | 5341D | 5341E | 5404A | 5404B | 5404C | 5404D | 5380 |
|---|---|---|---|---|---|---|---|---|---|
| | Position LAT/LONG | ... | DateTime DDMMYY-TIME | Speed | Road Network SubzoneID | Road Network Subzone Location | Road Network Subzone Label | Intersection Mapping | Vehicle-position point |
| 5410 | (N/S)°/ (W/E)° | ... | ddmmyy-time | #km/h | null | GeohashString-5402 | null | null | 5338 |
| | ... | ... | ... | ... | ... | ... | ... | ... | ... |
| 5411 | (N/S)°/ (W/E)° | ... | ddmmyy-time | #km/h | 5492 | GeohashString-5492 | non-core | 4802F | 5352 |
| 5413 | (N/S)°/ (W/E)° | ... | ddmmyy-time | #km/h | #### | GeohashString-### | core | 4802F | 5353 |
| 5415 | (N/S)°/ (W/E)° | ... | ddmmyy-time | #km/h | #### | GeohashString-### | core | 4802F | 5354 |
| 5417 | (N/S)°/ (W/E)° | ... | ddmmyy-time | #km/h | #### | GeohashString-### | core | 4802F | 5355 |
| 5419 | (N/S)°/ (W/E)° | ... | ddmmyy-time | # km/h | #### | GeohashString-### | core | 4802F | 5356A |
| 5421 | (N/S)°/ (W/E)° | ... | ddmmyy-time | #km/h | #### | GeohashString-### | core | 4802F | 5356B |
| 5429 | (N/S)°/ (W/E)° | ... | ddmmyy-time | #km/h | #### | GeohashString-### | core | 4802F | 5356C |
| 5339 | (N/S)°/ (W/E)° | ... | ddmmyy-time | #km/h | #### | GeohashString-### | core | 4802F | 5357 |
| 5439 | (N/S)°/ (W/E)° | ... | ddmmyy-time | #km/h | #### | GeohashString-### | non-core | 4802G, 4802F | 5358 |

FIG. 54C

| | 5341B | 5341D | 5341E | 5404A | 5404B | 5404C | 5404D | 5380 |
|---|---|---|---|---|---|---|---|---|
| 5403 | Position LAT/LONG | ... DateTime DDMMYY-TIME | Speed | Road Network SubzoneID | Road Network Subzone Location | Road Network Subzone Label | Intersection Mapping | Vehicle-position point |
| 5429 | (N/S)°/ (W/E)° | ... ddmmyy-time | #km/h | #### | GeohashString-### | core | 4802F | 5456C |
| 5339 | (N/S)°/ (W/E)° | ... ddmmyy-time | #km/h | #### | GeohashString-### | core | 4802F | 5357 |
| 5439 | (N/S)°/ (W/E)° | ... ddmmyy-time | #km/h | #### | GeohashString-### | non-core | 4802G, 4802F | 5358 |
| 5428 | (N/S)°/ (W/E)° | ... ddmmyy-time | #km/h | #### | GeohashString-### | non-core | 4802G, 4802F | 5359 |
| 5431 | (N/S)°/ (W/E)° | ... ddmmyy-time | #km/h | #### | GeohashString-### | non-core | 4802G, 4802F | 5360 |
| 5432 | (N/S)°/ (W/E)° | ... ddmmyy-time | #km/h | #### | GeohashString-### | core | 4802G | 5361 |
| 5434 | (N/S)°/ (W/E)° | ... ddmmyy-time | #km/h | #### | GeohashString-### | core | 4802G | 5362 |
| 5436 | (N/S)°/ (W/E)° | ... ddmmyy-time | #km/h | #### | GeohashString-### | core | 4802G | 5363 |
| 5438 | (N/S)°/ (W/E)° | ... ddmmyy-time | #km/h | #### | GeohashString-### | core | 4802G | 5364 |
| 5440 | (N/S)°/ (W/E)° | ... ddmmyy-time | #km/h | #### | GeohashString-### | core | 4802G | 5365 |
| 5442 | (N/S)°/ (W/E)° | ... ddmmyy-time | #km/h | #### | GeohashString-### | non-core | 4802G, 4802F | 5366 |

Rows 5439–5431 bracketed as 5494; rows 5432–5440 bracketed as 5493.

| | Position LAT/LONG | ... | DateTime DDMMYY-TIME UTC | Speed km/h | Road Network SubzoneID | Road Network Subzone Location | Road Network Subzone Label | Intersection Mapping | Vehicle-position point |
|---|---|---|---|---|---|---|---|---|---|
| | (5502) | | (5504) | (5506) | (5508) | (5510) | (5512) | (5514) | (5516) |
| 5411 | 43°12'37.05" N 79°46'58.879" W | ... | 23/01/18 - 14:35:44 | 30 | 5492 | GeohashString-### | non-core | 4802F | 5352 |
| 5413 | 43°12'37.084" N 79°46'59.124" W | ... | 23/01/18 - 14:35:50 | 31 | #### | GeohashString-### | core | 4802F | 5353 |
| 5415 | 43°12'37.18" N 79°47'0.144" W | ... | 23/01/18 - 14:35:55 | 28 | #### | GeohashString-### | core | 4802F | 5354 |
| 5417 | 43°12'37.473" N 79°47'0.754" W | ... | 23/01/18 - 14:35:59 | 29 | #### | GeohashString-### | core | 4802F | 5355 |
| 5419 | 43°12'37.791" N 79°47'0.981" W | ... | 23/01/18 - 14:36:03 | 30 | #### | GeohashString-### | core | 4802F | 5356A |
| 5421 | 43°12'38.006" N 79°47'1.348" W | ... | 23/01/18 - 14:36:06 | 33 | #### | GeohashString-### | core | 4802F | 5356B |
| 5429 | 43°12'38.395" N 79°47'2.327" W | ... | 23/01/18 - 14:36:40 | 36 | #### | GeohashString-### | core | 4802F | 5356C |
| 5339 | 43°12'38.52" N 79°47'2.327" W | ... | 23/01/18 - 14:37:08 | 36 | #### | GeohashString-### | core | 4802F | 5357 |

FIG. 55A

| | Position LAT/LONG | ... | DateTime DDMMYY-TIME UTC | Speed | Road Network SubzoneID | Road Network Subzone Location | Road Network Subzone Label | Intersection Mapping | Vehicle-position point | |
|---|---|---|---|---|---|---|---|---|---|---|
| 5439 | 43°12'38"N 79° 47' 05"W | ... | 23/01/18 - 14:36:10 | 36 | #### | GeohashString-### | non-core | 4802G | 5358 | |
| 5428 | 43° 12' 38"N 79° 47' 12"W | ... | 23/01/18 - 14:36:13 | 0 | #### | GeohashString-### | non-core | 4802G | 5359 | 5494 |
| 5431 | 43° 12' 38"N 79° 47' 20"W | ... | 23/01/18 - 14:36:18 | 10 | #### | GeohashString-### | non-core | 4802G | 5360 | |
| 5432 | 43° 12'39"N 79° 47' 31"W | ... | 23/01/18 - 14:36:25 | 0 | #### | GeohashString-### | core | 4802G | 5361 | |
| 5434 | 43° 12' 39"N 79° 47' 48"W | ... | 23/01/18 - 14:37:50 | 5 | #### | GeohashString-### | core | 4802G | 5362 | |
| 5436 | 43° 12' 39"N 79° 48' 02"W | ... | 23/01/18 - 14:38:15 | 10 | #### | GeohashString-### | core | 4802G | 5363 | 5495 |
| 5438 | 43° 12' 39"N 79° 48' 02"W | ... | 23/01/18 - 14:39:00 | 20 | #### | GeohashString-### | core | 4802G | 5364 | |
| 5440 | 43°12' 39"N 79°48'03"W | ... | 23/01/18 - 14:39:05 | 30 | #### | GeohashString-### | core | 4802G | 5365 | |

FIG. 55C

| From | To | Cardinal Direction |
|---|---|---|
| 337.5° | 22.5° | N |
| 22.6° | 67.5° | NE |
| 67.6° | 112.5° | E |
| 112.6° | 157.5° | SE |
| 157.6° | 202.5° | S |
| 202.6° | 247.5° | SW |
| 247.6° | 292.5° | W |
| 292.6° | 337.5° | NW |

5610F

| 5610F-1 | TripID | 5551 |
|---|---|---|
| 5610F-2 | HardwareId | Device $ID_{112}$ |
| 5610F-3 | ClientGuid | 2031 |
| 5610F-4 | Vin | 12345678910123456 |
| 5610F-5 | Make | Mercedes-Benz |
| 5610F-6 | Model | Powertrain |
| 5610F-7 | VehicleYear | 2020 |
| 5610F-8 | WeightClass | 4 |
| 5610F-9 | VehicleType | truck |
| 5610F-10 | Vocation | delivery |
| 5610F-13 | IntersectionId | 4802F |
| 5610F-25 | TimezoneName | EST |
| 5610F-26 | EventStartTimeUTC | 23/01/18 - 14:35:44 |
| 5610F-27 | EventEndTimeUTC | 23/01/18 - 14:37:08 |
| 5610F-28 | EventStartTimeLocal | 23/01/18 - 10:35:44 |
| 5610F-29 | EventEndTimeLocal | 23/01/18 - 10:37:08 |
| 5610F-30 | StartingLocation | 43°12'37.05" N  79°46'58.879" |
| 5610F-31 | EntryCardinal | N |
| 5610F-32 | Exit Cardinal | W |
| 5610F-37 | TravelTime | 34s |
| 5610F-38 | TravelDistance | 89m |
| 5610F-39 | TravelSpeed | 2.7 km/h |
| 5610F-40 | RunningTime | 34s |
| 5610F-41 | RunningSpeed | 2.7km/h |
| 5610F-44 | StopTimeTotal | 0 |
| 5610F-45 | NumberOfStops | 0 |
| 5610F-46 | TimeFromFirstStop | null |
| 5610F-47 | DistanceFromFirstStop | null |

FIG. 56C

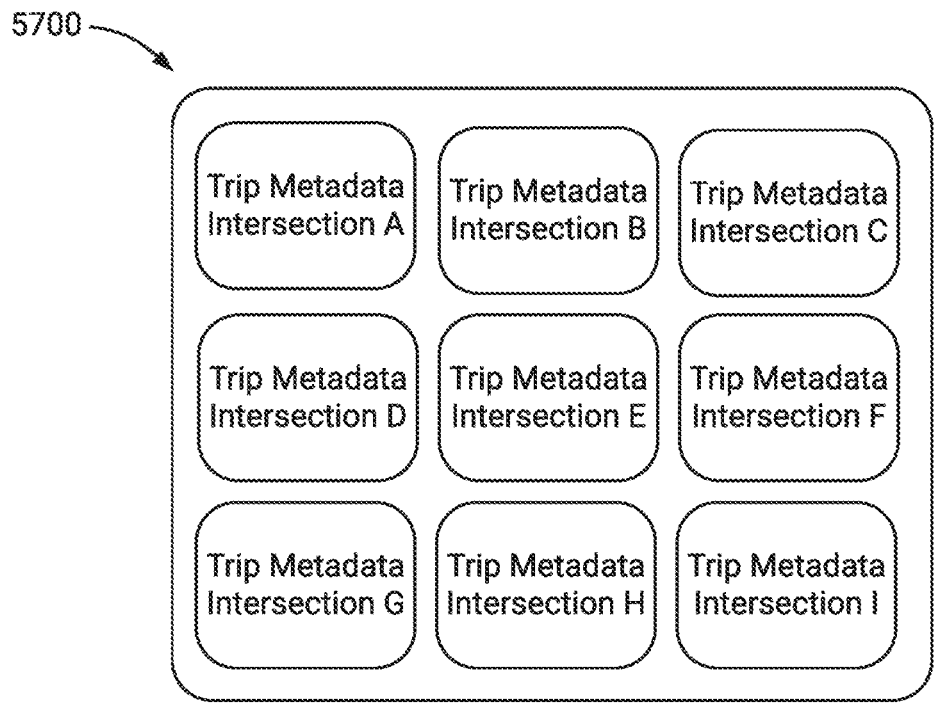
FIG. 57A
| | | |
|---|---|---|
| 5702A | IntersectionID | 4802G |
| 5702B | EntryCardinal | N |
| 5702C | ExitCardinal | E |
| 5702D | EventStartTimeLocal | 01/01/20 -1:00:00 |
| 5702E | EventStopTimeLocal | 01/01/21 - 1:00:00 |
FIG. 57B
FIG. 57C

| | | |
|---|---|---|
| 5704A | NumberOfTrips | 10,000 |
| 5704B | AvgTravelSpeed | 60km/h |
| 5704C | AvgRunningSpeed | 100km/h |
| 5704D | AvgTravelTime | 156s |
| 5704E | PercentOfVolumeByVehicleClass | Class A - 5%<br>Class B - 5%<br>Class C - 7%<br>Class D - 10%<br>Class E - 3%<br>Class F - 10%<br>Class G - 5%<br>Class H - 5%<br>Class 3 - 30%<br>Class 4 - 2%<br>Class 5 - 4%<br>Class 6 - 4%<br>Class 7 - 5%<br>Class 8 - 5% |
| 5704F | Percentage Stopping | 70% |
| 5704G | AvgNumberOfStops | 2 |
| 5704I | AvgDistanceFromIntersectionToFirstStop | 6m |
| 5704H | AvgTotalTimeStopped | 50s |
| 5704J | AvgTimeFromFirstStop | 75s |
| 5704K | AvgTotalTimeStoppedNoZero | 40s |
| 5704L | AvgNumberOfStopsNoZero | 3 |

FIG. 57D

| NumberOfTrips |
| --- |
| AvgTravelSpeed |
| AvgRunningSpeed |
| AvgTravelTime |
| PercentOfVolumeByVehicleClass |
| Percentage Stopping |
| AvgNumberOfStops |
| AvgDistanceFromIntersectionToFirstStop |
| AvgTotalTimeStopped |
| AvgTimeFromFirstStop |
| AvgTotalTimeStoppedNoZero |
| AvgNumberOfStopsNoZero |

5808

| Corridor Metrics - ABCDGF | |
|---|---|
| NumberOfTrips | ## |
| AvgTravelSpeed | ## |
| AvgRunningSpeed | ## |
| AvgTravelTime | ## |
| PercentOfVolumeByVehicleClass | ## |
| Percentage Stopping | ## |
| AvgNumberOfStops | ## |
| AvgDistanceFromIntersectionToFirstStop | ## |
| AvgTotalTimeStopped | ## |
| AvgTimeFromFirstStop | ## |
| AvgTotalTimeStoppedNoZero | ## |
| AvgNumberOfStopsNoZero | ## |

5814ABC

| ABC NumberOfTrips | ## |
|---|---|
| ABC AvgTravelSpeed | ## |
| ABC AvgRunningSpeed | ## |
| ABC AvgTravelTime | ## |
| ABC PercentOfVolumeByVehicleClass | ## |
| ABC Percentage Stopping | ## |
| ABC AvgNumberOfStops | ## |
| ABC AvgDistanceFromIntersectionToFirstStop | ## |
| ABC AvgTotalTimeStopped | ## |
| ABC AvgTimeFromFirstStop | ## |
| ABC AvgTotalTimeStoppedNoZero | ## |
| ABC AvgNumberOfStopsNoZero | ## |

METHOD FOR PROVIDING CORRIDOR METRICS FOR A CORRIDOR OF A ROAD NETWORK

RELATED APPLICATIONS

This application is a Continuation of U.S. application Ser. No. 17/368,171 filed Jul. 6, 2021, now U.S. Pat. No. 11,403,938, titled "Method for Determining Traffic Metrics of a Road Network", which is herein incorporated by reference in its entirety, and which is a Continuation-in-part under 35 U.S.C. § 120 of U.S. application Ser. No. 16/877,936, filed May 19, 2020, now U.S. Pat. No. 11,335,189, titled "Method For Defining Road Networks", which is herein incorporated by reference in its entirety, and which is a Continuation-in-part under 35 U.S.C. § 120 of U.S. application Ser. No. 16/535,527, filed Aug. 8, 2019, now U.S. Pat. No. 10,916,127, titled "Intelligent Telematics System For Defining Vehicle Ways", which is also herein incorporated by reference in its entirety, and which claims benefit under 35 U.S.C. § 119(e) to U.S. Provisional Application Ser. No. 62/829,539, filed Apr. 4, 2019, titled "Intelligent Telematics System For Providing Traffic Metrics", which is herein incorporated by reference in its entirety. This application also claims the benefit under 35 U.S.C. § 119(e) to U.S. Provisional application Ser. No. 63/048,268, filed Jul. 6, 2020, titled "Intersection Metrics", which is also herein incorporated by reference in its entirety.

BACKGROUND

Telematics systems have been employed by fleet owners to monitor use and performance of vehicles in the fleet. Analysis of vehicle data collected by such telematics systems can be useful for extracting meaningful data regarding behaviour of a group of vehicles.

SUMMARY

According to an embodiment there is provided a method for providing corridor metrics for a corridor of a road network comprising, providing first road network data indicating a first plurality of road network subzones defining a geographic area occupied by a road network, the road network including a plurality of intersections, processing first road network data for labelling each road network subzone as one of a core subzone and non-core subzone for forming a first plurality of core subzones and a first plurality of non-core subzones and storing an indication thereof in the first road network data, mapping each of the first plurality of core subzones to an intersection of the plurality of intersections of the road network and storing an indication thereof in the first road network data, forming a plurality of subsets of core subzones of the first plurality of core subzones, each thereof defining a geographic area occupied by an intersection core of an intersection of the plurality of intersections, processing first road network data for mapping each non-core subzone of the first plurality of non-core subzones to at least an intersection of the plurality of intersections, forming second road network data including the first road network data and an indication of the at least an intersection of the plurality of intersections of the road network to which each non-core subzone of the first plurality of non-core subzones is mapped, forming trip metadata dependent on second road network data and third vehicle data corresponding to the first plurality of road network subzones, and processing trip metadata associated with a plurality of contiguous intersections of the plurality of intersections of the road network defining the corridor for forming corridor metrics data indicative of corridor metrics for the corridor.

In an embodiment the method includes forming traffic metrics data for each pair of contiguous intersections of the plurality of contiguous intersections indicative of traffic metrics for each pair of contiguous intersections. In an embodiment the method includes forming cumulative metric data indicative of one or more sequences of contiguous intersections of the plurality of contiguous intersections indicative of traffic metrics for the one or more sequences of contiguous intersections.

In an embodiment the method includes processing trip metadata associated with a plurality of contiguous intersections of the plurality of intersections defining the corridor for forming corridor metrics data indicative of corridor metrics for the corridor including processing trip metadata and corridor data, the corridor data indicative of the plurality of intersections defining the corridor. In an embodiment the method including processing trip metadata associated with a plurality of contiguous intersections of the plurality of intersections defining the corridor for forming corridor metrics data indicative of corridor metrics for the corridor including processing trip metadata and corridor data, the corridor data indicative of the plurality of intersections defining the corridor wherein corridor data is provided by a user.

In an embodiment the method includes processing trip metadata associated with a plurality of contiguous intersections of the plurality of intersections of the road network defining the corridor for forming traffic metrics data indicative of corridor metrics for the corridor includes, processing trip metadata associated with each contiguous intersection of the plurality of contiguous intersections for forming intersection metrics data indicative of intersection metrics for each thereof, and processing intersection metrics data for each contiguous intersection of the plurality of contiguous intersections for forming corridor metrics data.

In an embodiment the method includes processing first road network data for mapping each non-core subzone of the first plurality of non-core subzones to at least an intersection of the plurality of intersections of the road network including, for each road network subzone of the first plurality of road network subzones, processing road network data for forming point data indicating a point representing a location of the road network subzone, for each intersection of the plurality of intersections, processing point data of a corresponding intersection core and point data of the first plurality of non-core subzones for clustering corresponding points into groups, and for each point of a non-core subzone of the first plurality of non-core subzones grouped in a same group as points of an intersection core, mapping the non-core subzone to a corresponding intersection of the intersection core.

In an embodiment the method includes processing point data of a corresponding intersection core and point data of the first plurality of non-core subzones for clustering corresponding points into groups including, for at least a road network subzone, processing road network data for determining a centre point of the road network subzone. In an embodiment the method includes processing point data of a corresponding intersection core and point data of the first plurality of non-core subzones for clustering corresponding points into groups including clustering the corresponding points into groups using a spatial clustering algorithm.

In an embodiment the method includes forming trip metadata dependent on second road network data and third vehicle data corresponding to the first plurality of road network subzones including, for each vehicle of a plurality of vehicles corresponding to the third vehicle data, selecting at least a first subset of temporally consecutive third vehicle data instances indicating the vehicle transitions from a first undrivable state to a second drivable state to a third undrivable state for forming journey data, processing journey data and road network data for mapping each instance of journey data to a road network subzone of the first plurality of road network subzones based on a journey data instance corresponding to a road network subzone of the first plurality of road network subzones and storing an indication of a location of the road network subzone, a label of the road network subzone, and intersection mapping of the road network subzone in the journey data, selecting subsets of journey data instances for forming trip data indicative of vehicle trips and mapping trip data to an intersection of the plurality of intersections of the road network, and processing each trip data instance of trip data for forming trip metadata.

In an embodiment the method includes forming trip metadata dependent on second road network data and third vehicle data corresponding to the first plurality of road network subzones including, for each vehicle of a plurality of vehicles corresponding to the third vehicle data, selecting at least a first subset of temporally consecutive third vehicle data instances indicating the vehicle transitions from a first undrivable state to a second drivable state to a third undrivable state for forming journey data, including, for at least a vehicle, selecting at least a sequence of third vehicle data instances including a third vehicle data instance indicating ignition status of the vehicle is OFF, immediately followed by a third vehicle data instance indicating an ignition status of the vehicle is ON and the vehicle has a speed greater than 0 km/h, immediately followed by one or more third vehicle data instances indicating the vehicle is ON, immediately followed by a third vehicle data instance indicating ignition status of the vehicle is OFF.

In an embodiment the method includes selecting subsets of journey data instances for forming trip data indicative of vehicle trips includes, selecting at least a first sequence of journey data instances from journey data for forming trip data, the at least a first sequence of journey data instances including at least one journey data instance corresponding to a core subzone that is mapped to a first intersection immediately followed by a journey data instance mapped to a second intersection, wherein the second intersection and the first intersection are not a same intersection, and mapping each trip data instance to the first intersection and storing an indication of the mapping therein.

In an embodiment the method includes selecting subsets of journey data instances for forming trip data indicative of vehicle trips includes, selecting at least a first sequence of journey data instances from journey data including at least one journey data instance corresponding to a core subzone that is mapped to a first intersection immediately followed by a journey data instance mapped to a second intersection, wherein the second intersection and the first intersection are not a same intersection, selecting a second sequence of journey data instances including at least a journey data instance corresponding to a non-core subzone mapped to the first intersection immediately preceding the at least a first sequence of journey data instances, forming trip data based on the first sequence of journey data instances and the second sequence of journey data instances, and mapping each trip data instance to the first intersection and storing an indication of the mapping therein.

In an embodiment the method includes forming trip metadata comprises forming trip metadata including one or more of HardwareId data, VIN data, Make data, Model data, VehicleYear data, WeightClass data, VehicleType data, Vocation data, TripID data, IntersectionId data, TimezoneName data, EventStartTimeUTC data, EventEndTimeUTC data, EventStartTimeLocal data, EventEndTimeLocal data, StartingLocation data, EntryCardinal data, ExitCardinal data, StreetNameEntry data, StreetNameExit data, SignalUsed data, TurnSignals data, TravelTime data, TravelDistance data, TravelSpeed data, RunningTime data, RunningSpeed data, MaxSpeed data, MinSpeed data, StopTimeTotal data, NumberOfStops data, TimeFromFirstStop data, DistanceFromFirstStop data, CoreDistance data, MaxAcceleration data, and MinAcceleration data.

In an embodiment the method includes forming EntryCardinal data comprises determining a bearing between position data corresponding to a first instance of corresponding trip data located in an intersection core and an immediately preceding instance of corresponding journey data and creating EntryCardinal data indicative of the bearing. In an embodiment the method includes forming ExitCardinal data includes, determining a bearing between position data corresponding to a last instance of corresponding trip data located in an intersection core and an immediately following instance of corresponding journey data and creating ExitCardinal data indicative of the bearing.

In an embodiment the method includes processing trip metadata associated with each contiguous intersection of the plurality of contiguous intersections for forming intersection metrics data indicative of intersection metrics for each thereof includes, selecting a subset of trip metadata based on filter data for forming filtered trip metadata, a subset of trip metadata associated with each of the plurality of intersections, and processing filtered trip metadata for providing traffic metrics for the plurality of contiguous intersections.

In an embodiment the method includes selecting a subset of trip metadata based on filter data for forming filtered trip metadata includes selecting a subset of trip metadata based on filter data including one or more of, HardwareId data, VIN data, Make data, Model data, VehicleYear data, WeightClass data, VehicleType data, Vocation data, IntersectionId data, TimezoneName data, EventStartTimeUTC data, EventEndTimeUTC data, EventStartTimeLocal data, EventEndTimeLocal data, StartingLocation data, EntryCardinal data, ExitCardinal data, StreetNameEntry data, StreetNameExit data, SignalUsed data, TurnSignals data, TravelTime data, TravelDistance data, TravelSpeed data, RunningTime data, RunningSpeed data, MaxSpeed data, MinSpeed data, StopTimeTotal data, NumberOfStops data, TimeFromFirstStop data, DistanceFromFirstStop data, CoreDistance data, MaxAcceleration data, and MinAcceleration data.

In an embodiment the method includes forming intersection metrics data comprises forming intersection metrics data including one or more of, PercentageStopping, AvgTravelSpeed, AvgRunningSpeed, AvgTotalTimeStopped, AvgTotalTimeStoppedNoZero, AvgTravelTime, AvgTimeFromFirstStop, AvgNumberOfStops, AvgNumberOfStopsNoZero, AvgDistanceFromIntersectionToFirstStop, PercentOfVolumeByVehicleClass, and NumberOfTrips.

In an embodiment the method includes forming corridor metrics data includes forming corridor metrics including one or more of, corridor PercentageStopping, corridor AvgTravelSpeed, corridor AvgRunningSpeed, corridor AvgTotalTimeStopped, corridor AvgTotalTimeStoppedNoZero, corridor corridor AvgTravelTime, corridor AvgTimeFromFirstStop, corridor AvgNumberOfStops, corridor AvgNumberOfStopsNoZero, corridor AvgDistanceFromIntersectionToFirstStop, corridor PercentOfVolumeByVehicleClass, and corridor NumberOfTrips.

BRIEF DESCRIPTION OF DRAWINGS

Embodiments of the invention are now described by way of non-limiting example and are illustrated in the following figures in which like reference numbers indicate like features, and wherein:

FIG. 6Ai is a simplified diagram of an exemplary type of vehicle way;

FIG. 6Aii is a simplified diagram of an exemplary type of vehicle way;

FIG. 6Aiii is a simplified diagram of an exemplary type of vehicle way;

FIG. 6Aiv is a simplified diagram of an exemplary type of vehicle way;

FIG. 6Av is a simplified diagram of an exemplary type of vehicle way;

FIG. 6Avi is a simplified diagram of an exemplary type of vehicle way;

FIG. 6Bi is a conceptual diagram of a specific and non-limiting example zone encompassing the vehicle way of FIG. 6Ai;

FIG. 6Bii is a conceptual diagram of a specific and non-limiting example zone encompassing the vehicle way of FIG. 6Aii;

FIG. 6Biii is a conceptual diagram of a specific and non-limiting example zone encompassing the vehicle way of FIG. 6Aiii;

FIG. 6Biv is a conceptual diagram of a specific and non-limiting example zone encompassing the vehicle way of FIG. 6Aiv;

FIG. 6Bv is a conceptual diagram of a specific and non-limiting example zone encompassing the vehicle way of FIG. 6Av;

FIG. 6Bvi is a conceptual diagram of a specific and non-limiting example zone encompassing the vehicle way of FIG. 6Avi;

FIG. 12B is a simplified diagram of a reference area, a reference point and a Geohash cell to which the reference point was mapped;

FIG. 12C is a simplified conceptual diagram of a centre cell and its 8 closest neighbouring cells;

FIG. 12D is a simplified conceptual diagram of a reference area completely subdivided into a grid of contiguous Geohash cells;

FIG. 13A is a simplified conceptual diagram of exemplary first subzone data;

FIG. 13B is a simplified conceptual diagram of other exemplary first subzone data;

FIG. 20D is a table representing an example subset of vehicle data instances corresponding to a position within a subzone;

FIG. 20E is a table of exemplary features and feature values based on the subset of vehicle data instances of FIG. 20D;

FIG. 25B is a table representing training data including subzone ID, a plurality of features for each associated subzone, and a class label;

FIG. 28B is exemplary second subzone data;

FIG. 28C is another exemplary second subzone data.

FIG. 34B is an exemplary first subset of second vehicle data corresponding to a position within a second subzone;

FIG. 34C is an exemplary second subzone-related features and feature values based on the first subset of second vehicle data instances;

FIG. 38A is a conceptual diagram of exemplary features generated for a second subzone;

FIG. 38B is a conceptual diagram of exemplary unlabelled data;

FIG. 42A is a conceptual diagram of a simplified road network zone;

FIG. 42B is exemplary classification data indicating a second subzone ID for each geohash in a road network zone and classification thereof;

FIG. 42D is another conceptual diagram of a simplified road network zone illustrating a first neighbour count for each second subzone of a road network zone within the respective second subzone;

FIG. 42E is another conceptual diagram of a simplified road network zone illustrating a neighbour sum for each second subzone of a road network zone within the respective second subzone;

FIG. 42F is a conceptual diagram of exemplary classification data;

FIG. 42G is another conceptual diagram of a simplified road network zone illustrating a second neighbour count for each second subzone of a road network zone within the respective second subzone;

FIG. 42H is a conceptual diagram of other exemplary classification data;

FIG. 42I is another conceptual diagram of a simplified road network zone illustrating a third neighbour count for each second subzone of a road network zone within the respective second subzone;

FIG. 42J is a conceptual diagram of other exemplary classification data;

FIG. 43 is a conceptual diagram of exemplary classification data;

FIG. 44D is a conceptual diagram of exemplary road network data created by a traffic analytics system;

FIG. 45A is a conceptual diagram of an exemplary road network;

FIG. 46 is a flow diagram of a process for providing traffic metrics of an intersection according to an embodiment;

FIG. 47A is a flow diagram of a process for core subzones defining intersection cores and identifying non-core subzones;

FIG. 47B is a conceptual diagram of traffic control equipment-position data points representing locations of traffic control equipment located within a geographic area including a road network;

FIG. 47C is a conceptual diagram of traffic control equipment clustered into groups;

FIG. 47D is another conceptual diagram of traffic control equipment clustered into groups and an intersection reference point indicating a centroid thereof;

FIG. 47E is a conceptual diagram of the first plurality of road network subzones and intersection reference areas and intersection reference points 4 superposed thereon;

FIG. 47F is a flow diagram of an exemplary process for determining whether a road network subzones overlaps an intersection reference area for labelling the road network subzone as one of a core and non-core subzone;

FIG. 47G is a simple block diagram of an exemplary Geohash decode function for resolving a Geohash string to a centre location of the corresponding Geohash;

FIG. 48 is another conceptual diagram of the first plurality of road network subzones including a first plurality of core subzones and the first plurality of non-core subzones;

FIG. 49A is a conceptual diagram of exemplary modified first road network data;

FIG. 49B is another conceptual diagram of exemplary modified first road network data;

FIG. 49C is yet another a conceptual diagram of exemplary modified first road network data;

Figure 50A:
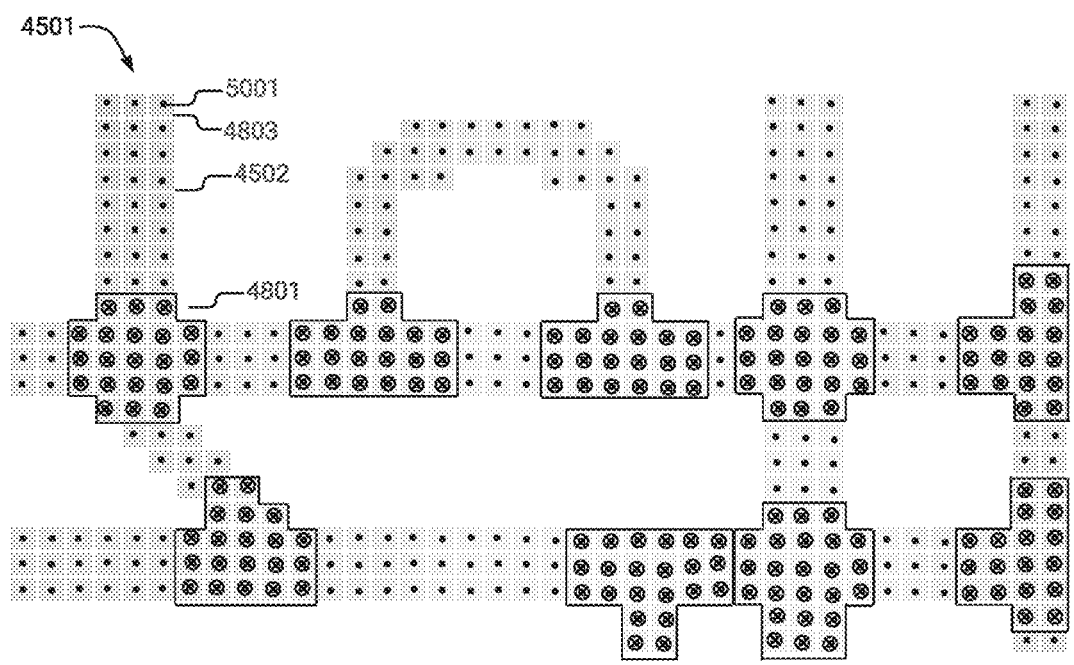
Figure 50B:
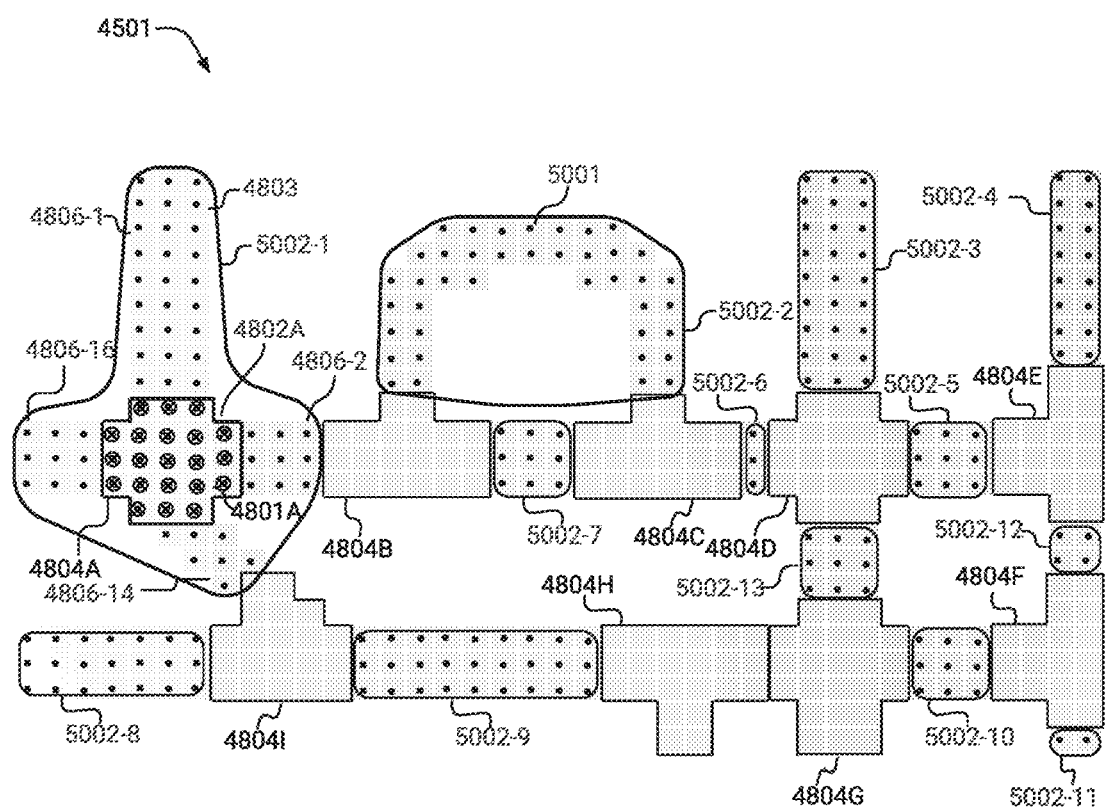
Figure 50C:
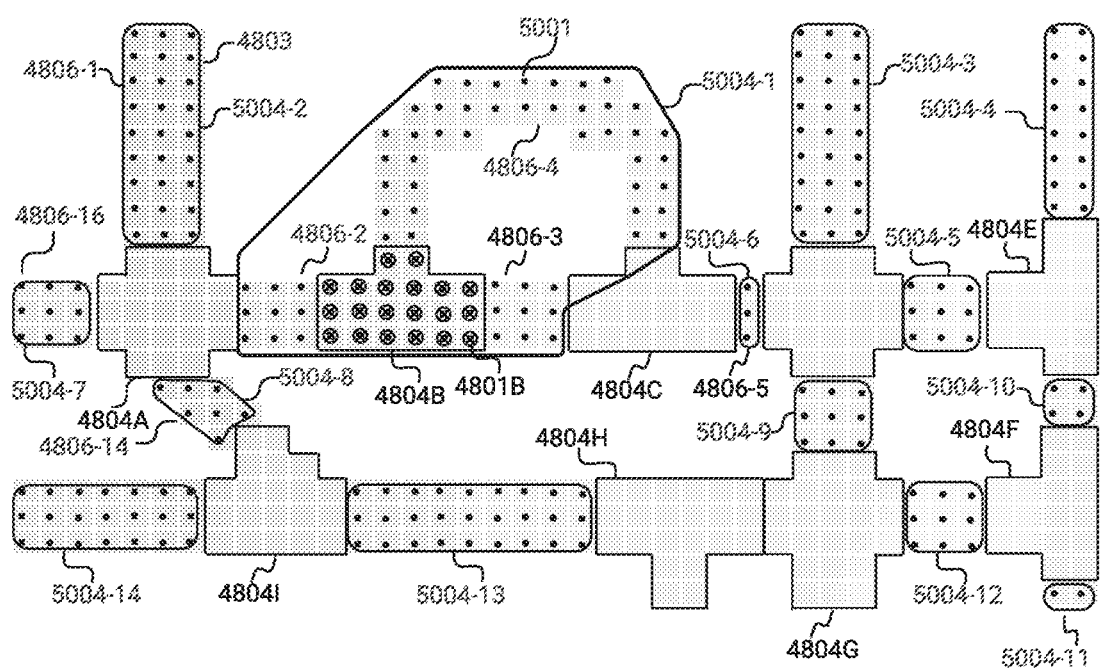
Figure 50D:
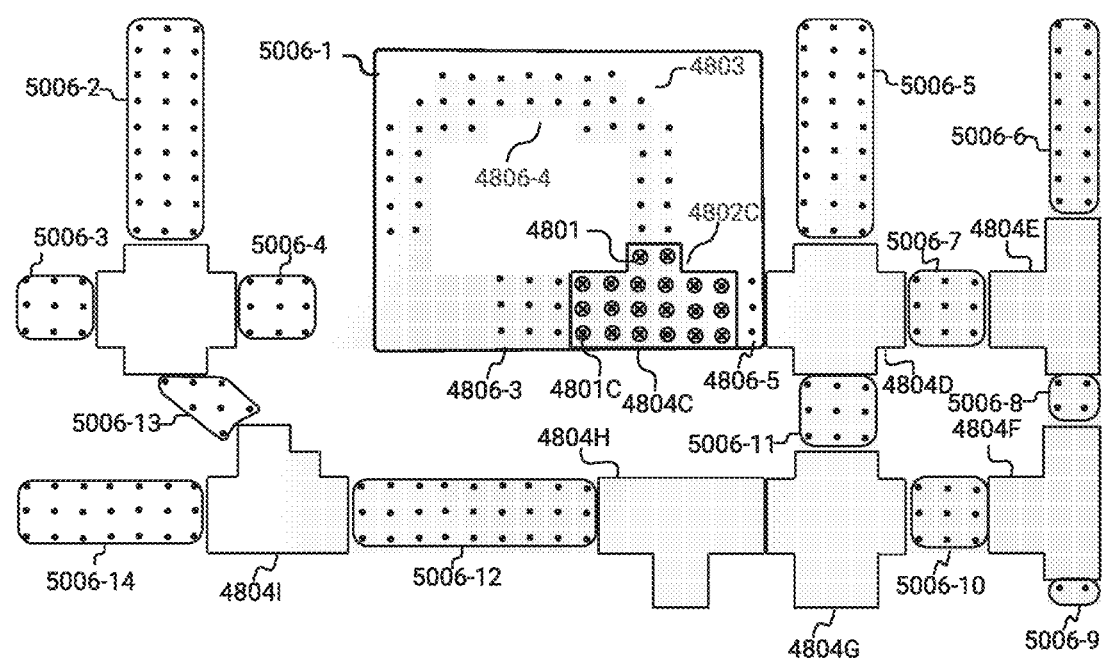
Figure 50E:
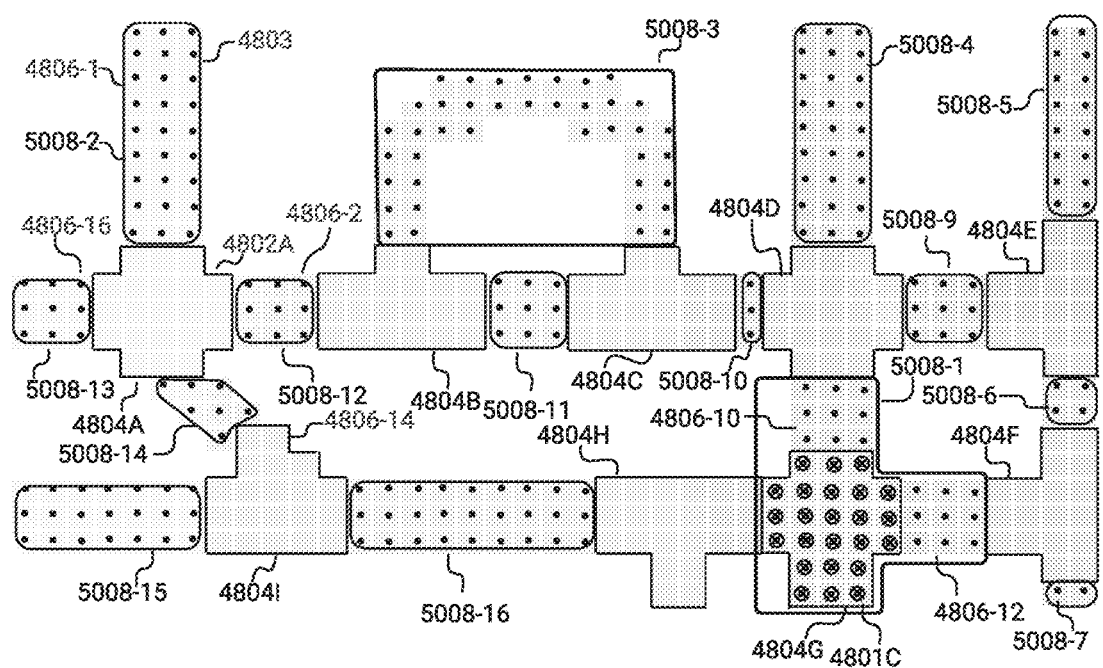
Figure 51:
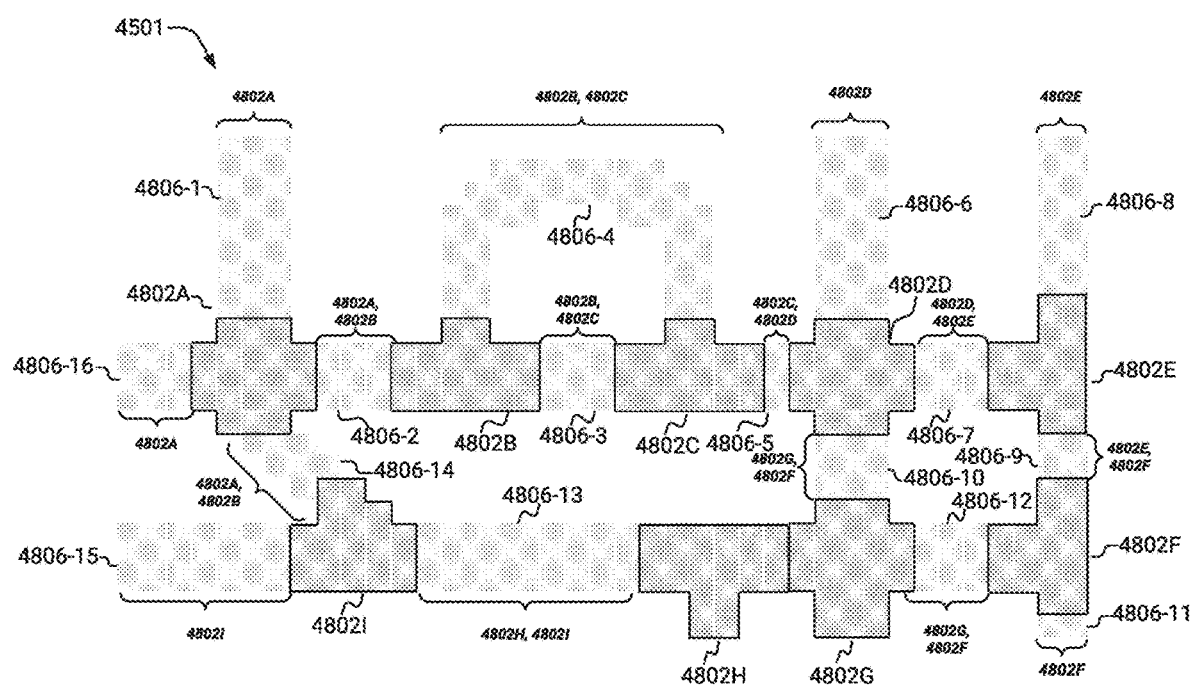

FIG. 50A is a conceptual diagram of exemplary representative points of the first plurality of road network subzones superposed thereon;

FIG. 50B is a conceptual diagram of exemplary groups of representative points according to a spatial clustering algorithm;

FIG. 50C is another conceptual diagram of exemplary groups of representative points according to a spatial clustering algorithm;

FIG. 50D is yet another conceptual diagram of exemplary groups of representative points according to a spatial clustering algorithm;

FIG. 50E is yet another conceptual diagram of exemplary groups of representative points according to a spatial clustering algorithm;

FIG. 51 is a conceptual diagram of the first plurality of road network subzones indicating the mapping of non-core subzones to intersections.

Figure 53A:
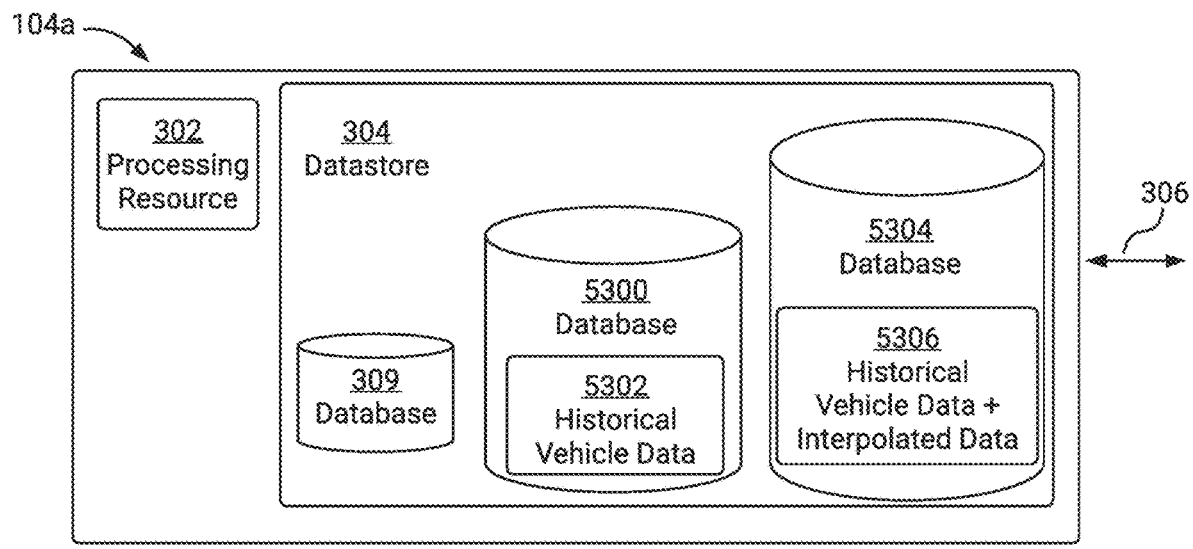
Figure 53B:
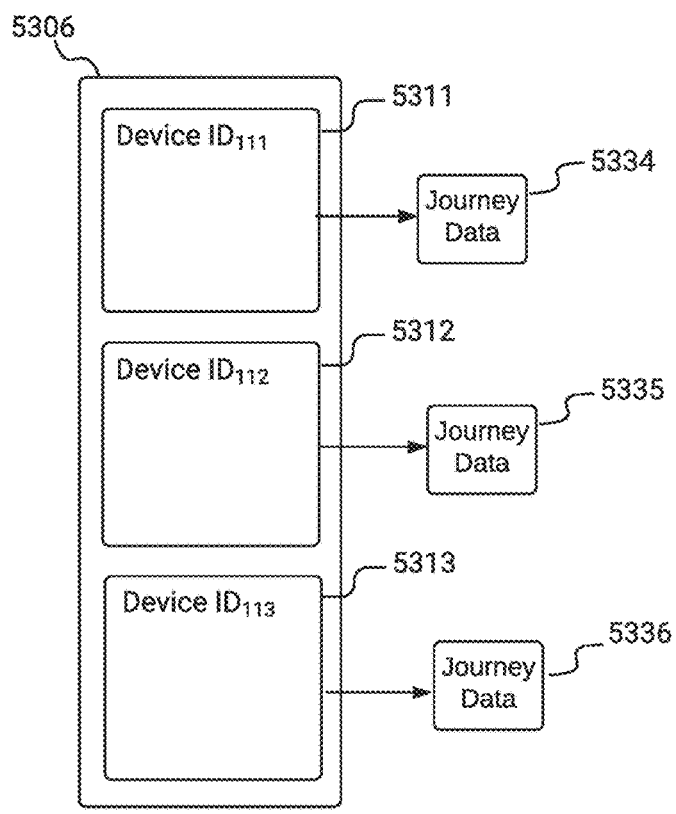
Figure 53C:
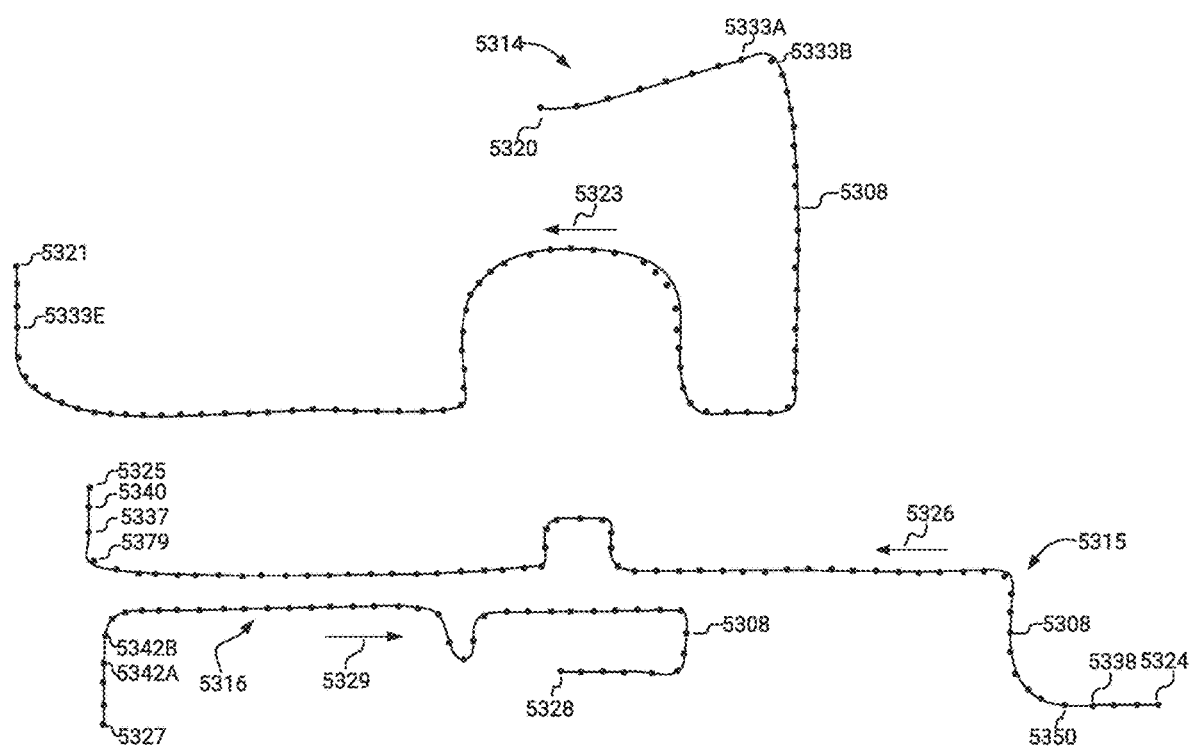
Figure 53E:
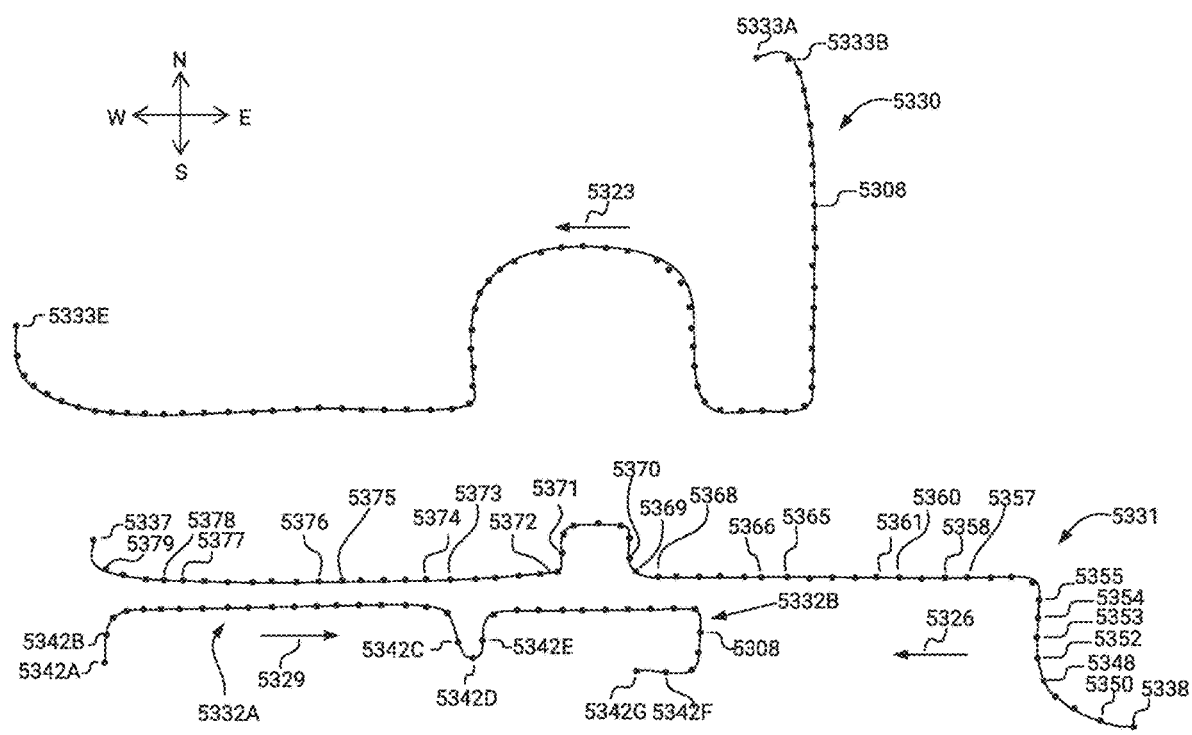
Figure 53F:
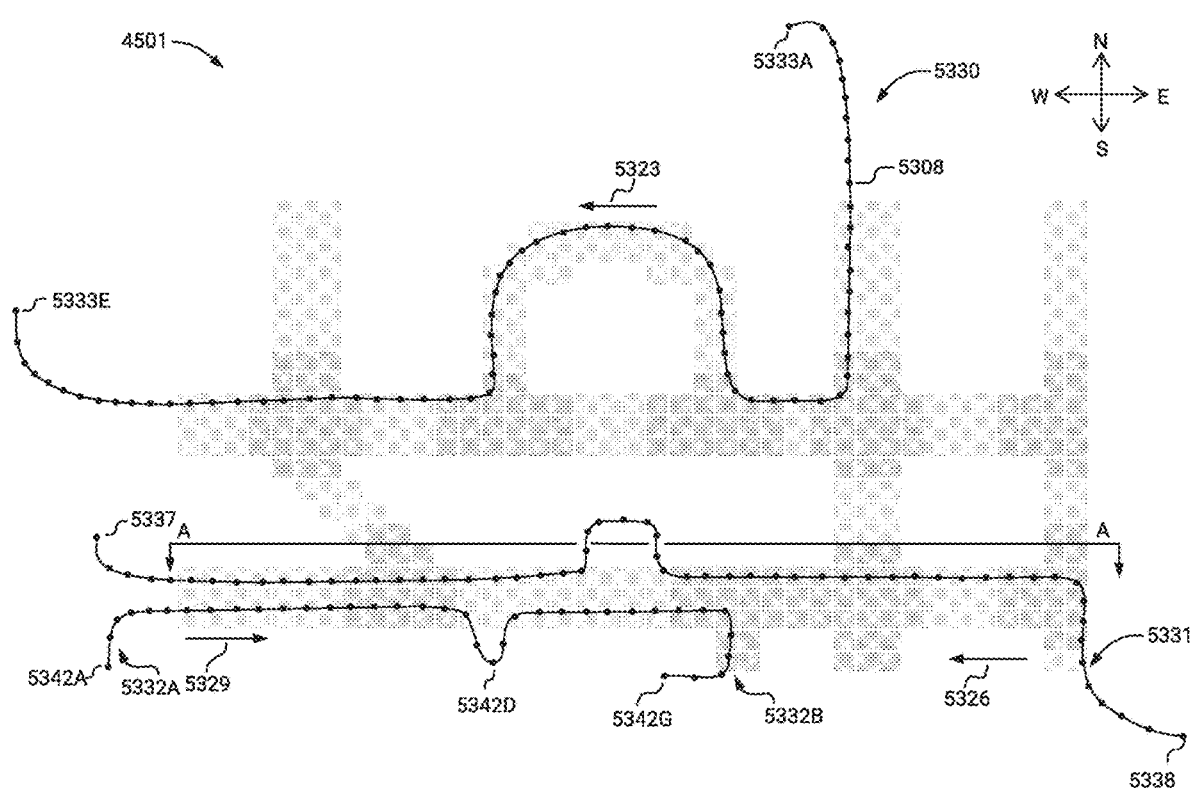

FIG. 52A is a conceptual diagram of exemplary second road network data;

FIG. 52B is another conceptual diagram of exemplary second road network data;

FIG. 52C is another conceptual diagram of exemplary second road network data;

FIG. 53A is another simplified block diagram of a traffic analytics system;

FIG. 53B is a conceptual diagram of third vehicle data organized by device ID;

FIG. 53C is a conceptual diagram of vehicle paths of vehicles;

FIG. 53D shows exemplary journey data;

FIG. 53E is a conceptual diagram of vehicle journeys;

FIG. 53F is a conceptual diagram of exemplary vehicle journeys superposed on a first plurality of road network subzones.

Figure 54A:
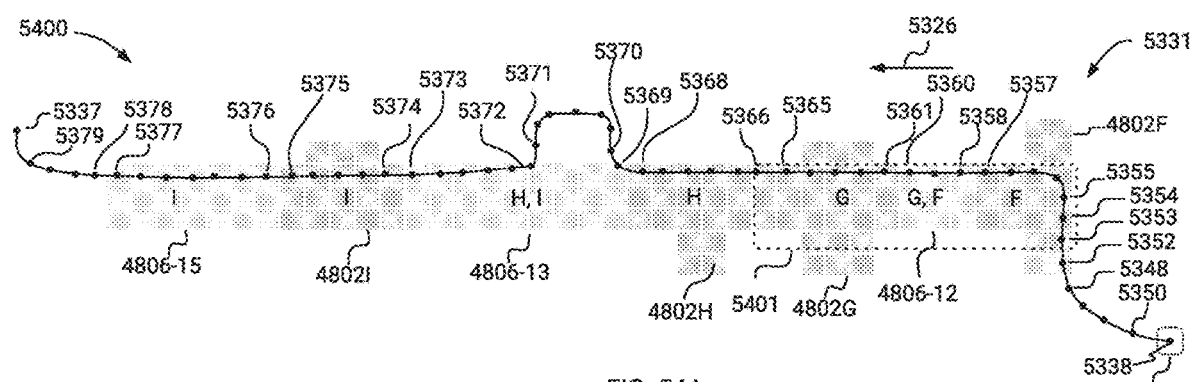
Figure 54B:
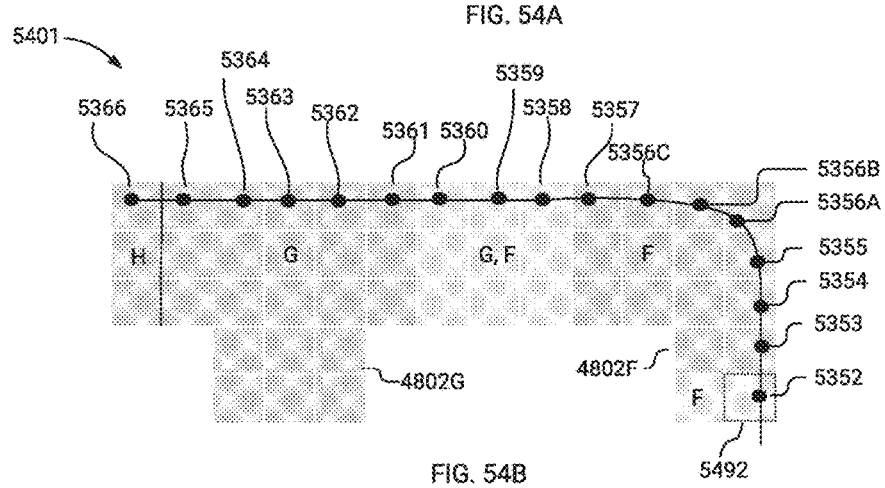
Figure 55B:
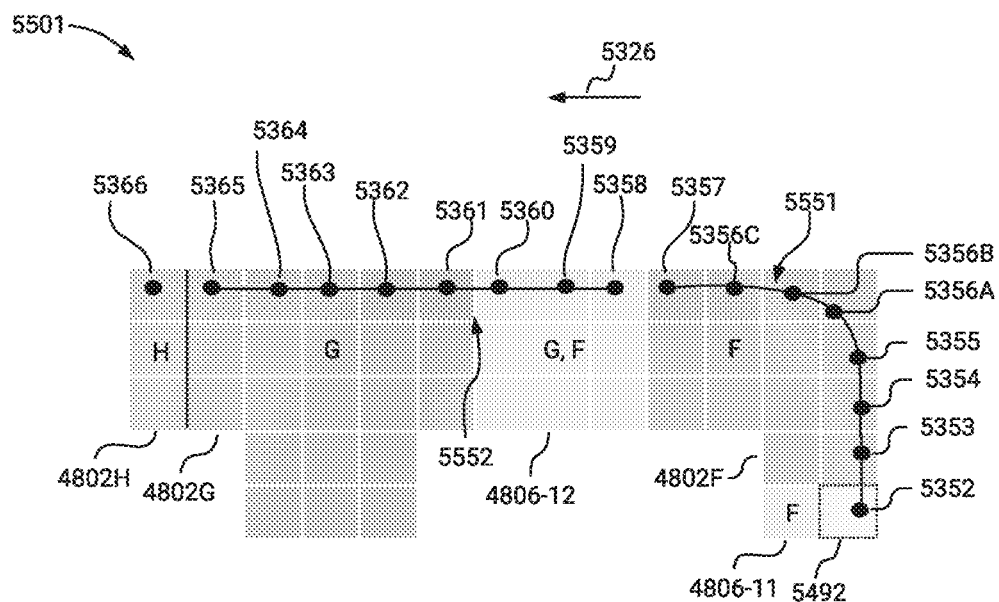
Figure 55D:
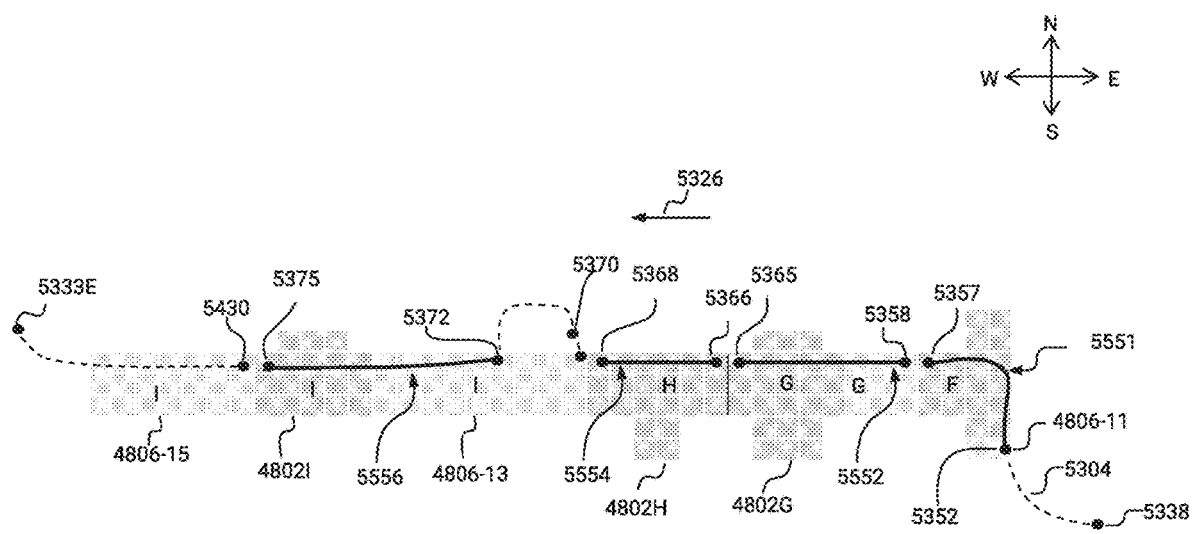
Figure 55E:
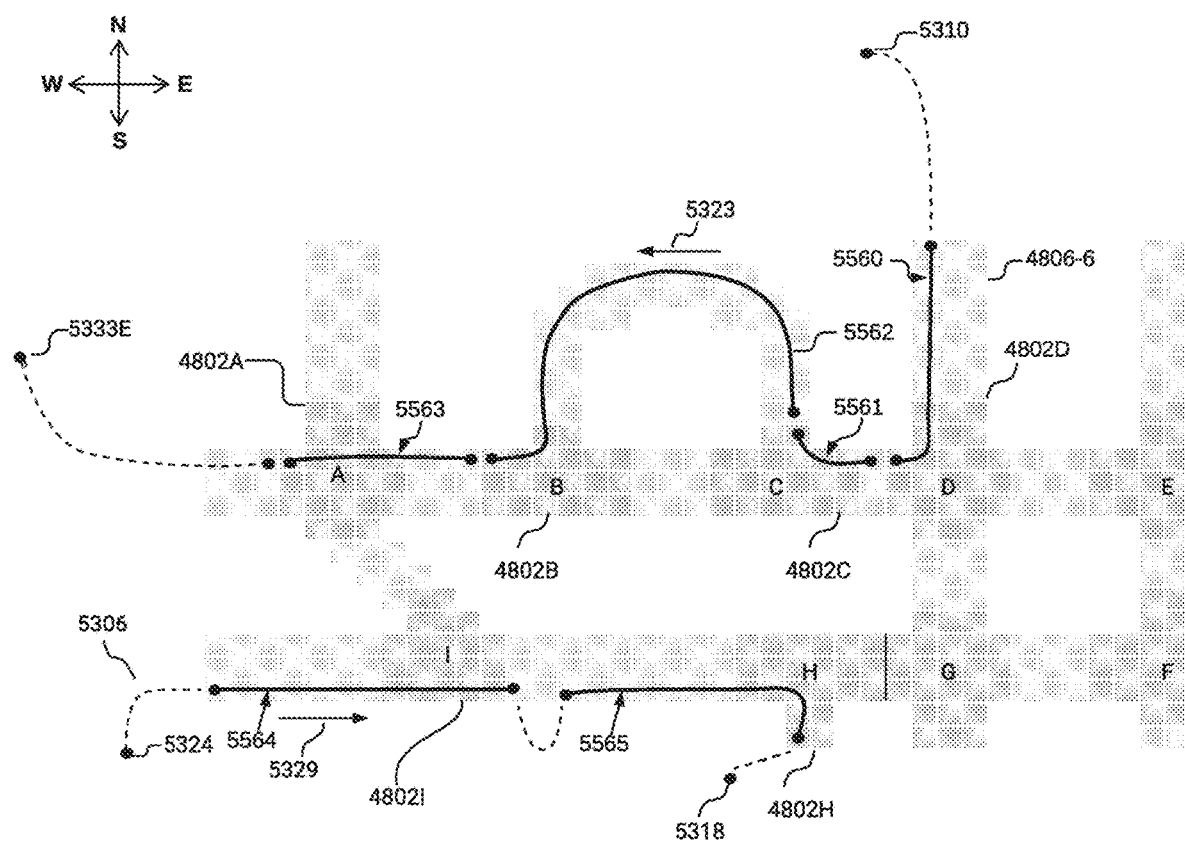
Figures 56A, 56B:
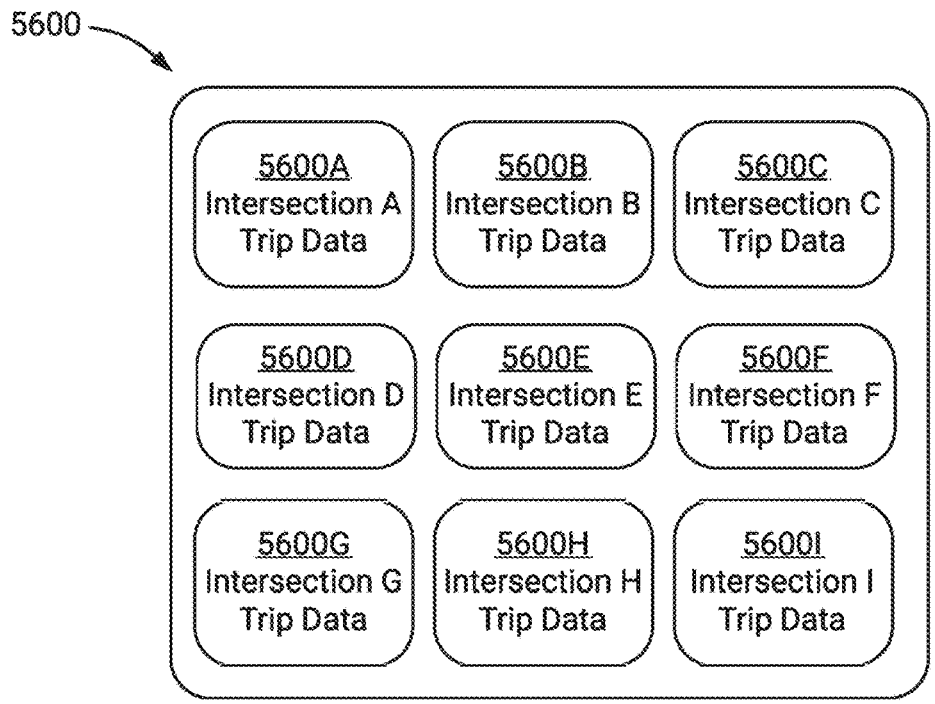
Figure 58A:
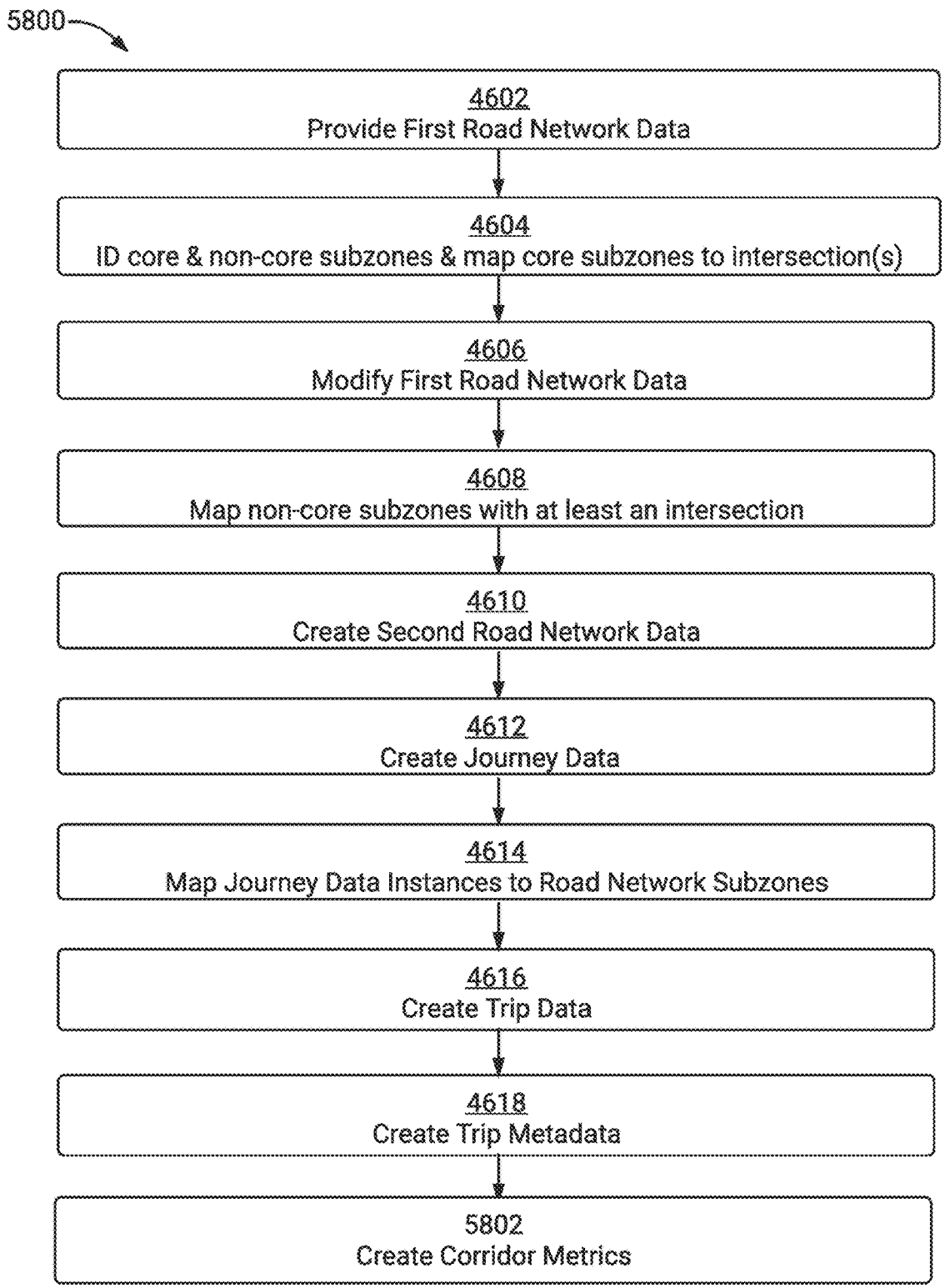
Figure 58B:
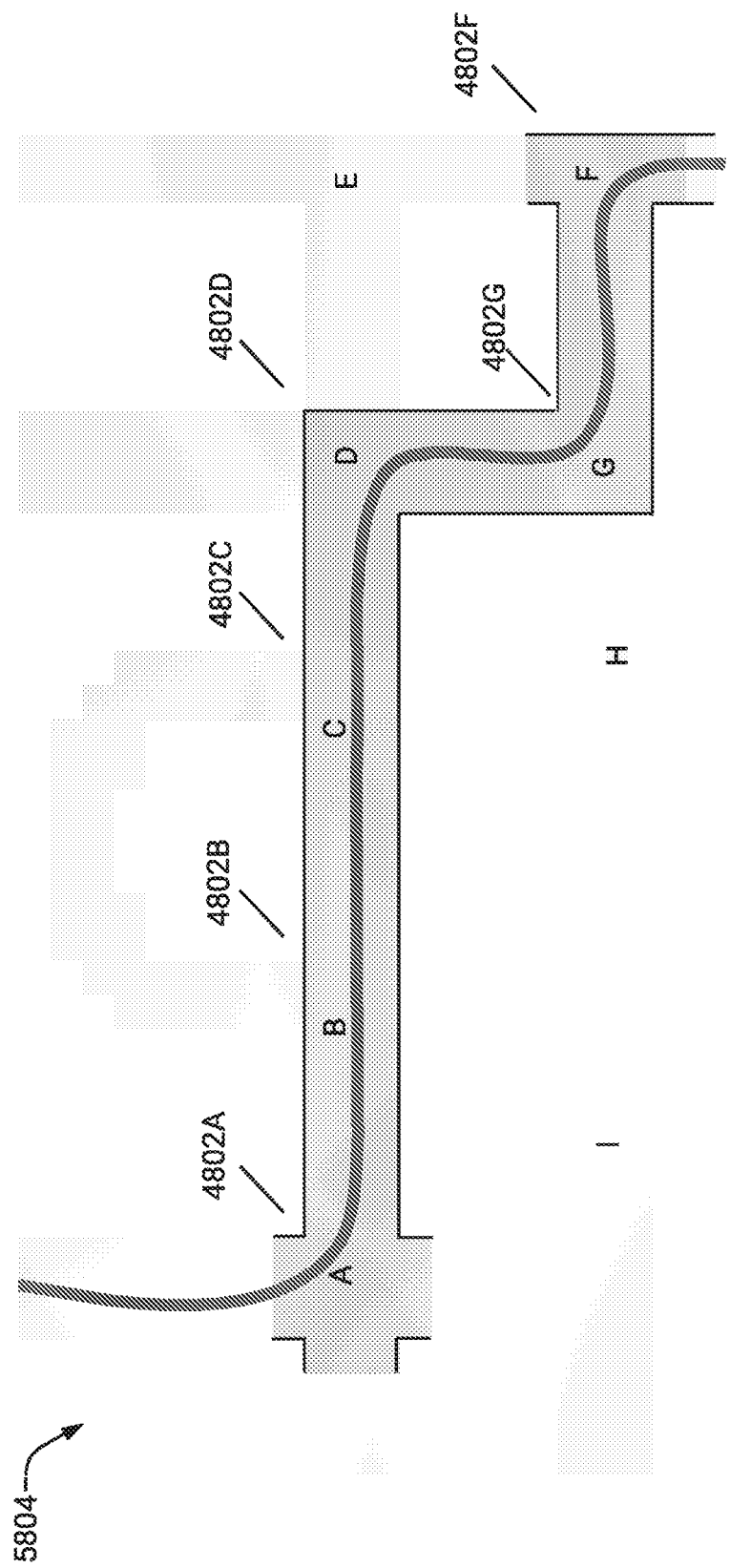
Figures 58C, 58D:
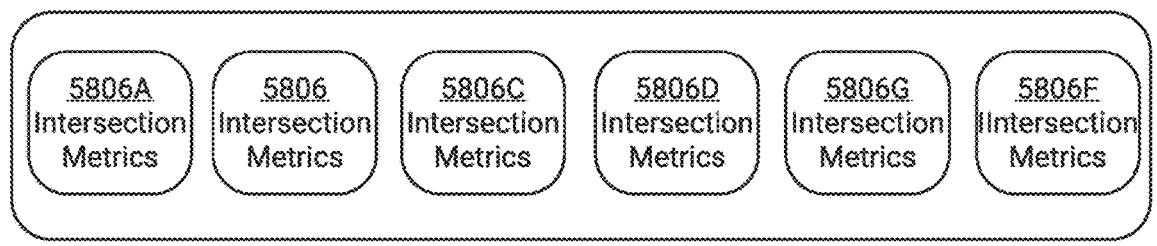
Figures 58E, 58F:
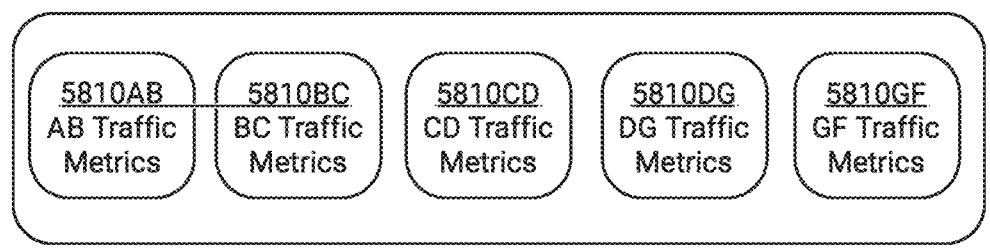
Figures 58G, 58H:
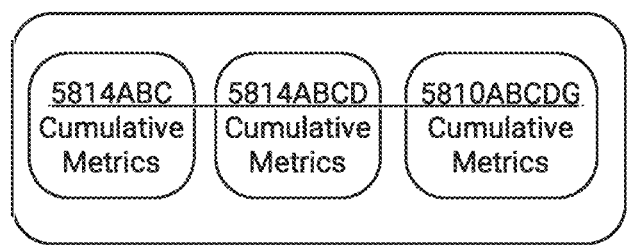

FIG. 54A is a conceptual diagram of a portion of a first plurality of road network subzones;

FIG. 54B is an enlarged view of a portion of a first plurality of road network subzones;

FIG. 54C is a conceptual diagram of exemplary modified journey data;

FIG. 54D is another conceptual diagram of exemplary modified journey data;

FIG. 55A is a conceptual diagram of exemplary trip data;

FIG. 55B is conceptual diagram of a trip superposed on a portion of a first plurality of road network subzones;

FIG. 55C is another conceptual diagram of exemplary trip data;

FIG. 55D is a conceptual diagram of exemplary trips superposed on a portion of a first plurality of road network subzones;

FIG. 55E is another conceptual diagram of exemplary trips superposed on a first plurality of road network subzones;

FIG. 56A is a conceptual diagram of exemplary trip data;

FIG. 56B is a table showing assigned cardinal direction based on the bearing;

FIG. 56C is a conceptual diagram of exemplary trip metadata;

FIG. 57A is another conceptual diagram of exemplary trip metadata associated will all intersections or a road network;

FIG. 57B shows exemplary filter data;

FIG. 57C shows exemplary filtered trip metadata;

FIG. 58A is a flow diagram of a process for determining corridor metrics for a road network corridor;

FIG. 58B is a conceptual diagram of an exemplary corridor;

FIG. 58C is a conceptual diagram of exemplary intersection metrics data for a plurality of intersections;

FIG. 58D is a conceptual diagram of exemplary intersection metrics data for an intersection;

FIG. 58E is a conceptual diagram of exemplary corridor metrics data for a plurality of intersections;

FIG. 58F is a conceptual diagram of exemplary traffic metrics between two intersections;

FIG. 58G is a conceptual diagram of exemplary cumulative metrics data for a sequence of intersections; and FIG. 58H is a conceptual diagram of exemplary cumulative metrics data for a plurality of sequences of intersections.

DESCRIPTION

Telematics is a method of monitoring a vehicle using an onboard monitoring device for gathering and transmitting vehicle operation information. For instance, fleet managers employ telematics to have remote access to real time operation information of each vehicle in a fleet. A vehicle may include a car, truck, recreational vehicle, heavy equipment, tractor, snowmobile or other transportation asset. A monitoring device may detect environmental operating conditions associated with a vehicle, for example, outside temperature, attachment status of an attached trailer, and temperature inside an attached refrigeration trailer. A monitoring device may also detect operating conditions of an associated vehicle, such as position, (e.g., geographic coordinates), speed, and acceleration, among others.

In an exemplary telematics system, raw vehicle data, including vehicle operation information indicative of a vehicle's operating conditions, is transmitted from an onboard monitoring device to a remote subsystem, (e.g., server). Raw vehicle data may include information indicating the identity of the onboard monitoring device (e.g., device identifier, device ID) and/or the identity of the associated vehicle the onboard monitoring device is aboard. Specific and non-limiting examples of raw vehicle data includes device ID data, position data, speed data, ignition state data, (e.g. indicates whether vehicle ignition is ON or OFF), and date and time data indicative of a date and time vehicle operating conditions were logged by the monitoring device. Raw vehicle data transmitted and collected over a period of time forms historical vehicle data which may be stored by the remote subsystem for future analysis of a single vehicle or fleet performance. In practise, a single fleet may comprise many vehicles, and thus large volumes of raw vehicle data (e.g., terabytes, petabytes, exabytes . . . ) may be transmitted to, and stored by, a remote subsystem. Telematics systems are discussed in further detail below with reference to FIGS. 1A, 1B, 1C and FIG. 2.

Processing historical vehicle data corresponding to positions within a roadway section of interest may provide an alternative technique for obtaining traffic data and/or traffic metrics that avoid some of the drawbacks of existing techniques described in the foregoing. For example, a method for obtaining traffic data and/or traffic metrics from historical vehicle data may include obtaining a location (e.g., boundary coordinates) of a roadway section of interest. For instance, a road agency may store geographic data describing a roadway system comprising the roadway section of interest on a publicly accessible server, such as a server accessible via the Internet. The geographic data may be in the form of a geospatial file (e.g., shape file (.shp), GeoJSON (.geojson)), or other file format, from which geographical coordinates of boundaries delineating roads forming the roadway system may be extracted. In this example, a geospatial file including boundary coordinates of the roadway section of interest is accessed, and latitude, longitude (Lat/Long) coordinates of a plurality of points defining the boundaries thereof are extracted from the geospatial file. Next, a plurality of raw vehicle data instances corresponding to a position within boundaries of the roadway section of interest are selected from the historical vehicle data and processed for providing traffic data and/or traffic metrics relating to the roadway section of interest.

In an exemplary implementation, obtaining traffic data and/or traffic metrics for a roadway section of interest from historical vehicle data includes obtaining and processing vehicle speed data for determining an average speed of vehicles traversing a roadway section of interest. In this example, the roadway section of interest is in the form of a portion of a road (i.e., a road portion.) Firstly, the location of the road portion is determined. For instance, geographical coordinates of boundaries of the road portion are extracted, for example, from a shape file (.shp) or a GeoJSON file (.geojson).

As described in the foregoing, historical vehicle data comprises raw vehicle data instances corresponding to a plurality of vehicles which may be indicative of device ID, vehicle position, speed, and date & time the vehicle position and speed were logged. A subset of raw vehicle data instances corresponding to a location within the boundaries of the road portion are selected from historical vehicle data and a cumulative speed of all vehicles that have traversed the road portion are divided by the number thereof to provide an average speed traffic metric. This is only one method of obtaining traffic data and/or traffic metrics from historical vehicle data and is not intended to limit embodiments to this example.

In practise, locations and/or boundaries of roadway sections of interest are not readily available. For instance, some geographic information systems (GISs), (e.g., geographical information systems available from ESRI® of Redlands, Calif., USA), and web mapping services (e.g., Google Maps, developed by Google® of Mountain View, Calif., USA), among others, have compiled geospatial information describing locations, (e.g., boundary information) of roadway systems. However, such systems and services have invested significant resources to do so. For instance, high volumes of different data types are collected via a variety of data collection techniques. This data is then processed to provide geospatial information. Some exemplary data collection techniques include aerial and satellite image capture, video recording, Light Detection and Ranging (LiDAR), road surveying, and crowdsourcing.

In general, implementing similar techniques for obtaining roadway section locations would be time consuming, complex, computationally intensive, and costly. Some web mapping services, (e.g., Google Maps) may provide geospatial roadway-related information, such as Lat/Long coordinates of road boundaries, via interactive maps. However, such functionality is not designed to enable easy extraction of boundary information in large quantities and/or in a suitable machine-readable data format. Alternatively, roadway boundary information may be available in a suitable machine-readable data format, GIS, for example, however, at a cost.

Described herein are alternative techniques for defining locations of roadway sections that may avoid some issues of known techniques described in the foregoing. Upon definition of a location of a roadway section of interest, related traffic data and/or traffic metrics related thereto may be determined by processing raw vehicle data instances corresponding to positions within a roadway section of interest, as described above.

In general, techniques described herein may be used to determine a location of any area frequently used by vehicles. Such areas are discussed in further detail below in reference to FIGS. 6Ai-6Avi and FIGS. 6Bi-6Bvi.

Described herein are various embodiments of systems and methods for defining an area frequently used by vehicles, (i.e., an area on the Earth's surface repeatedly employed by vehicles), hereinafter referred to as a 'vehicle way'. A vehicle way may include an area used by vehicles for movement and/or parking. Specific and non-limiting examples of vehicle ways include traffic-designated areas, such as by road agencies, for channeling traffic flow (e.g., roads, traffic junctions), and for parking (e.g., street parking spaces, commercial parking lots). Vehicle ways may also include areas that are not traffic-designated areas. For instance, areas that have not been created and/or maintained by a road agency or commercial entity for vehicle use, nonetheless are repeatedly used thereby. For example, a vehicle way includes an ad hoc vehicle way. An example of an ad hoc vehicle way includes a beaten path created by frequent flow of vehicles for accessing a natural attraction, such as a lake, river, or forested area, for which no access road was available. Another example of an ad hoc vehicle way includes a portion of a field frequently used to accommodate overflow vehicles of a nearby parking lot.

Illustrated in FIGS. 6Ai-6Avi are simplified diagrams of various exemplary types of vehicle ways, including: circular traffic junction 602, (i.e., roundabout) having circular road segment 604 and road segments 606, 607, 608 and 609 for channeling vehicles therethrough; three way traffic junction 612 (i.e., intersection) having road segments 614, 616, and 617 for channeling vehicles therethrough; traffic junction 618 (i.e., highway off-ramp) having road segment 619, main road portion 620, and 622 for channeling vehicles therethrough; parking lot 624, having parking area 626 and entry/exit 629 for channeling vehicles in and out thereof; road portion 650 having opposing lanes 643*a* and 643*b*; and on-street parking space 644. The exemplary vehicle ways of FIGS. 6Ai-6Avi are provided for example purposes only and embodiments are not intended to be limited to the examples described herein.

A defined vehicle way may be described by any data format provided the data indicates the location (e.g., the unique location of the vehicle way on the Earth's surface) occupied thereby. For example, a vehicle way may be defined by a plurality of points defining the boundaries of the vehicle way. The geographic coordinates of the plurality of points may be, for example, stored in a text file, such as a comma-separated values (.csv) file. In another example, boundaries may be described in a geospatial file, for instance a shape file (.shp) or a GeoJSON file (.geojson), from which geographic coordinates of vehicle way boundaries may be obtained. In yet another example, the location occupied by a vehicle way may be described in accordance with a geospatial indexing system, such as Geohash. Geohash is a known public domain hierarchical geospatial indexing system which uses a Z-order curve to hierarchically subdivide the latitude/longitude grid into progressively smaller cells of grid shape. For instance, a Geohash string indicates a unique geographical area (e.g., cell). A vehicle way may be described by data indicative of a plurality of Geohash strings indicating the Geohash cells occupied by the vehicle way. A vehicle way may be described in numerous data formats and embodiments are not intended to be limited to examples described herein.

Some embodiments described herein relate to techniques for defining a vehicle way comprising processing data indicative of vehicle operation conditions of a plurality of vehicles that have travelled within a known area, that is, an area of which the location thereof is defined. Processing such data may provide an indication as to whether the known area is a portion of the vehicle way. In other words, processing such data may provide an indication as to whether the vehicle way occupies the known area.

Processing data may also include processing other data indicative of vehicle operation conditions of another plurality of vehicles that have travelled within other known areas proximate the known area. Furthermore, processing data may also include processing spatial relationship data of the known area to other known areas proximate thereto.

Some embodiments described herein relate to defining a vehicle way by defining a relationship between vehicle operating conditions of vehicles that have operated proximate known areas and the likelihood the known areas are portions of a vehicle way.

Some embodiments described herein relate to techniques for defining a vehicle way using machine learning techniques using historical vehicle data, (e.g., raw vehicle data), and/or data derived therefrom to define the location of the vehicle way.

In example implementations, a traffic analytics system may be configured to access historical vehicle data associated with known areas and define one or more classification models that are related to operating conditions of corresponding vehicles, and then operate in accordance with the one or more models. In general, each such classification model may receive as input, data (i.e., features), derived from historical vehicle data related to vehicles that have operated within a known area, within a plurality of known areas, and a spatial relationship of the known area to the other known areas, and output an indication the known area is a portion of a vehicle way.

As described in the foregoing, a vehicle way includes areas frequently used and/or employed by vehicles. The phrases 'frequently used' and 'repeatedly employed' are relative to the time period of logging of the historical vehicle data. For example, data (i.e., features), derived from historical vehicle data related to vehicles that have travelled within a known area are input to a classification model for use thereof. However, if there is little raw vehicle data corresponding to a vehicle way of interest within the historical vehicle data, the output of the classifier may not provide meaningful data when applied for defining the vehicle way of interest.

Figure 1A:
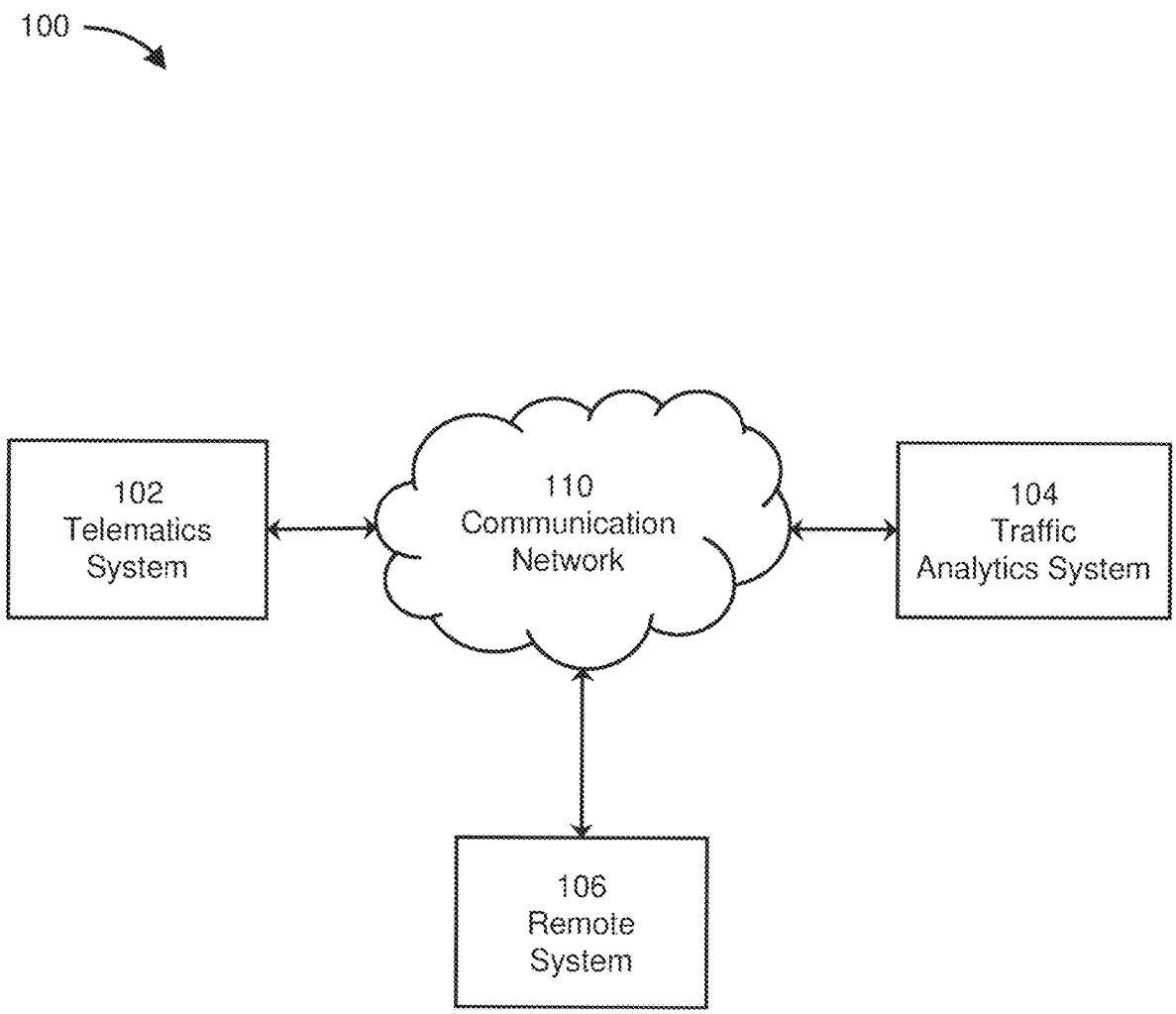
FIG. 1A is a simplified diagram of an exemplary network configuration with which some embodiments may operate.

Illustrated in FIG. 1A is a simplified diagram of an exemplary network configuration 100 with which some embodiments may operate. Network configuration 100 includes telematics system 102, traffic analytics system 104, remote system 106, and communication network 110. Communication network 110 may be communicatively coupled to telematics system 102, traffic analytics system 104, and remote system 106, enabling communication therebetween.

Figure 1B:
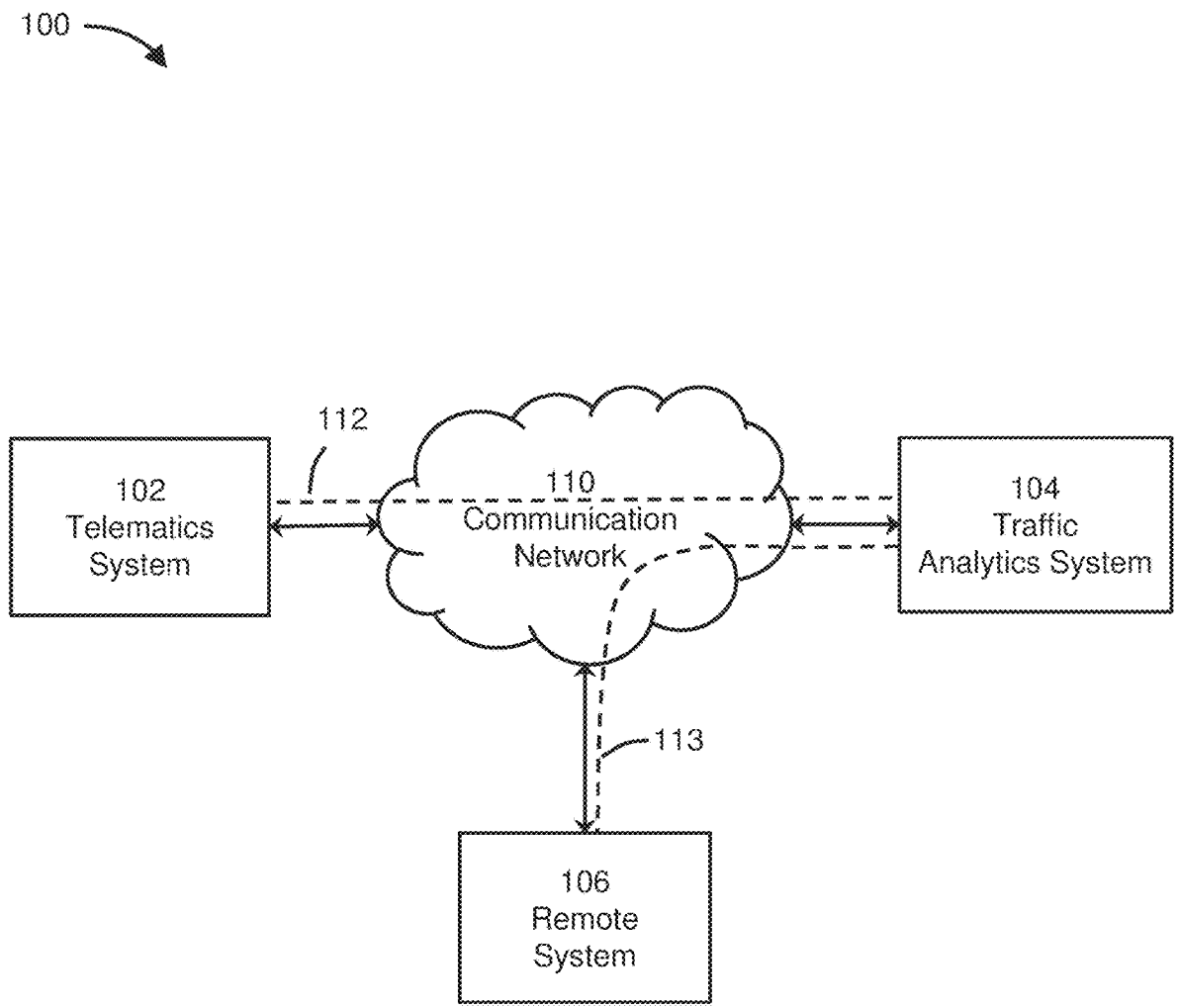
FIG. 1B is a simplified diagram of the exemplary network configuration of FIG. 1A illustrating communication paths.

For example, traffic analytics system 104 may communicate with telematics system 102, and remote system 106 for receiving historical vehicle data or a portion thereof via communication network 110. FIG. 1B is a simplified diagram of network configuration 100 illustrating communication path 112 between traffic analytics system 104 and telematics system 102 and communication path 113 between traffic analytics system 104 and remote system 106.

Figure 1C:
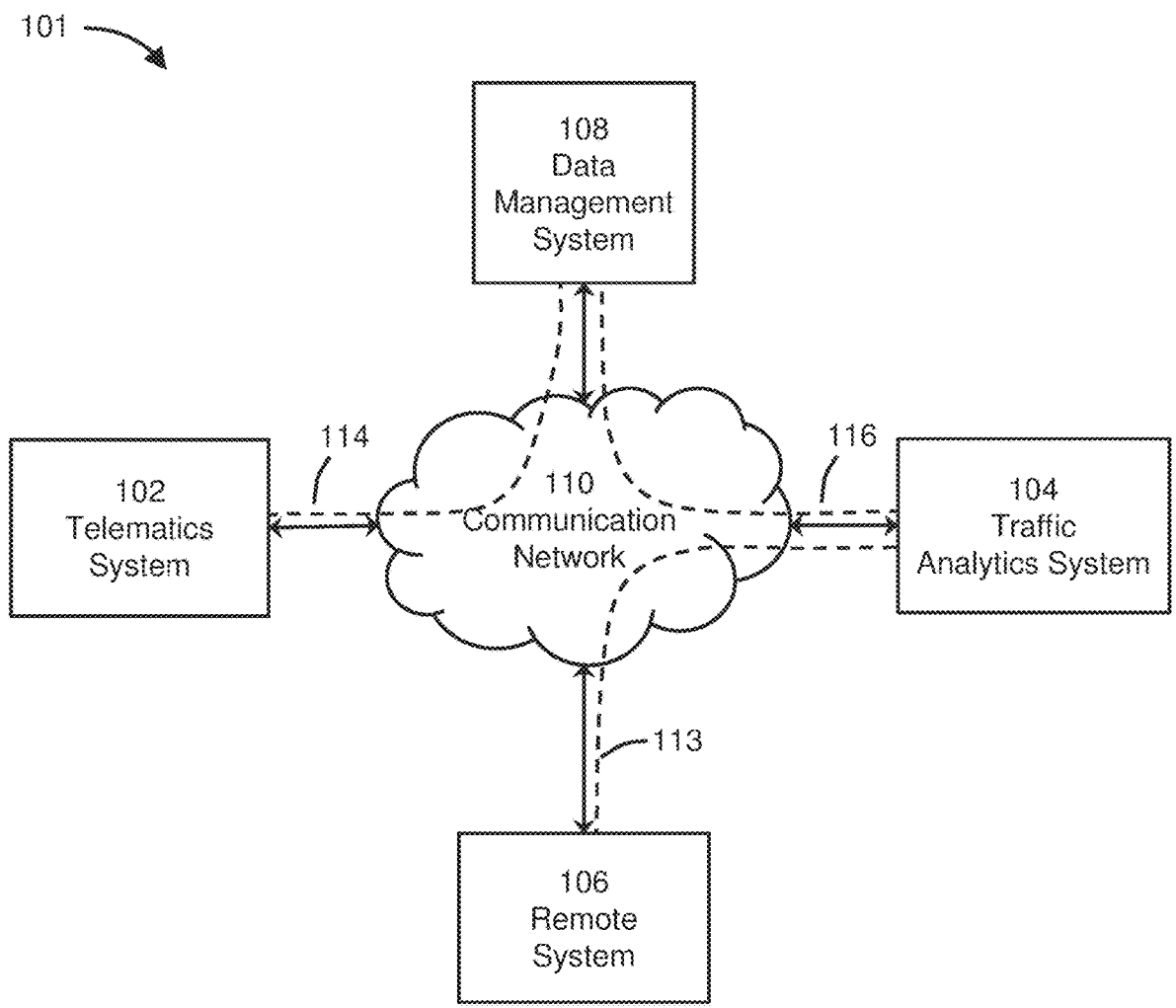
FIG. 1C is a simplified diagram of another exemplary network configuration with which some embodiments may operate illustrating communication paths.

FIG. 1C is a simplified diagram of another exemplary network configuration 101 with which some embodiments may operate. Network configuration 101 includes telematics system 102, traffic analytics system 104, remote system 106, data management system 108 and communication network 110. Communication network 110 may be communicatively coupled to telematics system 102, traffic analytics system 104, remote system 106, and data management system 108, enabling communication therebetween.

For example, telematics system 102 may transmit raw vehicle data and/or historical vehicle data to data management system 108 for the storage thereof, as illustrated by communication path 114. Traffic analytics system 104 may be configured for communicating with data management system 108, for receiving historical vehicle data or a portion thereof via communication network 110, as illustrated by communication path 116. Traffic analytics system 104 may also be configured for communicating with remote system 106.

Remote system 106 may be another telematics system from which traffic analytics system 104 receives historical vehicle data. Alternatively, remote system 106 may store historical vehicle data collected by one or more telematics systems and/or similar vehicle monitoring systems.

Alternatively, remote system 106 may provide external data to traffic analytics system 104. For example, remote system 106 is a map service provider that provides geospatial information regarding roadway systems, traffic control equipment, and/or jurisdictional boundary information, among other geospatial information to traffic analytics system 104.

In yet another example, remote system 106 may be a customer system to which traffic analytics system 104 transmits output data in the form of raw data, a web page, or in another data format.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), Global System for Mobile (GSM), Enhanced Data Rates for GSM Evolution (EDGE), Long Term Evolution (LTE), CDMA (Code-division Multiple Access) (CDMA), WCDMA (Wide Code-division Multiple Access), (High Speed Packet Access (HSPA), Evolved HSPA (HSPA+), Low-power WAN (LPWAN), Wi-Fi, Bluetooth, Ethernet, Hypertext Transfer Protocol Secure (HTTP/S), Transmission Control Protocol/Internet Protocol (TCP/IP), and Constrained Application Protocol/Datagram Transport Layer Security (CoAP/DTLS), or other suitable protocol. Communication network 110 may take other forms as well.

Figure 2:
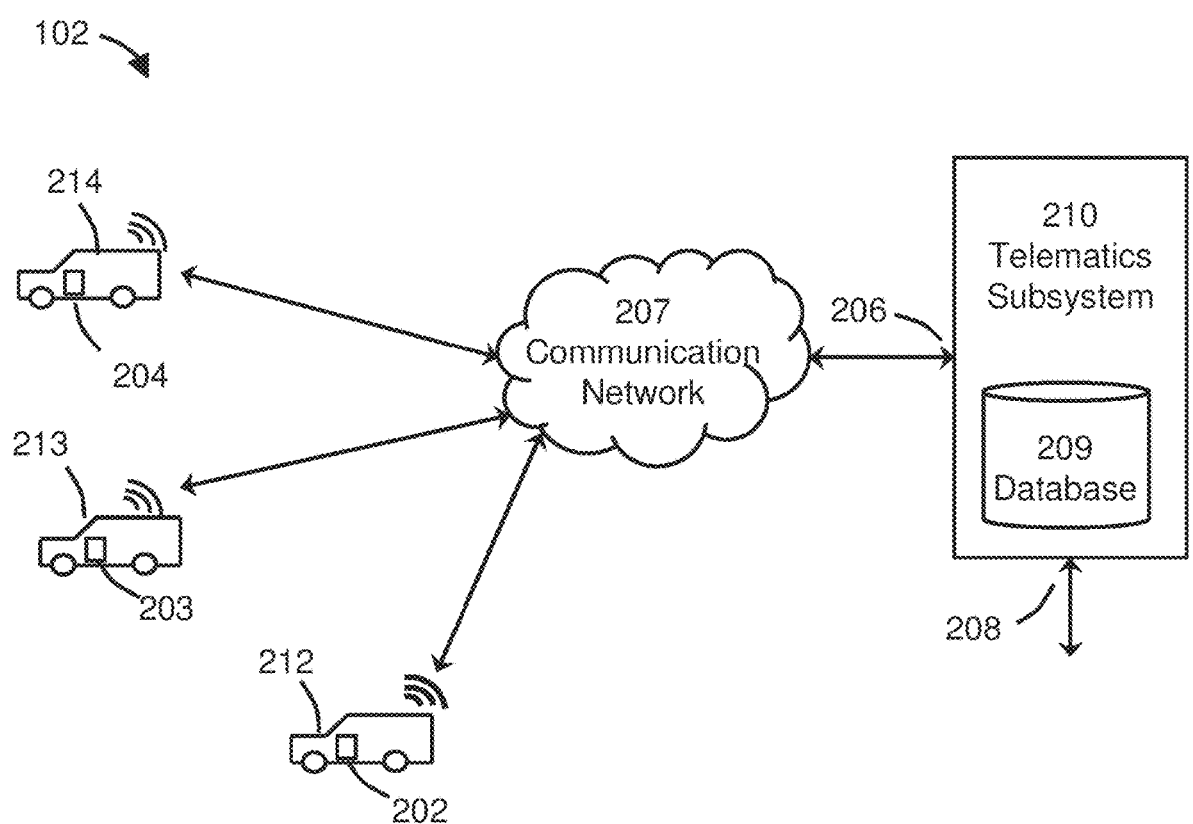
FIG. 2 is a simplified block diagram of an exemplary telematics system.

Illustrated in FIG. 2 is a simplified block diagram of an exemplary telematics system for gathering and storing vehicle operation information. Telematics system 102 comprises telematics subsystem 210 (e.g., server) having a first network interface 206 and onboard monitoring devices 202, 203, and 204 communicatively coupled therewith via communication network 207.

Communication network 207 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 207 may operate according to one or more communication protocols, such as, General Packet Radio Service (GPRS), Universal Mobile Telecommunications Service (UMTS), Global System for Mobile (GSM), Enhanced Data Rates for GSM Evolution (EDGE), Long Term Evolution (LTE), CDMA (Code-division Multiple Access) (CDMA), WCDMA (Wide Code-division Multiple Access), (High Speed Packet Access (HSPA), Evolved HSPA (HSPA+), Low-power WAN (LPWAN), Wi-Fi, Bluetooth, Ethernet, Hypertext Transfer Protocol Secure (HTTP/S), Transmission Control Protocol/Internet Protocol (TCP/IP), and Constrained Application Protocol/Datagram Transport Layer Security (CoAP/DTLS), or other suitable protocol. Communication network 110 may take other forms as well.

Telematics system 102 may comprise another network interface 208 for communicatively coupling to another communication network, such as communication network 110. Telematics subsystem 210 may comprise a plurality of servers, datastores, and other devices, configured in a centralized, distributed or other arrangement.

Also shown in FIG. 2 are vehicles 212, 213 and 214, each thereof having aboard the monitoring devices 202, 203, and 204, respectively. A vehicle may include a car, truck, recreational vehicle, heavy equipment, tractor, snowmobile, or other transportation asset. Onboard monitoring devices 202-204 may transmit raw vehicle data associated with vehicles 212-214. Raw vehicle data transmitted and collected over a period of time forms historical vehicle data which may be stored by remote telematics subsystem 210.

In practise, a monitoring device is associated with a particular vehicle. For example, during configuration of monitoring devices 202-204, each thereof may be assigned a unique device ID that is uniquely associated with a vehicle information number (VIN) of vehicles 212-214, respectively. This enables an instance of received raw vehicle data to be associated with a particular vehicle. As such, vehicle-specific raw vehicle data may be discernable among other raw vehicle data in the historical vehicle data.

Three monitoring devices are described in this example for explanation purposes only and embodiments are not intended to be limited to the examples described herein. In practise, a telematics system may comprise many vehicles, such as hundreds, thousands and tens of thousands or more. Thus, huge volumes of raw vehicle data may be received and stored by telematics subsystem 210.

In general, monitoring devices comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, among others. One of ordinary skill in the art will appreciate that these are but a few types of vehicle operating conditions that may be detected.

Monitoring device 202 may comprise a sensing module for determining vehicle position. For instance, the sensing module may utilize Global Positioning System (GPS) technology (e.g., GPS receiver) for determining the geographic position (Lat/Long coordinates) of vehicle 212. Alternatively, the sensing module utilizes another global navigation satellite system (GNSS) technology, such as, GLONASS or BeiDou. Alternatively, the sensing module may further utilize another kind of technology for determining geographic position. In addition, the sensing module may provide other vehicle operating information, such as speed.

Alternatively, vehicle position information may be provided according to another geographic coordinate system, such as, Universal Transverse Mercator, Military Grid Reference System, or United States National Grid.

In general, a vehicle may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Monitoring device 202 may comprise a monitoring module operable to communicate with a data/communication bus of vehicle 212. A monitoring module may communicate via a direct connection, such as, electrically coupling, with a data/communication bus of vehicle 212 via a vehicle communication port, (e.g., diagnostic port/communication bus, OBDII port). Alternatively, a monitoring module may comprise a wireless communication interface for communicating with a wireless interface of the data/communication bus of vehicle 212. Optionally, a monitoring module may communicate with other external devices/systems that detect operating conditions of the vehicle.

Monitoring device 202 may be configured to wirelessly communicate with telematics subsystem 210 via a wireless communication module. In some embodiments, monitoring device 202 may directly communicate with one or more networks outside vehicle 212 to transmit data to telematics subsystem 210. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to telematics subsystem 210. The raw vehicle data may be transmitted at predetermined time intervals, (e.g., heartbeat), intermittently, and/or according to other predefined conditions. Raw vehicle data transmitted from monitoring devices 202-204 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

In an exemplary implementation, raw vehicle data received and stored by a subsystem over a period of time forms historical vehicle data. In an exemplary implementation, historical vehicle data may be stored by telematics subsystem 210 in a database, such as database 209, as shown. A period of time may include, for example, 3 months, 6 months, 12 months, or another duration of time.

Traffic Analytics System

Figure 3A:
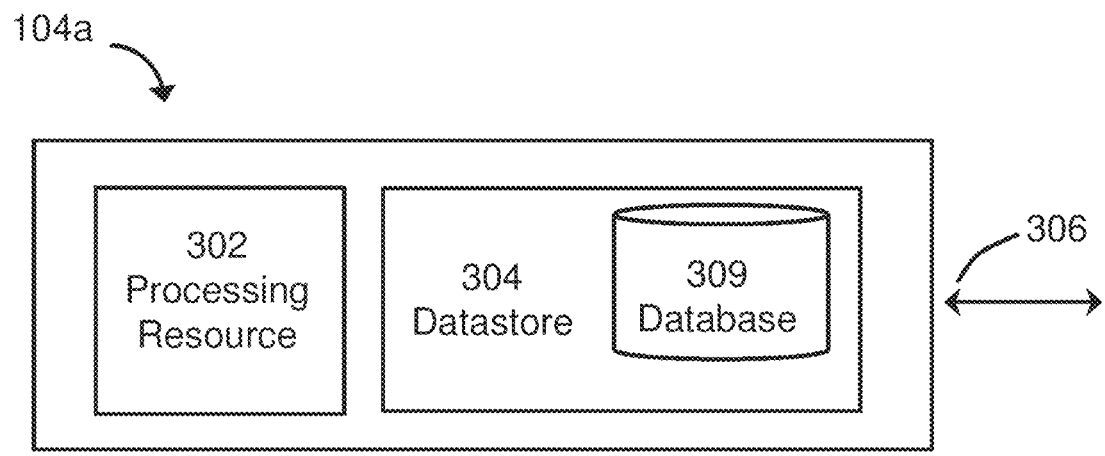
FIG. 3A is a simplified block diagram of an exemplary traffic analytics system according to an embodiment.
Figure 3B:
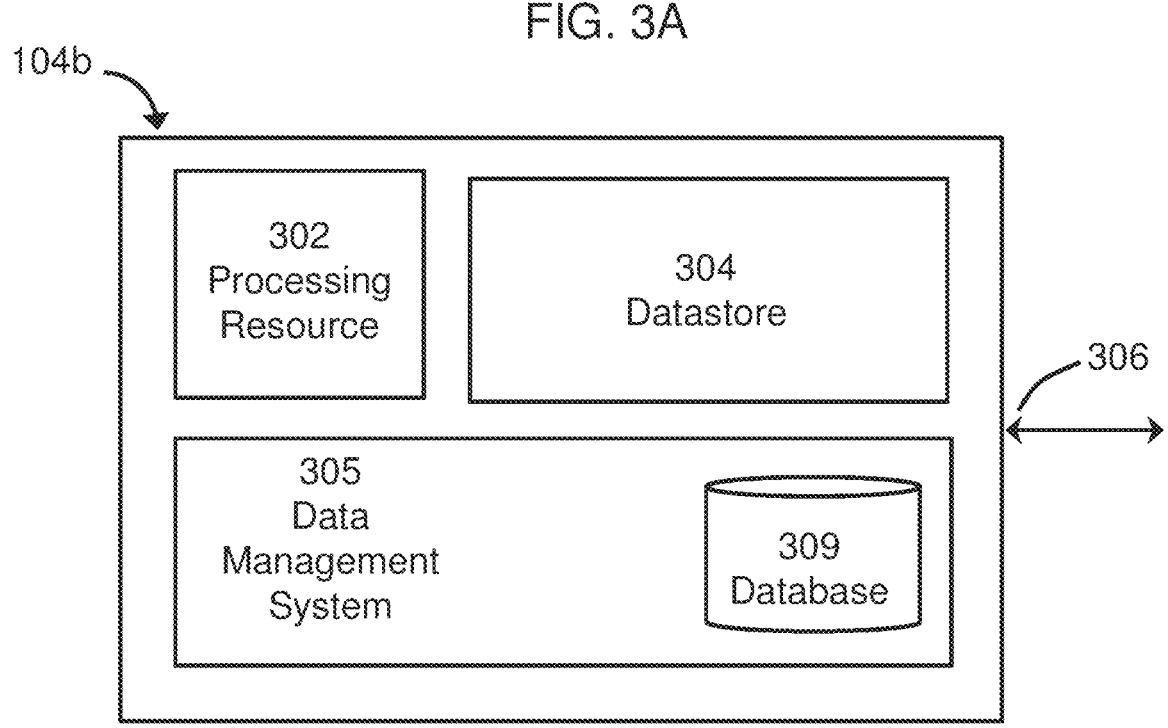
FIG. 3B is a simplified block diagram of another exemplary traffic analytics system comprising a data management system according to an embodiment.

Illustrated in FIG. 3A and FIG. 3B there are two exemplary traffic analytics systems 104 including traffic analytics system 104a and traffic analytics system 104b, as shown respectively.

FIG. 3A is a simplified block diagram of exemplary traffic analytics system 104a comprising a processing resource 302, datastore 304, and network interface 306. For example, processing resource 302 and datastore 304 may be communicatively coupled by a system communication bus, a wired network, a wireless network, or other connection mechanism and arranged to carry out various operations described herein. Optionally, two or more of these components may be integrated together in whole or in part.

Network interface 306 may be interoperable with communication network 110 and may be configured to receive data from various network components of the network configuration 100, 101 such as telematics system 102, remote system 106, data management system 108, and possibly other network components. Traffic analytics system 104a, 104b may communicate with one or more of these network components for obtaining historical vehicle data, or portions thereof. For instance, once received, datastore 304 may store subsets of raw vehicle data in a database, such as database 309.

In an exemplary implementation, traffic analytics system 104a is configured to interoperate with data management system 108 for obtaining historical vehicle data and/or a portion thereof. For example, data management system 108 may manage and store large volumes (e.g., big data) and multiple types of data. Data management system 108 may comprise a relational database, for storing historical vehicle data, or a portion thereof, collected by one or more telematics or vehicle monitoring systems. Data management system 108 may include a web service that enables interactive analysis of large datasets stored in a remote datastore. Traffic analytics system 104a may be configured to interoperate with such a data management system for obtaining raw vehicle data from historical vehicle data stored therein and managed thereby. An example of such a data management system is a managed cloud data warehouse for performing analytics on data stored therein, such as BigQuery™, available from Google® of Mountain View, Calif., USA.

FIG. 3B is a simplified block diagram of second exemplary traffic analytics system 104b comprising processing resource 302, datastore 304, data management system 305 and network interface 306. For example, processing resource 302, datastore 304, and data management system 305 may be communicatively coupled by a system communication bus, a wired network, a wireless network, or other connection mechanism and arranged to carry out various operations described herein. Optionally, two or more of these components may be integrated together in whole or in part. Data management system 305 may comprise a datastore including database for storing historical vehicle data or a portion thereof. Optionally data management system 305 stores and manages large volumes (e.g., big data) and multiple types of data. For example, data management system 305 may comprise a relational database, for storing historical vehicle data collected by one or more telematics or vehicle monitoring systems, or a portion thereof. In another example, database 309 of data management system 305 stores subsets of raw vehicle data from historical vehicle data for processing by traffic analytics system 104b. Alternatively, data management system 305 may include and/or access a web service that enables interactive analysis of large datasets stored in a remote datastore. An example of such a data management system is a managed cloud data warehouse for performing analytics on data stored therein, such as BigQuery™.

According to an embodiment, exemplary traffic analytics system 104b receives and stores historical vehicle data in data management system 305 and operates on subsets of historical vehicle data in accordance with operations described herein.

Processing resource 302 may include one or more processors and/or controllers, which may take the form of a general or a special purpose processor or controller. In exemplary implementations, processing resource 302 may be, or include, microprocessors, microcontrollers, application specific integrated circuits, digital signal processors, and/or other data processing devices. Processing resource 302 may be a single device or distributed over a network.

Datastore 304 may be or include one or more non-transitory computer-readable storage media, such as optical, magnetic, organic, or flash memory, among other data storage devices and may take any form of computer readable storage media. Datastore 304 may be a single device or may be distributed over a network.

Processing resource 302 may be configured to store, access, and execute computer-readable program instructions stored in datastore 304, to perform the operations of traffic analytics system 104a, 104b described herein. For instance, processing resource 302 may be configured to receive historical vehicle data and may execute a classification model for defining a vehicle way. Other functions are described below.

Traffic analytics system 104a, 104b may be configured to access, receive, store, analyze and process raw vehicle data for defining a classification model and/or executing a classification model. For example, traffic analytics system 104a, 104b may select and process raw vehicle data of a plurality of vehicles corresponding to a known area, for determining whether the known area is likely to be a portion of a vehicle way. Other examples and corresponding operations are also possible.

In some example implementations, traffic analytics system 104a, 104b may include and/or communicate with a user interface. The user interface may be located remote from traffic analytics system 104a, 104b. For instance, traffic analytics system 104a, 104b may communicate with a user interface via network interface 306. Other examples are also possible.

For the ease of description, traffic analytics system 104a, 104b is shown as a single system, however, it may include multiple computing systems, such as servers, storage devices, and other distributed resources, configured to perform operations/processes described herein. Operations and processes performed by traffic analytics system 104a, 104b described herein may be performed by another similarly configured and arranged system.

Figure 4A:
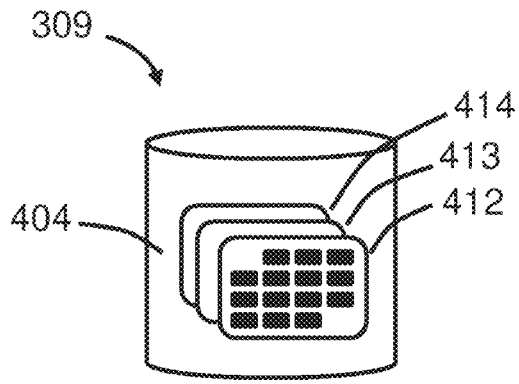
FIG. 4A is a conceptual diagram of a database of a traffic analytics system according to an embodiment.

In an exemplary implementation, traffic analytics system 104a, 104b is configured to obtain, store and process historical vehicle data. For example, traffic analytics system 104a, 104b obtains historical vehicle data 404 from telematics system 102 and stores it in database 309. FIG. 4A is a conceptual diagram of database 309. In this example, traffic analytics system 104a, 104b organizes historical vehicle data 404 by vehicle, via associated device ID. For instance, vehicle-specific datasets 412-414 of database 309 comprise raw vehicle data indicative of vehicle operation information of vehicles 212-214, respectively.

Figure 4B:
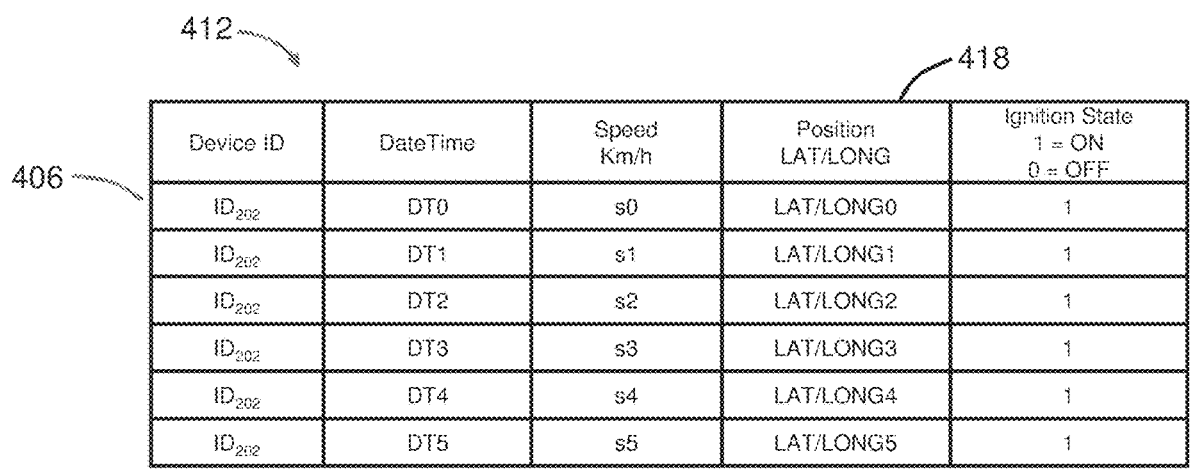
FIG. 4B is a conceptual diagram of a dataset of the database of FIG. 4A.

Shown in FIG. 4B is a conceptual diagram of dataset 412. In this example, each row thereof represents a raw vehicle data instance 406 indicative of vehicle operation information collected by monitoring device 202 at different points in time. Raw vehicle data instances 406 of dataset 412 are organized sequentially in time, from DTO to DTS. In this example, a raw vehicle data instance 406 includes device ID data, speed data, position data, (e.g., LAT/LONG), ignition state data, and date and time data, (e.g., timestamp), as shown.

Figure 4C:
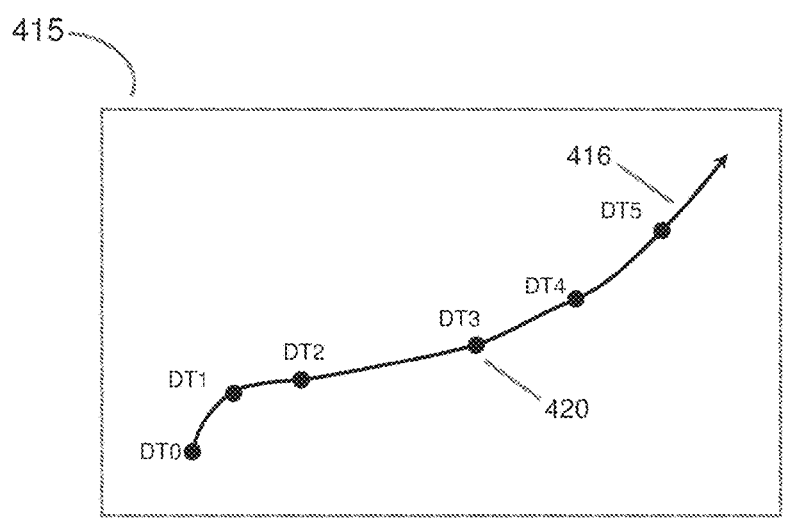
FIG. 4C is a conceptual diagram of a vehicle's path within a geographic area.

Now referring to FIG. 4C, shown is a conceptual diagram of vehicle 212's path 416 within geographic area 415 corresponding to vehicle position data 418 of dataset 412. Vehicle-position data points 420 represents a position of vehicle 212 at different points in time, DTO-DTS. As shown, the position of vehicle 212 changes position at each temporally subsequent point in time.

For ease of description, database 309 comprising historical vehicle data 404 is described as organized into vehicle-specific datasets 412-414. One of ordinary skill appreciates that historical vehicle data may be organized in numerous manners.

Intelligent Telematics System

An intelligent telematics system includes aspects of a telematics system and a traffic analytics system, such as, telematics system 102 and traffic analytics system 104a, 104b.

Figure 5A:
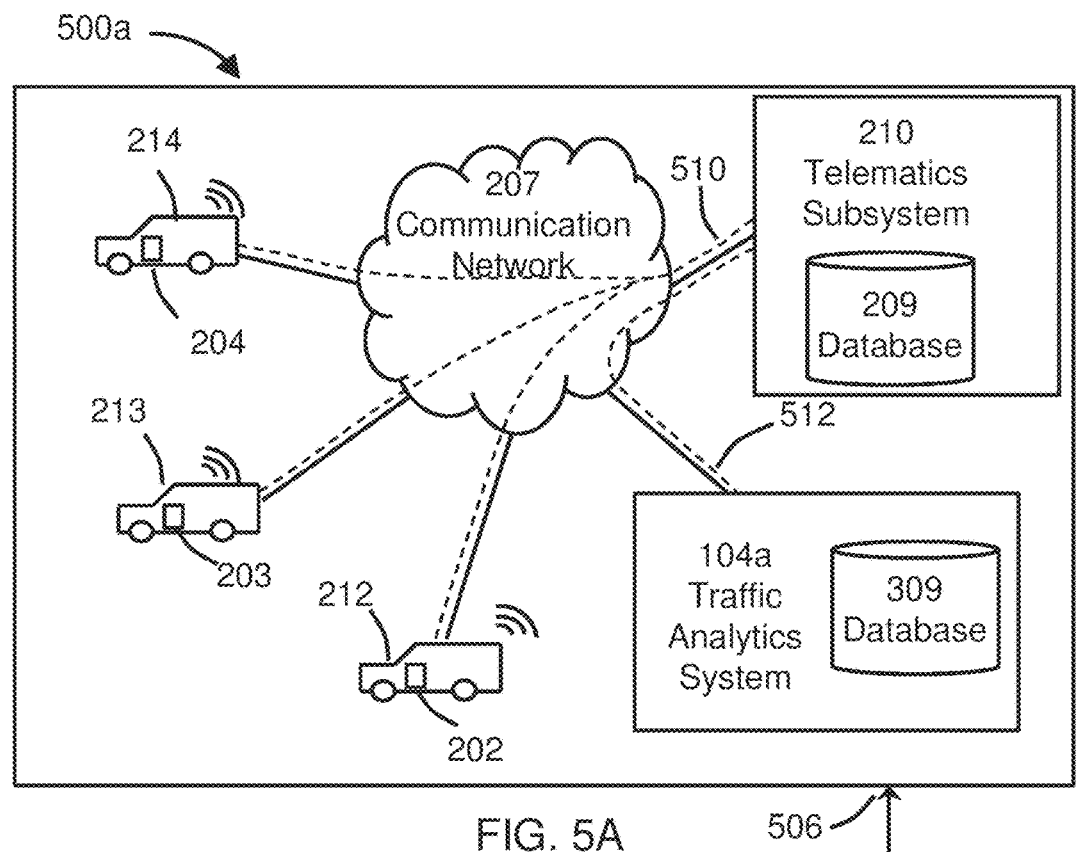
FIG. 5A is a simplified diagram illustrating an exemplary intelligent telematics system according to embodiments.

FIG. 5A is a simplified diagram of an alternative embodiment with which some embodiments may operate. Shown in FIG. 5A is intelligent telematics system 500a comprising monitoring devices 202, 203, and 204, telematics subsystem 210 (e.g., server), traffic analytics system 104a, communicatively coupled via communication network 207. Intelligent telematics system 500a may also include network interface 506 compatible for interfacing with a communication network for communicating with other network components. For example, network interface 506 may be interoperable with communication network 110 and may be configured to receive data from various network components of the network configuration 100, 101 such as remote system 106.

In this example monitoring devices 202-204 may be configured to wirelessly communicate with telematics subsystem 210 via a wireless communication module. In some embodiments, monitoring devices 202-204 may directly communicate with one or more networks outside respective vehicles to transmit data to telematics subsystem 210. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to telematics subsystem 210, as represented by communication path 510. In an exemplary implementation, raw vehicle data received and stored by telematics subsystem 210 over a period of time forms historical vehicle data. For instance, historical vehicle data may be stored by telematics subsystem 210 in database 209. A period of time may include, for example, 3 months, 6 months, 12 months, or another duration of time. In an exemplary embodiment, subsets of raw vehicle data selected from historical vehicle data stored in database 209 may be stored in another database, for instance, database 309 for processing by traffic analytics system 104a. In this example raw vehicle data is transmitted by telematics subsystem 210 and received by traffic analytics system 104a via communication path 512, as shown.

Figure 5B:
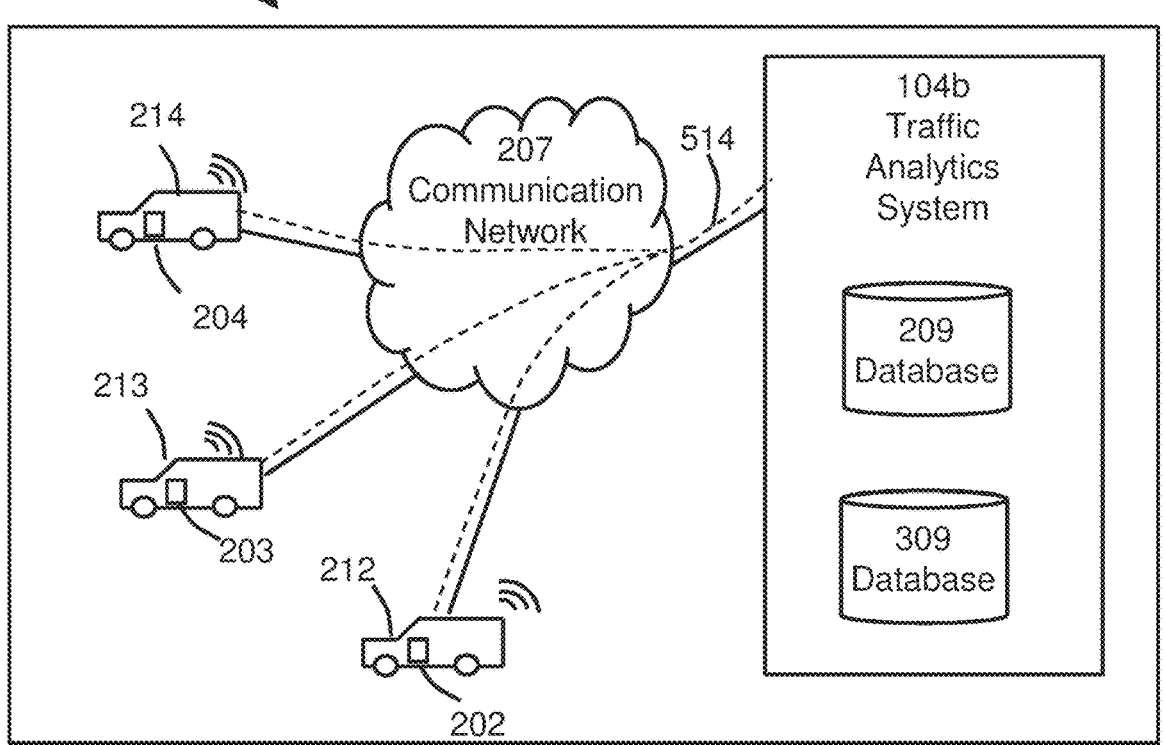
FIG. 5B is a simplified diagram illustrating another exemplary intelligent telematics system according to embodiments.

FIG. 5B is a simplified diagram of another alternative embodiment with which some embodiments may operate. Shown in FIG. 5B is intelligent telematics system 500b comprising monitoring devices 202, 203, and 204 and traffic analytics system 104b, communicatively coupled therewith via communication network 207.

Intelligent telematics system 500b may also include network interface 506 compatible for interfacing with a communication network for communicating with other network components. For example, network interface 506 may be interoperable with communication network 110 and may be configured to receive data from various network components of the network configuration 100, 101, such as remote system 106.

In this example monitoring devices 202-204 may be configured to wirelessly communicate with traffic analytics system 104b via a wireless communication module. In some embodiments, monitoring devices 202-204 may directly communicate with one or more networks outside respective vehicles to transmit data to traffic analytics system 104b. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to traffic analytics system 104b via communication path 514, as shown. In an exemplary implementation, raw vehicle data received and stored by traffic analytics system 104b over a period of time forms historical vehicle data. For instance, historical vehicle data may be stored by traffic analytics system 104b in database 209 in data management system 305. A period of time may include, for example, 3 months, 6 months, 12 months, or another duration of time. In an exemplary embodiment, subsets of raw vehicle data selected from historical vehicle data stored in database 209 may be stored in another database, for instance, database 309 for processing by traffic analytics system 104b. In this example raw vehicle data is transmitted by telematics subsystem 210 and received by traffic analytics system 104a. Traffic analytics system 104b may be configured to perform operations of telematics system 201 as described herein.

In some example implementations, intelligent telematics system 500a, 500b may be configured to include and/or communicate with a user interface. The user interface may be located remote therefrom. For instance, intelligent telematics system 500a, 500b may communicate with a user interface via network interface 506. Other examples are also possible.

Classification Model

According to an embodiment, a classifier defining a relationship between operation of a plurality of vehicles having operated in a known area and a probability the known area is a portion of a vehicle way may be defined by processing corresponding historical vehicle data. For example, such processing may provide features (e.g., data indicative of variables/attributes, or measurements of properties) of the known area. A machine learning algorithm may be trained with training data comprising features to recognize patterns therein and generalize a relationship between the features and an outcome that the known area is occupied by the vehicle way.

Figure 7:
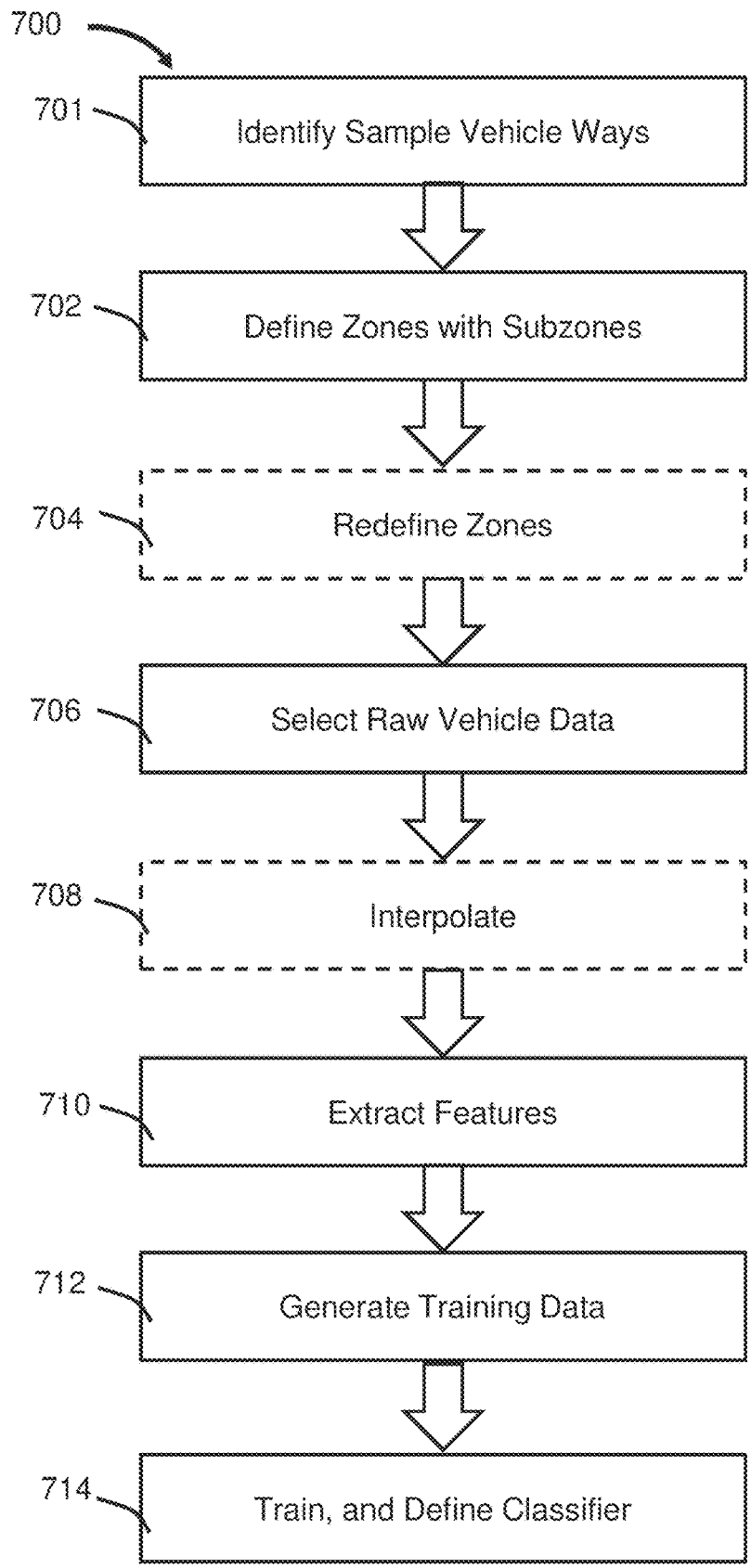
FIG. 7 is a flow diagram of a process for defining a classifier for use in defining a vehicle way according to some embodiments.

Shown in FIG. 7 is a flow diagram of a process 700 for defining a classifier for use in defining a vehicle way according to some embodiments. In particular, a classifier is for providing an indication that a known area is, or is not, a portion of a vehicle way. A classifier may provide as output a likelihood (e.g., probability) a known area is a portion of a vehicle way. Alternatively, a classifier may output an indication (e.g., binary value) that a known area is, or is not, a portion of a vehicle way.

Process 700 is described below as being carried out by traffic analytics system 104a. Alternatively, process 700 may be carried out by traffic analytics system 104b, intelligent telematics system 500a, 500b, another system, a combination of other systems, subsystems, devices or other suitable means provided the operations described herein are performed. Process 700 may be automated, semi-automated and some blocks thereof may be manually performed.

Block 701

Process 700 begins at block 701, wherein a plurality of sample vehicle ways is identified. According to an embodiment, a classifier may be defined according to a type and/or subtype of vehicle way that is to be defined using the classifier. Specific and non-limiting examples of types of vehicle ways include, traffic junctions, road segments, parking lots, and ad hoc vehicle ways. Specific and non-limiting examples of subtypes of vehicle ways include: subtypes of traffic junctions, including roundabouts, intersections, on-ramps, and off-ramps; subtypes of parking lots including single entry and single exit parking lots, single entry and multiple exit parking lots, and multiple entry and single exit parking lots; and subtypes of road segments including one way, two way, multi-lane, and divided highways. A subtype may be considered another type of vehicle way. A subtype may be considered another type of vehicle way. Block 701 will be further described below in reference to FIG. 8.

In an exemplary implementation, a plurality of sample vehicle ways of only parking lot type is identified for defining a classifier for use in defining parking lots. In another exemplary implementation, a plurality of sample vehicle ways for defining a classifier for use in defining a vehicle way in the form of a traffic junction comprises traffic junctions only. For example, the plurality of sample vehicle ways may include one or more of the following traffic junctions, 3-way intersections, 4-way intersections, n-way intersections, roundabouts, and any other portion of a road system where multiple roads intersect allowing vehicular traffic to change from one road to another.

Alternatively, a plurality of sample vehicle ways for defining a classifier for use in defining a subtype of a traffic junction in the form of an intersection only comprises intersections (e.g., 3-way intersections, 4-way intersections). Defining a classifier for use for defining a particular type or subtype of vehicle way may provide a more accurate classifier.

Furthermore, a classifier defined with sample vehicle ways of only one type and/or one subtype of vehicle way may be suitable for use in defining vehicle ways of a different type and/or subtype of vehicle way.

Alternatively, a classifier may be defined for defining all types of vehicle ways.

Figure 8:
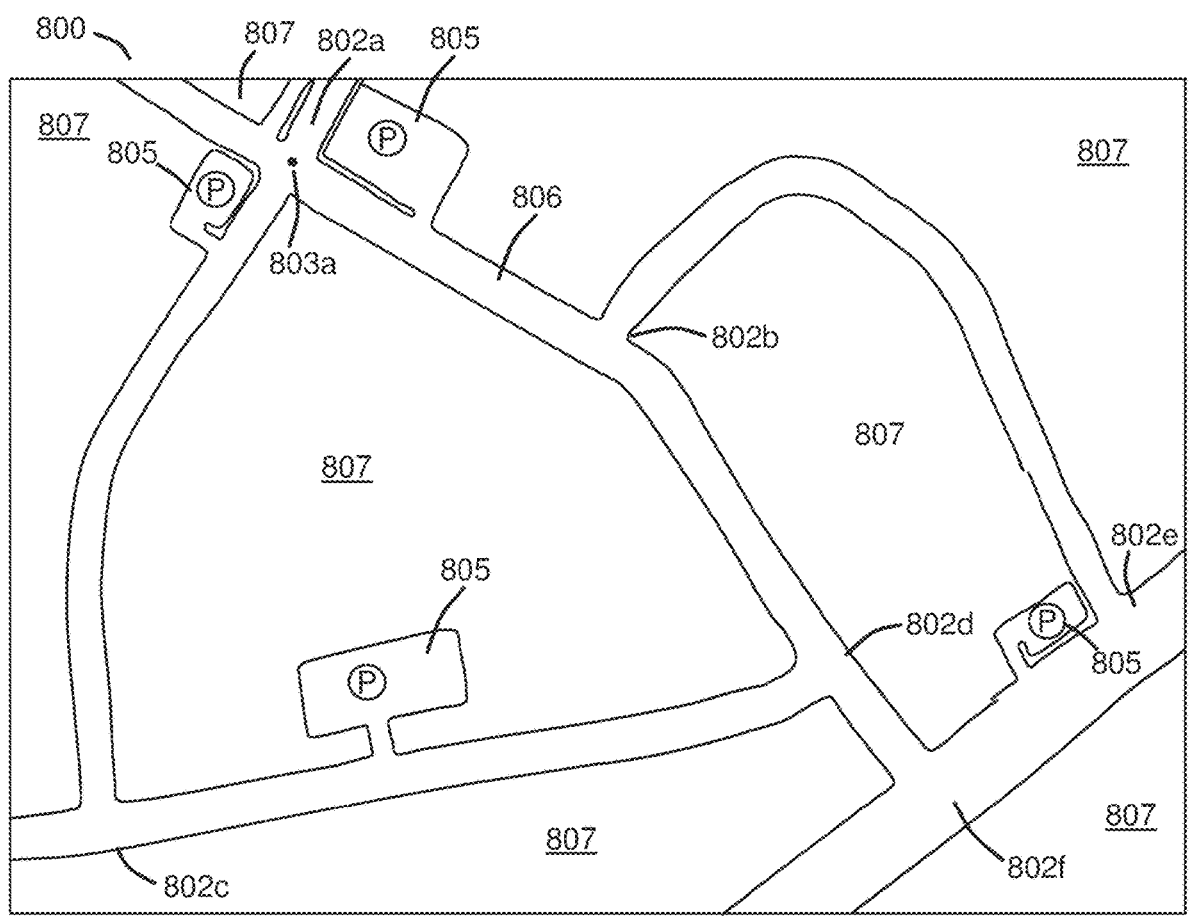
FIG. 8 is a simplified diagram of an area comprising a plurality of sample intersections.

In an exemplary implementation, a classifier for use in defining a vehicle way in the form of an intersection is defined according to process 700. In FIG. 8, shown is a simplified diagram of area 800 comprising a roadway system including a plurality of sample vehicle ways in the form of sample intersections 802a-802f. Area 800 also comprises parking lots 805, roadway sections 806, and non-traffic designated areas 807 (e.g., greenspace, sidewalks). For ease of description, only six sample intersections are described in this example. In practise, however, the number of sample vehicle ways may include other than six sample vehicle ways.

In this example, sample intersections 802a-802f are also shown to be part of the same roadway network. However, sample vehicle ways may be selected from different roadway systems located in different cities, countries and/or continents. One of ordinary skill in the art appreciates that selection of an appropriate number and type(s) of sample vehicle ways will become apparent during definition (e.g., training and verification) of the classifier.

Block 702

Once a plurality of sample vehicle ways has been identified, a plurality of associated zones for each of the plurality of sample vehicle ways, is defined in block 702. Block 702 will be further described below in reference to FIGS. 6Ai-6Avi, 6Bi-6Bvi, 6C, FIG. 8, FIG. 9, FIGS. 10A-10B, FIGS. 11A-11F, FIGS. 12A-12D, and FIGS. 13A-13B.

Figure 6C:
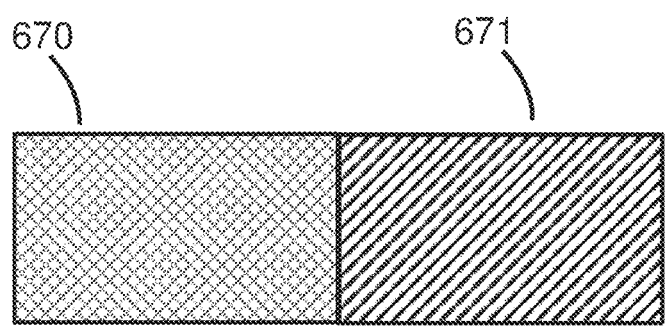
FIG. 6C is a conceptual diagram of elements of a vehicle way.

A zone includes an area encompassing an associated vehicle way. For example, shown in FIG. 6C is a conceptual diagram of elements of a vehicle way, including a bridge element 670 coupled to an employed element 671. For instance, bridge element 670 comprises an area for traversal of a vehicle for transitioning therefrom to employed element 671. Employed element 671 comprises an area in which the vehicle manoeuvres, such as for moving and/or parking. A vehicle way may have one or more of each of bridge elements and employed elements.

Shown in FIG. 6Bi-6Bvi are conceptual diagrams of some specific and non-limiting examples of zones encompassing the vehicle ways of FIG. 6Ai-6Avi.

For example, zone 611 encompasses circular traffic junction 602. Elements of circular traffic junction 602 include bridge elements 628 of road segments 606-609 and employed element 630 of circular road segment 604. A vehicle traverses one of bridge elements 628 to enter (i.e., transition into) employed element 630. Once inside employed element 630, the vehicle moves therethrough (i.e., maneuvers) and exits (i.e., transitions through) employed element 630 via a bridge element 628. In this example, circular traffic junction 602 comprises four bridge elements 628 and one employed element 630.

Zone 613 encompasses intersection 612. Elements of intersection 612 includes three bridge elements 632 for instance, road segments 614, 616, and 617 and one employed element 634 where road segments 614, 616 and 617 intersect.

Zone 615 encompasses traffic junction 618. Elements of traffic junction 618 includes two bridge elements 638 including off-ramp portion 622 and main road portion 620 and one employed element such as off-ramp portion 648.

Zone 640 encompasses parking lot 624. Elements of parking lot 624 includes a bridge element 642 of entry/exit 629 and an employed element 668 including parking area 626.

Zone 652 encompasses road portion 650. Elements of road portion 650 includes two bridge elements 654 of road portions 650 and an employed element 656 of road portion 650.

Zone 660 encompasses a bridge element 662 of on-street parking space 644 and an employed element 664 of on-street parking space 644.

In some instances, elements may include physical boundaries of a road surface such as a sidewalk, road shoulder, and lane divider, among others. In other instances, a vehicle way may not have any physical boundaries, such as a beaten path created by frequent flow of vehicles for accessing a natural attraction as described above.

One of ordinary skill in the art appreciates that the dimensions of a zone is selected to encompass and include elements of a vehicle way. A dimension that is too small and does not include the elements, or includes partial elements, of a vehicle way should be avoided. For example, referring to FIG. 6Bii, shown is zone 666 encompassing partial elements of intersection 612—only portions of bridge elements 632 and employed element 634. In this instance, as zone 666 encompasses an insufficient portion of intersection 612, only a portion of historical vehicle data associated therewith will be processed for defining a classifier. As such, the performance of the defined classifier may be poor.

Alternatively, a dimension that is too large should also be avoided. For instance, a zone should be large enough to encompass a vehicle way, however, not too large such that it includes extraneous areas. For example, a zone that is too large may result in unnecessary processing of extraneous historical vehicle data. Furthermore, dimensions of a zone may affect computing resources and processing time for defining and/or using a classification model. One of ordinary skill will appreciate that optimal zone dimensions will become apparent during definition of the classifier.

Continuing at block 702, each zone encompassing a vehicle way comprises a plurality of contiguous known areas, also referred to herein as subzones. Each subzone may have boundaries defined in accordance with a geographic coordinate system representing a unique two-dimensional space on the Earth's surface. For example, a zone may be partitioned by subdividing the zone into a grid of contiguous subzones bound by pairs of latitude and longitude lines. As such, the unique location of each subzone is known. Each subzone in the plurality of contiguous subzones within a zone shares a boundary with at least one other subzone. The plurality of contiguous subzones serves to facilitate organization of all points therein as each subzone comprises an aggregate of a portion of points within a zone. A point located within boundaries of a subzone may be uniquely associated therewith.

Optionally, a subzone may include a portion of a vehicle way overlapping another portion of a vehicle way. For instance, the subzone may represent a portion of an overpass that overlaps a portion of a roadway thereunder. Optionally, a subzone may include a portion of a vehicle way overlapped by another portion of a vehicle way. For instance, the subzone may represent a portion of a roadway that is overlapped by a portion of an overpass.

Figure 9:
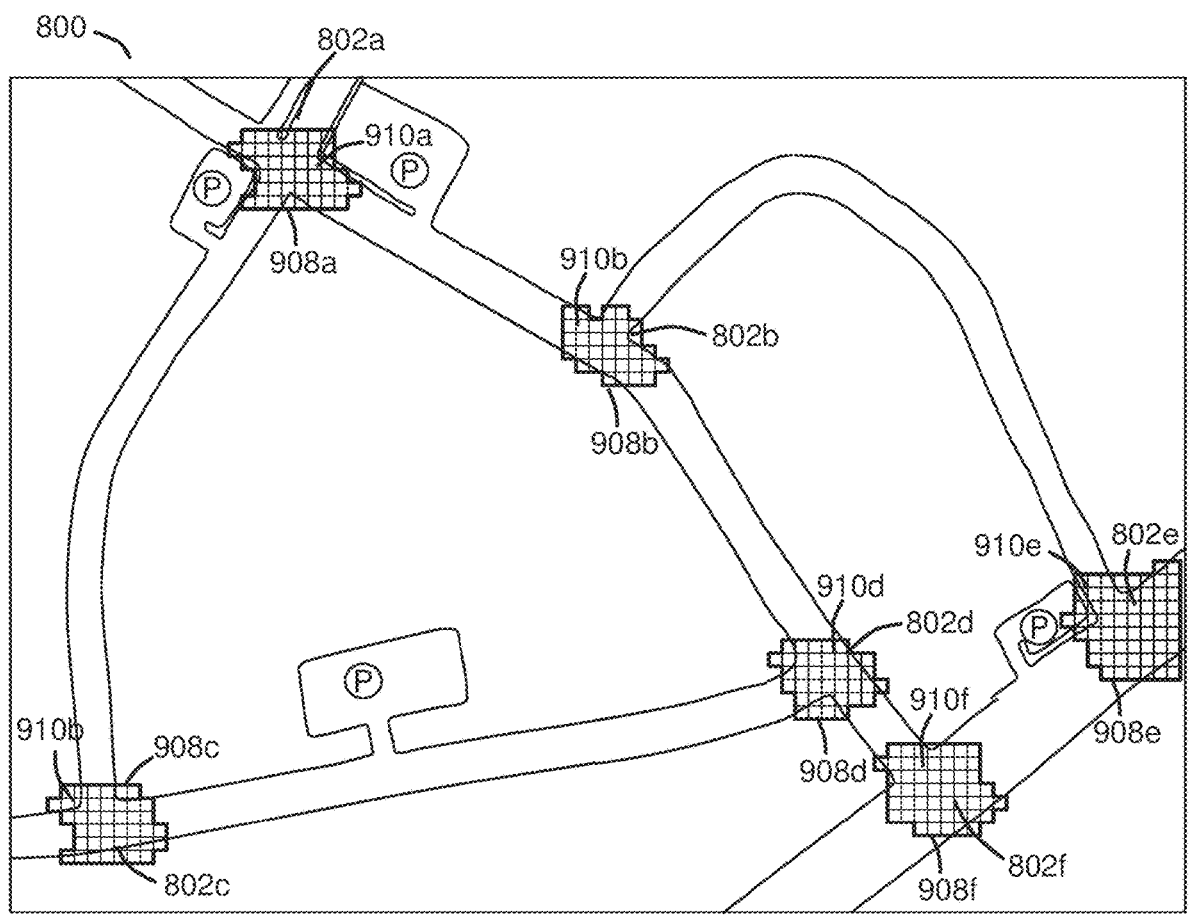
FIG. 9 is a simplified diagram of a plurality of exemplary zones imposed on the plurality of the sample intersections of FIG. 8.

In some exemplary implementations, zone dimensions may be determined according to the shape and size of an associated vehicle way. FIG. 9 is a simplified diagram of a plurality of exemplary zones 908a-908f defined for sample intersections 802a-802f, respectively. In this example, the dimensions of each zone are such that the elements of each associated vehicle way are encompassed thereby. As sample vehicle ways, e.g., sample intersections 802a-802f vary relatively in shape and size, so may respective zones 908a-908f.

Each of the plurality of zones 908a-908f is partitioned into a plurality of contiguous subzones 910a-910f. For instance, each of zones 908a-908f may be subdivided into a grid of contiguous subzones bound by pairs of latitude and longitude lines. As each of zones 908a-908f may be different in dimension, each thereof may comprise a different number of subzones 910a-910f, as shown. For example, zone 908b is smaller than zone 908f and accordingly, has fewer subzones 910b than the number of subzones 910f in zone 908f.

In some embodiments geographic coordinate data of a location (e.g., LAT/LONG) of a reference point proximate each of the sample vehicle ways is obtained by traffic analytics system 104a. A reference point indicates a general area in which a vehicle way may be located.

In an exemplary implementation, a user may view a georeferenced map of area 800 on a display and manually identify a reference point proximate sample intersection 802a. For instance, the georeferenced map may be accessed via a web page of an online map service, such as Google Maps. The user may choose reference point 803a on or near sample intersection 802a, as shown in FIG. 8. The location of reference point 803a may be obtained, by the user selecting reference point 803a on the georeferenced map with a pointer, causing text indicating geographic coordinates (e.g., LAT/LONG) thereof to appear on the display. Alternatively, a location of a reference point proximate a vehicle way may be obtained through use of a GPS enabled device or another geographic coordinate sensing device. One of ordinary skill in the art appreciates that there are various ways to obtain a location of a point. Point data indicative of the location of reference point 803a may be provided to traffic analytics system 104a, for example, via a user interface or data file accessed by traffic analytics system 104a. The reference point may be at or near the centre point of a zone.

In an exemplary implementation, a zone may be defined by subdividing a reference area into a grid of contiguous subzones according to a hierarchical geospatial indexing system, such as Geohash. Geohash is a known public domain hierarchical geospatial indexing system which uses a Z-order curve to hierarchically subdivide the latitude/longitude grid into progressively smaller cells of grid shape. Each cell is rectangular and represents an area bound by a unique pair of latitude and longitude lines corresponding to an alphanumeric string, known as a Geohash string and/or Geohash code.

Figures 11A, 11B:
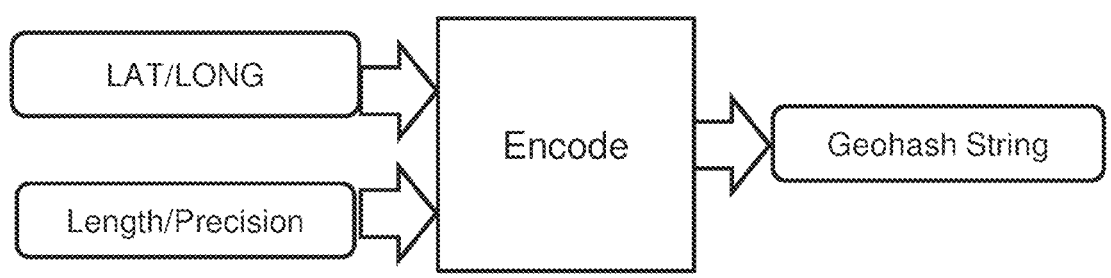
FIG. 11A is a table defining the relationship between Geohash string length and approximate Geohash cell dimensions.
FIG. 11B is a simplified functional block diagram of an exemplary Geohash encode function.

In a Geohash system the size of a cell depends on a user defined length of a string. The hierarchical structure of Geohash grids progressively refines spatial granularity as the length of string increases. For example, shown in FIG. 11A is table 1102 defining the relationship between string length and approximate cell dimensions. As string length increases, cell dimensions decrease, as shown. Cell size is also influenced by a cell's longitudinal location. Cell width reduces moving away from the equator (to 0 at the poles) due to the nature of longitudinal lines converging as they extend away therefrom. Table 1102 provides an approximation of Geohash cell dimensions located along the equator.

Some exemplary Geohash system functions will now be described below in reference to FIGS. 11B-11G. FIG. 11F is a simplified conceptual diagram of cell 1132, defined by latitude and longitude lines 1134 and 1136, respectively. Shown in FIG. 11B is a simplified functional block diagram of an exemplary Geohash encode function 1108, for mapping a point to a cell. For example, LAT/LONG coordinates, '42.620578, −5.620343,' of point 1130 of FIG. 11F and a user defined length=5 are input to encode function 1108 which maps point 1130 to cell 1132. Encode function 1108 outputs string 'ers42' corresponding to cell 1132 having dimensions 4.89 km×4.89 km. One of ordinary skill appreciates that encode function 1108 will map any point within cell 1132 to the same string, 'ers42.'

Figure 11C:
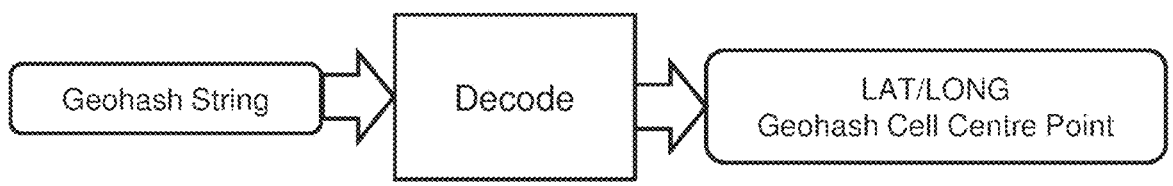
FIG. 11C is a simplified functional block diagram of an exemplary Geohash decode function.

FIG. 11C is a simplified functional block diagram of an exemplary Geohash decode function 1110 for resolving a string to the centre point of the corresponding cell. For example, string 'ers42' is input to decode function 1110 and decoded to cell 1132 centre point 1135 at LAT/LONG coordinates '42.60498047, −5.60302734.' In contrast to encode function 1108, decode function 1110 resolves an input string to LAT/LONG coordinates of one point only, specifically, the centre point of the corresponding cell.

Figure 11D:
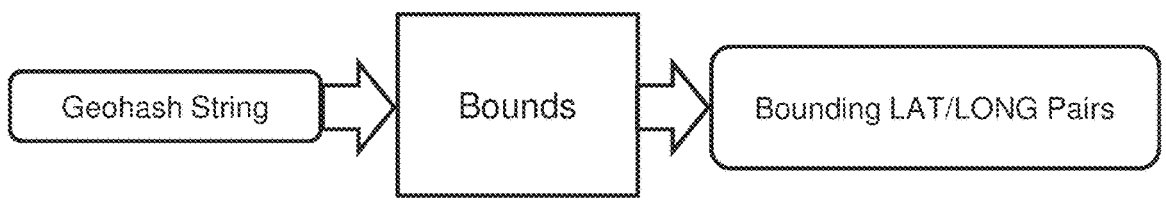
FIG. 11D is a simplified functional block diagram of an exemplary Geohash bounds function.

FIG. 11D is a simplified functional block diagram of an exemplary Geohash bounds function 1112 for resolving a string into ° N/° S, ° W/° E line pairs that bound the corresponding cell. For example, string 'ers42' is input to bounds function 1112 which outputs (42.626953125° N, 42.5830078125° N), (−5.5810546875° E, −5.625° E) line pairs bounding cell 1132, as shown in FIG. 11F.

Figure 11E:
FIG. 11E is a simplified functional block diagram of an exemplary Geohash neighbours function.
Figure 11F:
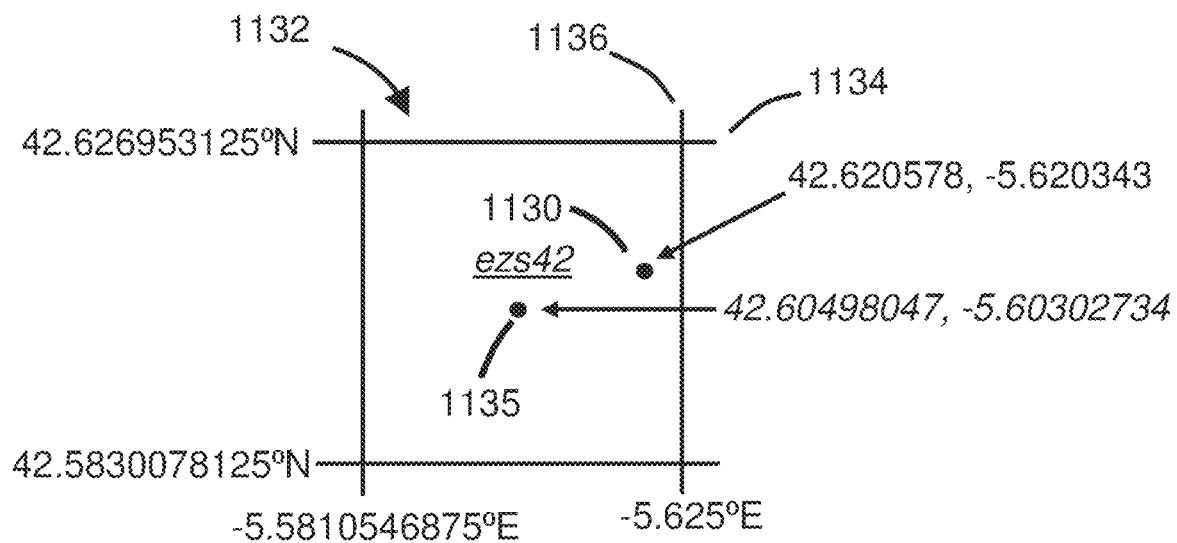
FIG. 11F is a simplified conceptual diagram of a Geohash cell.
Figure 11G:
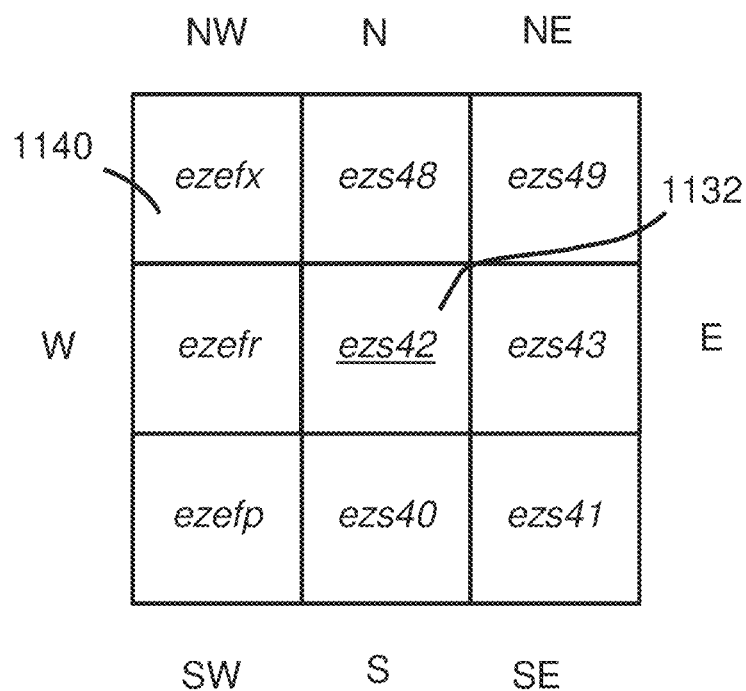
FIG. 11G is a conceptual diagram of a Geohash cell and 8 nearest neighbours of the Geohash cell.

FIG. 11E is a simplified functional block diagram of an exemplary Geohash neighbours function 1114 for determining the closest 8 neighbouring (e.g., adjacent) cells to a given cell. For example, string 'ers42' is input into neighbours function 1114 which outputs strings of the closest 8 neighbouring cells at relative positions NW, W, NE, W, E, SW, S, and SE to cell 1132. FIG. 11G is a simplified conceptual of cell 1132 and its 8 closest neighbouring cells 1140.

In an exemplary implementation, each of the plurality of zones 908a-908f of FIG. 9 is partitioned into a plurality of contiguous subzones 910a-910f, respectively, in the form of Geohash cells. As mentioned above, sample vehicle ways may be selected from various locations and thus may be located at different longitudes. As such, dimensions of Geohash cells across a plurality of zones may differ at different longitudes.

Figure 10A:
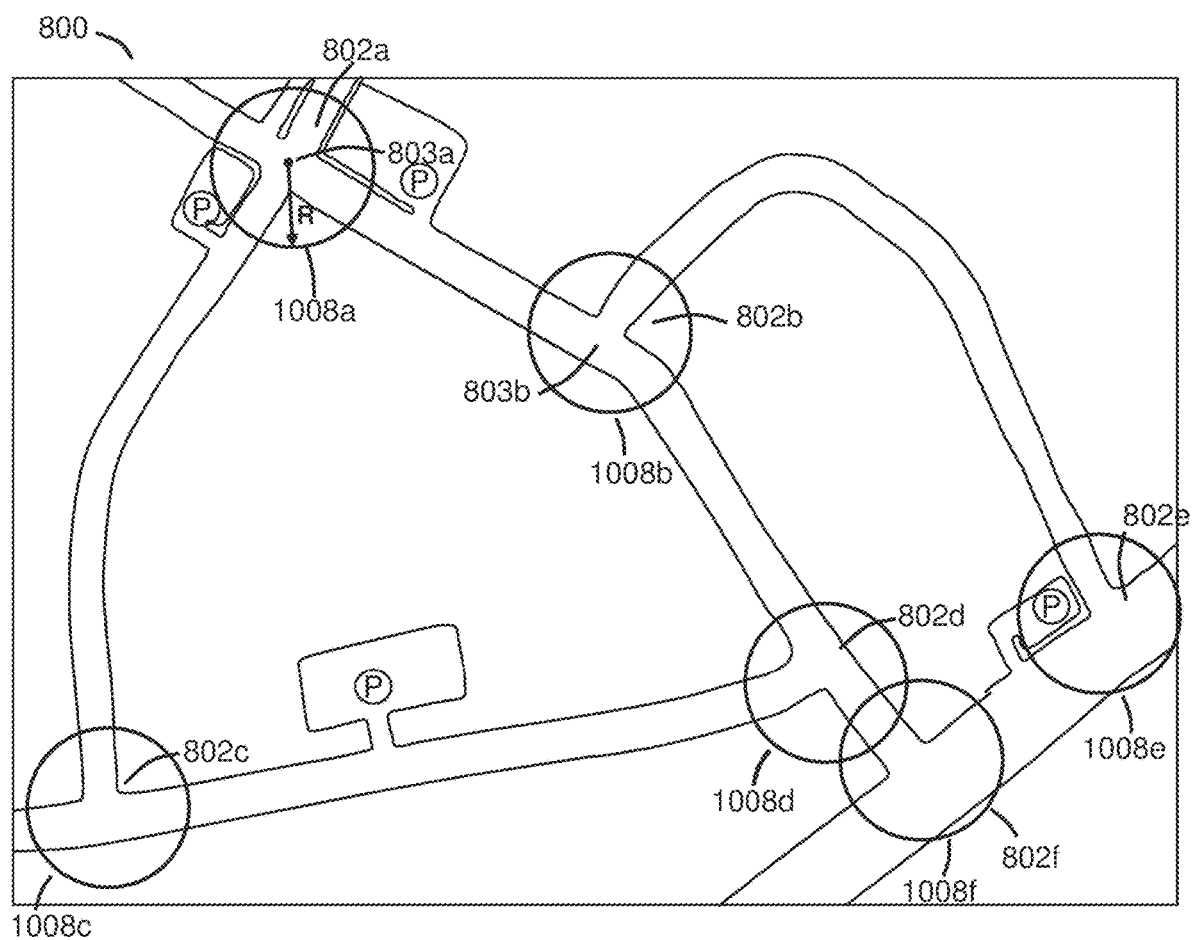
FIG. 10A is a simplified diagram of a plurality of exemplary reference areas of a same dimension defined for the sample intersections FIG. 8.

In some exemplary implementations, zone dimensions may be dependent on dimensions that are likely to encompass most vehicle ways to be defined using a classifier. For example, shown in FIG. 10A, is a simplified diagram of a plurality of reference areas 1008a-1008f of a same dimension defined for sample intersections 802a-802f, respectively. Dimensions of reference areas 1008a-1008f are approximated to encompass most intersections within an intersection population that may be defined by a classifier. In this example, reference areas 1008a-1008f are circular in shape having a radius R. In some instances, a reference area may be defined relative to the location of the reference point of the vehicle way. For instance, reference areas 1008a-1008f are centred about reference points 803a-803f of sample intersections 802a-802f. Accordingly, reference areas 1008a-1008f are defined by radius R extending from the reference points 803a-803f respectively.

In an exemplary implementation, the inventor determined a reference area defined radially 25 m from the reference point encompasses most intersections within an intersection population of interest whilst avoiding extraneous areas.

As noted above, for a plurality of different types and/or subtypes of vehicle ways a plurality of classifiers may be defined. As such, optimal zone dimensions may vary according to the classifier. One of ordinary skill will appreciate that an optimal zone dimensions will become apparent during definition of the classifier.

Figure 10B:
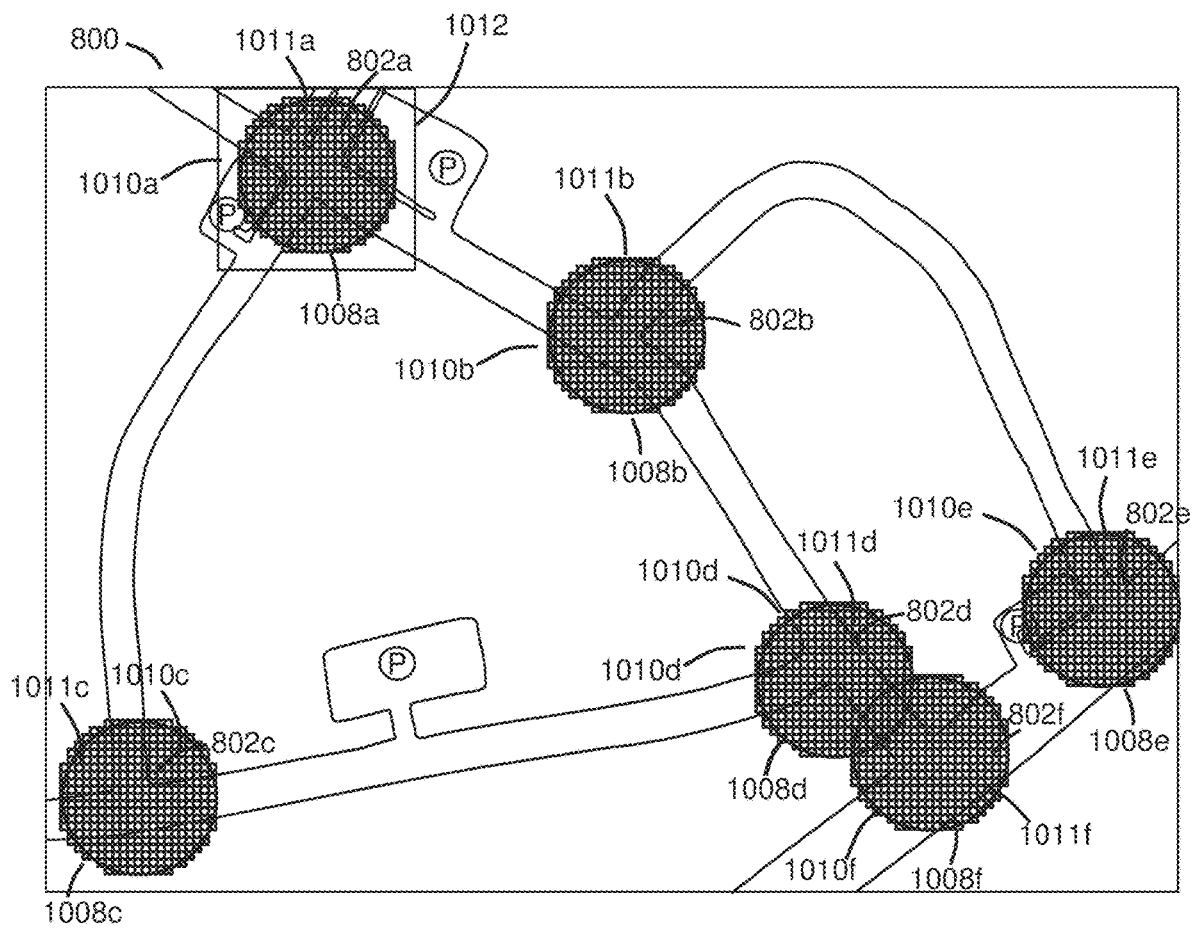
FIG. 10B is a simplified conceptual diagram of a plurality of exemplary zones imposed on sample vehicle ways.
Figure 12A:
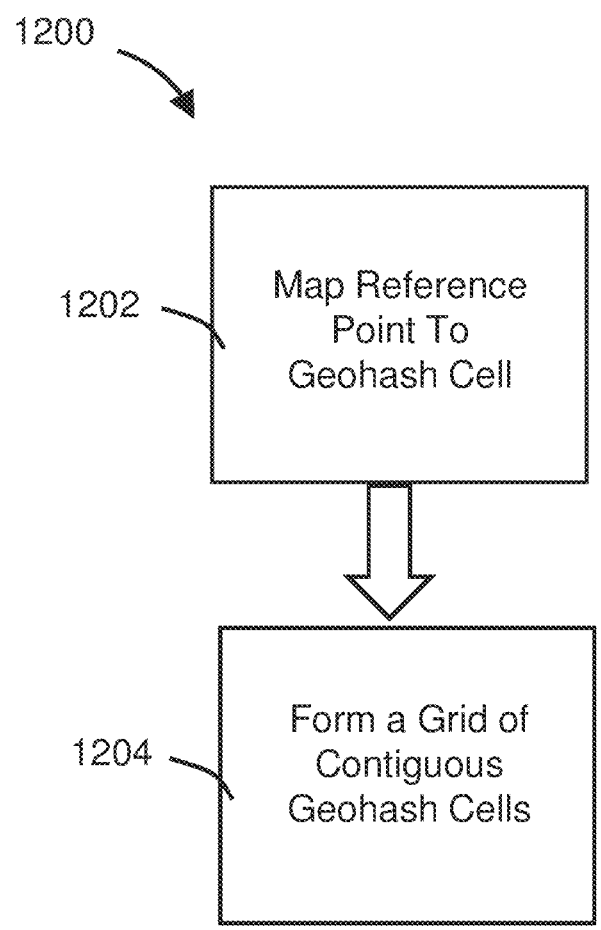
FIG. 12A is a flow diagram of an exemplary process for subdividing a reference area into a grid of Geohash cells.

FIG. 10B is a simplified conceptual diagram of a plurality of exemplary zones 1010a-1010f imposed on sample intersections 802a-802f, each comprising a plurality of contiguous subzones 1011a-1011f. In this example, reference areas 1008a-1008f of FIG. 10A are partitioned into a plurality of contiguous subzones in the form of Geohash cells. FIG. 12A is a flow diagram of one exemplary process 1200 for subdividing a reference area into a grid of Geohash cells.

Subdividing a reference area into a grid of Geohash cells, process 1200 begins at block 1202 wherein a reference point of a sample vehicle way is mapped to a Geohash cell. For example, LAT/LONG coordinates of reference point 803a is input into encode function 1108 and the corresponding Geohash string is output thereby. Shown in FIG. 12B is a simplified diagram of reference area 1008a, including reference point 803a and cell 1240, the Geohash cell to which reference point 803a was mapped. Geohash cell 1240 serves as a centre cell from which a grid of contiguous Geohash cells for subdividing reference area 1008a is formed.

Next at block 1204, a plurality of Geohash neighbours of the centre cell is determined. For instance, the Geohash string of the Geohash cell 1240 is input to Geohash neighbours function 1114, and corresponding strings of neighbour cells 1242 of Geohash cell 1240 are output. FIG. 12C is a simplified conceptual diagram of Geohash cell 1240 and its 8 closest neighbour cells 1242. Block 1204 repeats a similar step of determining neighbouring cells of neighbouring cells until reference area 1008a is completely subdivided into a grid of contiguous Geohash cells, as shown in FIG. 12D. Block 1204 may utilize Geohash bounds function 1112 to determine when to stop process 1200. For example, coordinates for the boundary of reference area 1008 may be input into bounds function 1112 to determine which Geohash cells in the grid include the boundary. Once the entire boundary is within a Geohash, process 1200 may stop. One of ordinary skill appreciates that there are other methods to manipulate or divide space using a Geohash system.

Once reference areas are partitioned into a plurality of contiguous subzones, the associated zone may be defined by peripheral edges of the plurality of contiguous subzones. For instance, once reference areas 1008a-1008f are defined, they are partitioned into a plurality of contiguous subzones 1011a-1011f and the peripheral edges 1248 of each thereof define zones 1010a-1010f.

In general, subzones are not limited to a particular dimension, size or shape. However, these attributes may affect processing time and resources for defining and/or using a classification model. For instance, higher precision subzones will increase the number of subzones for processing in comparison to lower precision subzones for a given zone.

Embodiments described herein are not limited to partitioning a zone with Geohashes. For example, a zone may be partitioned according to another hierarchical geospatial indexing system, e.g., H3—Uber's Hexagonal Hierarchical Spatial Index, S2—Google's S2 geographic spatial indexing system, or other system. Alternatively, a zone may be partitioned according to another method for subdividing geographical space.

One of ordinary skill in the art will appreciate that a zone may be defined in multiple ways. For instance, a plurality of contiguous subzones may be defined by creating a zone of a shape unique to a corresponding sample vehicle way, as shown in FIG. 9. In another instance, a reference area may be partitioned into a plurality of contiguous subzones to create a zone, as shown in FIG. 10B. The methods for defining a zone described herein are examples only and are not intended to limit embodiments.

According to some embodiments, for each of the plurality of zones, first subzone data may be formed. For each subzone, first subzone data may comprise information indicating a unique identifier and location (e.g., geographic coordinates of boundaries) of the subzone. First subzone data may also comprise information indicating the closest neighbours of the subzone and/or other subzone related information.

FIG. 13A is a simplified conceptual diagram of exemplary first subzone data 1302 formed for zone 1010a. In this example, first subzone data 1302 comprises Geohash string data which serves as a unique identifier of each subzone. As described above, the location of a Geohash cell (i.e. subzone) may be determined from a Geohash string, such as by inputting a Geohash string into Geohash system function 1112.

Alternatively, first subzone data may comprise unique ID data which serves as a unique identifier of each subzone and boundary coordinates of boundaries thereof, such as LAT/LONG pairs. For example, FIG. 13B is a simplified conceptual diagram of first subzone data 1304 formed for zone 1010a comprising Geohash string data which serves as a unique identifier of each subzone and LAT/LONG pairs defining boundaries of each Geohash.

Optionally, first subzone data may include information indicative of a Geohash cell's 8 closest neighbours.

In some instances, two or more of a plurality of zones may overlap, for example, zones 1010d and 1010f of FIG. 10B. However, in such instances, a subzone within more than one zone may skew training and/or output of a classification model. For example, vehicle data associated with subzones within multiple zones may be overrepresented in training and result in a biased classifier.

Block 704

Next, at block 704, a subzone common to multiple zones may be associated with a unique zone and then each of the multiple zones is redefined to include a new unique plurality of subzones. For example, first subzone data of the multiple zones are modified in accordance with the redefinition thereof. Block 704 will be described in further detail below with reference to FIGS. 14A-14C, FIGS. 15A-15B, and FIGS. 16A-16B.

In an exemplary implementation, the distance between the common subzone and each of the centre subzones of the multiple zones is calculated. The common subzone is uniquely associated with the zone having a centre subzone that is the shortest distance thereto.

Figure 14A:
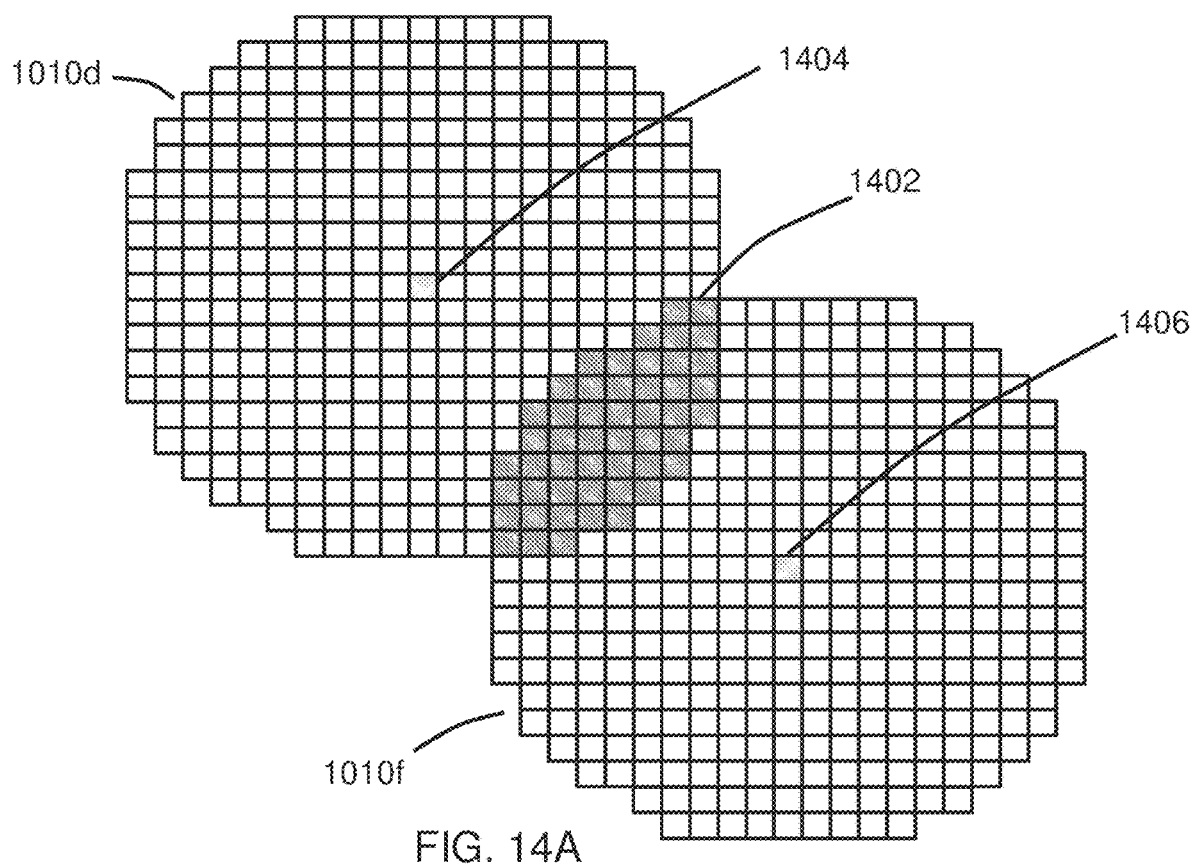
FIG. 14A is a simplified conceptual diagram of two zones comprising centre subzones and a plurality of common subzones located within an overlapping portion thereof.
Figure 14B:
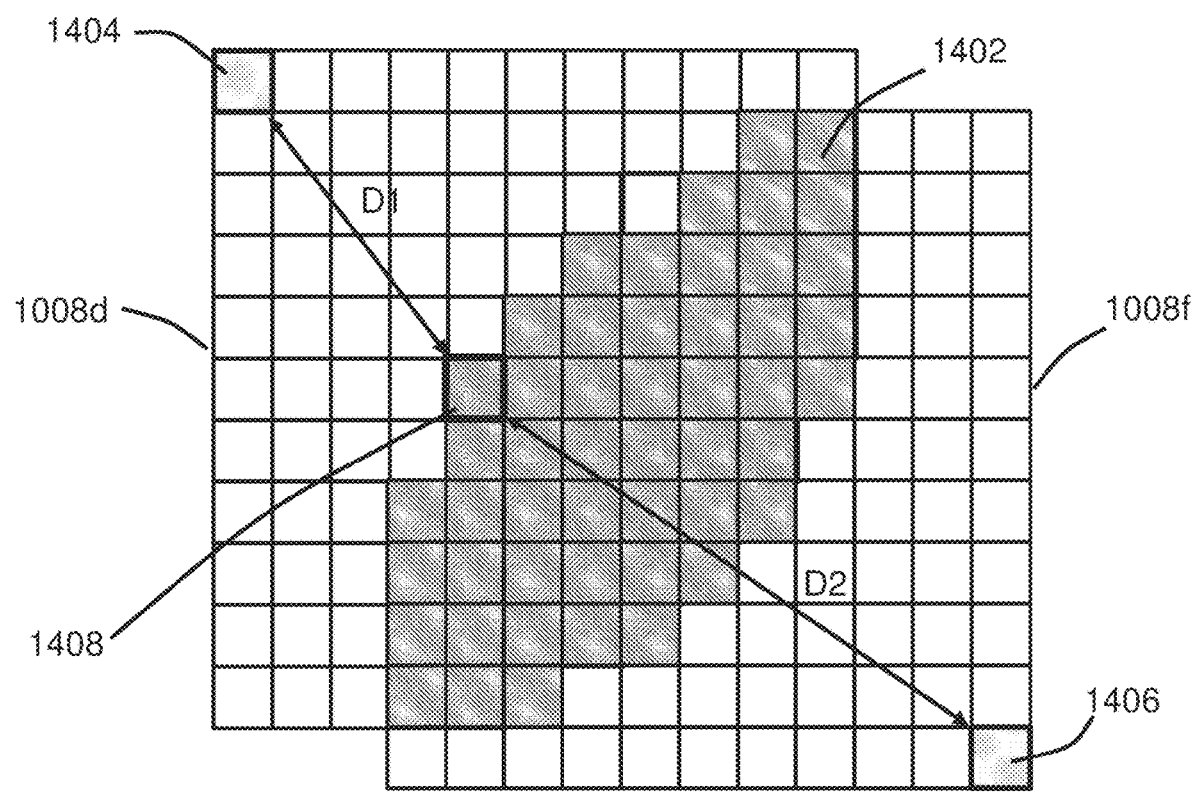
FIG. 14B is an enlarged view of a portion of zones comprising an overlapping portion.
Figure 14C:
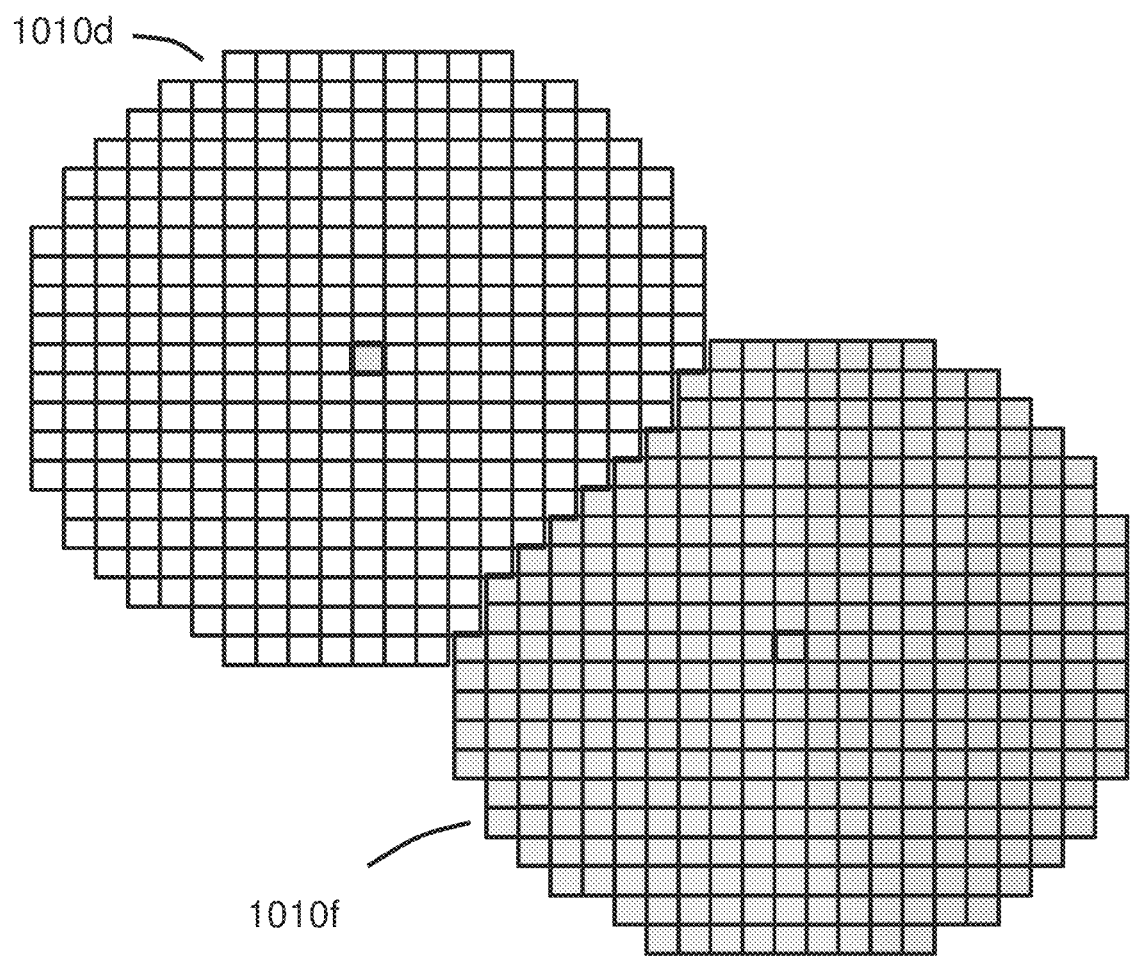
FIG. 14C is a simplified conceptual diagram of redefined zones.

For example, shown in FIG. 14A, is a simplified conceptual diagram of zones 1010d and 1010f comprising centre subzones 1404 and 1406 respectively, and a plurality of common subzones located within overlapping portion 1402 thereof. FIG. 14B is an enlarged view of a portion of zones 1010d and 1010f comprising overlapping portion 1402 that includes common subzone 1408. Distance D1 between common subzone 1408 and centre subzone 1404 of zone 1010d is shorter than distance D2 between common subzone 1408 and centre subzone 1406 of zone 1010f, as shown. As such, common subzone 1408 is uniquely associated with zone 1010d and zone 1010f is redefined to not include common subzone 1408. Each subzone within portion 1402 is analyzed and then uniquely associated with one of zones 1010*d* and 1010*f* followed by the redefinition thereof. FIG. 14C is a simplified conceptual diagram of redefined zones 1010*d* and 1010*f*.

Figure 15A:
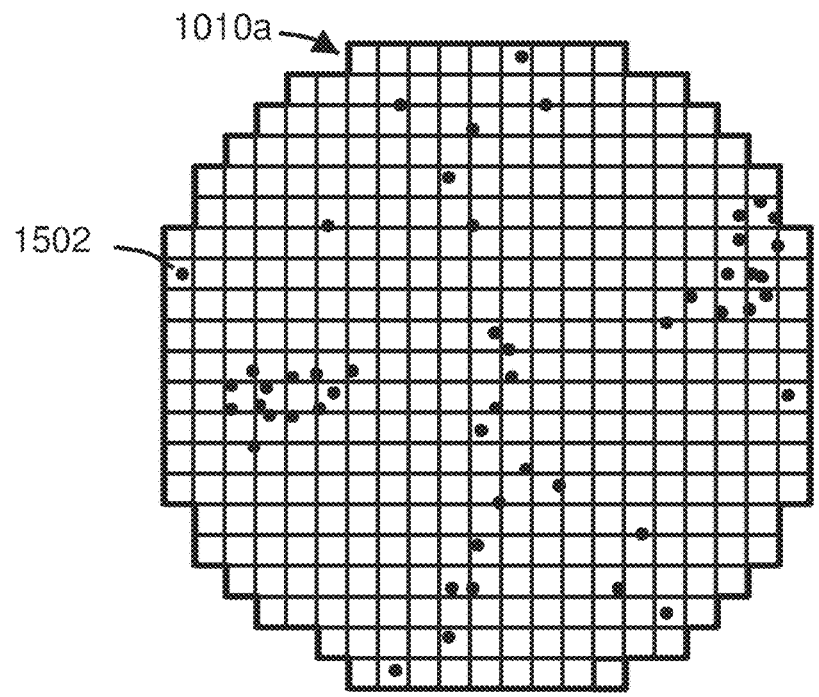
FIG. 15A is a simplified conceptual diagram of a zone comprising vehicle-position data points representing positions of vehicles therein.
Figure 15B:
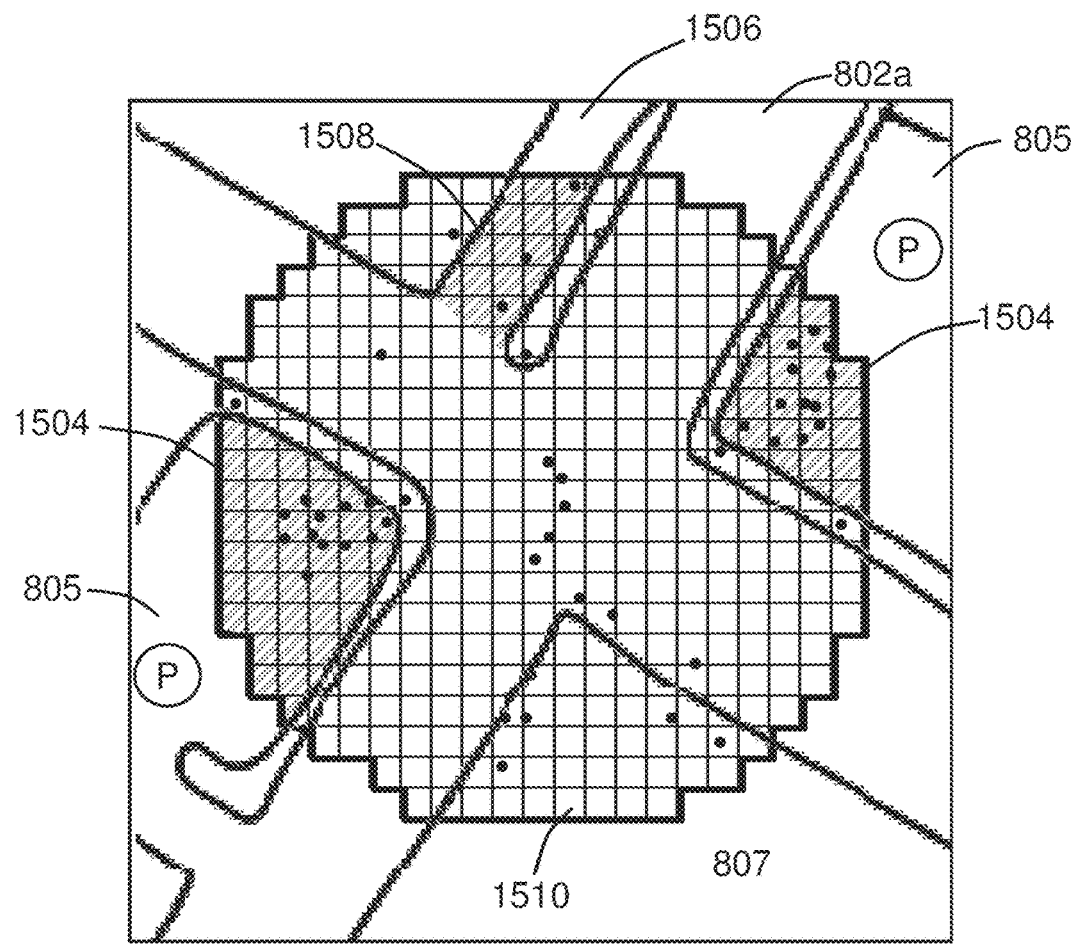
FIG. 15B is an enlarged view of a portion of an area and the simplified conceptual diagram of FIG. 15A imposed thereon.

FIG. 15A is a simplified conceptual diagram of zone 1010*a* comprising vehicle-position data points 1502 representing positions of vehicles indicated by raw vehicle data. Now referring to FIG. 15B, shown is an enlarged view of portion 1012 of area 800 imposed on the diagram of FIG. 15A. Vehicle-position data points 1502 are present within sample intersection 802*a*, areas 1504 in parking lots 805, portion 1508 of side street 1506, as well as in portions 1510 of non-traffic designated areas 807 (e.g., greenspace, sidewalks, as shown. Vehicle-position data points found in portions 1510 may be due to GPS error or other position sensing technology error. As described above, a classifier for identifying subzones as portions of a vehicle way will be defined based on raw vehicle data associated with the subzones and corresponding zone. FIG. 15B illustrates how vehicle traffic may be dispersed in a zone in practise. However, a classifier may be used to identify only those subzones that are occupied by the vehicle way based on raw vehicle data associated with the entire zone.

Figure 16A:
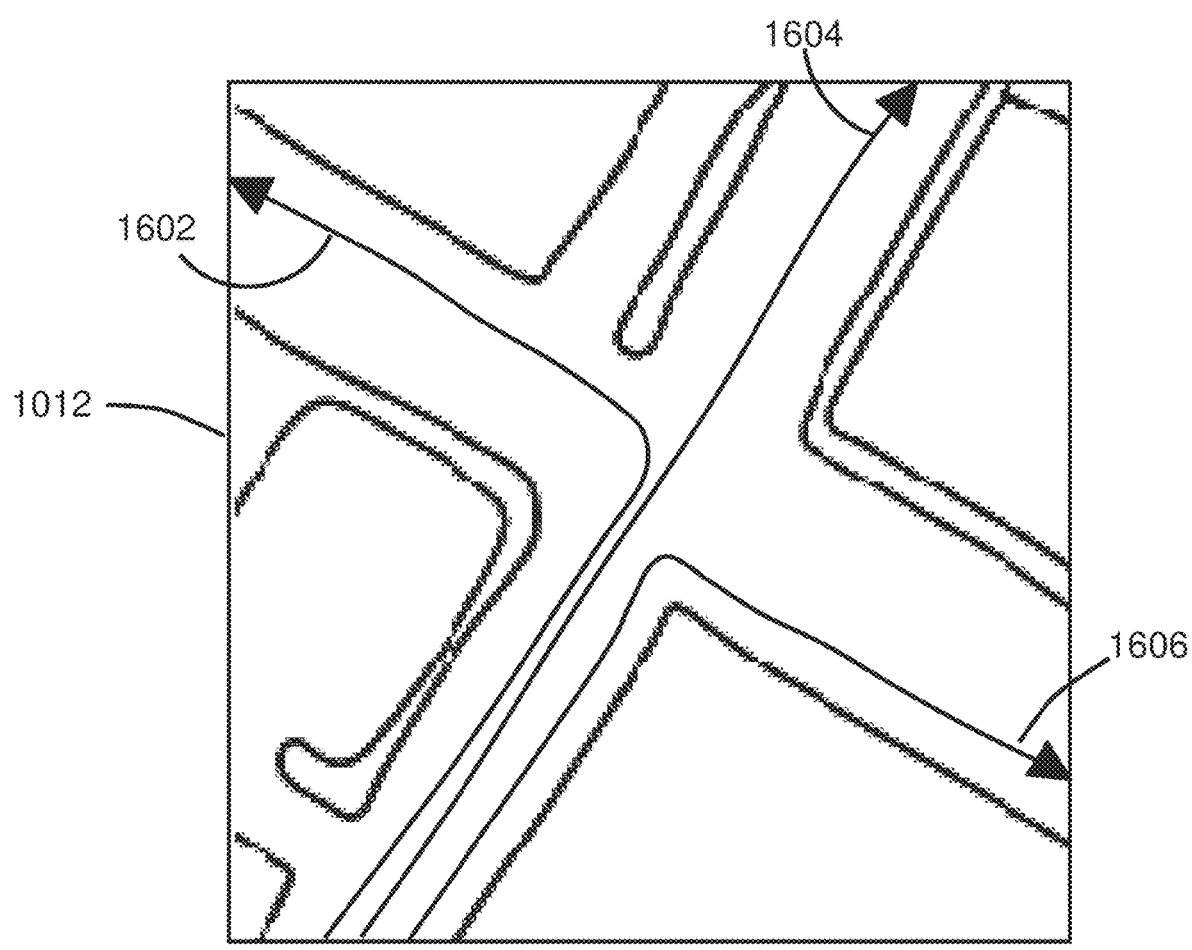
FIG. 16A an enlarged view of a portion of an area comprising a sample intersection and paths of vehicles that have traversed therethrough.

FIG. 16A shows an enlarged view of portion 1012 of area 800 comprising sample intersection 802*a* and paths 1602, 1604 and 1606 of one or more vehicles that have traversed therethrough. A same vehicle may have traversed sample intersection 802*a* at three different time intervals. Alternatively, three unique vehicles may have traversed sample intersection 802*a*. Paths 1602, 1604 and 1606 may have been traversed by any combination of one or more vehicles.

Figure 16B:
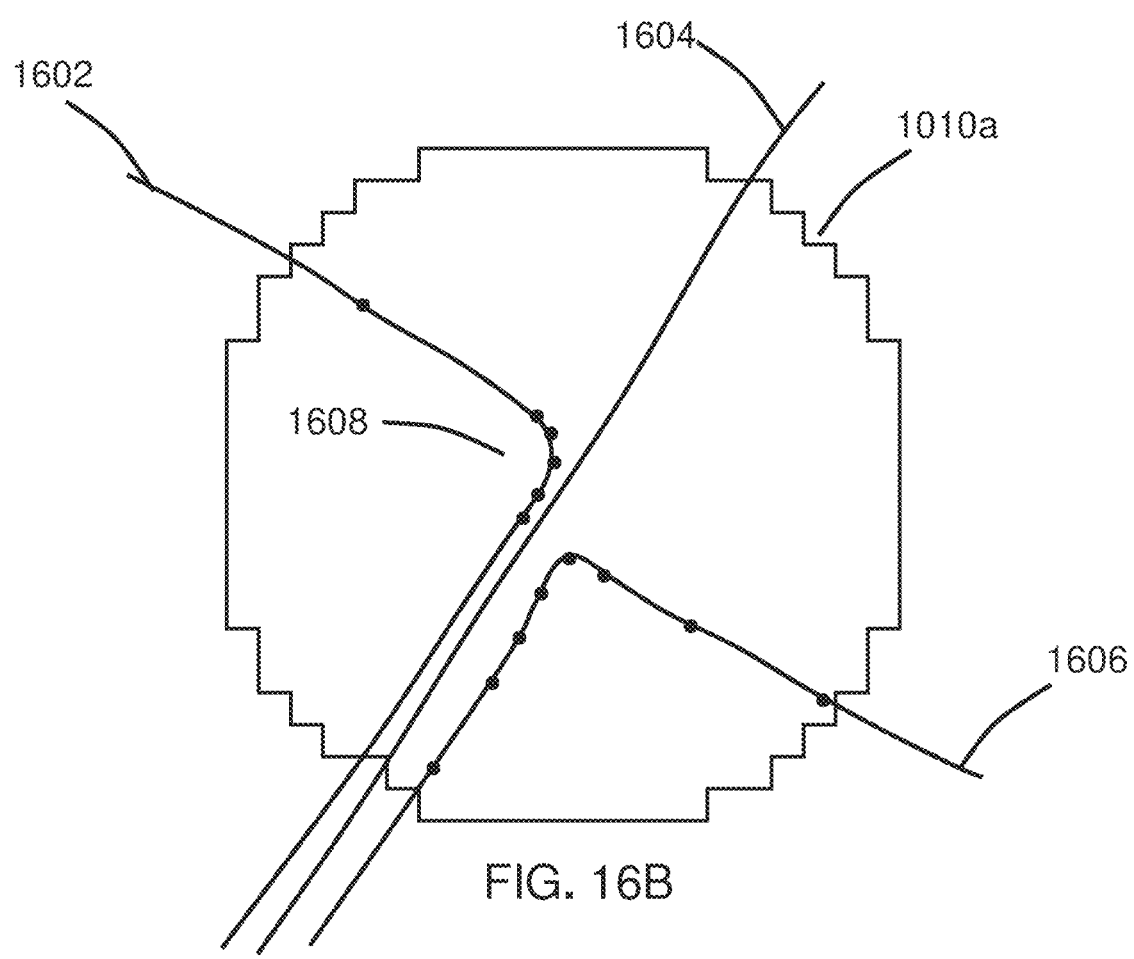
FIG. 16B is a conceptual diagram of a zone and vehicle position-data points representing position data of raw vehicle data instances that correspond to a position along vehicle paths.

Now referring to FIG. 16B, shown is a conceptual diagram of zone 1010*a* and vehicle position-data points 1608 representing position data of raw vehicle data instances that correspond to a position along paths 1602, 1604 and 1606. As shown in FIG. 16B, no vehicle-position data points correspond to path 1606. Data collected by a monitoring device when inside a zone may depend on various factors, such as, the frequency a monitoring device collects operation information, the size of the zone, or other predefined criteria for collecting data, among others. As a result, there may be instances when a monitoring device collects little-to-no data when traversing a zone. Accordingly, there may be occasions when selecting raw vehicle data based on vehicle position data indicating a position within a zone may not provide enough meaningful information that relates to all vehicles that have entered the zone. It would be advantageous to maximize information available in historical vehicle data related to vehicles that have entered a zone.

Block 706

Next, at block 706, a subset of raw vehicle data associated with each of the plurality of zones is selected from historical vehicle data. In an exemplary implementation, traffic analytics system 104*a* may access historical vehicle data, such as historical vehicle data in database 209, for selecting the subset stored by traffic analytics system 104*a* via communication network 110.

Figure 16C:
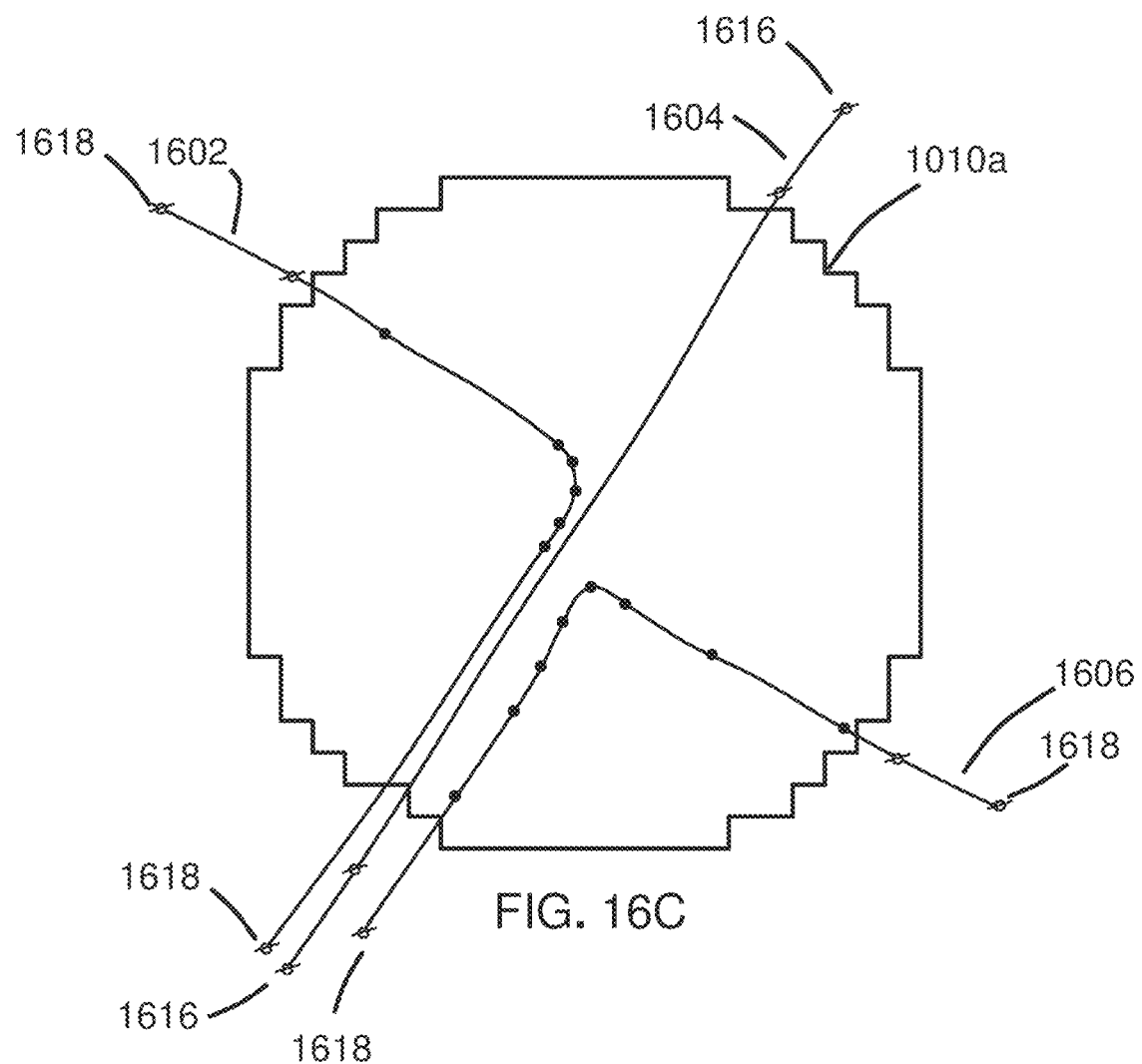
FIG. 16C illustrates vehicle position-data points corresponding to positions of vehicles man area.

According to an embodiment, the subset of raw vehicle data may be selected based on positions inside a zone. Optionally, the subset of raw vehicle data may be selected based on positions inside and outside the zone. FIG. 16C illustrates vehicle position-data points corresponding to positions within portion 1012 of area 800. Including raw vehicle data corresponding to positions both inside and outside zone 1010*a* in the subset enables inclusion of raw vehicle data corresponding to the positions on path 1604, represented by vehicle-position data points 1616. This also enables inclusion of more raw vehicle instances corresponding to paths 1602 and 1606, represented by vehicle-position data points 1618.

Block 708

Figure 16D:
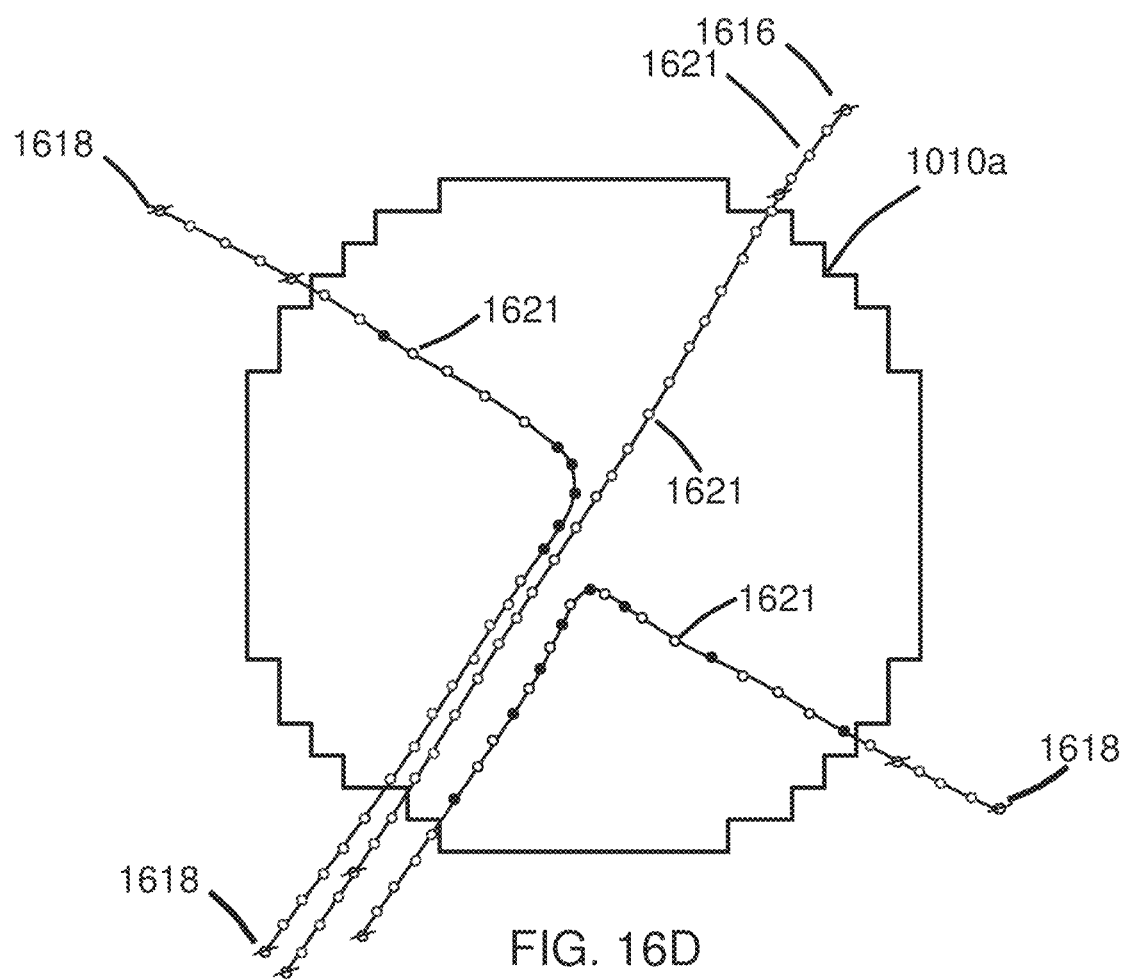
FIG. 16D illustrates vehicle-position data points corresponding to interpolated data instances.

Next, in block 708 interpolating data instances from the subset of raw vehicle data may be performed. For example, FIG. 16D illustrates vehicle-position data points 1621 corresponding to interpolated data instances. Selecting raw vehicle data corresponding to locations inside and outside a zone, at block 706, and then interpolating data therefrom at block 708, may provide more meaningful data for the purpose of training a machine learning algorithm in comparison to training based on raw vehicle data instances corresponding to locations inside a zone only. Block 708 is described further below with reference to FIGS. 16E-16F, FIG. 17, and FIGS. 18A-18B.

Figure 16E:
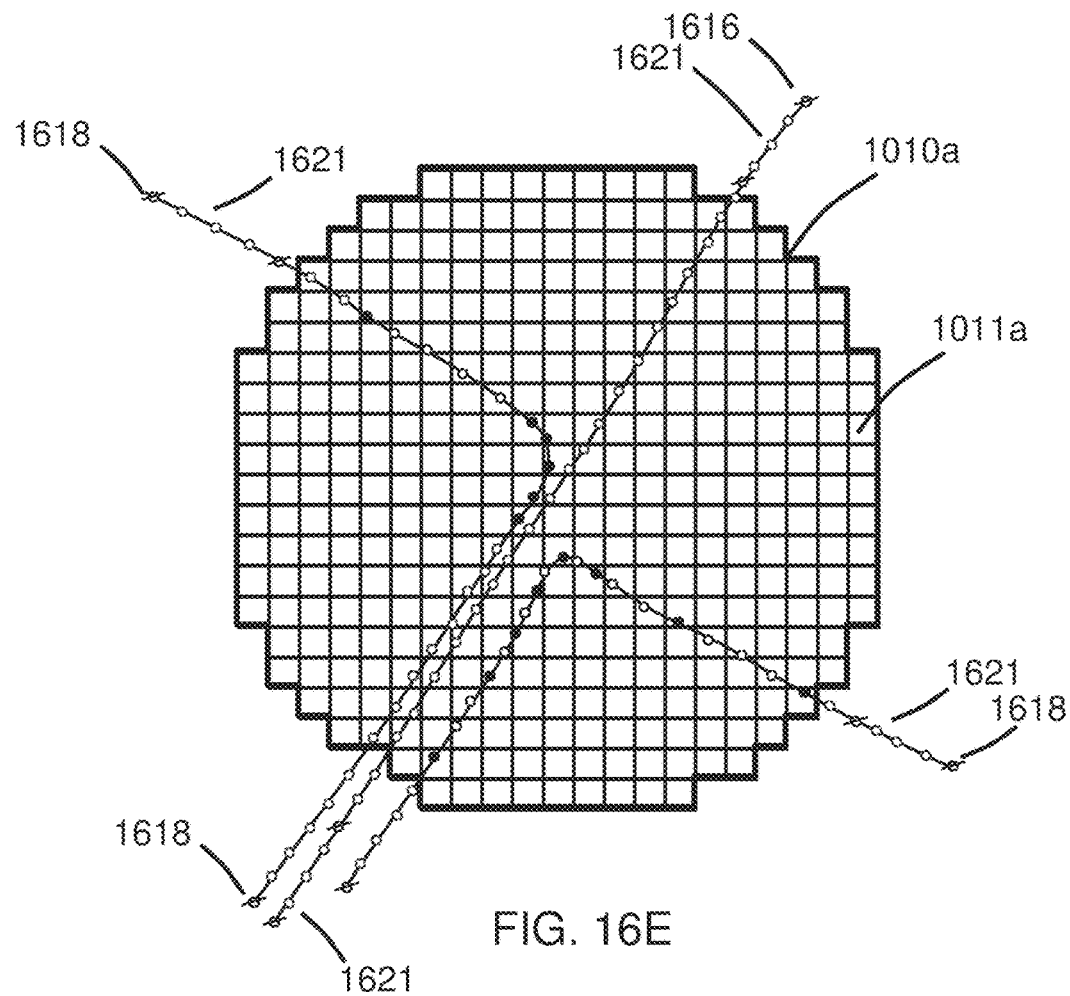
FIG. 16E is a conceptual diagram of a zone comprising a plurality of subzones illustrating vehicle-position data points corresponding to raw vehicle data and interpolated vehicle data.

Optionally, data instances are interpolated in dependence on the dimensions of subzones of a zone. For example, interpolating data such that there is one of an interpolated instance or raw vehicle data instance corresponding to a position in each subzone along a given path of a vehicle. Referring to FIG. 16E, shown is a conceptual diagram of zone 1010*a* comprising plurality of subzones 1011*a* of less than or equal to 4.77 m×4.77 m. In this example, data instances are interpolated such that there is at least one of an interpolated instance or raw vehicle data instance corresponding to a location in each subzone.

Figure 16F:
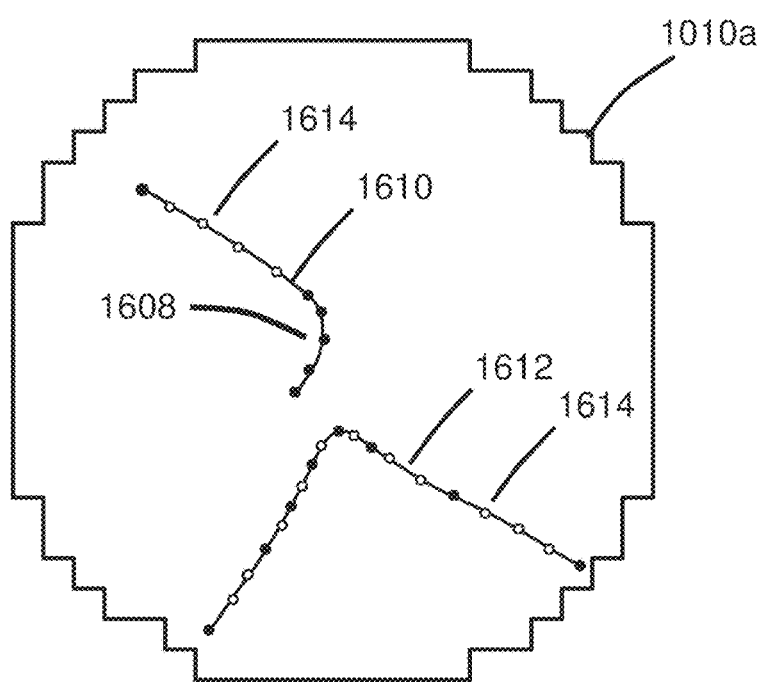
FIG. 16F illustrates vehicle-position data points inside a zone corresponding to interpolated data.

Alternatively, data may be interpolated from raw vehicle data corresponding to positions only inside a zone. Such as interpolated data instances corresponding to vehicle-position data points 1614, along portions 1610 and 1612 of paths 1602 and 1606, as shown in FIG. 16F.

Alternatively, there may be a sufficient amount of meaningful raw vehicle data corresponding to locations inside a zone that selecting raw vehicle data corresponding to locations outside a zone is unnecessary. Alternatively, there may be a sufficient amount of meaningful raw vehicle data in historical vehicle data that interpolation is unnecessary.

Figure 17:
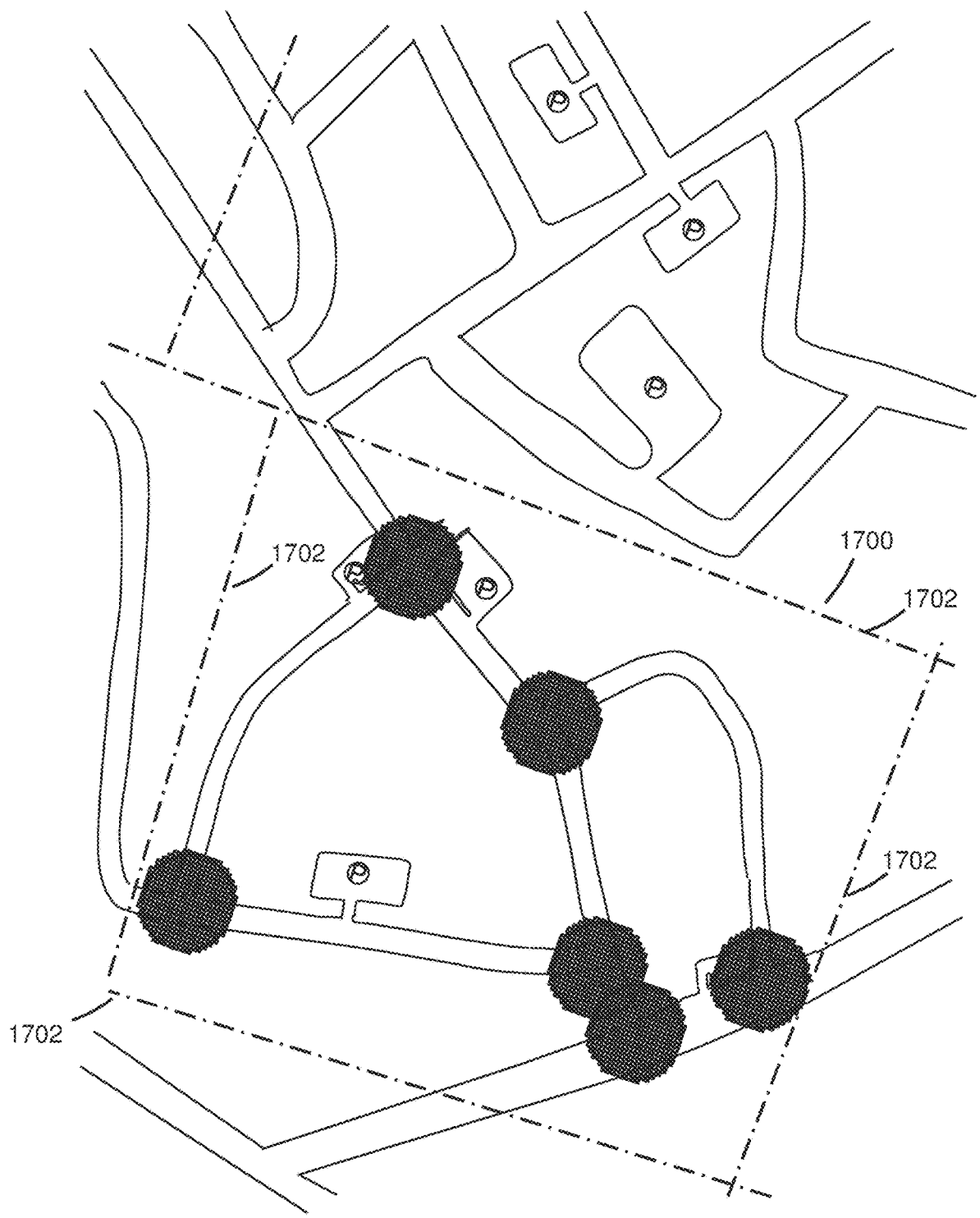
FIG. 17 is a simplified diagram of an exemplary implementation of a traffic zone encompassmg zones.

According to some embodiments, the subset of raw vehicle data associated with a zone comprises raw vehicle data corresponding to positions within a traffic zone. In some instances, a traffic zone may encompass a unique zone. In other instances, a traffic zone may encompass more than one zone. FIG. 17 is a simplified diagram of an exemplary implementation of traffic zone 1700 encompassing zones 1010*a*-1010*f*. For instance, geographic coordinates of boundaries 1702 of traffic zone 1700 are provided to traffic analytics system 104*a* for defining traffic zone 1700.

Figure 18A:
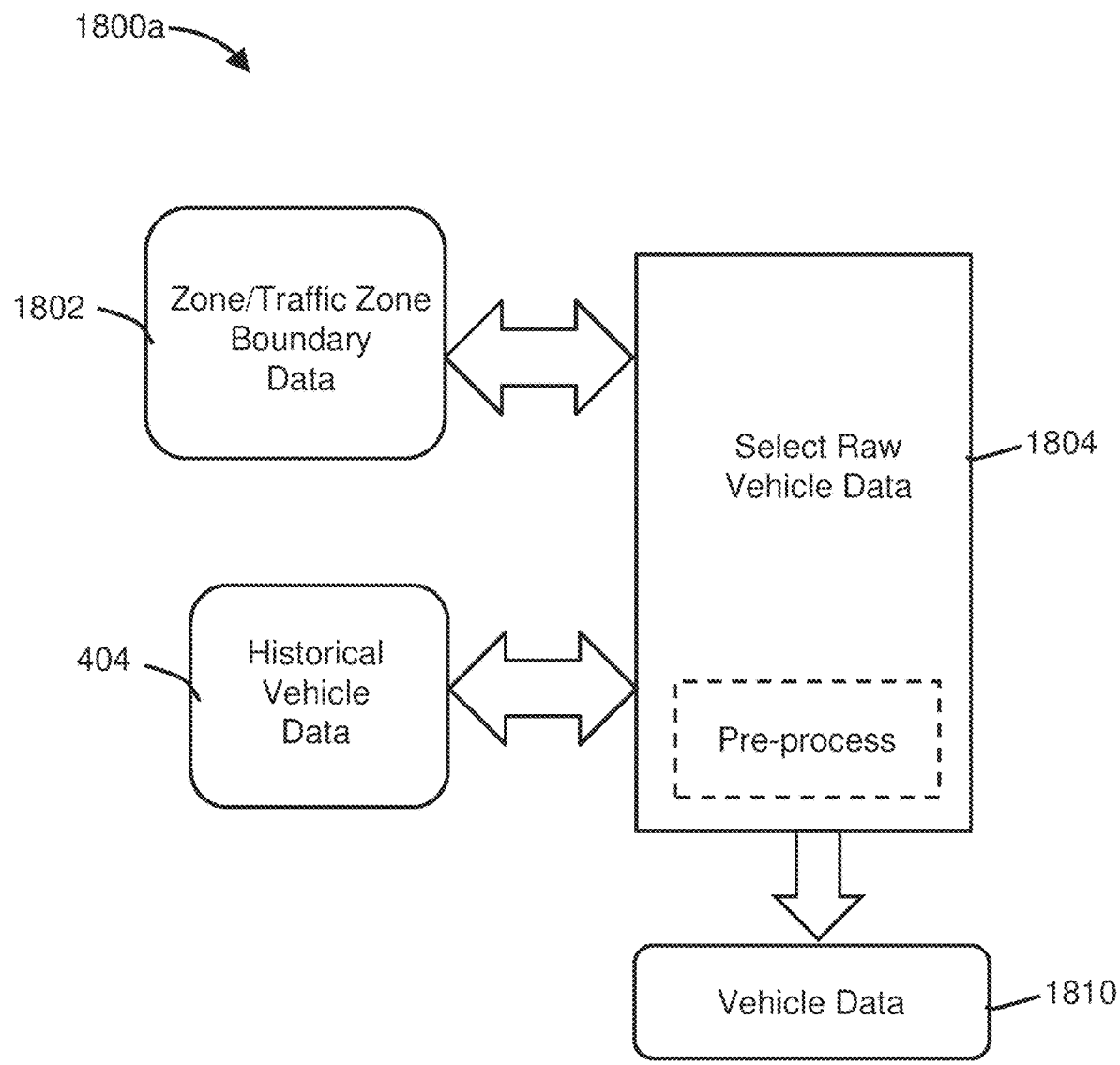
FIG. 18A is a simplified block diagram of a process for obtaining vehicle data for generating features.

FIG. 18A is a simplified block diagram of process 1800*a* for obtaining data, hereinafter referred to as vehicle data, for generating features. Vehicle data may be indicative of vehicle operating conditions for a plurality of corresponding vehicles. As mentioned above, such data may be a subset of raw vehicle data selected from historical vehicle data 404 that corresponds to a location within a zone and/or traffic zone. For example, boundary data 1802 comprises zone boundary data and/or traffic zone data indicative of locations of boundaries of a zone and/or a traffic zone, respectively. In block 1804, raw vehicle data is selected from historical vehicle data 404 based on boundary data 1802 to form first vehicle data 1810.

Figure 18B:
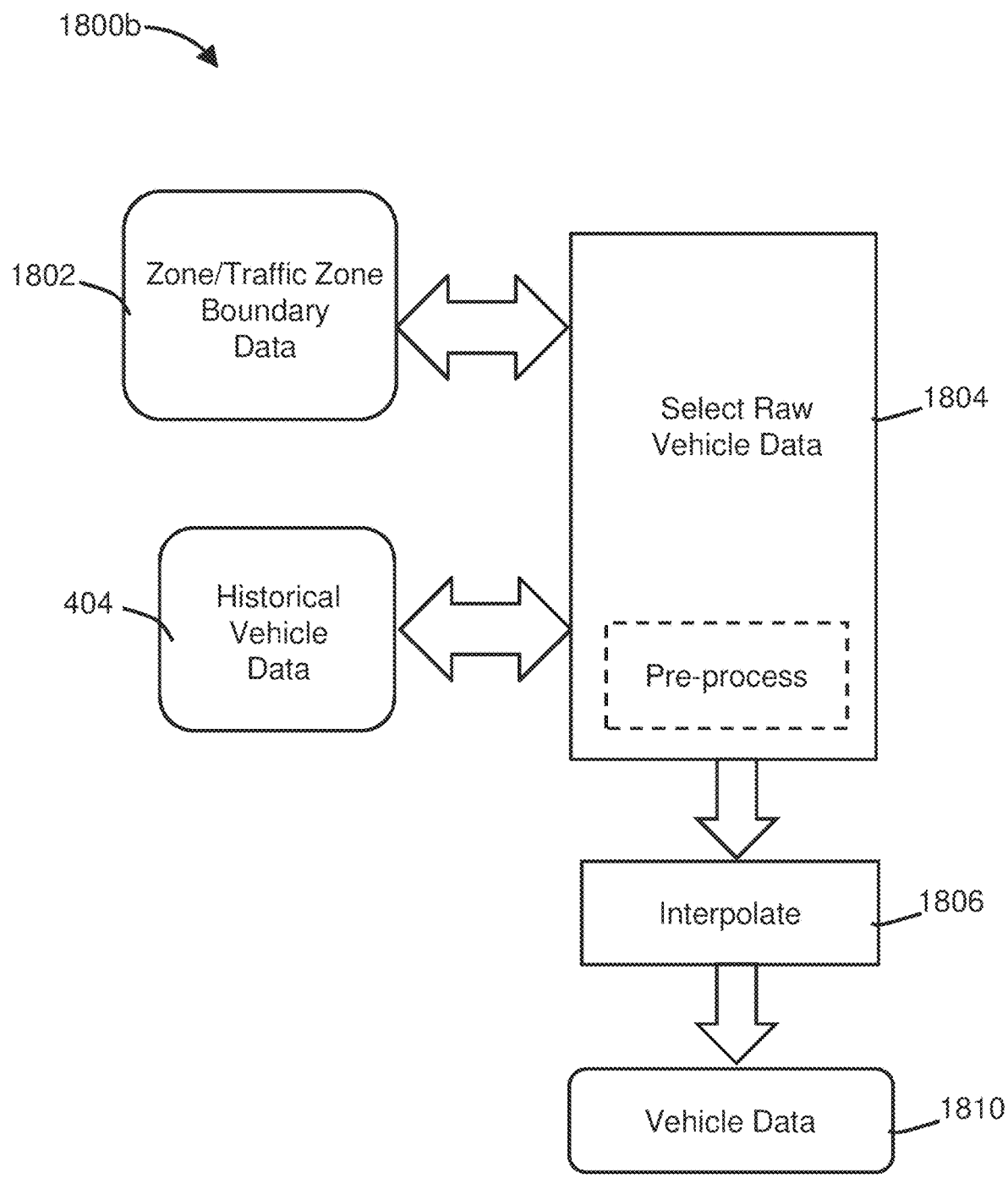
FIG. 18B is a simplified block diagram of another process for obtaining vehicle data for generating features.

FIG. 18B is a simplified block diagram of an alternative process 1800*b* for obtaining vehicle data for generating features. Such data may be a subset of raw vehicle data selected from historical vehicle data 404 that corresponds to a location within a zone and/or traffic zone. For example, boundary data 1802 comprises zone boundary data and/or traffic zone data indicative of locations of boundaries of a zone and traffic zone, respectively. In block 1804, raw vehicle data is selected from historical vehicle data 404 based on boundary data 1802. Next, in block 1806, data is interpolated from the raw vehicle data selected in block 1804 and first vehicle data 1810 comprising the raw vehicle data and the data interpolated therefrom is formed.

Optionally, raw vehicle data selected from historical vehicle data 404 may be selected based on date and time operating conditions are logged. For instance, raw vehicle data corresponding to a particular date and/or time range is selected. For example, only raw vehicle data collected over the last 3 months may be selected.

Optionally, at block 1804, the selected data is pre-processed, the selected data is pre-processed, such as, by removing outliers (e.g., unlikely speed values), duplicate values, and the like.

Block 710

Next, in block 710, features for each of the plurality of subzones of each of the plurality of zones are extracted from vehicle data. Features of the types described herein may include features that are present in a vehicle data instance or a subset of vehicle data instances and/or features derived therefrom. Features present in an instance or a subset of instances may include numeric values that are explicitly set out therein. Specific and non-limiting examples of such features include a minimum or maximum numeric value in the subset (where a minimum/maximum may be absolute and/or relative). The minimum or maximum data value may require some analysis, such as a comparison of values, but the minimum/maximum value itself will be a value found within the subset. For instance, a plurality of vehicle data instances in a vehicle data subset may be analyzed to determine a maximum speed of the subset. Block 710 is further described below with reference to FIGS. 19A-19B, FIGS. 20A-20E, FIG. 21, FIGS. 22A-22B, FIG. 23, and FIGS. 24A-24B.

Derived features may describe an instance or subset of vehicle data instances, but include a value not found therein. Instead, a value of a derived feature may be derived from the instance or subset, such as obtained through performing one or more computations on the instance or subset. Specific and non-limiting examples of derived features include average speed, total number of vehicle visits and ignition ratio. Optionally, a derived feature may describe a first derived feature forming a second derivative of the first derived feature. Additional derivatives of features may also be possible.

The features may additionally or alternatively be derived from the performance of one or more statistical computations on a vehicle data subset. For instance, a derived feature that may be employed may include standard deviation, mean, and median of values found in a vehicle data subset. For example, standard deviation, mean, and/or median of speed values of vehicles that have traversed a subzone. Features will be described in greater detail below.

The features may be prepared for use in training the model, for instance, by traffic analytics system 104a. Preparing the data may include various functions such as removing outliers (e.g., unlikely speed values), duplicate values, and the like.

Figures 19A, 19B:
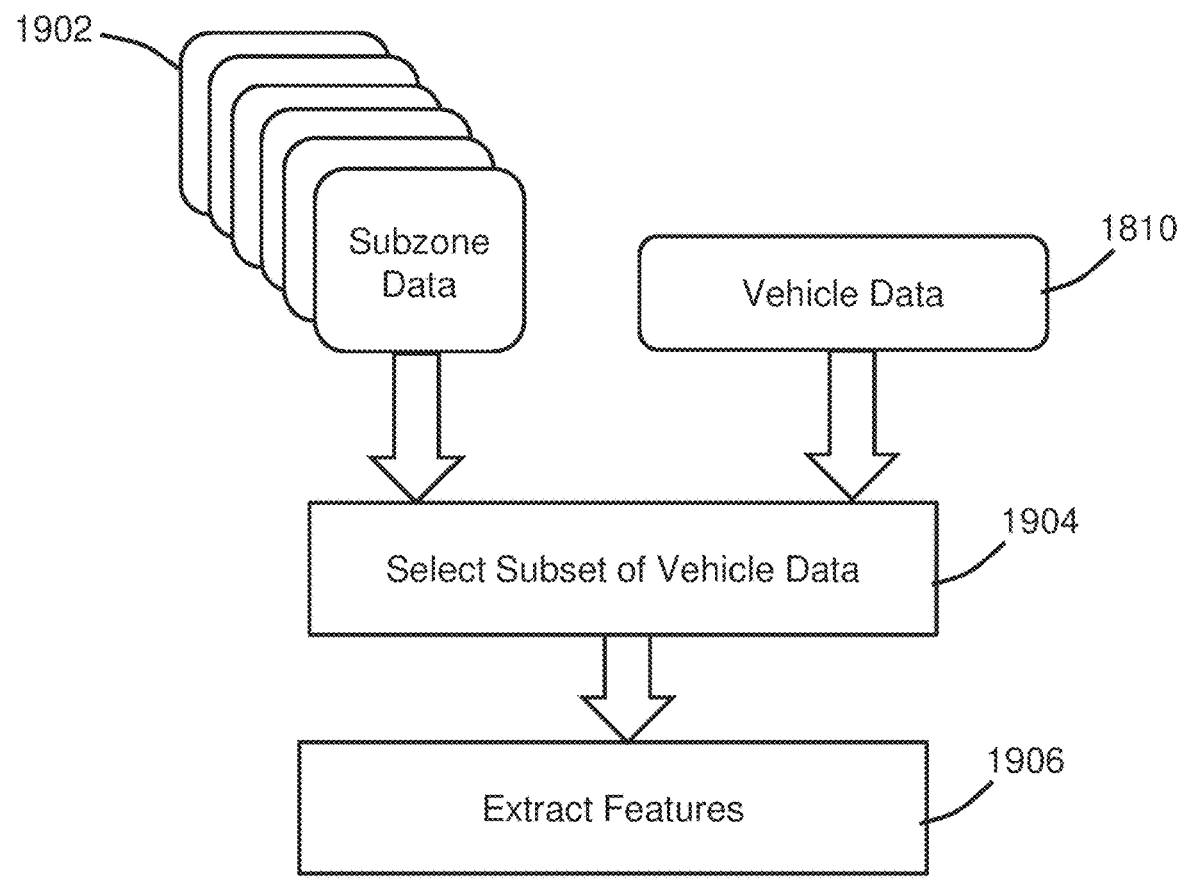
FIG. 19A is a conceptual block diagram of a feature extraction function for generating features from vehicle data.
FIG. 19B is an exemplary table representing data comprising each subzone ID and a plurality of features for each Geohash.

FIG. 19A is a conceptual block diagram of a feature extraction function for generating features from vehicle data. In block 1904, a subset of vehicle data for each of the plurality of subzones of the plurality of zones may be selected from vehicle data based on first subzone data. Once selected, the subset of vehicle data is analyzed and/or computations are performed thereon to extract/generate subzone features 1906. For each subzone in each zone, a plurality of features is generated. These features may be used to identify patterns in the features by a machine learning algorithm during training for defining a classifier.

For example, a subset of vehicle data is selected from first vehicle data 1810 based on first subzone data 1902 for each of the plurality of subzones of zones 1010a-1010f. Once selected, the subset of vehicle data instances is analyzed and/or computations are performed thereon to extract/generate subzone features 1906. For instance, for each Geohash in zones 1010a-1010f, a plurality of features, (e.g., F1-Fn) are generated. FIG. 19B is an exemplary table 1908 representing data comprising a plurality of features for each Geohash.

Subzone-Related Features

According to an embodiment, a plurality of subzone-related features is based on and/or derived from a subset of vehicle data associated with each subzone.

In a first exemplary implementation, the subset is a first subset of vehicle data corresponding to a position within a subzone. Subzone-related features indicate measurements/attributes of vehicle operating conditions of at least one vehicle that has operated in the subzone.

Figures 20A, 20B:
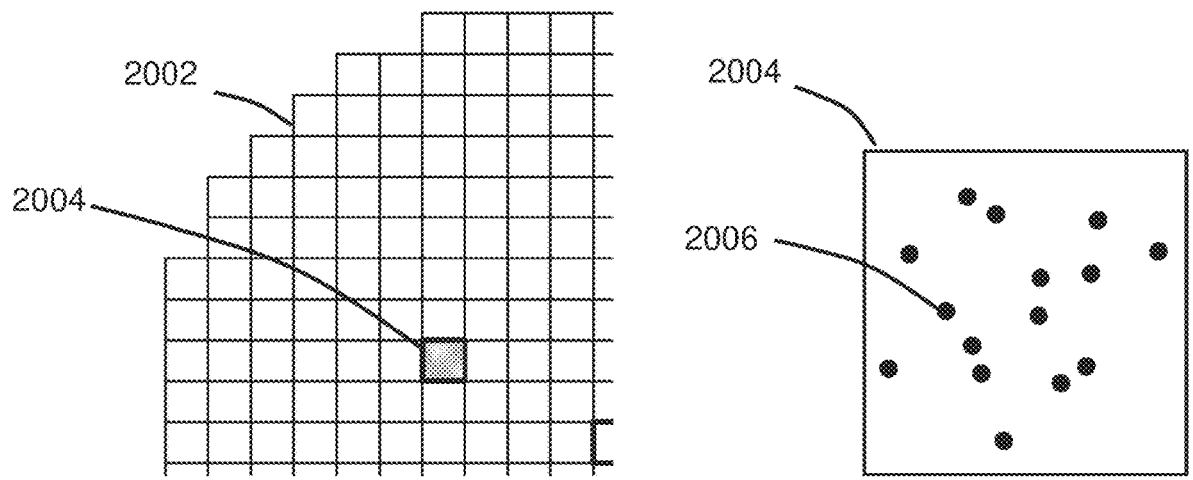
FIG. 20A is a conceptual diagram of a portion of a zone.
FIG. 20B enlarged view of a subzone.

For example, FIG. 20A is a conceptual diagram of portion 2002 of zone 1010a as demarcated by line 1250A-1250A of FIG. 12D. Portion 2002 comprises subzone 2004, as shown. An enlarged view of subzone 2004 is depicted in FIG. 20B comprising vehicle-position data points 2006 each thereof indicative of a position of one or more vehicles that have entered subzone 2004 at one point in time.

Figure 20C:
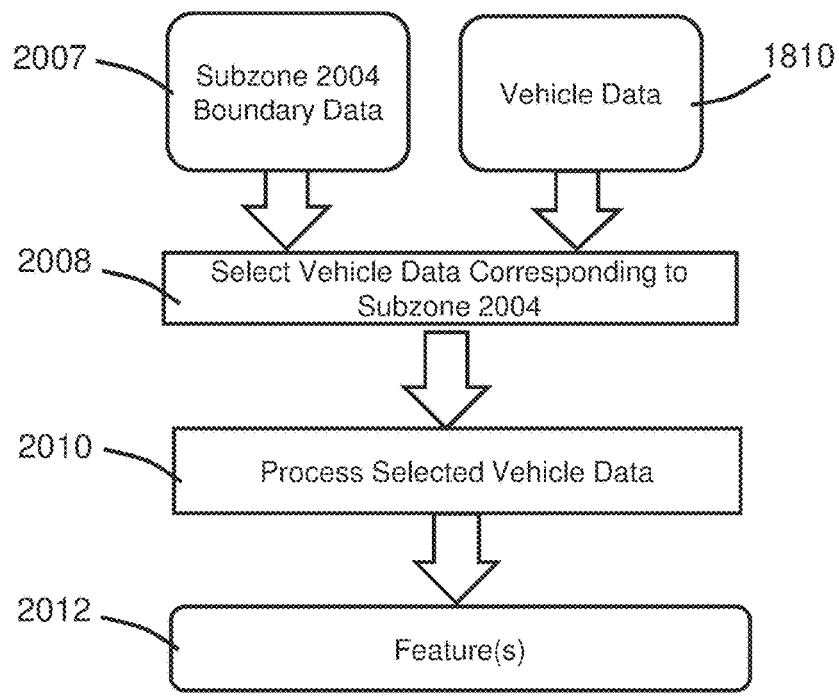
FIG. 20C is a simplified functional block diagram of a function that may be implemented for generating at least one feature.

Illustrated in FIG. 20C is a simplified functional block diagram of a function that may be implemented at block 1904. First vehicle data 1810 and subzone 2004 first subzone data 2007 is provided in block 2008 and a first subset of vehicle data corresponding to a position within subzone 2004 may be selected. The first subset of vehicle data is represented by the vehicle-position data points 2006 shown in FIG. 20B. Once selected, the first subset of vehicle data is processed at block 2010. For instance, the first subset of vehicle data instances may be analyzed and/or have computations performed thereon at block 2010 to form at least one feature 2012.

FIG. 20D is a table 2014 representing an example of a first subset of vehicle data corresponding to a position within subzone 2004. Position data 2018 of each instance 2016 is represented by vehicle-position data points 2006 as shown in FIG. 20B. Subzone-related features formed from processing the first subset of vehicle data are indicative of attributes/measurements of vehicle operating data of vehicles with corresponding device IDs ID1, ID2, ID3, ID4, when operating in subzone 2004. These subzone-related features may be used by the ML algorithm to identify patterns. For descriptive purposes, only 4 vehicles are shown to have entered subzone 2004, in this example. In practice however, the number of vehicles that may enter a subzone may be more or less than four.

Some specific and non-limiting examples of the subzone-related features are provided in Table 1 below.

TABLE 1

| Subzone-related Features |
| --- |
| Minimum vehicle speed |
| Maximum vehicle speed |
| Average vehicle speed |

TABLE 1-continued

Subzone-related Features

Median vehicle speed
Standard deviation of vehicle speed
Minimum ignition
Maximum ignition
Total number of ignitions on
Total number of ignitions off
Average number of ignitions
Ignition ratio
Total number of vehicle visits
Average number of visits/vehicle
Minimum number of vehicle visits/day
Maximum number of vehicle visits/day
Average number of vehicle visits/day
Median number of vehicle visits/day
Standard deviation of number of vehicle visits/day
Minimum unique number of vehicle visits/day
Maximum unique number of vehicle visits/day
Median unique number of vehicle visits/day
Standard deviation of unique number of vehicle visits/day
Average unique number of visits/day
Total number of unique vehicle visits Other subzone-related features may be based on and/or are derived from the first subset of vehicle data instances. Embodiments are not intended to be limited to the example features described herein. FIG. 20E is a table of exemplary subzone-related features and feature values based on the subset of vehicle data instances. Other features may be based on and/or be derived from the first subset of vehicle data.

Ignition state indicates whether a vehicle is in a driveable state or not. For example, an internal combustion engine (ICE) vehicle has an ignition state of on when the engine is on. An ICE vehicle has an ignition state of off when the engine is off, even if electrical power is provided to vehicle circuitry by the battery. In another example, an electric vehicle (EV) has an ignition state of on when electricity is provided to the EV's electric motor, whereas the ignition state is off when no electricity is provided to the EV's electric motor.

The minimum ignition feature of a subzone has a value of 1 only when all vehicles that have entered a subzone have an ignition state of 1. This may indicate that the vehicle way is not employed as a parking area.

The maximum ignition feature has a value of 0 only when all vehicles in a subzone have an ignition state of off. This may indicate that the subzone is a portion of vehicle way employed as a parking area.

The ignition ratio feature is defined as,

Ignition ratio=Total number of ignitions off/(Total number of ignitions off)+(Total number of ignitions on)

In a second exemplary implementation, subzone-related features may be based on and/or derived from the first subset of vehicle data and a second subset of vehicle data including vehicle data temporally preceding and/or subsequent thereto for a same vehicle.

Figure 21:
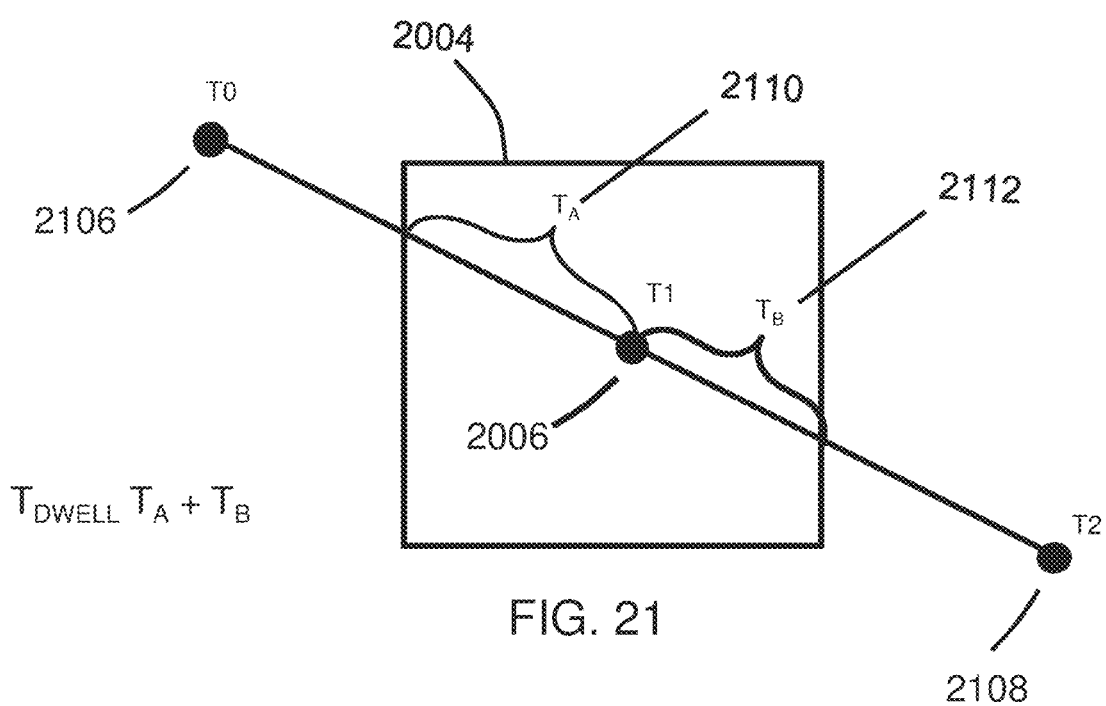
FIG. 21 is a simplified diagram of a subzone and vehicle-position data points.

For instance, the first and second subsets of vehicle data may be processed for providing subzone-related features indicative of dwell time of a vehicle within a given subzone. Shown in FIG. 21 is a simplified diagram of subzone 2004 and vehicle-position data point 2006 representing a vehicle position at T1 according to vehicle data. A dwell time of a vehicle within subzone 2004 may be determined by obtaining vehicle data corresponding to the same vehicle at a preceding point in time, T0, and a subsequent point in time, T2, represented by vehicle-position data points 2106 and 2108 respectively. As geographic coordinates of boundaries of subzone 2004 are known, the time TA (2110) between the time a vehicle enters subzone 2004 and arrives at vehicle—position data point 2006, and the time TB (2112) between the time the vehicle leaves vehicle—position data point 2006 and exits subzone 2004 may be determined. The dwell time, (e.g., how long the vehicle is in a subzone) may be calculated by, TDWELL=TA+TB. For each vehicle that enters subzone 2004 a dwell time is calculated and features, average dwell time, minimum dwell time, maximum dwell time, median dwell time and standard deviation of dwell time are based thereon or derived therefrom.

In a third exemplary implementation, subzone-related features may be based on and/or derived from the first subset of vehicle data and a third subset of vehicle data including vehicle data corresponding to vehicle data temporally subsequent thereto for a same vehicle. In this example subzone-related features relates to the travel time of a vehicle between a location within a subzone and the first location the vehicle ignition state is off. In other words, the travel time between a position within a subzone and position the vehicle parks, i.e., time to park.

Figures 22A, 22B:
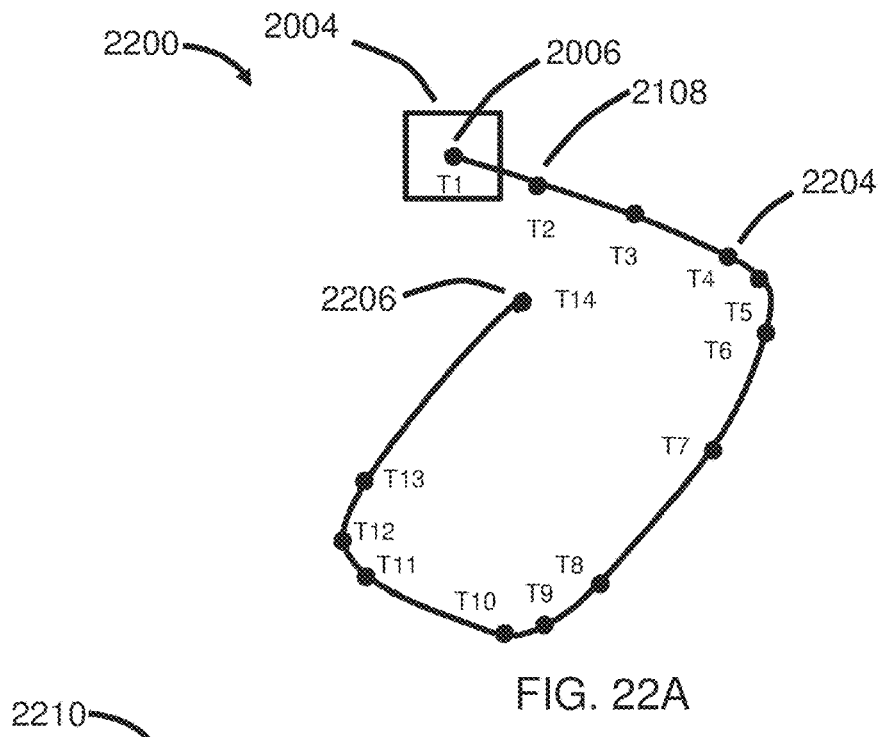
FIG. 22A is a simplified diagram of a path of a vehicle that has traversed a subzone.
FIG. 22B is a table representing a subset of vehicle data.

FIG. 22A is a simplified diagram of a path of a vehicle that has traversed subzone 2004 having a related vehicle data instance corresponding to vehicle-position data point 2006 at time T1, as shown. Each temporally subsequent vehicle data instance is represented by a vehicle-position data points 2204 at times T1-T14 each representing a new location of a same vehicle at consecutive points in time as the vehicle travels along path 2200. Vehicle-position data point 2206 at T14 represents the first location the vehicle ignition is turned off, indicating that the car has parked. The time to park from vehicle—position data point 2006 to 2206 may be calculated as $T_{TIMETOPARK}$=T14−T1. For each vehicle that enters subzone 2004 the time to park is calculated to provide subzone-related features such as, average time to park, minimum time to park, maximum time to park, median time to park, and standard deviation of time to park.

Table 2210 of FIG. 22B represents a third subset of vehicle data corresponding to vehicle-position data points 2204 at times T1-T14.

In some cases, a vehicle ignition is ON and the speed is 0 km/hr, such as at T9. For example, when a vehicle is not moving yet the ignition is on. For instance, at red lights, stop signs, heavy traffic (stop-and-go), picking up passengers, going through a drive through, among others.

Zone-Related Features

According to an embodiment, zone-related features may be based on and/or derived from a fourth subset of vehicle data instances associated with the zone and/or subzone-related features. Table 2 lists specific and non-limiting examples of such zone-related features. These zone-related features may be determined for each subzone of the plurality of subzones for each zone of the plurality of zones.

TABLE 2

Zone-Related Features

Zone Minimum Ignition OFF
Zone Maximum Ignition OFF
Zone Average Vehicle Speed
Zone Maximum Vehicle Speed
Zone Minimum Vehicle Speed
Zone Average Number of Unique Visits/Day
Zone Minimum Number of Unique Visits/Day
Zone Maximum Number of Unique Visits/Day
Zone Average Median Number of Unique Visits/Day
Zone Total Average Number of Unique Visits/Day In a first exemplary implementation, zone average speed may be determined by selecting a subset of vehicle data instances corresponding to a position within a zone and calculating the average speed therefrom.

In a second exemplary implementation, zone average speed may be determined by calculating an average of the average speed subzone-related features of all subzones in a zone.

According to an embodiment, other zone-related features may be based on and/or derived from a fifth subset of vehicle data instances associated with the zone. Table 3 lists specific and non-limiting examples of such zone-related features. These zone-related features may be determined for each subzone of the plurality of subzones for each zone of the plurality of zones.

TABLE 3

Zone-Related Features

Zone Total Number of Visits
Zone Total Number of Unique Visits

In an exemplary implementation, zone total number of visits may be determined by selecting a subset of vehicle data instances corresponding to a position within a zone and calculating the total number of vehicles that correspond to the zone.

According to an embodiment, other zone-related features may be based on and/or derived from another portion of subzone-related features. Table 4 lists specific and non-limiting examples of such zone-related features. These zone-related features may be determined for each subzone of the plurality of subzones for each zone of the plurality of zones.

TABLE 4

Zone-Related Features

Zone Average Time to Park
Zone Maximum Time to Park
Zone Minimum Time to Park
Zone Maximum Dwell Time
Zone Minimum Dwell Time
Zone Median Dwell Time
Zone Average Dwell Time
Zone Minimum Number of Unique Visits
Zone Average Number of Unique Visits
Zone Maximum Number of Unique Visits
Zone Average Total Number of Visits
Zone Maximum Total Number of Visits
Zone Minimum Total Number of Visits For example, zone average dwell time may be determined by calculating an average of the average dwell time subzone-related features of all subzones in a zone.

Subzone-Zone-Related Features

According to an embodiment, subzone-zone-related features may be based on and/or derived from a portion of subzone-related features in relationship to a portion of zone-related features. Subzone-zone-related features are determined for each subzone of the plurality of subzones for each zone of the plurality of zones.

Specific and non-limiting examples of relationship-based features are listed in Table 5 below.

TABLE 5

Subzone-Zone-Related Features

Minimum Vehicle Speed Ratio
Average Vehicle Speed Ratio

TABLE 5-continued

Subzone-Zone-Related Features

Maximum Vehicle Speed Ratio
Minimum Ignition Off Ratio
Maximum Ignition Off Ratio
Maximum Dwell Time Ratio
Minimum Dwell Time Ratio
Average Median Dwell Time Ratio
Average Dwell Time Ratio
Minimum Time to Park Ratio
Average Time to Park Ratio
Maximum Time to Park Ratio
Minimum Number of Unique Vehicle Visits Ratio
Maximum Number of Unique Vehicle Visits Ratio
Average Number of Unique Vehicle Visits Ratio
Minimum Unique Number of Vehicle Visits/Day Ratio
Maximum Unique Number of Vehicle Visits/Day Ratio
Average Unique Number of Vehicle Visits/Day Ratio
Total Unique Number of Vehicle Visits/Day Ratio
Average Median Unique Number of Vehicle Visits/Day Ratio
Minimum Total Number of Vehicle Visits Ratio
Maximum Total Number of Vehicle Visits Ratio
Average Total Number of Vehicle Visits Ratio
Total Number of Vehicle Unique Visits Ratio
Total Number of Vehicle Visits Ratio In an exemplary implementation, subzone-zone-related feature average speed ratio may be determined by calculating the ratio of subzone-related feature average speed to zone-related feature, zone average speed.

As described above, raw vehicle data may be selected from historical vehicle data based on a particular date and/or time period. As such, values of features described herein may vary accordingly.

Spatial-Related Features

According to an embodiment, spatial-related features may be based on and/or derived from spatial relationship data of a subzone to the zone. According to an embodiment, spatial-related features may be based on and/or derived from a spatial relationship data of a subzone to the plurality of subzones, or a portion thereof, of a zone.

Figure 23:
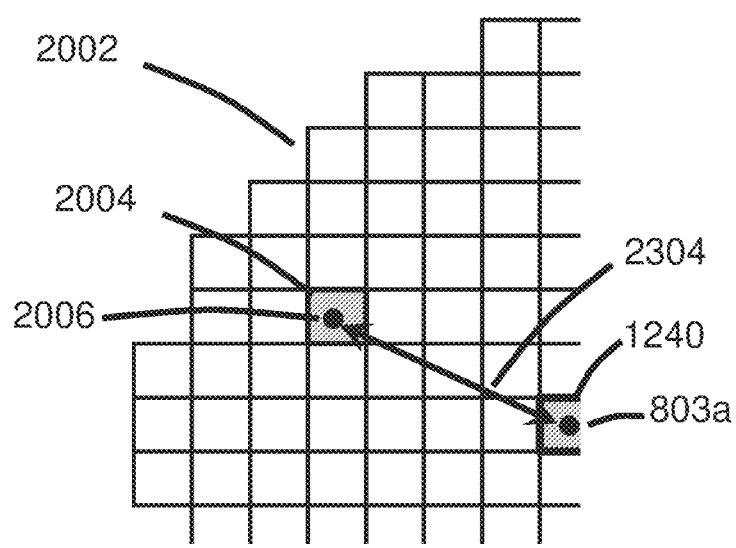
FIG. 23 is a simplified diagram of a portion of a zone.

In a first exemplary implementation, for each subzone, a spatial-related feature may be based on and/or derived from the distance of the subzone to the centre point of a zone. For instance, one method for determining the distance between a subzone and the centre point of a zone comprises, determining a location of a centre point of the subzone and the location of the centre point of the centre subzone of a zone. Next, the distance therebetween is calculated. For example, shown in FIG. 23 is a simplified diagram of portion 2002 including vehicle—position data point 2006 of subzone 2004, and reference point 803a, which may be a centre point, of zone 1010a. The distance 2304 between vehicle—position data point 2006 (i.e., centre point) and reference point 803a is determined, for instance, by using the Haversine formula.

Figure 24A:
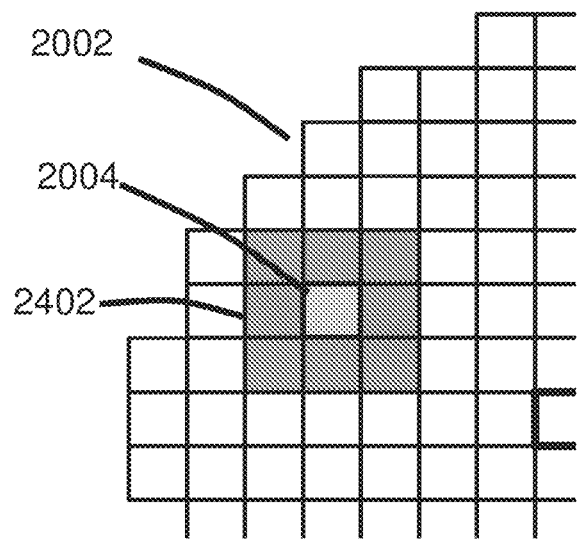
FIG. 24A is a simplified conceptual diagram of a portion of a zone including a subzone having 8 adjacent subzones.
Figure 24B:
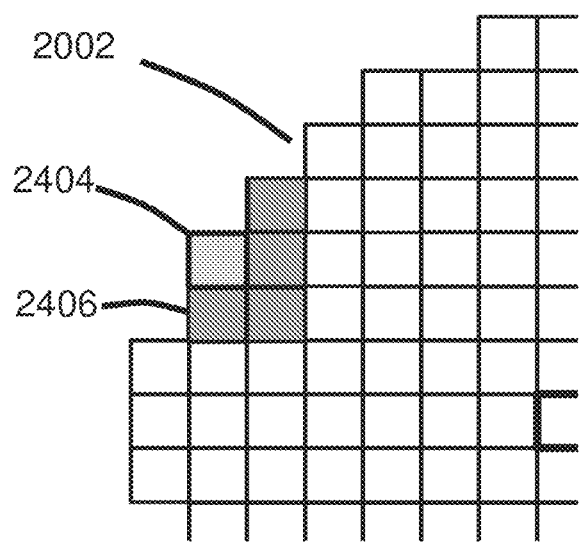
FIG. 24B is a simplified conceptual diagram of a portion of a zone including a subzone having 4 adjacent subzones.

In a second exemplary implementation, for each subzone, a feature may be based on and/or derived from the number of subzones adjacent the subzone (e.g., number of Geohash neighbours). FIG. 24A is a simplified conceptual diagram of portion 2002 including subzone 2004 having 8 adjacent subzones 2402. FIG. 24B is also a simplified conceptual diagram of portion 2002 including subzone 2404 having 4 adjacent subzones 2406. In these examples, the features for subzones 2004 and 2404 may have values 8 and 4 respectively. Alternatively, features for subzones 2004 and 2404 may have values be derived therefrom.

In a third exemplary implementation, for each subzone, a feature may be based on and/or derived from the number of subzones adjacent the subzone (e.g., number of Geohash neighbours) having vehicle data corresponding to a location therein. FIG. 24A shows subzone 2004 having 8 adjacent subzones 2402. If no vehicle data corresponds to 3 of those adjacent subzones the value of the feature is 5. In other words, if vehicles did not enter 3 of the 8 subzones, the number of adjacent subzones having vehicle data corresponding to a location therein is 5.

Spatial-related features are determined for each subzone of the plurality of subzones for each zone of the plurality of zones.

Example features are not intended to limit embodiments to the features described herein.

Block 712

In block 712 training data is formed. For instance, for each subzone, above described features are determined to create training data. Training data further includes an indication of the class of each subzone.

Figure 25A:
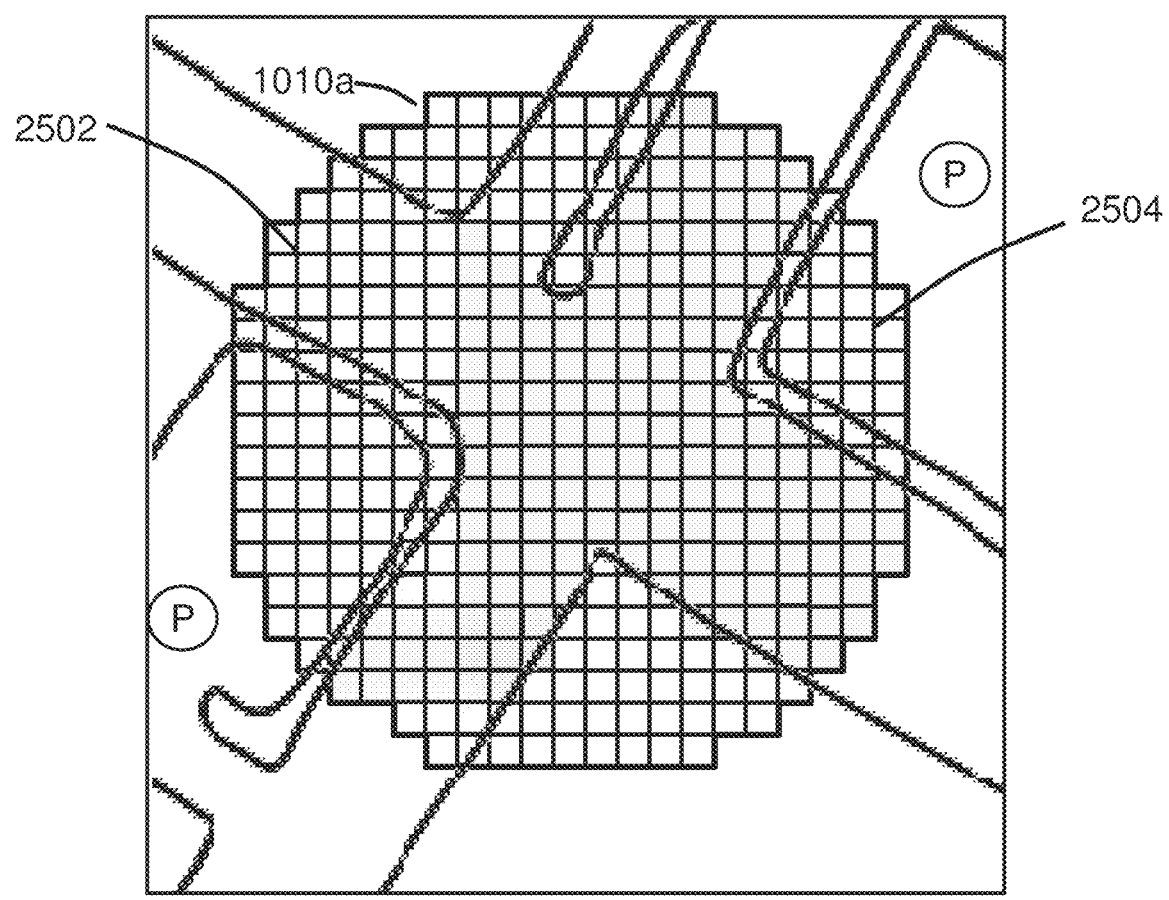
FIG. 25A is a conceptual diagram of a portion of a sample vehicle way and a zone imposed thereon.

Shown in FIG. 25A is a conceptual diagram of a portion of sample vehicle way in the form of sample intersection 802*a* and zone 1010*a* imposed thereon. Shaded subzones 2502 of zone 1010*a* indicate that they are portions of sample intersection 802, whereas the unshaded subzones 2504 are not portions of sample intersection. Table 2510 of FIG. 25B represents training data including subzone ID, a plurality of features generated for each associated subzone, and a class label, indicating a subzone is one of a 'vehicle way' class, (e.g., a portion of sample vehicle way, such as sample intersection 802*a*) or a 'not-vehicle way' class (e.g., not a portion of a sample vehicle way).

Block 714

Finally, in block 714, a machine learning technique, such as random forest technique, is implemented using training data to define a classifier for classifying a subzone as one of a vehicle way class or not-vehicle way class. The training data used may include all or a portion of the features described herein. Optionally, other features may be included in the training data.

Figure 25C:
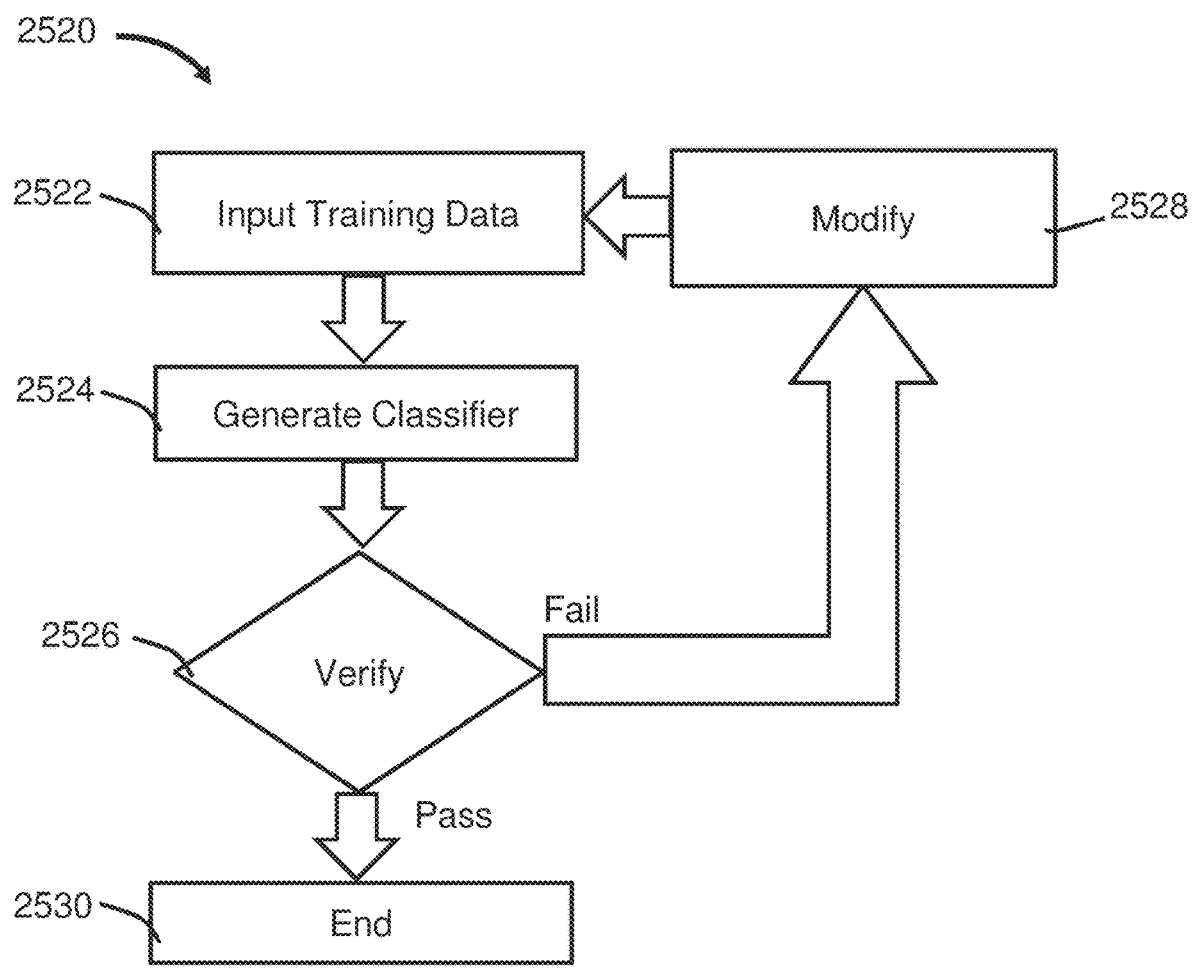
FIG. 25C is a simplified high-level flow diagram of an exemplary process for using a machine learning technique to define a classifier.

For example, FIG. 25C is a high-level flow diagram of an exemplary process 2520 for using a machine learning technique to define a classifier for classifying subzones. Process 2520 begins at block 2522 where training data, such as training data represented by table 2510, is input to a machine learning algorithm. Next, at block 2524, a classifier that is generated by training the ML algorithm is verified, and at block 2526 the performance of the classifier is evaluated. If the classifier meets performance criteria, (e.g., passes verification) process 2520 ends at block 2530. However, if the performance criteria are not met, (e.g., fails verification), the process 2520 continues to block 2528 where modifications to training data or machine learning algorithm parameters may be performed and process 2520 continues until the defined classifier meets the required performance criteria.

Optionally, modifications to other parameters may also be performed should performance criteria not be met. Such as, the relative position of the reference areas from the reference points and/or subzone dimensions (e.g., Geohash precision). When performance criteria are met, classifier data associated with the classifier may be generated. Such classifier data may be indicative of the relative position of the reference areas from the reference points that were used for defining the classifier. The classifier data may also be indicative of subzone dimensions (e.g., Geohash precision) of subzones used for defining the classifier. This classifier data may be useful when using the classifier for defining a vehicle way. Each classifier may have unique classifier data associated therewith.

According to some embodiments, a road network may be defined by partitioning an area into subzones and classifying each thereof as a portion of the road network (i.e., portion of a vehicle way) or not a portion of the road network (i.e., not a portion of a vehicle way) using at least a machine learning technique. Some embodiments include generating unlabeled data including features representing each of the subzones for classification thereof by a classifier. In some instances, features may be based on and/or derived from vehicle operation information of vehicles corresponding to one or more subzones. Aggregating subzones classified as a portion of a road network may provide an indication of a geographical location thereof from which a road network may be defined.

Subprocess 2600

Shown in FIG. 246A is a flow diagram of subprocess 2600 for defining a road network using a machine learning technique according to an embodiment. Subprocess 2600 is described below as being carried out by traffic analytics system 104*a*. Alternatively, subprocess 2600 may be carried out by telematics system 102, traffic analytics system 104*b*, intelligent telematics system 500*a*, 500*b*, another system, a combination of other systems, subsystems, devices or other suitable means provided the operations described herein are performed. Subprocess 2600 may be automated, semi-automated and some blocks thereof may be manually performed.

Figure 26A:
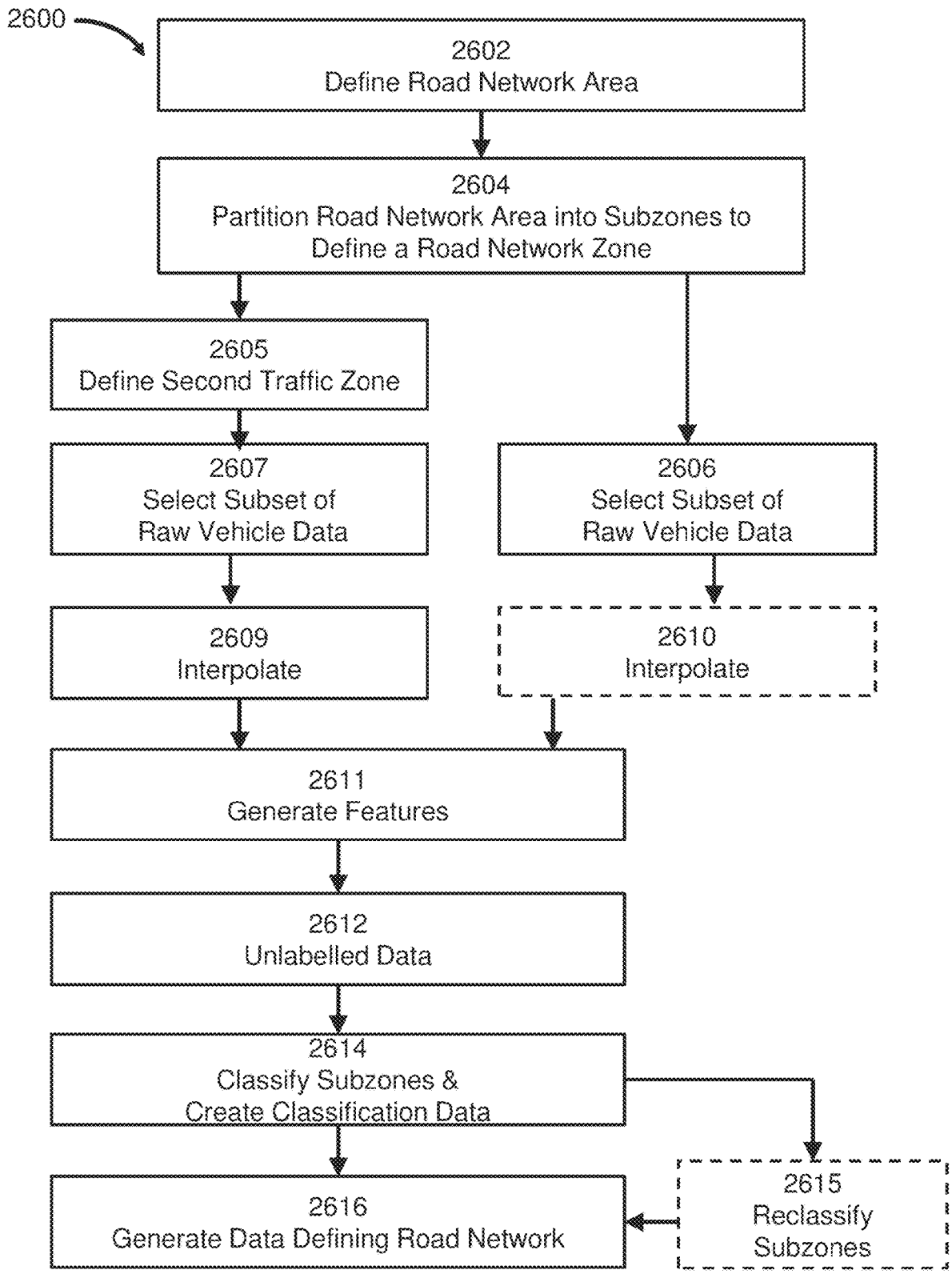
FIG. 26A is a flow diagram of a process for defining a road network according to an embodiment.
Figures 26B, 26C:
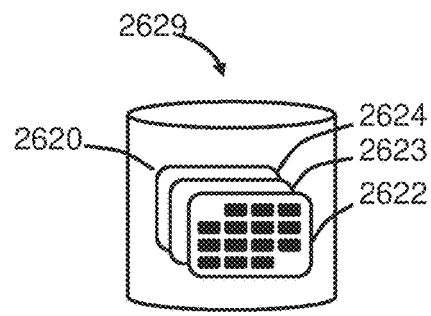
FIG. 26B is a conceptual diagram of a database comprising second historical vehicle data.
FIG. 26C is a conceptual diagram of a dataset comprising raw vehicle data instances indicative of vehicle operation information collected by a monitoring device at different points in time.

In an exemplary implementation, traffic analytics system 104*a* is configured to obtain, store and process second historical vehicle data. For example, traffic analytics system 104*a* obtains second historical vehicle data, for instance, second historical vehicle data 2620, from telematics system 102 and stores it in datastore 304 in database 2629. FIG. 26B shows a conceptual diagram of database 2629. In this example, traffic analytics system 104*a* organizes second historical vehicle data 2620 by vehicle based on associated device ID. For instance, datasets 2622-2624 of database 2629 comprise raw vehicle data indicative of vehicle operation information of vehicles 212-214, respectively.

Shown in FIG. 26C is a conceptual diagram of dataset 2622. In this example, each row thereof represents a raw vehicle data instance 2626 indicative of vehicle operation information collected by monitoring device 202 at different points in time. Raw vehicle data instances 2626 of dataset 2622 are organized sequentially in time, from DT10 to DT15. In this example, a raw vehicle data instance 2626 includes device ID data, speed data, position data, (e.g., LAT/LONG), ignition state data, and date and time data, (e.g., timestamp), as shown.

Block 2602

Subprocess 2600 begins at block 2602 wherein subprocess 2600 includes defining a road network area comprising a road network of interest. A road network area may be defined in a geospatial file (e.g., shape file (.shp), GeoJSON (.geojson)). Alternatively, a road network area may be defined in another data format indicative of, for example, a polygon, latitude-longitude pairs, GPS coordinates indicating a location of four corners bounding the road network area, among others. One of ordinary skill in the art will appreciate that there are multiple data formats for defining geographical coordinates of boundaries of an area.

Figure 27:
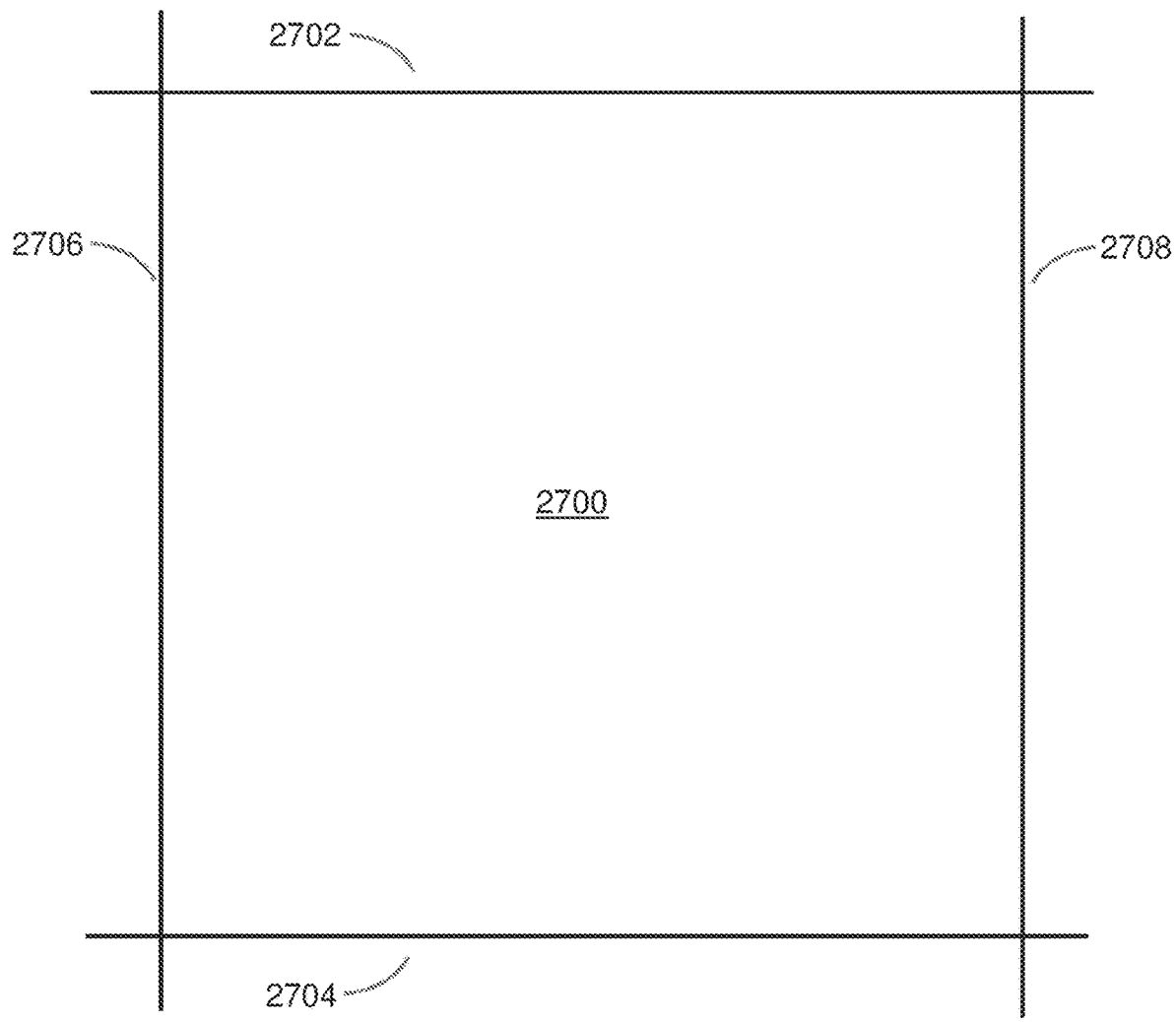
FIG. 27 is a simplified diagram of an exemplary road network area defined by latitude-longitude pairs.

For instance, data indicating latitude-longitude pairs defining boundaries of a road network area may be provided to traffic analytics system 104*a*, for example, by a user. Alternatively, traffic analytics system 104*a* may obtain such data from a governmental agency that stores data describing geographic coordinates of boundaries of municipalities, communities or other areas of interest, on a publicly accessible server, such as a server accessible via the Internet. Shown in FIG. 27 is a simplified diagram of an exemplary road network area 2700 defined by latitude-longitude pairs, including latitude pair, (2702, 2704) and longitude pair, (2706, 2708). In this example, road network area 2700 is square-shaped, however, a road network area may be any shape and/or size.

Block 2604

Next, at block 2604, subprocess 2600 includes partitioning the road network area into a plurality of contiguous second subzones, to define a road network zone. At this block, subprocess 2600 may generate second subzone data, indicative of a second subzone ID of each second subzone in the road network zone. Optionally, second subzone data may include an indication of the boundaries of each second subzone.

In an exemplary implementation, a road network zone may be defined by partitioning a road network area into a grid of contiguous second subzones according to a hierarchical geospatial indexing system. Specific and non-limiting examples of hierarchical geospatial indexing systems include Geohash, Uber's Hexagonal Hierarchical Spatial Index, i.e., H3, and Google's S2 Geographic Spatial Index, i.e., S2. In another exemplary implementation, a road network area may be subdivided into a grid of contiguous second subzones bound by latitude-longitude pairs. Alternatively, a road network area may be partitioned according to another method for subdividing geographical space. One of ordinary skill appreciates that there are various methods for subdividing a geographical space into a plurality of contiguous second subzones.

Described further below are steps at block 2614 wherein subprocess 2600 includes utilizing a classifier for classifying each of the plurality of contiguous second subzones in the road network zone. In some instances, classifier data uniquely associated with a classifier utilized at block 2614 may indicate a method for partitioning a road network area, e.g., a hierarchical geospatial system, second subzone dimensions and/or other parameters associated with the classifier.

For example, classifier data associated with a classifier utilized at block 2614 indicates road network area 2700 is to be partitioned into a plurality of contiguous second subzones according to a Geohash hierarchical geospatial indexing system with a Geohash precision of 9. A precision of 9 corresponds to dimensions of Geohashes less than or equal to 4.77 m×4.77 m.

Figure 28A:
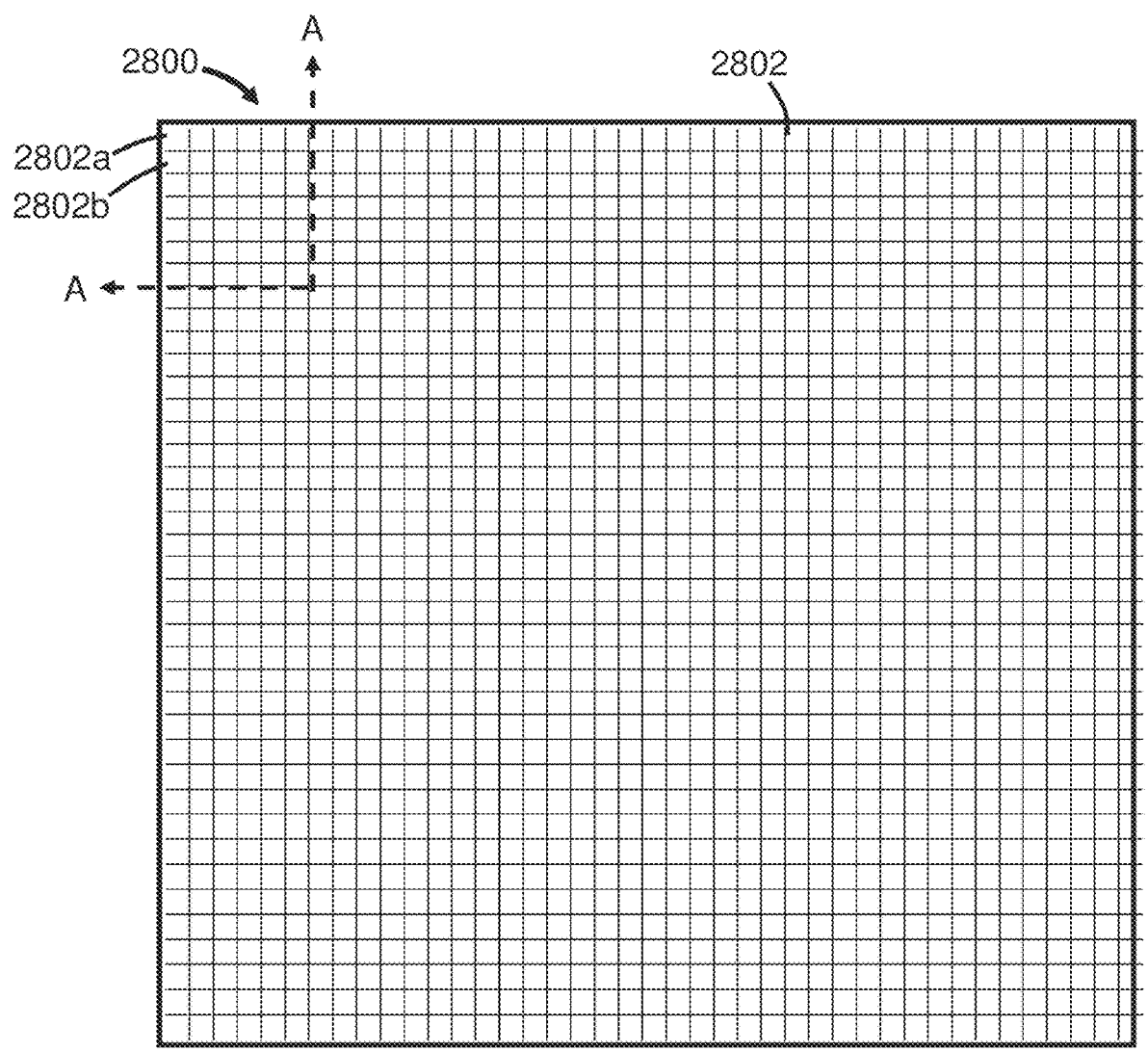
FIG. 28A is a conceptual diagram of a road network zone comprising a plurality of Geohashes.

In the present example, traffic analytics system 104a partitions road network area 2700 into a plurality of Geohashes 2802 of precision 9 forming road network zone 2800 as shown in FIG. 28A. Traffic analytics system 104a also generates second subzone data indicating a second subzone ID for each Geohash 2802 in road network zone 2800. FIG. 28B shows exemplary second subzone data 2804 including a second subzone ID for each Geohash 2802. In this example, a second subzone ID corresponds to a Geohash string of that particular Geohash. For instance, second subzone data 2804a for Geohash 2802a includes second subzone ID 'GeohasString1,' second subzone data 2804b for Geohash 2802b includes second subzone ID 'GeohashString2', and so on.

Alternatively, traffic analytics system 104a generates second subzone data indicating a second subzone ID for each Geohash 2802 in road network zone 2800 and a boundary thereof. FIG. 28C shows exemplary second subzone data 2806 including a second subzone ID for each Geohash 2802 in road network zone 2800. In this example second subzone data 2806 includes a second subzone ID corresponding to a Geohash string of that Geohash, and boundaries thereof. Boundaries of each Geohash 2802 is indicated by a latitude-longitude pair. For instance, second subzone data 2806a for Geohash 2802a includes a second subzone ID 'GeohashString1' and boundary corresponding to (LAT1, LAT2), (LONG1, LONG2) PAIR1. Second subzone data 2806b for Geohash 2802b a second subzone ID 'GeohashString2' and boundary corresponding to (LAT1, LAT2), (LONG1, LONG2) PAIR2.

Boundaries of a Geohash may be determined by use of a Geohash bounds function as described above in reference to FIG. 11D. For example, traffic analytics system 104a may determine a boundary for each Geohash 2802 by implementing a Geohash system bounds function on an associated Geohash string, i.e., second subzone ID.

Next, subprocess 2600 proceeds to one of block 2605 or block 2606.

Block 2606

At block 2606, subprocess 2600 includes selecting a second subset of raw vehicle data from second historical vehicle data corresponding to the road network zone.

For example, traffic analytics system 104a selects a second subset of a raw vehicle data from second historical vehicle data 2620 corresponding to road network zone 2800. I.e., a second subset of raw vehicle data having position data indicating a position within boundaries of road network zone 2800 is selected from second historical vehicle data 2620.

Figure 29:
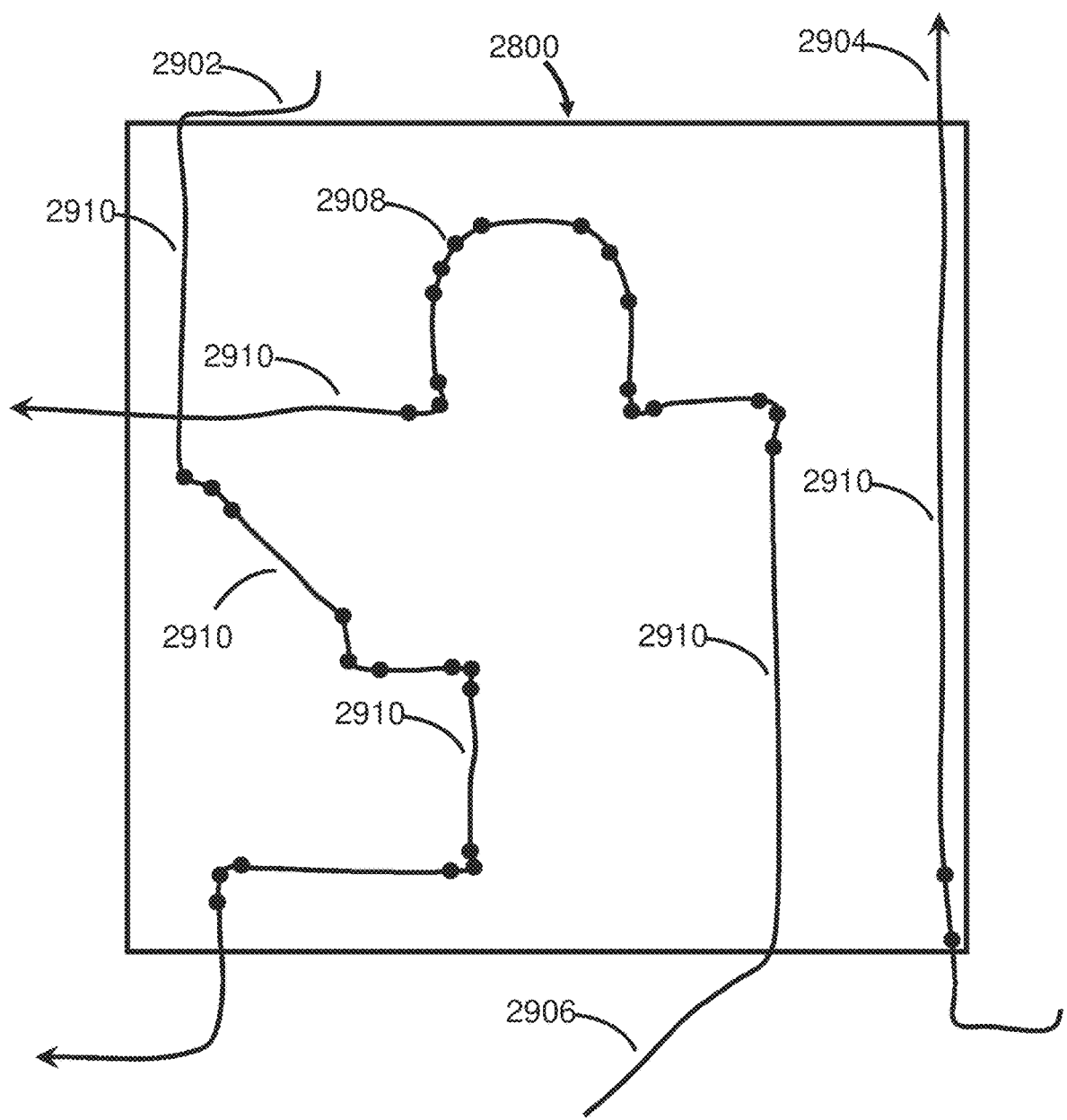
FIG. 29 is a simplified diagram of a road network zone, exemplary paths taken by three vehicles that have traversed therethrough and vehicle position-data points corresponding to the paths.

Now referring to FIG. 29, shown is a simplified diagram of road network zone 2800 and exemplary paths 2902, 2904 and 2906, taken by three vehicles that have traversed therethrough. For instance, a same vehicle may have traversed road network zone 2800 at three different time intervals. Alternatively, a combination of one or more vehicles may have traversed road network zone 2800.

Also shown in FIG. 29 are vehicle position-data points 2908 representing position data of raw vehicle data corresponding to paths 2902, 2904 and 2906 within road network zone 2800. Monitoring devices may transmit raw vehicle data intermittently, as illustrated by lack of vehicle position-data points 2908 on portions 2910 of paths 2902, 2904 and 2906.

Transmission of raw vehicle data by a monitoring device may depend on various factors, such as, the frequency a monitoring device collects vehicle operation information, changes in direction of travel of a vehicle, or lack thereof, among others. As such, there may be instances when a monitoring device transmits little raw vehicle data while traversing a road network zone.

Block 2610

A method for increasing an amount of data indicative of vehicle operation within a road network zone may include interpolating data. For instance, after block 2606, subprocess 2600 may proceed to block 2610 wherein subprocess 2600 includes interpolating data instances from the second subset of raw vehicle data selected in block 2606.

Figure 30:
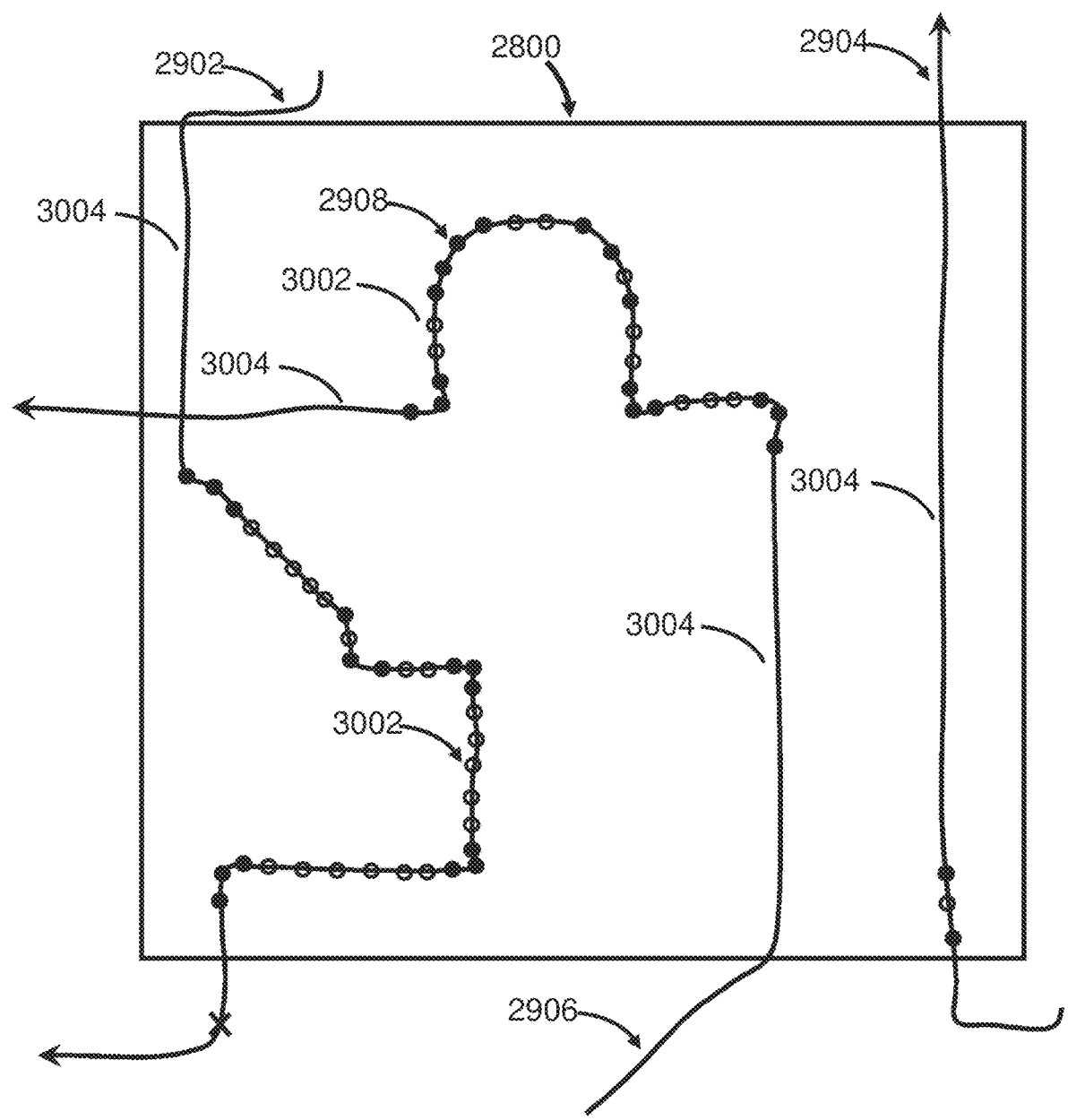
FIG. 30 is a simplified diagram of a road network zone, exemplary paths taken by three vehicles that have traversed therethrough, vehicle position-data points corresponding to the paths and interpolated vehicle position-data points.

In the present example, traffic analytics system 104a interpolated data instances from the second subset of raw vehicle data instances selected from second historical vehicle data. For example, shown in FIG. 30 is another simplified diagram of road network zone 2800, exemplary paths 2902, 2904 and 2906, vehicle position-data points 2908, as well as interpolated vehicle position-data points 3002 interpolated by traffic analytics system 104a. FIG. 30 illustrates that interpolating data instances may increase the amount of data indicative of vehicle operation information of vehicles corresponding to road network zone 2800. In some instances, there may still be portions of paths 2902, 2904 and 2906, such as portions 3004, for which no vehicle operation information is available.

Optionally, at block 2606 and/or at block 2610, the second subset of raw vehicle data and/or the second subset of raw vehicle data and interpolated data, interpolated therefrom, is pre-processed. For example, by removing outliers (e.g., unlikely speed values), duplicate values, and the like.

Another method for increasing an amount of vehicle operation information related to vehicles traversing a road network zone includes selecting a second subset of raw vehicle data within and beyond boundaries of the road network zone.

Block 2605

For instance, instead of proceeding to block 2606 after block 2604, subprocess 2600 proceeds to block 2605. At block 2605, subprocess 2600 includes defining a second traffic zone larger than, and encompassing, the road network zone for selecting a second subset of raw vehicle data from second historical vehicle data. In some instances, a second traffic zone boundary may be based on a predefined distance from boundaries of the road network zone.

Figure 31:
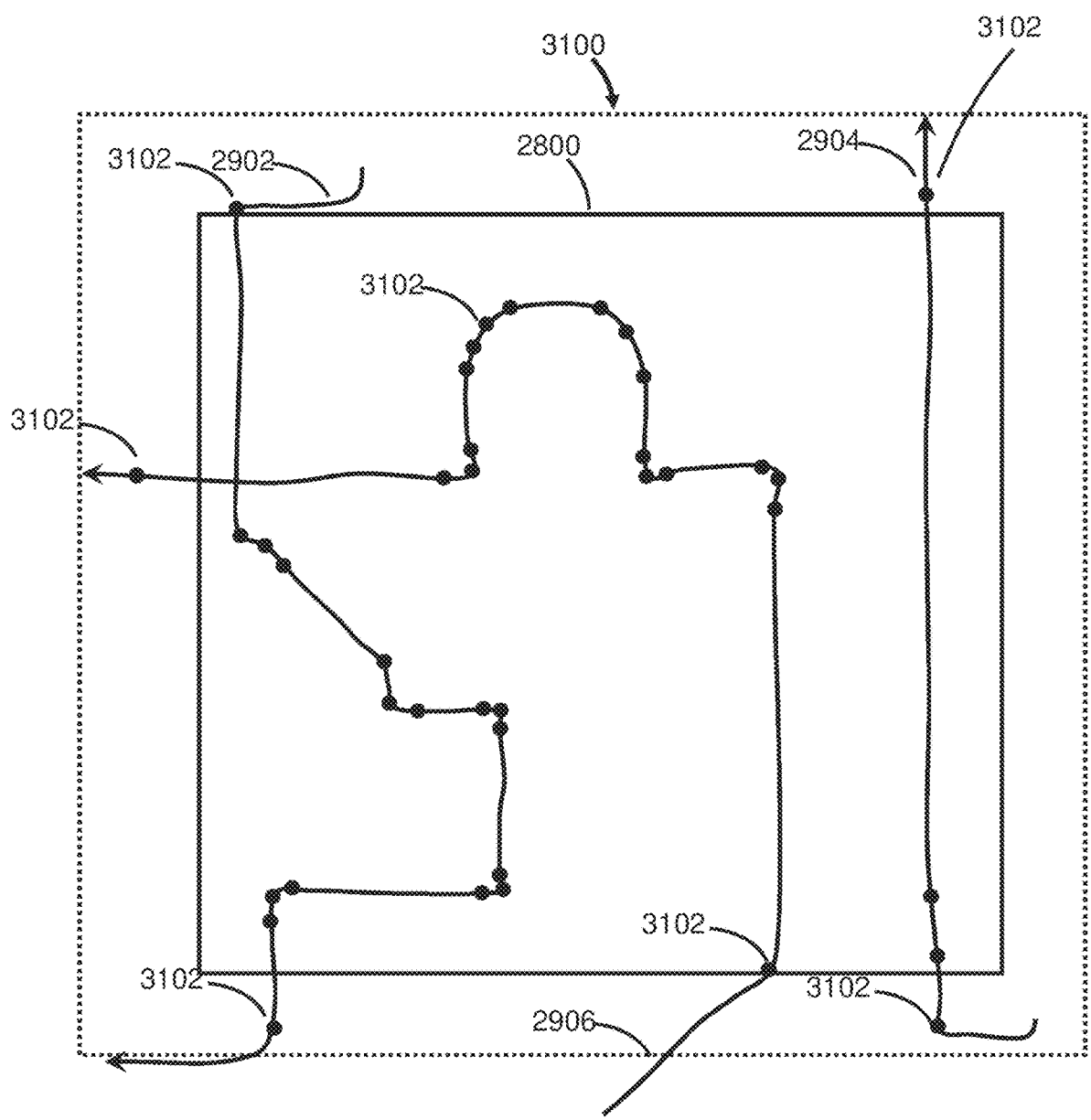
FIG. 31 is a simplified diagram of a second traffic zone, encompassing a road network zone, exemplary paths taken by three vehicles that have traversed therethrough and vehicle position-data points corresponding to the paths.

In the present example, traffic analytics system 104a defines a second traffic zone 3100 based on a predefined parameter, such as 500 m, from the boundary of road network zone 2800, as shown in FIG. 31. Second traffic zone 3100 encompasses and extends beyond the boundaries of road network zone 2800, as shown.

According to an embodiment, a second traffic zone may be defined based on a user configurable parameter. For example, a user provides input to traffic analytics system 104a, via a user interface thereof, indicating a distance from the boundary of the road network zone 2800 defining the second traffic zone 3100. Alternatively, a user provides a data file comprising data indicative of the boundary of the second traffic zone.

According to another embodiment, a second traffic zone may be user definable. For example, a data file comprising data indicative of the boundary of a second traffic zone 3100 is input to traffic analytics system 104a, via a user interface thereof. Alternatively, a data file is transmitted to traffic analytics system 104a, for example, via network interface 306. An exemplary data file includes a geospatial file (e.g., shape file (.shp), GeoJSON (.geojson)).

According to yet another embodiment, a second traffic zone may be defined based on data retrieved from a remote source. For example, traffic analytics system 104a may obtain data from a governmental agency that stores data describing boundaries of the road network area, e.g., geographic coordinates of boundaries of municipalities, communities, on a publicly accessible server, such as a server accessible via the Internet. Traffic analytics system 104a may then add a predefined buffer extending beyond the boundary of road network zone 2800 to determine the boundary of second traffic zone 3100. For example, a predefined buffer may be 2 km. In this example, traffic analytics system 104 determines the boundaries of second traffic zone 3100 to be located 2 km from the boundaries of road network zone 2800.

Block 2607

Next at block 2607, subprocess 2600 includes selecting a second subset of raw vehicle data from second historical vehicle data corresponding to the second traffic zone.

For example, traffic analytics system 104a selects a second subset of raw vehicle data from second historical vehicle data 2620 corresponding to positions within second traffic zone 3100. Referring again to FIG. 31, illustrated are vehicle position-data points 3102 representing position data of the second subset of raw vehicle data selected in block 2607 corresponding to paths 2902, 2904 and 2906 within second traffic zone 3100.

Block 2609

Next, at block 2609, subprocess 2600 includes interpolating data instances from the second subset of raw vehicle data selected in block 2607.

Figure 32:
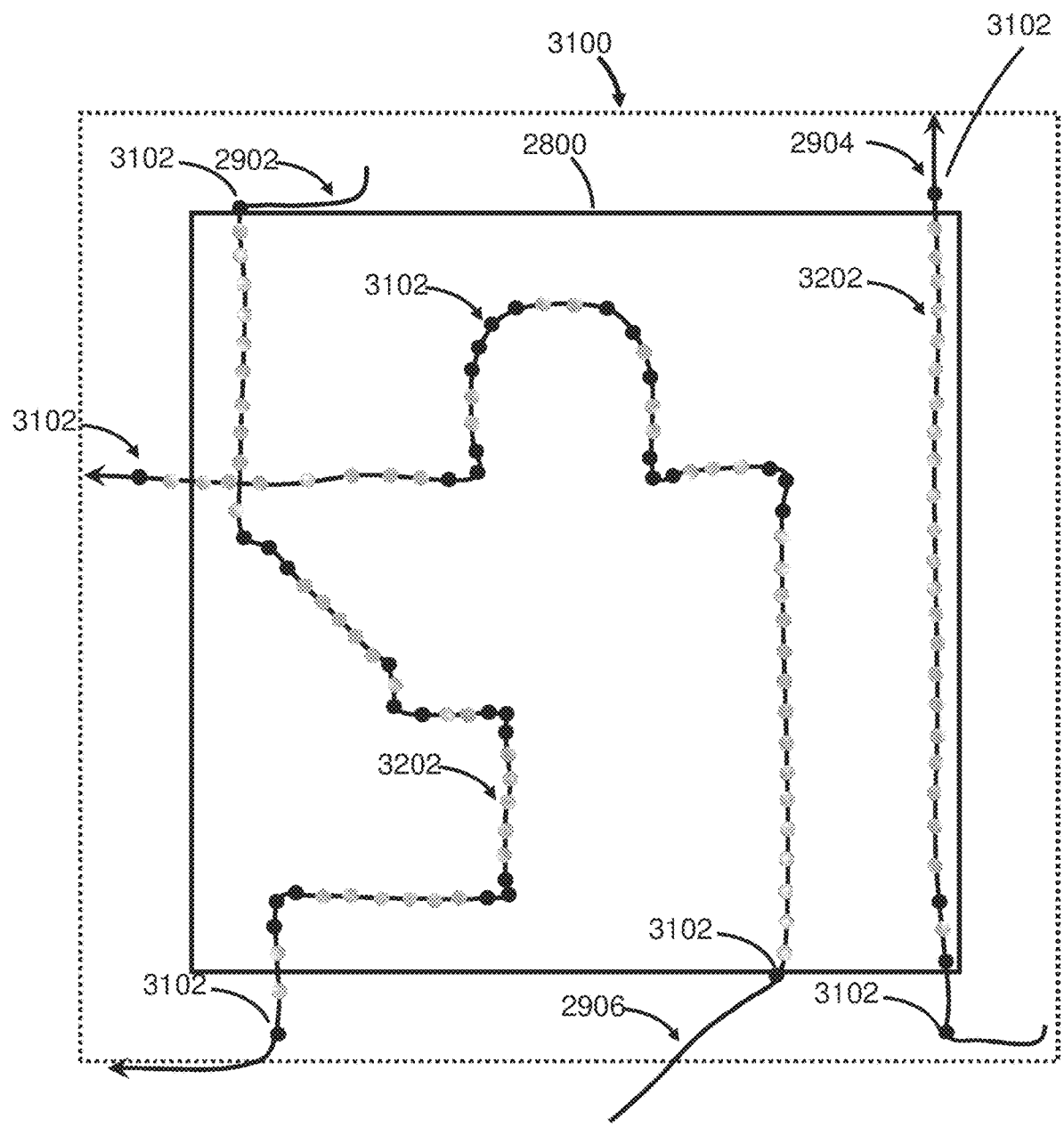
FIG. 32 is a simplified diagram of a second traffic zone, encompassing a road network zone, exemplary paths taken by three vehicles that have traversed therethrough, vehicle position-data points corresponding to the paths and interpolated vehicle position-data points.

In the present example, traffic analytics system 104a interpolates data instances from the second subset of raw vehicle data selected from second historical vehicle data 2620 corresponding to second traffic zone 3100. FIG. 32 illustrates interpolated vehicle position-data points 3202 corresponding to data instances interpolated by traffic analytics system 104a as well as vehicle position-data points 3102 representing position data of the second subset of raw vehicle data corresponding to paths 2902, 2904 and 2908 within second traffic zone 3100.

Selecting a second subset of raw vehicle data corresponding to locations within and beyond a road network zone and interpolating data therefrom may provide more vehicle operation information in comparison to a second subset of raw vehicle data corresponding solely to a road network zone.

In some instances, data instances may be interpolated in dependence on the dimensions of second subzones of a road network zone. For example, data instances may be interpolated such that there is approximately one of an interpolated instance or raw vehicle data instance corresponding to a position in each second subzone along a path of a vehicle. Alternatively, data instances may be interpolated in dependence on classifier data. For example, classifier data associated with a classifier utilized in block 2614 may indicate data instances are to be interpolated such that there is approximately one of an interpolated instance or raw vehicle data instance every 10 m along a path of a vehicle.

Optionally, at block 2607 and/or block 2609, the second subset of raw vehicle data and/or the second subset of raw data and interpolated data is pre-processed. For example, by removing outliers (e.g., unlikely speed values), duplicate values, and the like.

Optionally, a second subset of raw vehicle data selected from second historical vehicle data may be selected based on date and time vehicle operating conditions are logged. For instance, the second subset of raw vehicle data corresponds to a particular date and/or time range. For example, only raw vehicle data collected over the last 3 months is selected.

Block 2611

Next, at block 2611, subprocess 2600 includes processing second vehicle data for generating features for each of the plurality of contiguous second subzones in the road network zone. Second vehicle data includes one of, the second subset of raw vehicle data provided at block 2606, the second subset of raw vehicle data and interpolated data provided at block 2610, and the second subset of raw vehicle data and interpolated data provided at block 2609. Second vehicle data includes one or more second vehicle data instances corresponding to a second subzone (i.e., includes position data indicative of a position within a subzone.) Second vehicle data may be preprocessed by removing outliers (e.g., unlikely speed values), duplicate values, and the like.

Features for each of the plurality of second subzones of the road network zone are extracted from second vehicle data including at least one second vehicle data instance. Features of the types described herein may include features that are present in a second vehicle data instance or a subset of second vehicle data instances and/or features derived therefrom. Features present in an instance or a subset of instances may include numeric values that are explicitly set out therein. Specific and non-limiting examples of such features include a minimum or maximum numeric value in the subset (where a minimum/maximum may be absolute and/or relative). The minimum or maximum data value may require some analysis, such as a comparison of values, but the minimum/maximum value itself will be a value found within the subset. For instance, a plurality of second vehicle data instances in a subset of second vehicle data may be analyzed to determine a maximum speed of the subset.

Derived features may describe an instance or subset of second vehicle data instances, but include a value not found therein. Instead, a value of a derived feature may be derived from the instance or subset, such as obtained through performing one or more computations on the instance or subset. Specific and non-limiting examples of derived features include average speed, total number of vehicle visits and ignition ratio. Optionally, a derived feature may describe a first derived feature forming a second derivative of the first derived feature. Additional derivatives of features may also be possible.

The features may additionally or alternatively be derived from the performance of one or more statistical computations on a second vehicle data subset. For instance, a derived feature that may be employed may include standard deviation, mean, and median of values found in a second vehicle data subset. For example, standard deviation, mean, and/or median of speed values of vehicles that have traversed a second subzone. Features will be described in greater detail below.

Processing second vehicle data for generating features for each of the second subzones in road network zone at block 2611 may include generating second subzone-related features, road network zone-related features, second subzone-road network zone-related features, spatial-related features, and/or other features. Generation of features at block 2611 is described below with reference to FIG. 33 to FIG. 38A

Second Subzone-Related Features

According to an embodiment, a plurality of second subzone-related features is based on and/or derived from a subset of second vehicle data associated with each second subzone.

In a first exemplary implementation, a plurality of second subzone-related features is based on and/or derived from a first subset of second vehicle data corresponding to a position within a second subzone. In this example, second subzone-related features indicate measurements/attributes of vehicle operating conditions of at least one vehicle that has operated in the second subzone.

Figure 33:
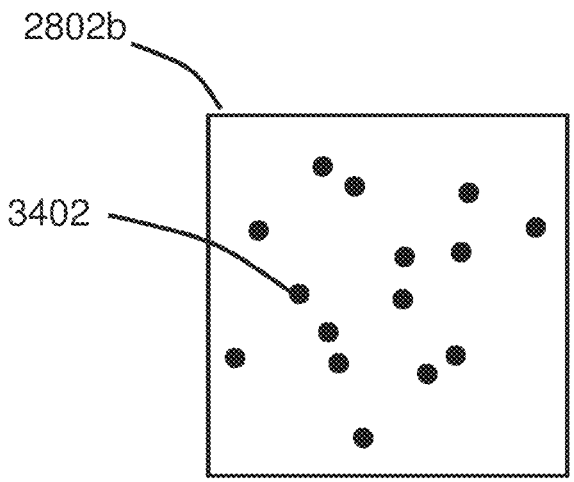
FIG. 33 is a conceptual diagram of a second subzone comprising vehicle-position data points indicative of a position of one or more vehicles that have entered the second subzone at one point in time.

For example, FIG. 33 is a conceptual diagram of second subzone 2802b of FIG. 28A. Second subzone 2802b is shown comprising vehicle-position data points 3302 each thereof indicative of a position of one or more vehicles that have entered second subzone 2802b at one point in time.

Figure 34A:
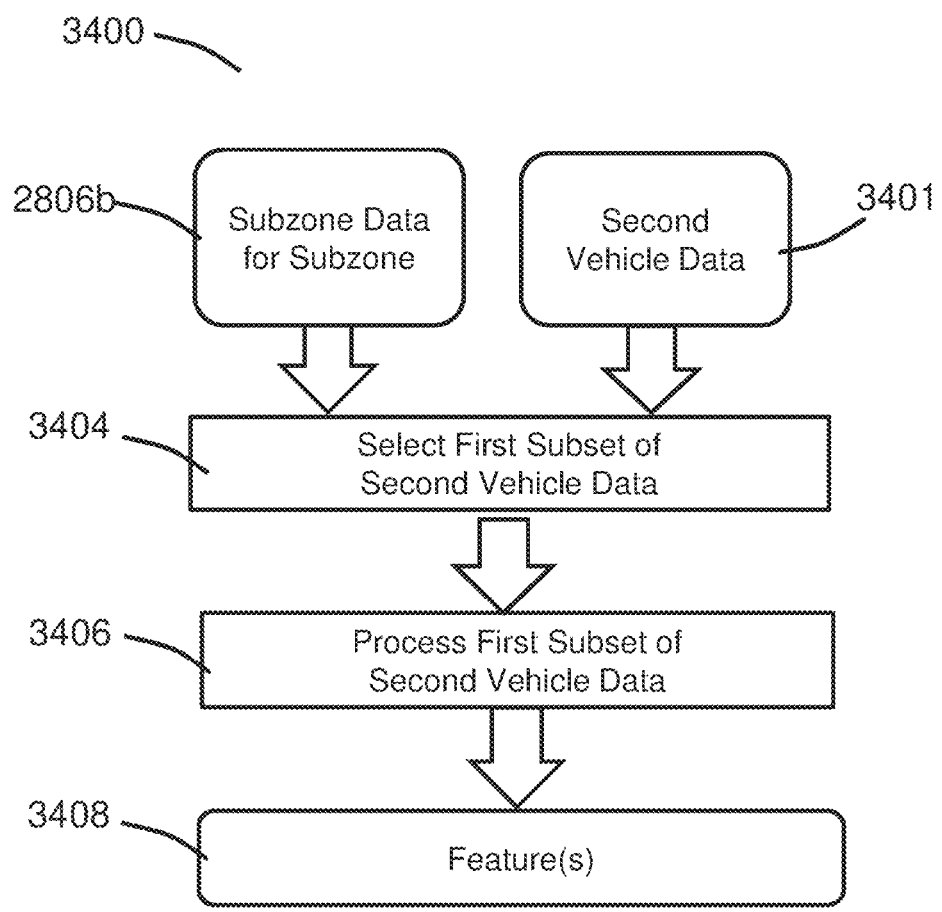
FIG. 34A is a simplified functional block diagram of an exemplary process for generating second subzone-related features for a second subzone.

Illustrated in FIG. 34A is a simplified functional block diagram of an exemplary process 3400 that may be implemented at block 2611 for generating second subzone-related features for a second subzone.

At block 3404, process 3400 includes processing second vehicle data and second subzone data corresponding to a second subzone for selecting a first subset of second vehicle data.

For example, traffic analytics system 104a provides second vehicle data, 3401, including a second subset of raw vehicle data selected from second historical vehicle data 2620 corresponding to second traffic zone 3100 and data interpolated therefrom. Next, traffic analytics system 104a processes second vehicle data 3401 and second subzone data 2806b corresponding to second subzone 2802b. Processing includes selecting a first subset of second vehicle data corresponding to second subzone 2802b. Vehicle-position data points 3302 are a conceptual representation of the first subset of second vehicle data.

At block 3406, process 3400 includes analyzing and/or performing computations on the first subset of second vehicle data to form at least one feature. For example, traffic analytics system 104a processes the first subset of second vehicle data instances to form, for example, feature 3408.

FIG. 34B shows exemplary first subset of second vehicle data 3414 corresponding to a position within second subzone 2802b. Position data 3418 of each second vehicle data instance 3416 is represented by a vehicle-position data point 3302 as shown in FIG. 33. In this example second subzone-related features formed by processing the first subset of second vehicle data are indicative of attributes/measurements of vehicle operating data of vehicles while operating in second subzone 2802b. For example, vehicles having corresponding device IDs ID1, ID2, ID3, and ID4, For descriptive purposes only 4 vehicles are shown to have entered second subzone 2802a. In practice however, the number of vehicles that may enter a second subzone may be greater or less than four.

Some specific and non-limiting examples of the second subzone-related features are provided in Table 6 below.

TABLE 6

| Second Subzone-related Features |
|---|
| Minimum vehicle speed |
| Maximum vehicle speed |
| Average vehicle speed |
| Median vehicle speed |
| Standard deviation of vehicle speed |
| Minimum ignition |
| Maximum ignition |
| Total number of ignitions on |
| Total number of ignitions off |
| Average number of ignitions |
| Ignition ratio |
| Total number of vehicle visits |
| Average number of visits/vehicle |
| Minimum number of vehicle visits/day |
| Maximum number of vehicle visits/day |
| Average number of vehicle visits/day |
| Median number of vehicle visits/day |
| Standard deviation of number of vehicle visits/day |
| Minimum unique number of vehicle visits/day |
| Maximum unique number of vehicle visits/day |
| Median unique number of vehicle visits/day |
| Standard deviation of unique number of vehicle visits/day |
| Average unique number of visits/day |
| Total number of unique vehicle visits |

Ignition state, for example ignition state 3419 in second vehicle data 3414, indicates whether a vehicle is in a driveable state or not. For example, an internal combustion engine (ICE) vehicle has an ignition state of on when the engine is on. An ICE vehicle has an ignition state of off when the engine is off, even if electrical power is provided to vehicle circuitry by the battery. In another example, an electric vehicle (EV) has an ignition state of on when electricity is provided to the EV's electric motor, whereas the ignition state is off when no electricity is provided to the EV's electric motor.

A minimum ignition feature of a second subzone has a value of 1 only when all vehicles that have entered a second subzone have an ignition state of 1. A minimum ignition feature of 1 may indicate that the vehicle way is not employed as a parking area.

A maximum ignition feature has a value of 0 only when all vehicles in a second subzone have an ignition state of off. A maximum ignition feature of 0 may indicate that the second subzone is a portion of vehicle way employed as a parking area.

The ignition ratio feature is defined as, $$\text{Ignition ratio} = \frac{\text{Total number of ignitions off}}{(\text{Total number of ignitions off}) + (\text{Total number of ignitions on})}$$

Referring now to FIG. 34C, shown is table 3420 of exemplary second subzone-related features and feature values based on the first subset of second vehicle data instances. Other second subzone-related features may be based on and/or are derived from the first subset of second vehicle data instances. Embodiments are not intended to be limited to the example features described herein.

In a second exemplary implementation, second subzone-related features may be based on and/or derived from a first subset of second vehicle data and a second subset of second vehicle data corresponding to second vehicle data temporally preceding and/or subsequent thereto for a same vehicle.

For example, traffic analytics system 104a selects a first subset of second vehicle data corresponding to second subzone 2802a. Next, traffic analytics system 104a selects a second subset of second vehicle data including second vehicle data instances temporally preceding and following second vehicle data instances corresponding to vehicles in the first subset of second vehicle data.

Figure 35:
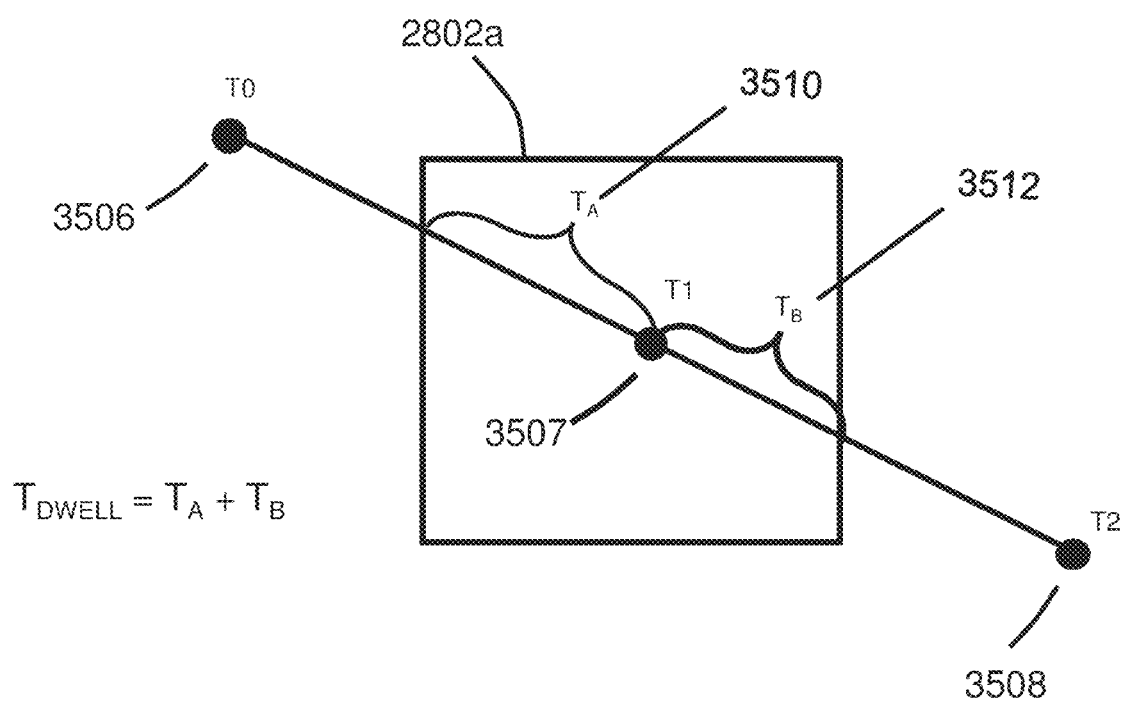
FIG. 35 is a simplified diagram of a second subzone and a vehicle-position data point representing a vehicle position at T1 according to a first subset of second vehicle data.

For instance, shown in FIG. 35 is a simplified diagram of second subzone 2802a and vehicle-position data point 3507 representing a vehicle position at T1 according to the first subset of second vehicle data. A dwell time of a vehicle within second subzone 2802a may be determined by obtaining a second subset of second vehicle data corresponding to the same vehicle at a preceding point in time, T0, and a subsequent point in time, T2, represented by vehicle-position data points 3506 and 3508 respectively. As geographic coordinates of boundaries of second subzone 2802b are known, the time TA (3510) between the time a vehicle enters second subzone 2802a and arrives at point 3507, and the time TB (3512) between the time the vehicle leaves point 3507 and exits second subzone 2802b may be determined. The dwell time, TDWELL, e.g., how long the vehicle is in a second subzone, may be calculated according to TDWELL=TA+TB. For each vehicle that enters second subzone 2802a, traffic analytics system 104a calculates a dwell time and processes the dwell time of each of the vehicles to generate features. For example, average dwell time, minimum dwell time, maximum dwell time, median dwell time and standard deviation of dwell time are based thereon or derived therefrom.

In a third exemplary implementation, second subzone-related features may be based on and/or derived from a first subset of second vehicle data and a third subset of second vehicle data corresponding to second vehicle data temporally subsequent thereto for a same vehicle. For example, second subzone-related features relate to travel time of a vehicle between a location within a second subzone and the first location at which the vehicle ignition state is off. In other words, the travel time between a position within a second subzone and a position the vehicle parks, i.e., time to park.

For example, traffic analytics system 104a selects a first subset of second vehicle data corresponding to second subzone 2802a. Next, traffic analytics system 104a selects a second subset of second vehicle data including second vehicle data instances temporally preceding second vehicle data instances corresponding to vehicles in the first subset of second vehicle data. Next, traffic analytics system 104a selects a second subset of second vehicle data corresponding to the same vehicles in the first subset on the same path travelled thereby at a later point in time.

Figures 36A, 36B:
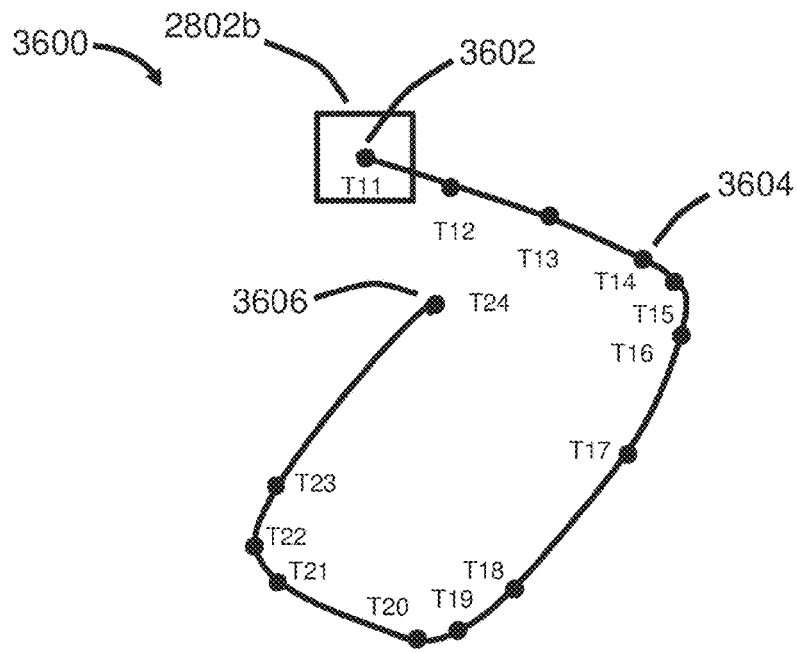
FIG. 36A is a simplified diagram of a path of a vehicle that has traversed a second subzone.
FIG. 36B is an exemplary third subset of second vehicle data corresponding to vehicle-position data points at times T11-T24.

For instance, FIG. 36A shows a simplified diagram of path 3600 of a vehicle that has traversed second subzone 2802b corresponding to the first subset of second vehicle data. Vehicle-position data point 3602 represents a position of the vehicle at T11 within second subzone 2802b. The second subset of second vehicle data includes a plurality of temporally subsequent second vehicle data instances represented by vehicle-position data points 3604 at times T11-T24 corresponding to the same vehicle. Each thereof representing a new location of the same vehicle at consecutive points in time as the vehicle travels along path 3600. Vehicle-position data point 3606 at T14 represents the first location the vehicle ignition is turned off, indicating that the car has parked.

The time to park from position 3602 to 3606 may be calculated as TIMETOPARK=T24−T11. For each vehicle that enters second subzone 2802b, traffic analytics system 104a calculates the time to park and generates second subzone-related features such as, average time to park, minimum time to park, maximum time to park, median time to park, and standard deviation of time to park.

FIG. 36B shows an exemplary third subset of second vehicle data 3610 corresponding to vehicle-position data points 3604 at times T11-T24. In some instances, a vehicle ignition is ON and the speed is 0 km/hr, such as at T19, corresponding to third subset data instance 3612. For example, a vehicle may not be moving yet the ignition is on, e.g., at red lights, stop signs, heavy traffic (stop-and-go), picking up passengers, going through a drive through, among others.

Road Network Zone-Related Features

According to an embodiment, road network zone-related features may be based on and/or derived from a fourth subset of second vehicle data instances associated with the road network zone and/or second subzone-related features. Table 7 below lists specific and non-limiting examples of such road network zone-related features. These road network zone-related features may be determined for each second subzone of a road network zone.

TABLE 7

| Road Network Zone-Related Features |
|---|
| Road Network Zone Minimum Ignition OFF |
| Road Network Zone Maximum Ignition OFF |
| Road Network Zone Average Vehicle Speed |
| Road Network Zone Maximum Vehicle Speed |
| Road Network Zone Minimum Vehicle Speed |
| Road Network Zone Average Number of Unique Visits/Day |
| Road Network Zone Minimum Number of Unique Visits/Day |

TABLE 7-continued

Road Network Zone-Related Features

Road Network Zone Maximum Number of Unique Visits/Day
Road Network Zone Average Median Number of Unique Visits/Day
Road Network Zone Total Average Number of Unique Visits/Day In a first instance, road network zone average speed may be determined by selecting a fourth subset of second vehicle data instances corresponding to a road network zone and calculating an average speed therefrom.

For example, traffic analytics system 104a selects a fourth set of second vehicle data corresponding to road network zone 2800 and processes speed data thereof for determining the average speed of a vehicle traversing road network zone 2800.

In a second instance, road network zone average speed may be determined by calculating an average of the average speed second subzone-related features of all second subzones in a road network zone.

For example, traffic analytics system 104a processes an average speed second subzone-related feature associated with each second subzone 2802 of road network zone 2800 for determining an average speed thereof.

According to an embodiment, other road network zone-related features may be based on and/or derived from a fifth subset of second vehicle data instances associated with the road network zone. Table 8 lists specific and non-limiting examples of such road network zone-related features. These road network zone-related features may be determined for each second subzone of the road network zone.

TABLE 8

Road Network Zone-Related Features

Road Network Zone Total Number of Visits
Road Network Zone Total Number of Unique Visits In an exemplary implementation, 'road network zone total number of visits' feature may be determined by selecting a fifth subset of second vehicle data instances corresponding to a road network zone and calculating the total number of vehicles that correspond to the road network zone.

For example, traffic analytics system 104a selects a fifth subset of second vehicle data instances corresponding to road network zone 2800 and processes the fifth subset for determining the total number of vehicles that have traversed therethrough.

According to an embodiment, other road network zone-related features may be based on and/or derived from another portion of second subzone-related features. Table 9 lists specific and non-limiting examples of such road network zone-related features. These road network zone-related features may be determined for each second subzone of the road network zone.

TABLE 9

Road Network Zone-Related Features

Road Network Zone Average Time to Park
Road Network Zone Maximum Time to Park
Road Network Zone Minimum Time to Park
Road Network Zone Maximum Dwell Time
Road Network Zone Minimum Dwell Time
Road Network Zone Median Dwell Time
Road Network Zone Average Dwell Time TABLE 9-continued Road Network Zone-Related Features Road Network Zone Minimum Number of Unique Visits
Road Network Zone Average Number of Unique Visits
Road Network Zone Maximum Number of Unique Visits
Road Network Zone Average Total Number of Visits
Road Network Zone Maximum Total Number of Visits
Road Network Zone Minimum Total Number of Visits For instance, 'road network zone average dwell time' feature may be determined by calculating an average of the average dwell time second subzone-related features of all second subzones in a road network zone.

For example, traffic analytics system 104a processes an average dwell time second subzone-related feature associated with each second subzone 2802 of road network zone 2800 for determining an average dwell time for road network zone 2800.

Second Subzone-Road Network Zone-Related Features

According to an embodiment, second subzone-road network zone-related features may be based on and/or derived from a portion of second subzone-related features in relationship to a portion of road network zone-related features. Such relationship-based second subzone-road network zone-related features are determined for each second subzone of the road network zone.

Specific and non-limiting examples of relationship-based features are listed in Table 10 below.

TABLE 10

Second Subzone-Road Network Zone-Related Features (SSRNZR)

SSRNZR Minimum Vehicle Speed Ratio
SSRNZR Average Vehicle Speed Ratio
SSRNZR Maximum Vehicle Speed Ratio
SSRNZR Minimum Ignition Off Ratio
SSRNZR Maximum Ignition Off Ratio
SSRNZR Maximum Dwell Time Ratio
SSRNZR Minimum Dwell Time Ratio
SSRNZR Average Median Dwell Time Ratio
SSRNZR Average Dwell Time Ratio
SSRNZR Minimum Time to Park Ratio
SSRNZR Average Time to Park Ratio
SSRNZR Maximum Time to Park Ratio
SSRNZR Minimum Number of Unique Vehicle Visits Ratio
SSRNZR Maximum Number of Unique Vehicle Visits Ratio
SSRNZR Average Number of Unique Vehicle Visits Ratio
SSRNZR Minimum Unique Number of Vehicle Visits/Day Ratio
SSRNZR Maximum Unique Number of Vehicle Visits/Day Ratio
SSRNZR Average Unique Number of Vehicle Visits/Day Ratio
SSRNZR Total Unique Number of Vehicle Visits/Day Ratio
SSRNZR Average Median Unique Number of Vehicle Visits/Day Ratio
SSRNZR Minimum Total Number of Vehicle Visits Ratio
SSRNZR Maximum Total Number of Vehicle Visits Ratio
SSRNZR Average Total Number of Vehicle Visits Ratio
SSRNZR Total Number of Vehicle Unique Visits Ratio
SSRNZR Total Number of Vehicle Visits Ratio For instance, second subzone-road network zone-related feature average speed ratio may be determined by calculating the ratio of second subzone-related feature average speed to road network zone-related feature, road network zone average speed.

For example, traffic analytics system 104a processes second subzone-related feature average speed for road network zone 2800 and road network zone-related feature average speed road network zone 2800 for determining a ratio thereof for generating a road network zone average speed for road network zone 2800.

Spatial-Related Features

According to an embodiment, spatial-related features may be based on and/or derived from spatial relationship data of a second subzone to the road network zone. According to an embodiment, spatial-related features may be based on and/or derived from a spatial relationship data of a second subzone to the plurality of second subzones, or a portion thereof, of a road network zone.

For instance, for each second subzone, a feature may be based on and/or derived from a number of adjacent second subzones adjacent thereto (e.g., the number of neighbours thereof).

Figure 37A:
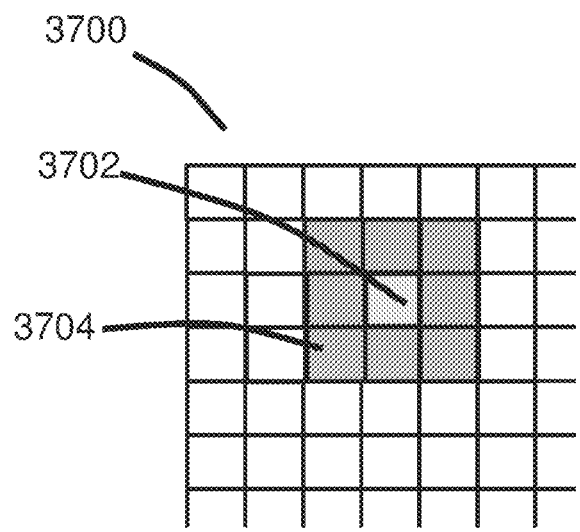
FIG. 37A is a conceptual diagram of a portion of a road network zone.
Figure 37B:
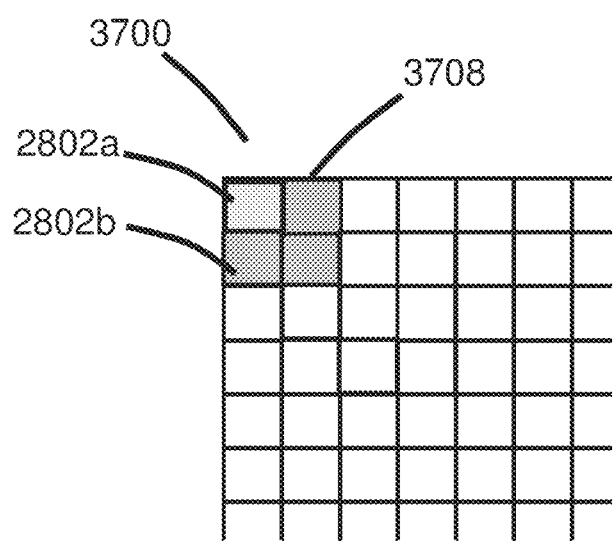
FIG. 37B is another conceptual diagram of a portion of a road network zone.

Shown in FIG. 37A is a conceptual diagram of a portion 3700 of road network zone 2800 indicated by A-A in FIG. 28A. Portion 3700 includes second subzone 3702 having 8 neighbours, second subzones 3704. FIG. 37B is also a conceptual diagram of the same portion 3700 of road network zone 2800 including second subzone 2802a having 4 neighbours, second subzone 2802b and second subzones 3708.

For example, traffic analytics system 104a processes second subzone data 2806 and implements a Geohash neighbours function, such as function 1114, for determining the number of neighbours of each second subzone 2802 of road network zone 2800 that are present therein. For instance, traffic analytics system 104a determines the value of the number of neighbours feature of second subzone 3702 is 8 and second subzone 2802a is 4. Alternatively, spatial-related features for second subzones 3702 and 2802a may have values derived from a number of neighbours feature.

In another instance, for each second subzone, a spatial-related feature may be based on and/or derived from the number of neighbours of the second subzone (e.g., number of Geohash neighbours) having second vehicle data corresponding to a location therein.

FIG. 37A shows second subzone 3702 having 8 neighbours, second subzones 3702. If no second vehicle data corresponds to 3 of those neighbours, the value of the feature is 5. In other words, if vehicles did not enter 3 of the 8 second subzones, the number of neighbours having second vehicle data corresponding to a location therein is 5.

For example, traffic analytics system 104a processes second subzone data 2806 and implements a Geohash neighbours function, such as function 1114, for determining neighbours of second subzone 3702 of road network zone 2800. Next, traffic analytics system 104a processes second vehicle data corresponding to each of the neighbours of second subzone 3702 for determining how many thereof have vehicles traversed.

Spatial-related features are determined for each second subzone of the plurality of second subzones for a road network zone. Specific and non-limiting examples of other spatial-related features include features derived from proximity of a second subzone from a traffic light, particular business, and pedestrian area. Example features are not intended to limit embodiments to the features described herein.

FIG. 38A shows a conceptual diagram of exemplary features 3800 generated for a second subzone 2802, such as second subzone 2802b.

According to some embodiments, features generated at block 2611 are generated based on classifier data. For instance, classifier data may define features needed to ensure accurate classification of second subzones by a classifier.
Block 2612

Next, at block 2612, subprocess 2600 includes generating unlabeled data including features generated for each of the plurality of second subzones of the road network zone.

For example, shown in FIG. 38B is a conceptual diagram of exemplary unlabeled data 3802 generated by traffic analytics system 104a. Each instance thereof includes features corresponding to one of each of the plurality of second subzones 2802 in road network zone 2800. For example, unlabeled data instance 3802a includes features corresponding to second subzone 2802a, unlabeled data instance 3802b includes to features corresponding to second subzone 2802b, and so on.
Block 2614

Next, at block 2614, subprocess 2600 includes processing the unlabeled data by a classifier including providing unlabeled data to the classifier for classifying each of the plurality of second subzones of the road network zone as one of a portion of a vehicle way and not a portion of a vehicle way and generating classification data indicative thereof.

Figures 39A, 39B:
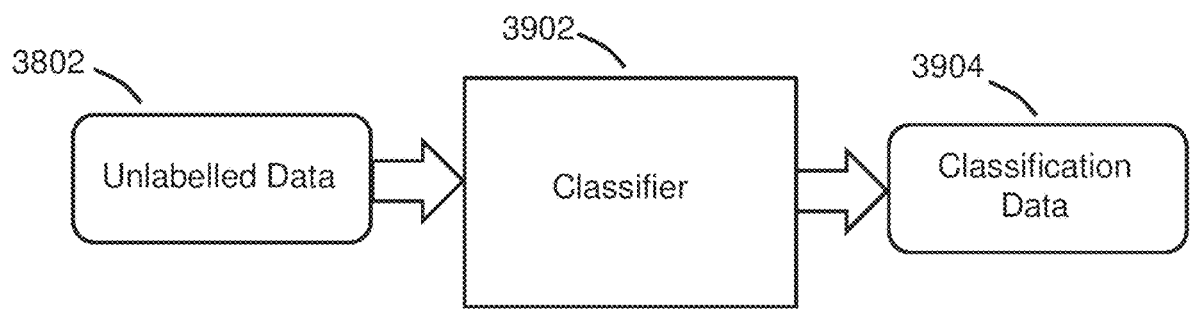
FIG. 39A is a conceptual block diagram of a classifier receiving unlabelled data and providing classification data.
FIG. 39B is a conceptual diagram of exemplary classification data illustrating each second subzone has been assigned a label, i.e., 1 or 0, indicating whether the area corresponding to a second subzone is a portion of a vehicle way, or not a portion of a vehicle way.

For example, traffic analytics system 104a implements a classifier 3902 shown in FIG. 39A and provides unlabeled data 3802 thereto. Classifier 3902 classifies each subzone 2802 and provides classification data 3904 indicating the classification of each second subzone 2802 of road network zone 2800. FIG. 39B is a conceptual diagram of exemplary classification data 3904 illustrating each second subzone 2802 has been assigned a label 3908, i.e., 1 or 0, indicating whether the area corresponding to a second subzone 2802 is a portion of a vehicle way, or not a portion of a vehicle way, respectively. Conceptual diagrams of unlabeled data 3802 and classification data 3904 are provided for example purposes only and embodiments are not intended to be limited to the examples described herein.

Figure 40A:
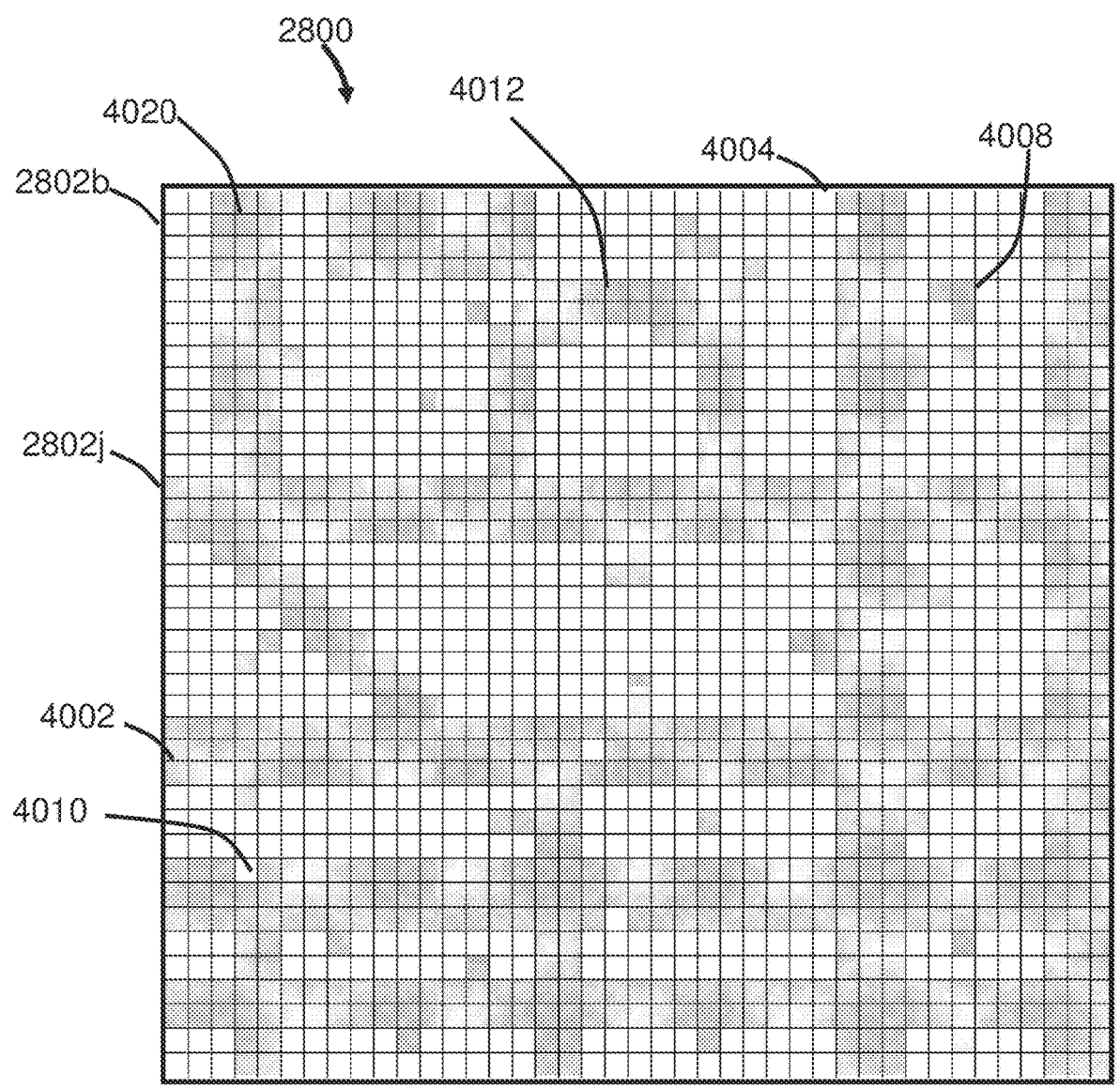
FIG. 40A is a diagram of a road network zone illustrating second subzones labelled as a portion of a vehicle way shaded grey.

Now referring to FIG. 40A, shown is another diagram of road network zone 2800 illustrating second subzones 2802 labelled as a portion of a vehicle way shaded grey. For instance, second subzone 2802b is labelled as not a portion of a vehicle way and appears white, whereas second subzone 2802j is labelled as a vehicle way and is shaded grey. Parts of a road network are visually identifiable in FIG. 40A, such as, cross streets 4002 and 4004, and crescent 4012, among others. An aggregation of the plurality of second subzones 2802 labelled as a portion of vehicle way indicates a location of road network 4020.
Block 2616

Finally, at block 2616, subprocess 2600 includes defining the road network.

According to one embodiment, defining the road network includes processing classification data for determining each of the plurality of second subzones of a road network zone labelled as a portion of a vehicle way, and providing data indicative thereof.

For example, traffic analytics system 104a processes classification data 3904 and generates data indicative of each Geohash labelled as a portion of a vehicle way. Such data indicates the plurality of Geohashes that defines road network 4020 representing the geographic location of road network 4020.

According to another embodiment, defining the road network includes processing classification data for determining geographic boundaries of the road network and generating data representative thereof. A road network may be defined by a geospatial file (e.g., shape file (.shp), GeoJSON (.geojson)), or other file format, indicating geographical coordinates of boundaries delineating roads forming the road network. Alternatively, a road network may be defined in another data format.

For example, traffic analytics system 104a processes classification data 3904 by converting each of the plurality of Geohashes that defines road network 4020 (i.e., Geohashes classified as a portion of a vehicle way) into a plurality of polygons. For instance, traffic analytics system 104a converts each Geohash having a label '1' into a first GeoJSON file, each representing a polygon, for forming a plurality of first GeoJSON files. Alternatively, traffic analytics system 104a converts each Geohash having a label '1' into a single first GeoJSON file representing a plurality of polygons. Geohashes may be converted, for example, into one or more first GeoJSON files via a Geohash to GeoJSON converter.

Figure 40B:
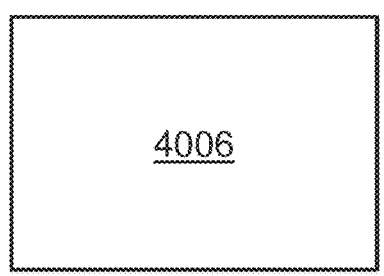
FIG. 40B is a conceptual diagram of a GeoJSON file indicating geographical boundaries of a road network.
Figure 40C:
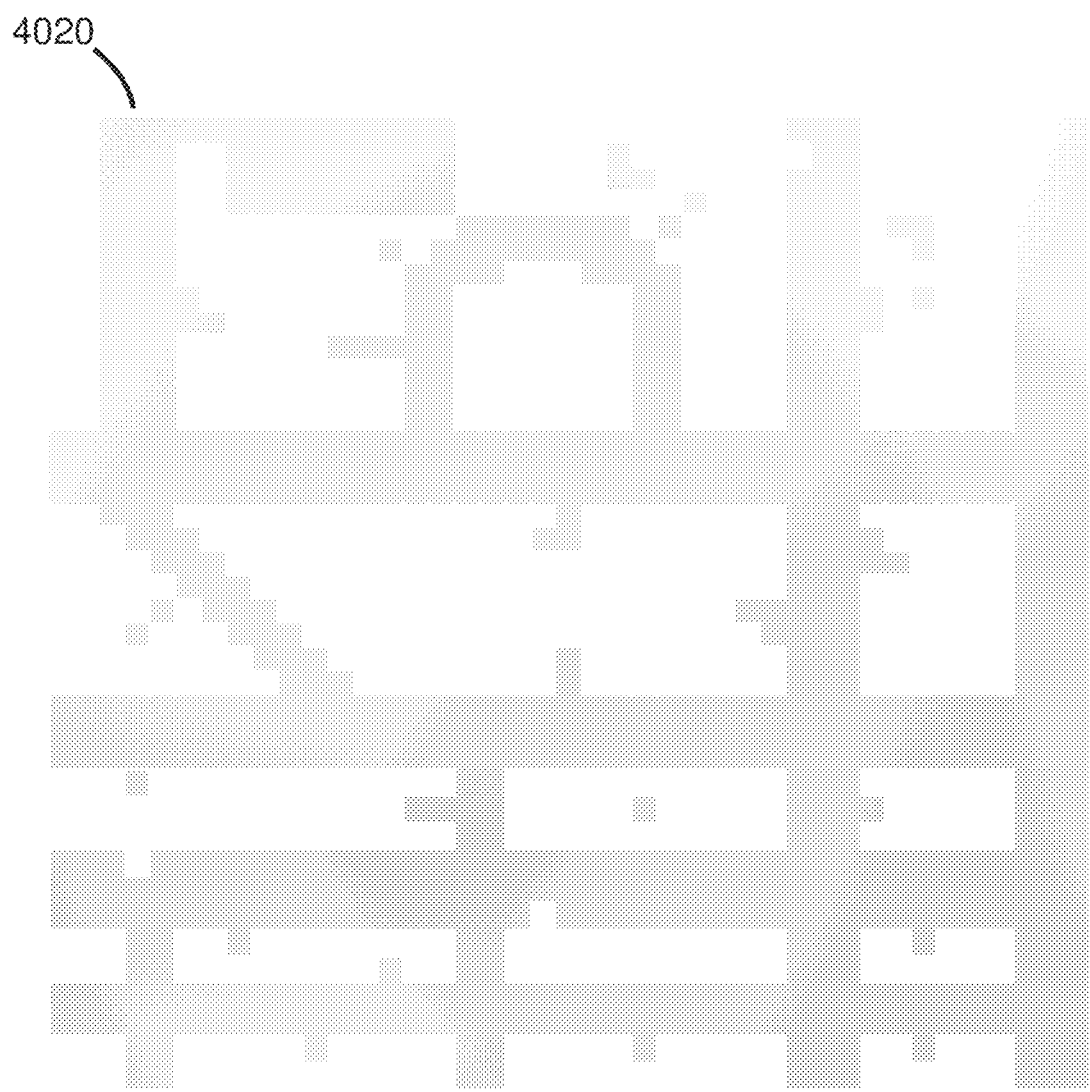
FIG. 40C is a conceptual diagram of road network indicative of a GeoJSON file.

Next, traffic analytics system 104a aggregates the plurality of polygons represented by each of the first GeoJSON files to form a second GeoJSON file. For example, traffic analytics system 104a may process the plurality of first GeoJSON files with a postGIS ST_UNION function that provides the geometry of the union of each of the plurality of polygons to form a second GeoJSON file 4006, shown in FIG. 40B. Alternatively, a single GeoSJON file representing a plurality of polygons is processed with a postGIS ST_UNION function for forming a second GeoJSON file. Second GeoJSON file 4006 indicates geographical boundaries of road network 4020. An exemplary conceptual diagram of road network 4020 indicated by second GeoJSON file 4006 is shown in FIG. 40C.

One of ordinary skill in the art will appreciate that there are various techniques for defining data indicative of geographical coordinates of boundaries of a road network.

Classification of second subzones as either a portion of a vehicle way, e.g., 1, or not a portion of a vehicle way, e.g., 0, may result in some second subzones to be classified as a false positive or false negative. For instance, referring again to road network zone 2800 in FIG. 40A, shown are incorrectly classified second subzones 4008, i.e., false positives, and second subzones 4010, i.e., false negatives. Mislabeling/incorrect classification of second subzones may be attributed to inaccuracy of the classifier used for classifying second subzones. Another factor that may contribute to mislabeling of a second subzone is that the second subzone is on the borderline of the decision boundary of the classifier. Furthermore, inaccurate position data due to GPS error may also cause incorrect classification of second subzones. One of ordinary skill in the art will appreciate that mislabeling of a second subzone may be caused by other factors.

Process 4100

Figure 41:
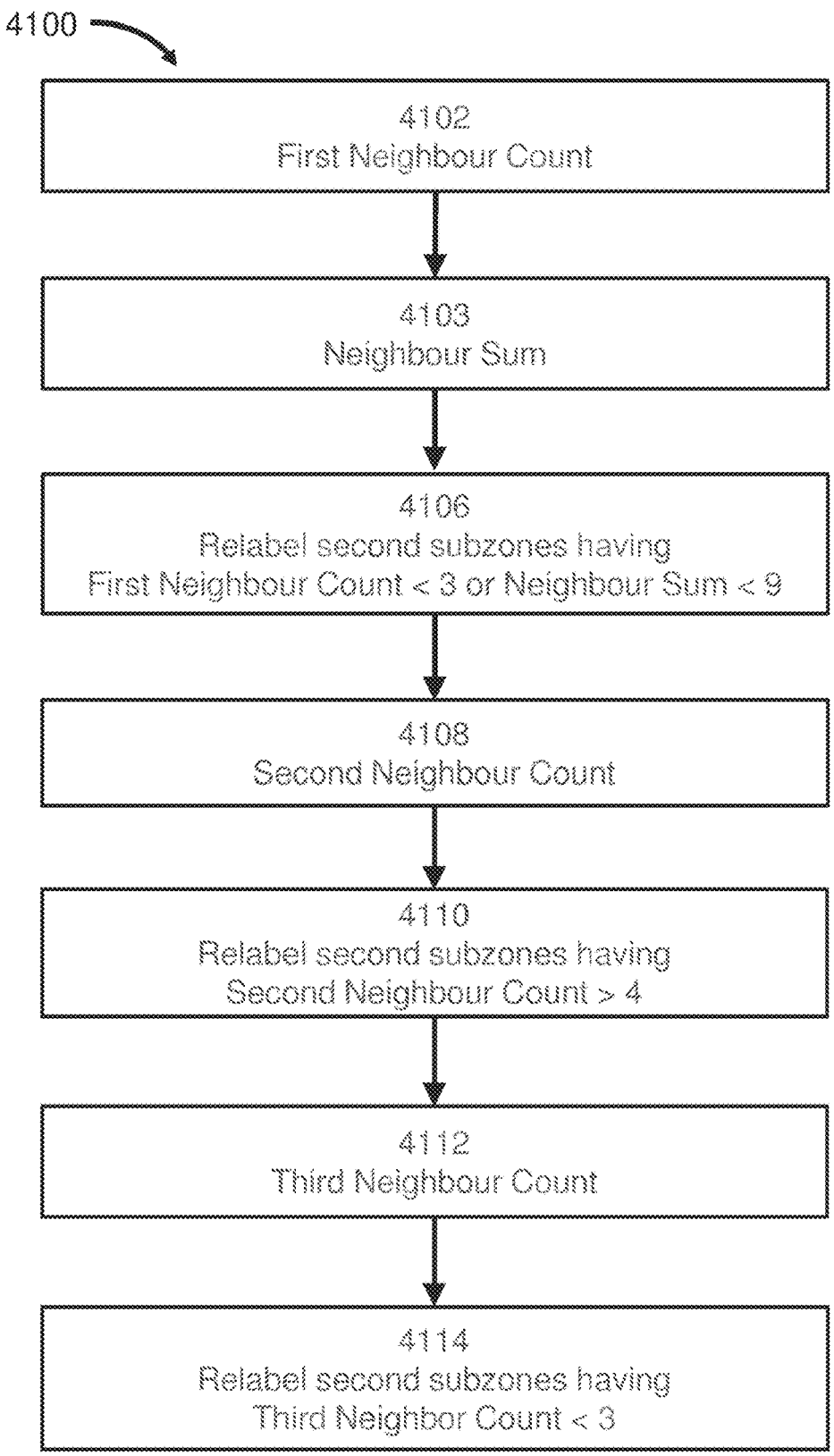
FIG. 41 is a flow diagram of a process for relabelling second subzones of a road network that have been incorrectly classified by a classifier.

Shown in FIG. 41 is a flow diagram of a process 4100 for relabeling second subzones of a road network zone that have been incorrectly classified by a classifier. Process 4100 is described in greater detail below with reference to FIGS. 42A-42J.

FIGS. 42A, 42D, 42E, 42G, and 42I include conceptual diagrams of a simplified road network zone 4202 comprising second subzones 4203 associated with an exemplary road network. In this example second subzones 4203 are in the form of Geohashes. A road network zone comprising 20 second subzones is described in this example for explanation purposes only and embodiments are not intended to be limited to the examples described herein. In practise, a road network zone may comprise any number of second subzones, e.g., hundreds, thousands, millions, and billions.

FIG. 42B shows exemplary classification data 4212 indicating a second subzone ID 4213 for each geohash 4203 in road network zone 4202 and a label/classification 4214 thereof. Each second subzone ID 4213 corresponds to a Geohash string of that particular Geohash. For instance, second subzone ID 4213a corresponds to Geohash string 'GeohashString_a' for Geohash 4203a, second subzone ID 4213b corresponds to Geohash string 'GeohashString_b' for Geohash 2802b, and so on. A label/classification 4214 of each second subzone 4203 of road network zone 4202 is indicated by the shade thereof, as shown in FIG. 42A. For example, second subzone 4203b is shaded grey indicating a classification of a portion of a vehicle way, e.g., 1, whereas second subzone 4203a is not shaded grey (i.e., white) indicating a classification of not a portion of a vehicle way, e.g., 0.

Block 4102

Beginning at block 4102, process 4100 includes determining the number of second subzone neighbours labelled as a portion of a vehicle way for each second subzone in a road network zone, to form a first neighbour count.

Figure 42C:
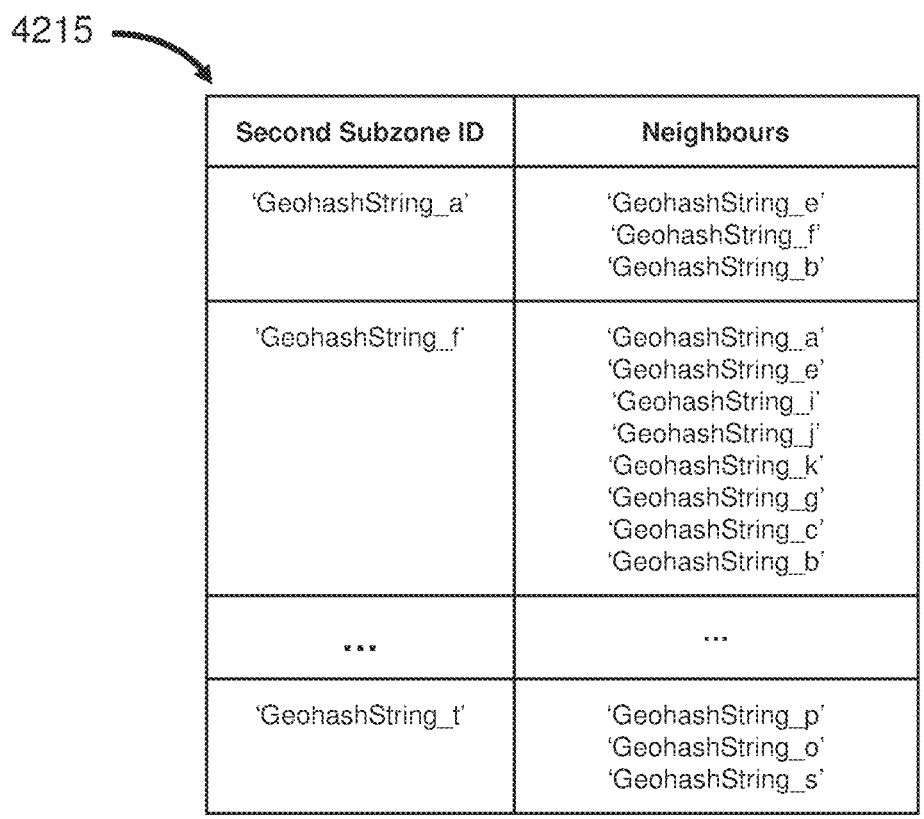
FIG. 42C is exemplary neighbour data indicating neighbours of each Geohash in a road network zone.

For instance, traffic analytics system 104a first determines the neighbours of each second subzone 4203 in road network zone 4202, for example, by inputting a Geohash string associated with each second subzone 4203 of road network zone 4202 into a Geohash neighbours function. An exemplary Geohash neighbours function is function 1114 described with respect to FIG. 11E. For example, neighbours of second subzone 4203a, having a second subzone ID corresponding to Geohash string 'GeohashString_a', include second subzones 4203e, 4203f and 4203b having second subzone IDs corresponding to GeohashString_e', GeohashString_f, and 'GeohashString_b'. Traffic analytics system 104a generates neighbour data 4215 indicating neighbours of each Geohash 4203 in road network zone 4202, as shown in FIG. 42C.

Next, traffic analytics system 104a processes classification data 4212 and neighbours data 4215 associated with each second subzone 4203 labelled as a portion of a vehicle way for generating first neighbour count data. For example, second subzone 4203b has 1 second subzone neighbour, second subzone 4203g, labelled as a portion of a vehicle way, and thus has a first neighbour count of 1. A first neighbour count indicative of first neighbour count data for each second subzone 4203 of road network zone 4202 is indicated in FIG. 42D within the respective second subzone. For instance, second subzone 4203b has a first neighbour count of 1 and second subzone 4203g has a first neighbour count of 3, as shown.

Block 4103

Next, at block 4103, process 4100 includes summing first neighbour counts of second subzone neighbours labelled as a portion of a vehicle way, for each second subzone labelled as a portion of a vehicle way of a road network zone, to form a neighbour sum.

For example, traffic analytics system 104a processes first neighbour count data for each of second subzones 4203 to form neighbour sum data for each thereof. For example, second subzone 4203b has one second subzone neighbour labelled as a portion of a vehicle way, second subzone 4204g, having a first neighbour count of 3. The sum of first neighbour counts of second subzone 4203b is 3. Traffic analytics system 104a forms neighbour sum data indicative of a neighbour sum, 3, for second subzone 4203b. In another example, second subzone 4203g has 3 second subzone neighbours labelled as a portion of a vehicle way, second subzone 4204b, second subzone 4204j, and second subzone 4204l, each having a first neighbour count of 1, 3 and 3 respectively. The sum of first neighbour counts of second subzone 4203g is a neighbour sum of 7 (i.e., 1+3+3). Traffic analytics system 104a forms neighbour sum data indicative of a neighbour sum 7 for second subzone 4203g. A neighbour sum indicative of neighbour sum data for each second subzone 4203 is indicated in FIG. 42E within a respective second subzone.

Block 4106

At block 4106, process 4100 includes, for each second subzone labelled as a portion of a vehicle way in a road network zone having one of a corresponding first neighbour count less than 3 or a neighbour sum less than 9, relabeling the second subzone as not a portion of a vehicle way.

For example, for each second subzone 4203 in road network zone 4202 labelled as a portion of a vehicle way, traffic analytics system 104*a* processes associated first neighbour count data and associated neighbour sum data to determine whether the first neighbour count is less than 3 and/or the neighbour sum is less than 9. If an associated first neighbour count is less than 3 and/or associated neighbour sum data is less than 9, traffic analytics system 104*a* modifies the label corresponding thereto indicating that the second subzone 4203 is not a portion of a vehicle way.

For instance, first neighbour count for second subzone 4203*b* is 1, as indicated in FIG. 42D, which is less than 3. As such, traffic analytics system 104*a* changes the label associated with second subzone 4203*b* from 1 to 0. Alternatively, neighbour sum for second subzone 4203*b* is 3, as indicated in FIG. 42E, which is less than 9. As such, traffic analytics system 104*a* would also change the label associated with second subzone 4203*b*, from 1 to 0.

In another instance, first neighbour count for second subzone 4203*g* is 3, as indicated in FIG. 42D, which is not less than 3. As such, traffic analytics system 104*a* does not change the label associated with second subzone 4203*g* from 1 to 0. However, neighbour sum for second subzone 4204*g* is 7, as indicated in FIG. 42E, which is less than 9. As such, traffic analytics system 104*a* changes the label associated with second subzone 4203*g*, from 1 to 0.

Traffic analytics system 104*a* modifies classification data 4212 to form classification data 4212' shown in FIG. 42F. Classification data 4212' is indicative of a present label of each second subzone 4203 of road network zone 4202. Classification of each second subzone 4203 of road network zone 4202 based on classification data 4212' is indicated in FIG. 42G. For example, in FIG. 42G second subzones 4302*b* and 4203*g* are white whereas in FIG. 42E second subzones 4302*b* and 4203*g* are shaded grey.

Block 408

Next at block 4108, process 4100 includes determining a number of second subzone neighbours labelled as a portion of a vehicle way for each second subzone labelled not a portion of a vehicle way, for forming a second neighbour count for each thereof.

For instance, traffic analytics system 104*a* processes classification data 4212' and neighbours data 4215 associated with each second subzone 4203 labelled as not portion of a vehicle way for generating second neighbour count data. For example, referring again to FIG. 42G, traffic analytics system 104*a* determines second subzone 4203*g* has 2 second subzone neighbours labelled as a portion of a vehicle way, second subzones 4203*j* and 4203*l* and forms second neighbour count data indicative of a second neighbour count of 2. In another example, traffic analytics system 104*a* determines second subzone 4203*k* has 5 second subzone neighbours, labelled as a portion of a vehicle way, second subzones 4203*j*, 4203*l*, 4203*n*, 4203*o* and 4203*p*, and forms second neighbour count data indicative of a second neighbour count of 5. Traffic analytics system 104*a* forms second neighbour count data indicative of second neighbour counts for each second subzone 4203. A second neighbour count for each second subzone 4203 of road network zone 4202 is indicated in FIG. 42G within a respective second subzone, as shown.

Block 4110

Next, at block 4110, process 4100 includes relabeling each second subzone classified as not a portion of a vehicle way having a second neighbour count greater than 4 as a portion of a vehicle way.

For example, traffic analytics system 104*a* processes second neighbour count data for each second subzone 4203 of road network zone 4202 to determine whether a second neighbour count is greater than 4. In this example, second subzone 4203*k* has a second neighbour count of 5, which is greater than 4. As such traffic analytics system 104*a* modifies classification data 4212' by changing the label of second subzone 4203*k* from 0 to 1. All other second subzones 4203 in road network zone 4202 have a second neighbour count which is not greater than 4.

Next, traffic analytics system 104*a* modifies classification data 4212' to form classification data 4212" shown in FIG. 42H indicative of a present label of each second subzone 4203 of road network zone 4202. Classification of second subzones 4203 of road network zone 4202 based on classification data 4212" is indicated in FIG. 42I. For example, second subzone 4303*k* is no longer white and is shaded grey.

Block 4112

At block 4112, process 4100 includes counting the number of second subzone neighbours labelled as a portion of a vehicle way for each second subzone labelled as a portion of a vehicle way to form a third neighbour count for each thereof.

For example, traffic analytics system 104*a* processes classification data 4212" of each second subzone 4203 of road network zone 4202 and neighbour data 4215. Processing includes, for each second subzone 4203 labelled as a portion of a vehicle way, determining the number of second subzone neighbours thereof also labelled as a portion of a vehicle way, to form third neighbour count data. For instance, second subzone 4203*j* has 3 second subzone neighbours labelled as a portion of a vehicle way, second subzones 4203*m*, 4203*o*, 4203*k*, and thus has a third neighbour count of 3. Traffic analytics system 104*a* forms third neighbour count data indicative of a third neighbour count for each second subzone 4203 in road network zone 4202. A third neighbour count for each second subzone 4203 is indicated in FIG. 42I within a respective second subzone.

Block 4114

Finally, at block 4114, process 4100 includes, for each second subzone labelled as a portion of a vehicle way having a third neighbour count less than 3, relabeling the second subzone as not a portion of a vehicle way for modifying the classification data.

For example, traffic analytics system 104*a* processes third neighbour count data for each second subzone 4203 of road network zone 4202 labelled as a portion of a vehicle way for determining whether a second subzone 4203 has a third neighbour count less than 3. In this example, each of second subzones 4203 of road network zone 4202 has a third neighbour count 3 or greater. As such traffic analytics system 104*a* does not relabel any second subzone 4203 as not a portion of a vehicle way.

In the present example, none of the second subzones 4203 labelled as a portion of a vehicle way have a third neighbour count less than 3, as shown in FIG. 42I. As such, traffic analytics system 104*a* does not relabel any of the second subzones as not a portion of a vehicle way. However, if a second subzone currently labelled as a portion of a vehicle way has a third neighbour count of less than 3, that second subzone would be relabeled as not a portion of a vehicle way.

Next, traffic analytics system 104a modifies classification data 4212" to form classification data 4212''' shown in FIG. 42J indicative of a present label of each second subzone 4203 of road network zone 4202. In this example, classification data 4212''' is the same as classification data 4212" as no second subzone labels were modified by traffic analytics system 104a at block 4114.

According to an embodiment, subprocess 2600 may proceed to block 2615 prior to block 2616 wherein subprocess 2600 includes relabeling/reclassifying second subzones that were incorrectly classified at block 2614 and modifying the classification data to indicate the present classification thereof. For instance, process 4100 may be implemented at block 2615 for relabeling second subzones of a road network zone that have been incorrectly classified at block 2614.

For example, traffic analytics system 104a implements process 4100 at block 2615 including processing classification data 3904 at block 4102 and modifying classification data 4212''' to form classified data 4300 at block 4144, as shown in FIG. 43.

Once second subzones have been relabeled at block 2615, subprocess 2600 proceeds to block 2616 including defining the road network based on the classification data.

Figure 44A:
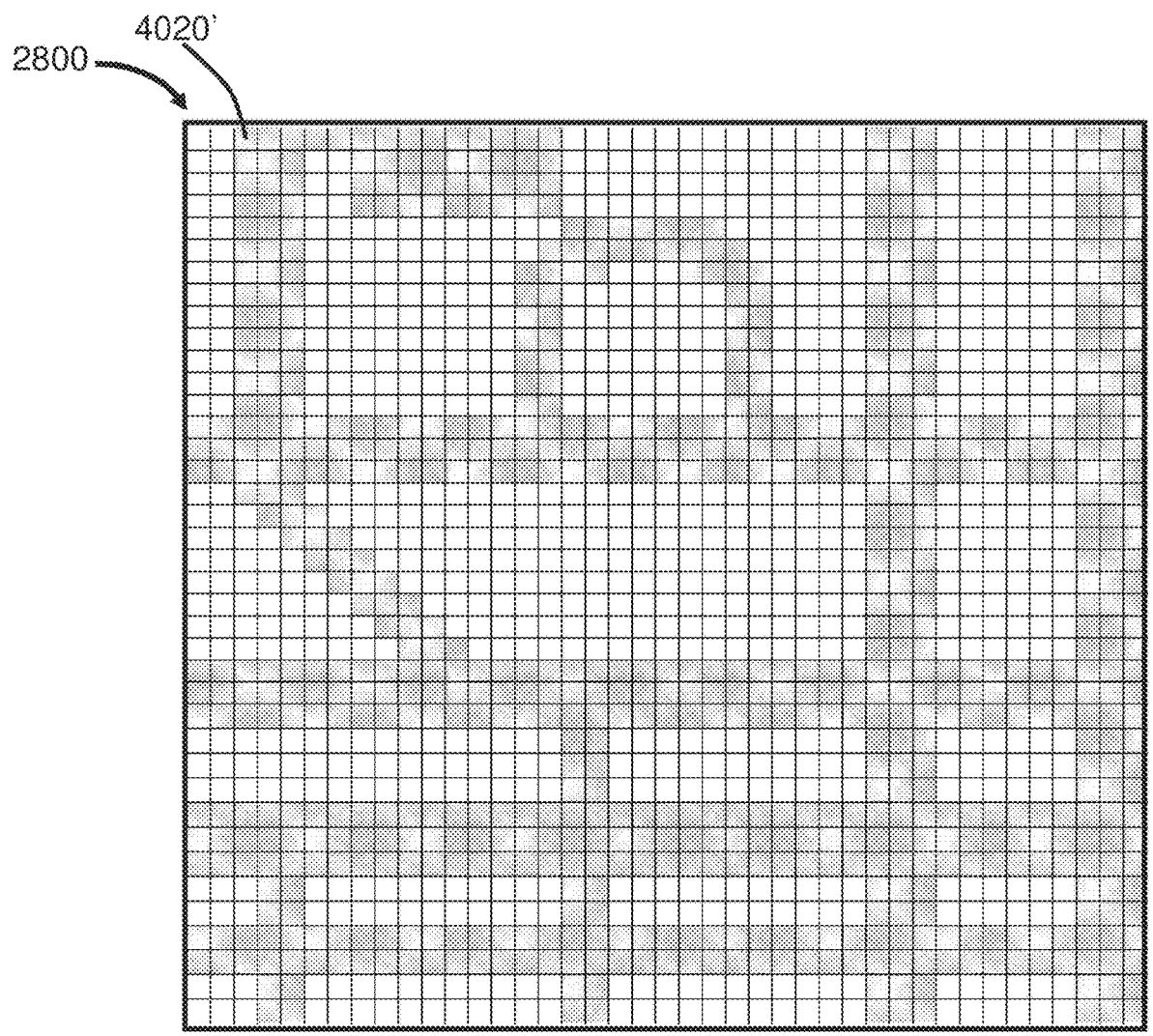
FIG. 44A is a conceptual diagram of a road network zone illustrating a road network including second subzones shaded according to classification data.

For example, referring to FIG. 44A, shown is a conceptual diagram of road network zone 2800 illustrating road network 4020' including second subzones 2802 shaded according to classification data 4300. For instance, second subzones 2802 labelled as a portion of a vehicle way are shaded grey and second subzones labelled as not a portion of a vehicle way not are shaded in grey (i.e., white.)

Referring again to FIG. 40A, shown are second subzones 4008 that have been incorrectly classified (i.e., mislabeled) as a portion of a vehicle way, (i.e., false positives). FIG. 40A also shows second subzones 4010 that have been incorrectly classified as not a portion of a vehicle way (i.e., false negatives).

Reclassification of subzones at block 2615 may provide more accurate classification data that may result in refined boundaries of the defined road network.

Once second subzones 2802 have been reclassified at block 2615, subprocess 2600 proceeds to block 2616 for defining the road network.

According to one embodiment, defining the road network includes processing classification data for determining each second subzone of a road network zone labelled as a portion of a vehicle way, and providing data indicative thereof.

For example, traffic analytics system 104a processes classification data 4300 and generates data indicative of each Geohash labelled as a portion of a vehicle way. Such data indicates a plurality of Geohashes that define road network 4020' representing the geographic location of road network 4020'.

According to another embodiment, defining the road network includes processing classification data for determining geographic boundaries of the road network and generating data representative thereof. A road network may be defined by a geospatial file (e.g., shape file (.shp), GeoJSON (.geojson)), or other file format, indicating geographical coordinates of boundaries delineating roads forming the road network. Alternatively, a road network may be defined in another data format.

For example, traffic analytics system 104a processes classification data 4300 by converting each of the plurality of Geohashes that defines road network 4020' (i.e., Geohashes classified as a portion of a vehicle way) into a plurality of polygons. For instance, traffic analytics system 104a converts each Geohash having a label '1' into a first GeoJSON file, each representing a polygon, for forming a plurality of first GeoJSON files. Alternatively, traffic analytics system 104a converts each Geohash having a label '1' into a single first GeoJSON file representing a plurality of polygons. Geohashes may be converted, for example, into one or more first GeoJSON files via a Geohash to GeoJSON converter.

Figure 44B:
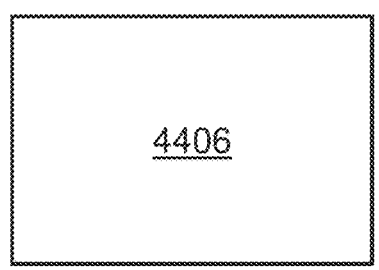
FIG. 44B is a conceptual diagram of a GeoJSON file indicating geographical boundaries of a road network based on classification data.
Figure 44C:
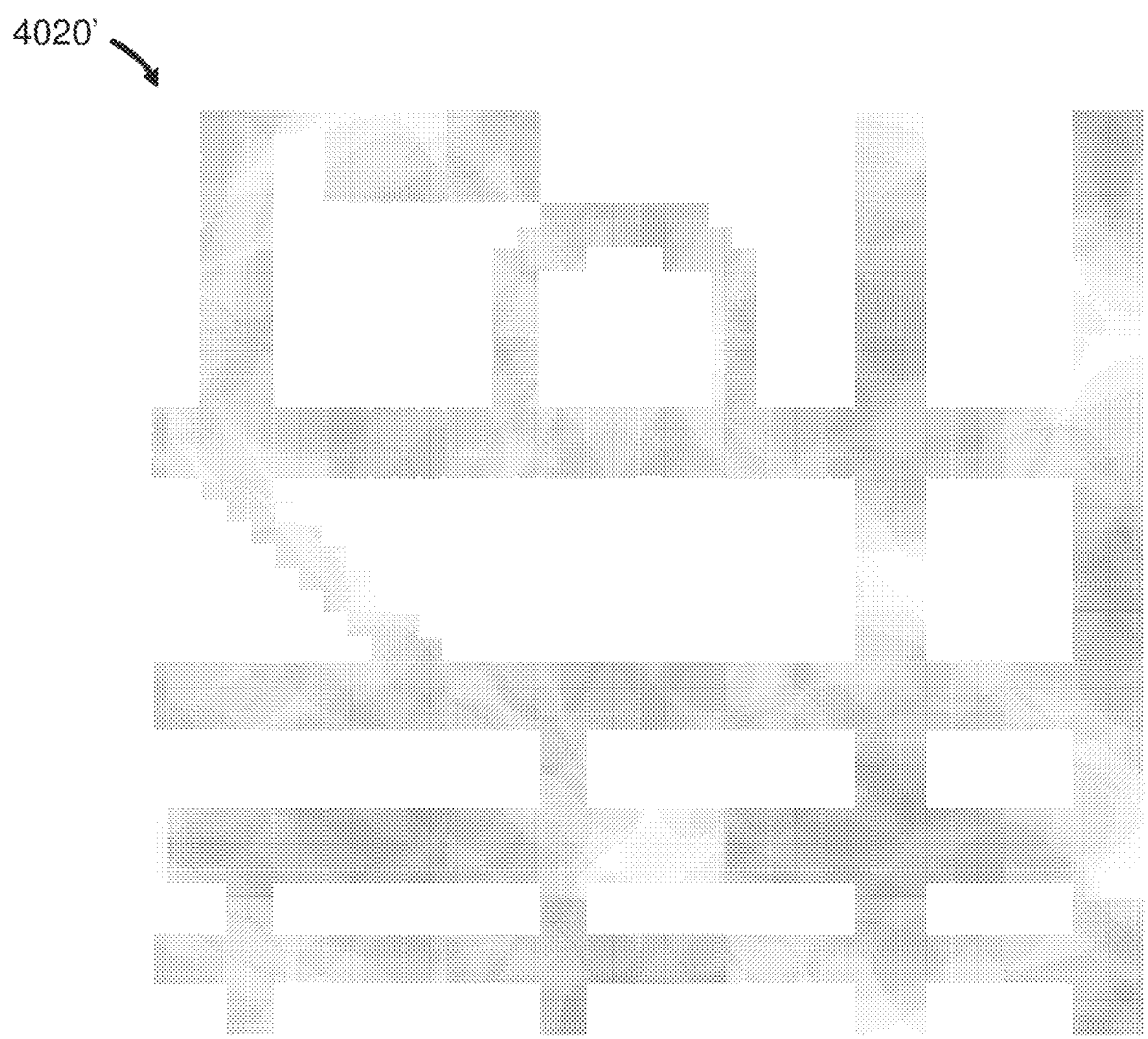
FIG. 44C is a conceptual diagram of a road network indicative of a GeoJSON file.

Next, traffic analytics system 104a aggregates the plurality of polygons represented by each of the first GeoJSON files to form a second GeoJSON file. For example, traffic analytics system 104a may process the plurality of first GeoJSON files with a postGIS ST_UNION function that provides the geometry of the union of each of the plurality of polygons to form the second GeoJSON file 4406, shown in FIG. 44B. Alternatively, a single GeoSJON file representing a plurality of polygons is processed with a postGIS ST_UNION function for forming a second GeoJSON file. Second GeoJSON file 4406 indicates geographical boundaries of road network 4020'. An exemplary conceptual diagram of road network 4020' indicated by second GeoJSON file 4006 is shown in FIG. 44C.

According to an embodiment, a road network is defined by road network data indicative of a first plurality of road network subzones corresponding to a geographical area occupied by the road network. Each road network subzone thereof corresponds to a portion of the road network. Specific and non-limiting examples of a road network subzone includes Geohash—a public domain hierarchical geospatial indexing system, H3—Uber's Hexagonal Hierarchical Spatial Index, S2—Google's S2 geographic spatial indexing system, or other spatial indexing system. Alternatively, a road network subzone zone may be defined by another system or method for subdividing geographical space.

According to an embodiment, generating road network data defining a road network includes processing classification data.

For example, traffic analytics system 104a processes classification data 4300 for forming road network data defining road network 4020'. Processing classification data includes selecting a plurality of second subzone data 2804 having a label '1' for identifying a subset of the plurality of second subzones that define road network 4020'. Traffic analytics system 104a generates road network data indicative of the subset of the plurality of second subzones defining road network 4020'.

A subzone representing a geographical area occupied by a portion of a road network is referred to hereinafter as a road network subzone. In the present example, the subset of the plurality of second subzones that define road network 4020' corresponds to a first plurality of road network subzones.

FIG. 44D is a conceptual diagram of exemplary road network data 4408 created by traffic analytics system 104a. Road network data 4408 includes road network subzone location data 4410 indicating a location of each of the first plurality of road network subzones. Road network data 4408 also includes road network subzone ID data 4412 indicating a unique identifier assigned to each second subzone 2802 labelled as a portion of a vehicle way.

In this example, the first plurality of road network subzones are in the form of Geohashes. Referring again to FIG. 44D, road network data 4408 includes road network subzone location data 4410 indicating a geohash string corresponding to a Geohash. For instance, road network data instance 4408-1 includes road network subzone location data 4410 indicating a geohash string, 'GeohashString_aaa', corresponding to a Geohash and road network subzone ID 4412 indicating the Geohash has a unique identifier, having a value 001.

According to another embodiment, generating road network data defining a road network includes partitioning an area occupied by the road network into a first plurality of road network subzones. For example, road network 4020' is defined in a geospatial file (e.g., shape file (.shp), GeoJSON (.geojson)) provided to traffic analytics system 104a, for instance, by the user via a user interface. The geographic area occupied by the road network may be partitioned according to the Geohash hierarchical geospatial indexing system, Uber's Hexagonal Hierarchical Spatial Index (e.g., H3), Google's S2 geographic spatial indexing system, or other spatial indexing system. Alternatively, a road network subzone may be defined by another system or method for subdividing geographical space. One of ordinary skill in the art will appreciate that there are multiple data formats for defining geographical coordinates of boundaries of an area.

Alternatively, traffic analytics system 104a may obtain a geospatial file from a governmental agency that stores data describing coordinates of boundaries of public roads of municipalities, counties, states, etc. on a publicly accessible server, such as, a server accessible via the Internet.

According to an embodiment, there is a process for providing traffic metrics of an intersection of a road network including processing road network data and third vehicle data corresponding to the intersection. Traffic metrics may include measurements of traffic properties and other measurement data relating to vehicles that have traversed an intersection.

Process 4600

Figure 46:
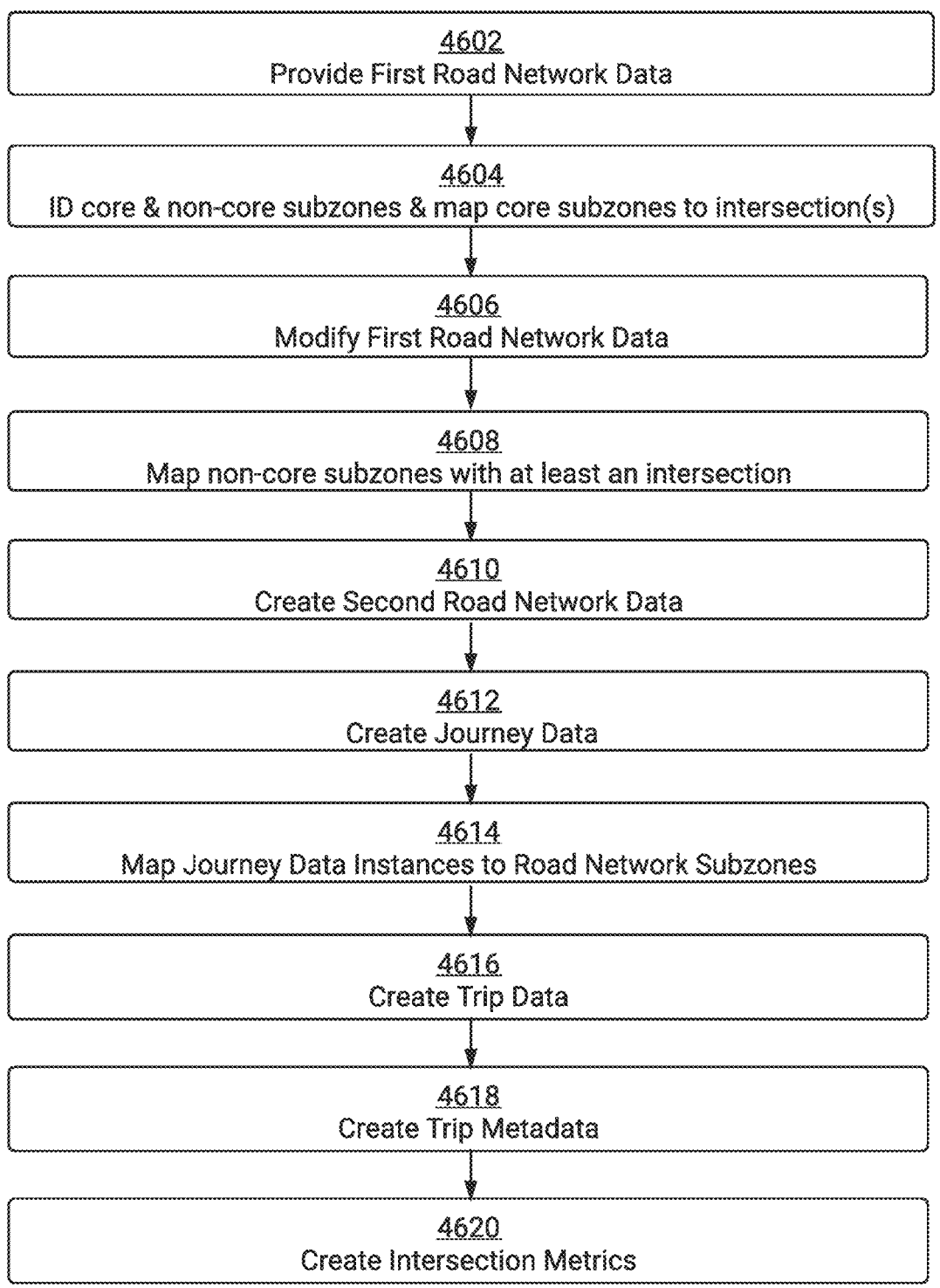

Shown in FIG. 46 is a flow diagram of process 4600 for providing traffic metrics of an intersection.

Process 4600 is described below as being carried out by traffic analytics system 104a. Alternatively, process 4600 may be carried out by telematics analytic system 104b, intelligent telematics system 500a, 500b, another system, a combination of other systems, subsystems, devices or other suitable means provided the operations described herein are performed. Process 4600 may be automated, semi-automated and some blocks thereof may be manually performed.

Block 4602

Starting at block 4602, process 4600 includes providing first road network data including a first plurality of road network subzones defining a road network, i.e., a geographical area occupied by a road network.

For example, traffic analytics system 104a provides first road network data that defines exemplary road network 4500 shown in FIG. 45A. For instance, a road agency may store geographic data describing road network 4500 on a publicly accessible server, such as a server accessible via the Internet. The geographic data may be in the form of a geospatial file (e.g., shape file (.shp), GeoJSON (.geojson)), or other file format, from which geographical coordinates of boundaries delineating roads forming the roadway system may be extracted. In this example, a geospatial file including boundary coordinates of the road network way is accessed, and latitude, longitude (Lat/Long) coordinates of a plurality of points defining the boundaries thereof are extracted from the geospatial file.

Figures 45B, 45C:
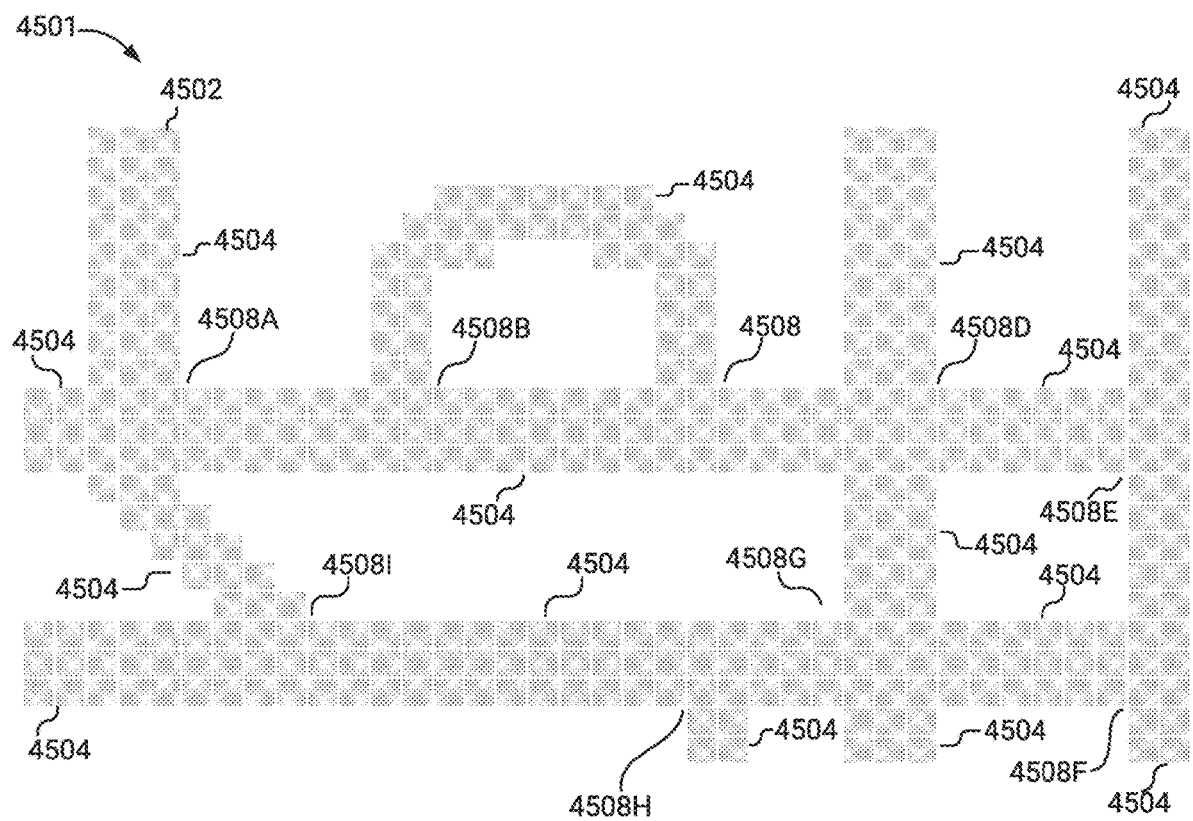
FIG. 45B is a conceptual diagram of a first plurality of road network subzones representing a geographical area occupied by a road network.
FIG. 45C is exemplary road network data defining a road network.

In this example, a geospatial file including boundary coordinates of the road network 4500 is received by traffic analytics system 104a, for instance, via network interface 306. Traffic analytics system 104a processes the geospatial file and, based thereon, determines a first plurality of road network subzones 4501, comprising a plurality of road network subzones 4502, corresponding to the geographical area occupied by road network 4500, as shown in FIG. 45B. For instance, traffic analytics system 104a partitions the geographic area delineated by boundary coordinates of the geospatial file into a plurality of road network subzones 4502 to form the first plurality of road network subzones 4501. In this example, traffic analytics system 104a partitions the geographic area in accordance with the Geohash hierarchical geospatial indexing system. For instance, each road network subzone 4502 of the first plurality of road network subzones 4501 is in the form of a Geohash.

Alternatively, the geographic area occupied by the road network may be partitioned according to Uber's Hexagonal Hierarchical Spatial Index (e.g., H3), Google's S2 geographic spatial indexing system, or other spatial indexing system. Alternatively, a road network subzone may be defined by another system or method for subdividing geographical space. One of ordinary skill in the art will appreciate that there are multiple methods for subdividing geographical space and multiple data formats for defining geographical coordinates of boundaries of a geographical area.

Next, traffic analytics system 104a generates first road network data. Shown in FIG. 45C is exemplary first road network data 4510 defining road network 4500. For each road network subzone 4502 of the first plurality of road network subzones 4501, first road network data 4510 includes road network subzone location data 4512 indicating the location of the road network subzone and road network subzone ID data indicating a unique identifier for identifying the road network subzone. In this example, road network subzone location data 4512 indicates a Geohash string indicative of a Geohash.

Alternatively, traffic analytics system 104a processes classification data for forming first road network data 4510 defining road network 4500. For example, classification data for road network 4500 may be formed by traffic analytics system 104a using similar techniques described hereinabove.

According to an embodiment, a road network includes a plurality of road network elements. A first specific and non-limiting example of a road network element includes an intersection formed by two or more roads intersecting. A second specific and non-limiting example of a road network element includes a road section including a portion of a road that does not intersect another road.

For instance, road network 4500 includes nine intersections 4508A to 4508I, and sixteen road sections 4504, as shown in FIG. 45A. Road sections 4504 channel vehicles to and from intersections 4508.

According to an embodiment, an intersection core, also referred to herein as a core, indicates a geographic area corresponding to an intersection. For instance, position data of a third vehicle data instance corresponding to a location within boundaries of an intersection core indicates that a vehicle is 'in', 'within', or 'at' an intersection. In contrast, position data of a third vehicle data instance corresponding to a location outside boundaries of an intersection core indicates that a vehicle is not 'in', 'within', or 'at' an intersection core.

Intersection cores corresponding to intersections of a road network may be defined by a subset of road network subzones. Techniques for identifying a subset of road network subzones forming intersection cores of a road network are described below.

Block 4604

Next, at block 4604, process 4600 includes selecting from the first plurality of road network subzones a first subset thereof for forming a first plurality of core subzones and uniquely associating each thereof with an intersection of the road network. The first plurality of core subzones define a plurality of intersection cores of the road network. The first plurality of core subzones may include one or more subsets thereof defining one or more intersection cores.

Process 4600 further includes selecting from the first plurality of road network subzones a second subset thereof for forming a first plurality of non-core subzones. The first plurality of non-core subzones define road sections of the road network, i.e., geographical area occupied by the road sections.

Figure 47A:
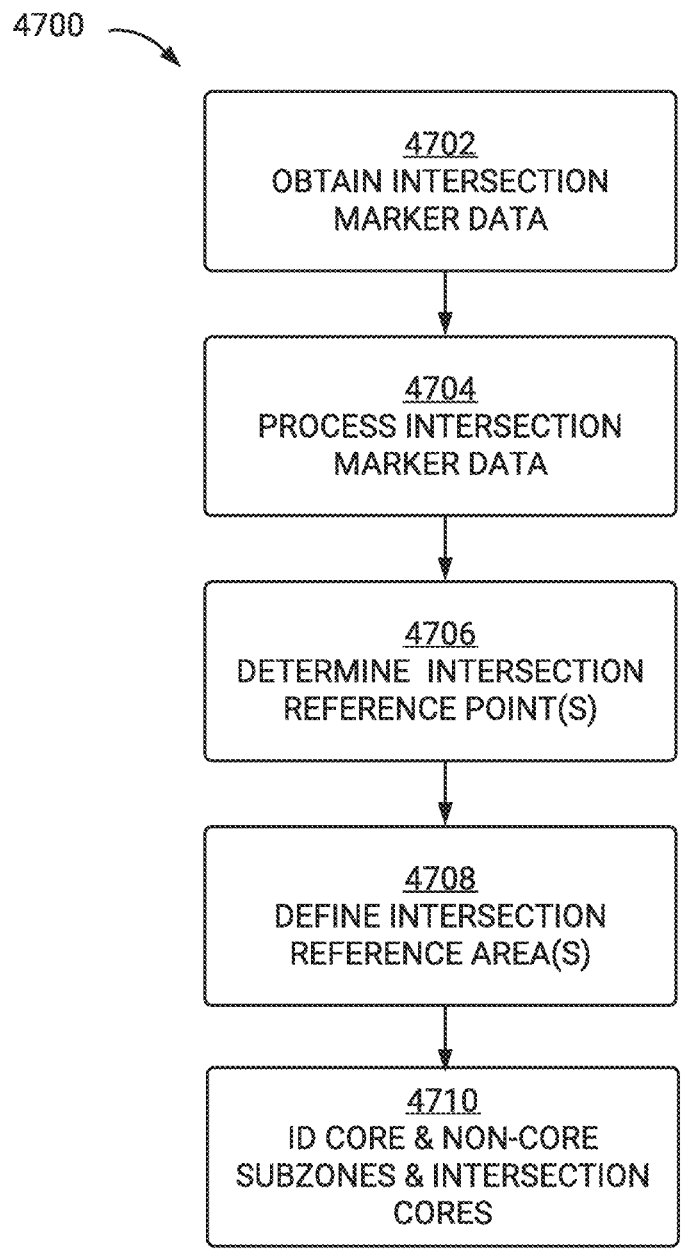

According to a first embodiment, process 4600 includes steps described in process 4700. A flow diagram for process 4700 is shown in FIG. 47A.

Process 4700

Block 4702

Process 4700 begins at block 4702 wherein process 4700 includes obtaining intersection marker data indicating geographic coordinates of a plurality of intersection markers associated with intersections of the road network.

A specific and non-limiting example of an intersection marker includes traffic control equipment (e.g., traffic light, traffic lamp, signal light, stop light) for managing traffic of the road network.

In the present example, traffic analytics system 104a receives intersection marker data indicating geographic coordinates of traffic control equipment located proximate road network 4500 from a map server via network interface 306. An exemplary map server includes an OpenStreetMaps© (OSM) server. For instance, traffic analytics system 104a queries an OSM database stored in an OSM server for geographic coordinates of traffic control equipment within a geographic area comprising road network 4500.

In this example, traffic analytics system 104a provides data to the OSM server indicating geographic coordinates, such as, LAT/LONG coordinates, of vertices 4511 of a polygon indicating boundaries of geographic area 4509 comprising road network 4500, as shown in FIG. 45A. Geographic coordinates of vertices 4511, may be provided to traffic analytics system 104a by a user. For instance, a user may measure locations using a GPS device, hover over points on a map, such as a map of Google maps, on the perimeter of road network 4500 for obtaining the geographic coordinates.

Alternatively, boundaries of a geographic area including the road network may be extracted from a geospatial file (e.g., shape file (.shp), GeoJSON (.geojson)). Such a file may be provided to traffic analytics system 104a, for instance, by the user via a user interface. Traffic analytics system 104a may send the geospatial file to the OSM server.

Alternatively, a user provides names of a municipality, community, town, etc., comprising road network 4500 to traffic analytics system 104a. Traffic analytics system 104a. specifies the name of a municipality, community, town, etc., in a query to an OSM database.

Figure 47B:
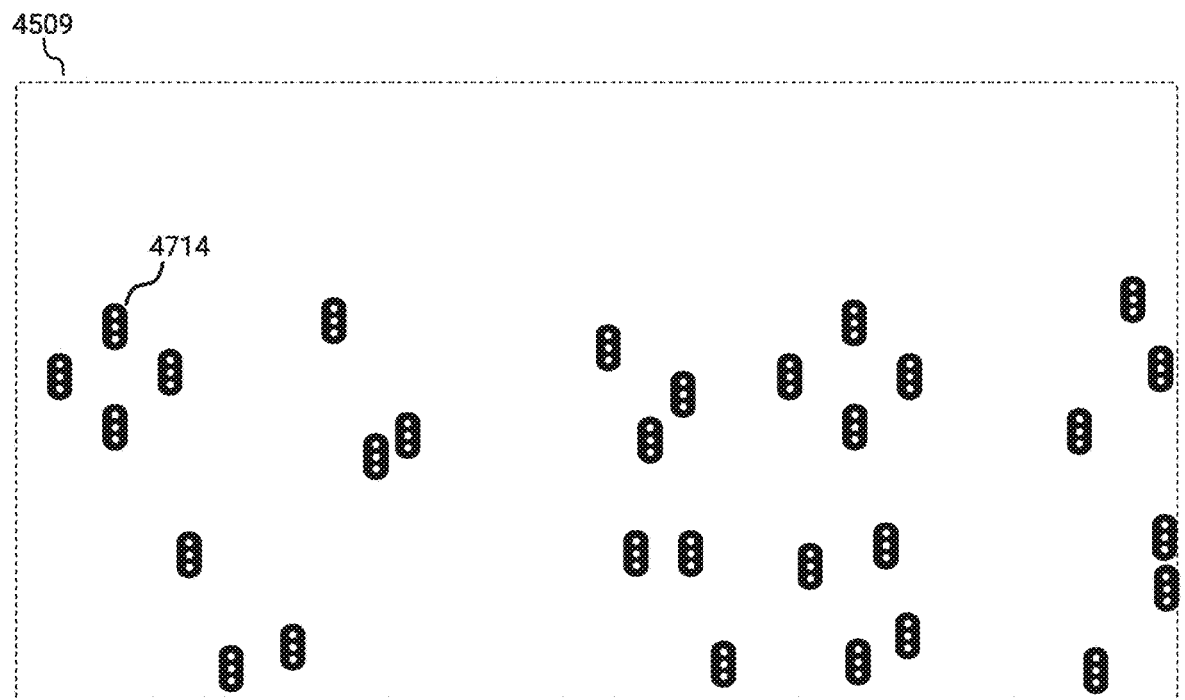

Intersection marker data indicating LAT/LONG coordinates of traffic control equipment within geographic area 4509 is transmitted by the OSM server and received by traffic analytics system 104a via communication network 110 and stored thereby in a datastore, for example, datastore 304. Referring now to FIG. 47B, shown is a conceptual diagram 4701 of geographic area 4509 including traffic control equipment-position data points 4714 representing locations of traffic control equipment within geographic area 4509. Alternatively, intersection marker data indicates GPS coordinates of traffic control equipment.

Alternatively, traffic analytics system 104a queries the OSM database for geographic coordinates of all traffic control equipment stored thereby and extracts traffic control equipment data corresponding to locations within geographic area 4509.

Alternatively, traffic analytics system 104a obtains traffic control equipment data from a governmental agency that stores data describing geographic coordinates of traffic control equipment of municipalities, communities, or other areas of interest, on a publicly accessible server, such as a server accessible via the Internet.

Block 4704—Cluster Intersection Marker Locations

Next, at block 4704, process 4700 includes processing intersection marker data for clustering intersection markers into groups based on geography thereof. A group of intersection markers may indicate a location of an intersection. In some embodiments, processing includes processing intersection marker data using a spatial clustering algorithm.

For example, traffic analytics system 104a processes traffic control equipment data using a spatial clustering algorithm, such as, density-based spatial clustering of applications with noise (DBSCAN). Traffic analytics system 104a sets DBSCAN parameters £, epsilon, specifying a distance measure for locating points in the neighborhood of any point, and minPts, minimum points, specifying a minimum number of points clustered together for a region to be considered dense. For example, if there are at least 'minPts' points within a radius of '£' to a point then all of these points are to be considered part of a same group. In an exemplary implementation, the inventor determined DBSCAN parameter c is defined as 30 m and parameter minPts as 1 provided accurate grouping of traffic control equipment of most road networks of interest. In some instances, traffic at an intersection may be controlled by only one traffic light.

In this example traffic analytics system 104a calculates distance between LAT/LONG coordinates of intersection markers when processing intersection marker data using DBSCAN. For instance, distance may be calculated using haversine or another using another formula. A person of skill will appreciate that there are various methods of calculating sufficiently accurate distance between LAT/LONG coordinates.

Figure 47C:
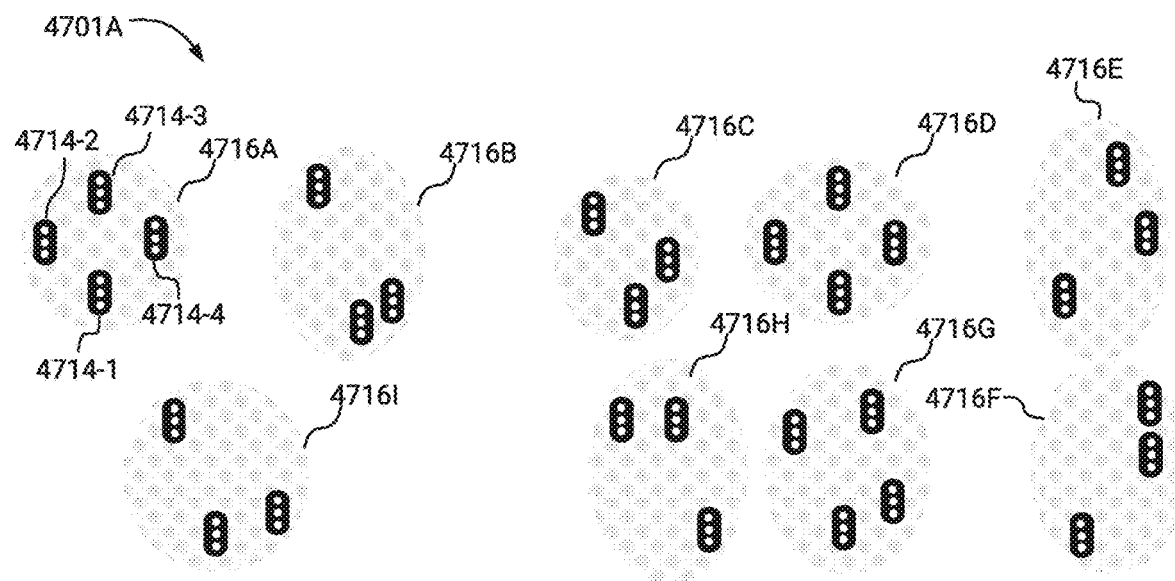

Shown in FIG. 47C is a conceptual diagram 4701A of groups of traffic control equipment 4716A, 4716B, 4716C, 4716D, 4716E, 4716F, 4716G, 4716H, and 4716I, grouped by traffic analytics system 104a. Traffic control equipment clustered in a same group may indicate the traffic control equipment manages traffic of a same intersection of the road network.

Accordingly, LAT/LONG coordinates of traffic control equipment in a cluster 4716 represented by traffic control equipment-position data points 4714 may provide an indication of a location of an intersection. For example, traffic control equipment-position data points 4714-1, 4714-2, 4714-3, and 4714-4, in cluster 4716A may indicate corresponding traffic control equipment manages traffic of a same intersection.

Block 4706

Next at block 4706, process 4700 includes processing intersection marker data for determining an intersection reference point associated with each group. An intersection reference point indicates a general area an intersection of the road network may be located. In some instances, an intersection reference point is a central location between clustered traffic control equipment.

Figure 47D:
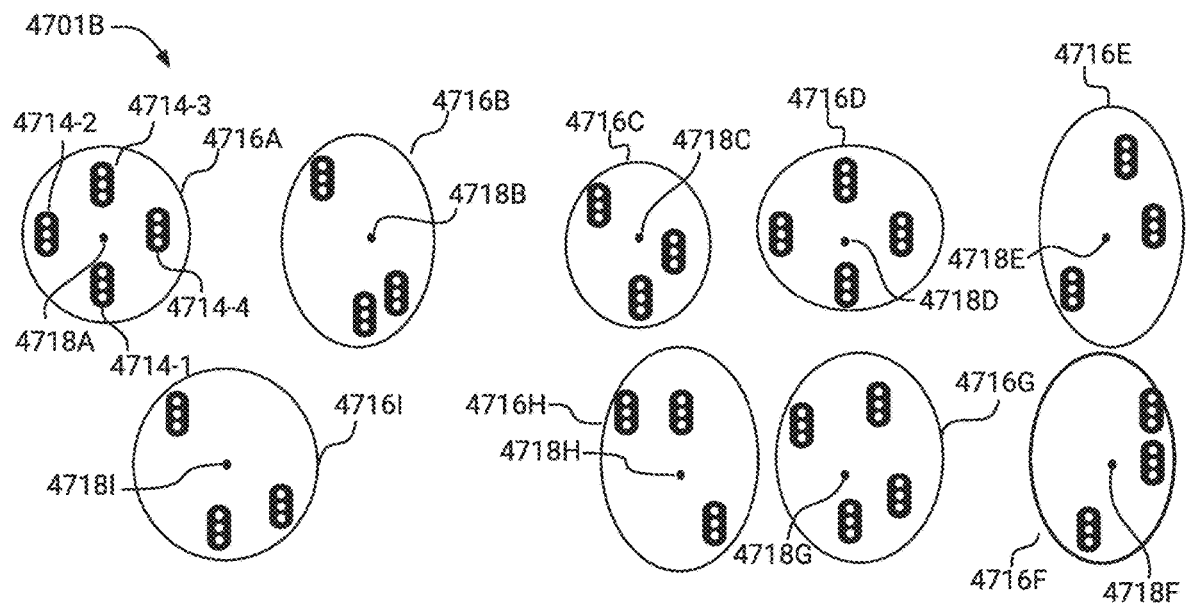

For example, traffic analytics system 104a processes traffic control equipment data indicating LAT/LONG coordinates of corresponding traffic control equipment represented by traffic control equipment-position data points 4714-1, 4714-2, 4714-3, and 4714-4 in group 4716A, for determining a centroid thereof. Shown in FIG. 47D is another conceptual diagram 4701B of groups of traffic control equipment illustrating centroid-position data point 4718A representing the centroid of traffic control equipment in cluster 4716A as determined by traffic analytics system 104a. A person of skill will appreciate there are various ways to calculate a geographic centre between coordinates.

Traffic analytics system 104a processes remaining traffic control equipment data to determine centroids 4718B, 4718C, 4718D, 4718E, 4718F, 4718G, 4718H, and 4718I, of groups 4716B, 4716C, 4716D, 4716E, 4716F, 4716G, 4716H, and 4716I, respectively, as shown in FIG. 47D.

Block 4708

Next at block 4708, process 4700 includes defining intersection reference area(s) based on locations of intersection reference points.

Figure 47E:
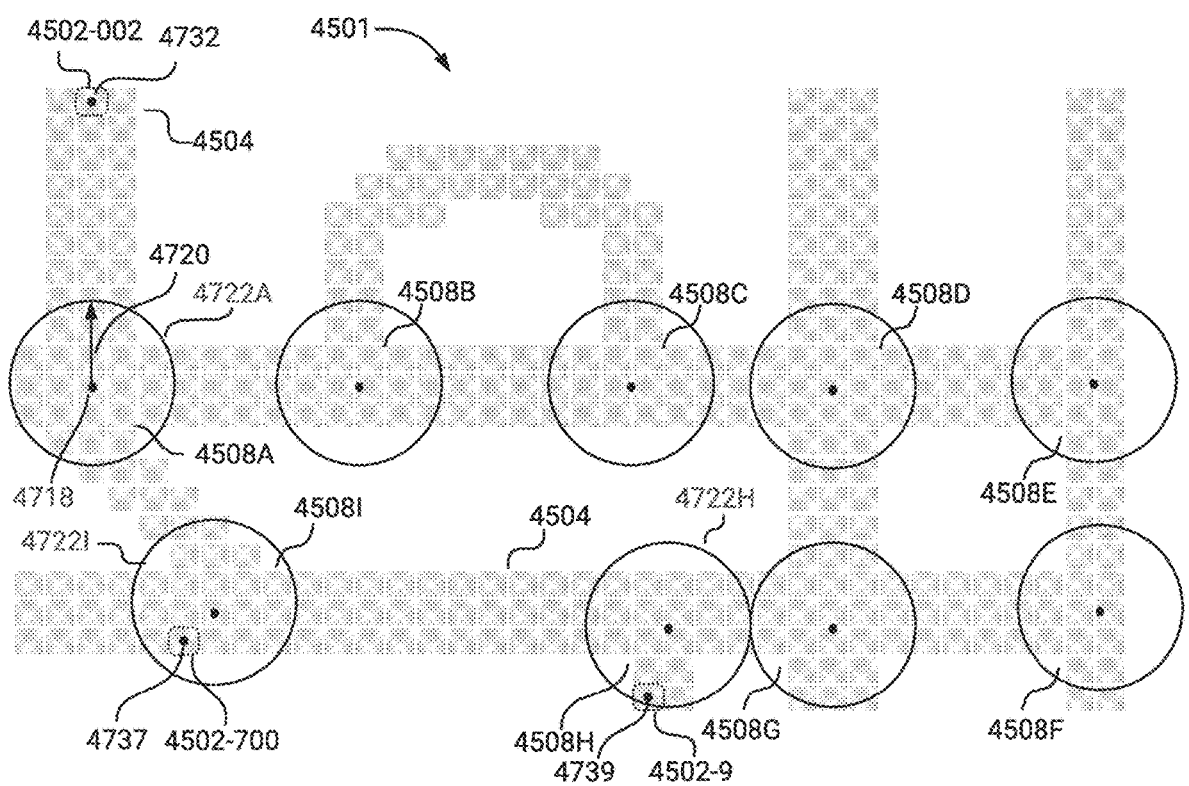

Shown in FIG. 47E is a conceptual diagram of the first plurality of road network subzones 4502 and intersection reference areas 4722 and intersection reference points 4718 superposed thereon;

In this example, traffic analytics system 104a defines intersection reference areas 4722 having a boundary at a radius, R1 4720, from intersection reference points 4718.

Dimensions of an intersection reference area may be approximated to encompass most intersection cores within an intersection population. In an exemplary implementation, the inventor determined an intersection reference area defined radially 25 m from the intersection reference point encompasses most intersection cores within an intersection population of interest whilst avoiding extraneous areas.

In the present example, traffic analytics system 104a creates intersection reference area data according to a geospatial data model for indicating a geographic location of intersection reference areas 4722. For instance, intersection reference area data indicating boundaries of a plurality of circles representing the location intersection reference area(s). Alternatively, intersection reference area data represents a plurality of polygons.

Alternatively, intersection reference area data may represent geographic location of the intersection reference areas in another data format. For example, a polygon in proprietary format, shape file (.shp), GeoJSON (.geojson) format, and the like.

Block 4710

Finally, at block 4710, process 4700 includes processing first road network data and intersection reference area data for identifying a first subset of road network subzones located within each intersection reference area corresponding to a first plurality of core subzones and mapping each thereof to an intersection. Process 4700 further includes defining an intersection core of each intersection of the road network representing a geographical area occupied thereby. Defining an intersection core includes uniquely mapping each core subzone of the first plurality of core subzones overlapping an intersection reference area to a corresponding intersection. A subset of the first plurality of core subzones uniquely mapped to an intersection defines the intersection core.

Finally, process 4700 also includes identifying a second subset of road network subzones not located within intersection reference areas that correspond to a first plurality of non-core subzones.

According to an embodiment, identifying a road network subzone as one of a core and non-core subzone includes determining whether the road network subzones overlaps an intersection reference area.

Process 4740

Figure 47F:
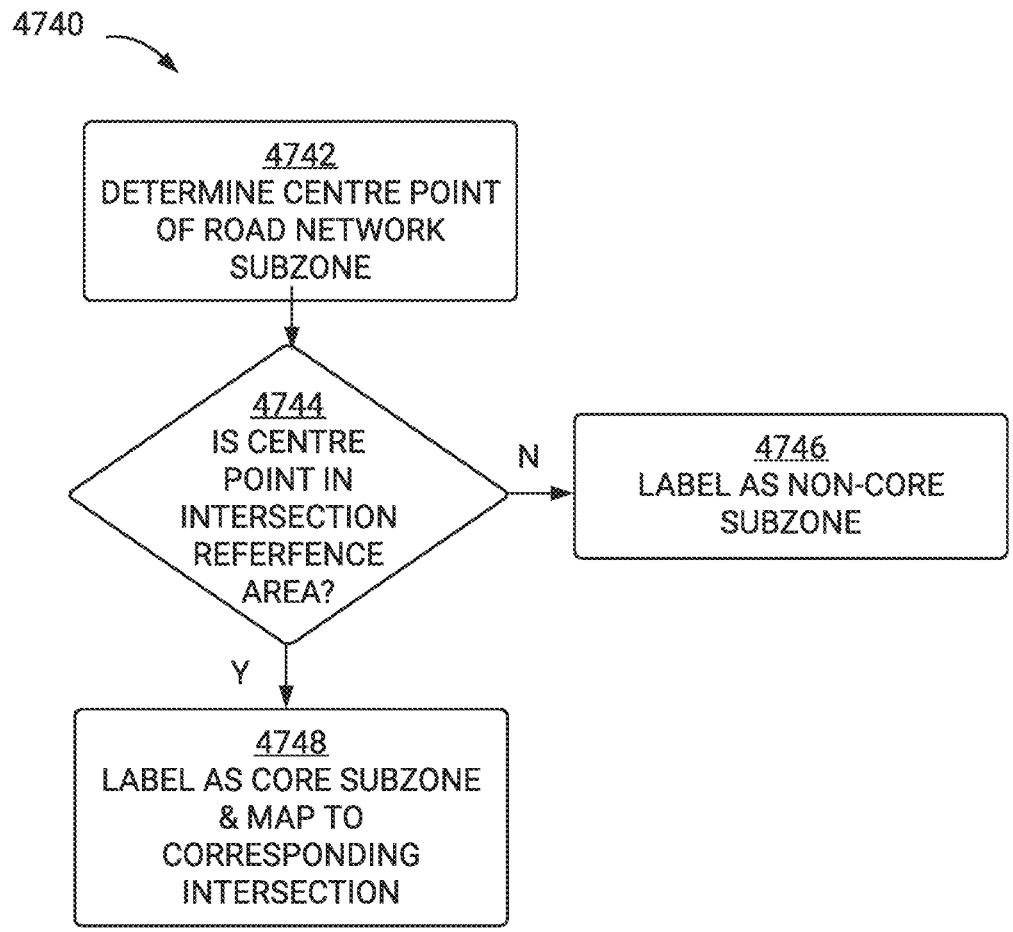

Shown in FIG. 47F is a flow diagram of an exemplary process 4740 for determining whether a road network subzones overlaps an intersection reference area for labelling the road network subzone as one of a core and non-core subzone.

For example, traffic analytics system 104a processes first road network data 4510 and intersection reference area data for determining whether each road network subzone 4802 of the first plurality of of road network subzones 4801 overlaps an intersection reference area 4722, labels each road network subzone 4802 as a core or non-core subzone and maps each core subzones of the first plurality of core subzones to an intersection.

At block 4742 of process 4740, determines geographic coordinates of a centre point of each road network subzone.

Figure 47G:
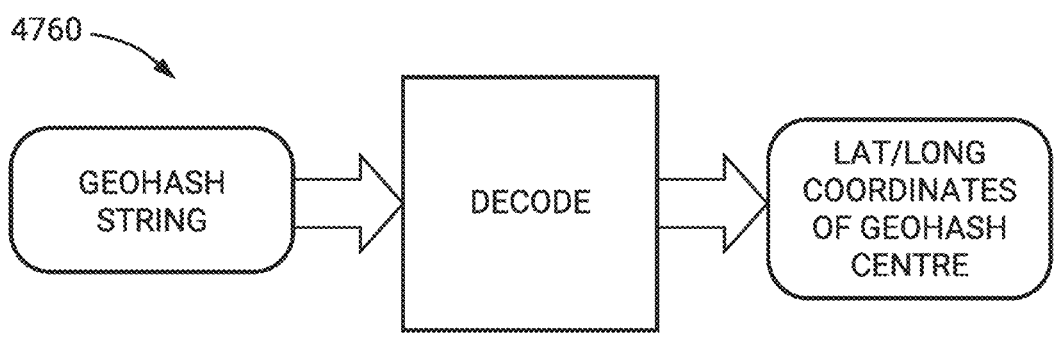

For example, traffic analytics system 104a determines geographic coordinates of a centre of each road network subzone 4502 of the first plurality of road network subzones 4501, by using, for example, a Geohash decode function. For example, shown in FIG. 47G is a simple block diagram of exemplary Geohash decode function 4760 for resolving a Geohash string to a centre location of the corresponding Geohash. For each road network subzone ID 4514 of first road network data 4510, traffic analytics system 104a inputs road network subzone location data 4512 indicative of a Geohash string into decode function 4760 which outputs LAT/LONG coordinates of a centre of a corresponding Geohash. Alternatively, decode function 4760 which outputs GPS coordinates of a centre of a corresponding Geohash.

For instance, road network subzone location data 4512-2 indicating 'GeohashString-002' is input into the decode function 4760. Decode function 4760 outputs LAT/LONG coordinates of centre point 4732 (i.e., centroid) of Geohash 4502-002, as shown in FIG. 47E.

Next, at block 4744 for each road network subzone 4502 (i.e., Geohash) of the first plurality of road network subzones 4501, traffic analytics system 104a evaluates whether a centre point of the road network subzone 4502 is within an intersection reference area 4722.

If a centre point of a road network subzone 4502 is outside all intersection reference areas 4722, the road network subzone 4502 is identified as a non-core subzone. If all the centre point of a road network subzone 4502 is found within an intersection reference area 4722, the road network subzone 4502 is identified as a core subzone.

For example, centre point 4732 of Geohash 4502-002 is outside all intersection reference areas 4722, thus Geohash 4502-002 is identified as a non-core subzone.

In another example, centre point 4737 of Geohash 4502-700 is within the boundaries of intersection reference area 47221, thus Geohash 4502-700 is labelled as a core subzone. Next, as Geohash 4502-700 overlaps with intersection reference area 47221 traffic analytics system maps Geohash 4502-700 to intersection 47221, or intersection I.

For each road network subzone 4502, traffic analytics system 104a determines whether the road network subzone is or is not located within intersection reference areas 4722, using the process described above.

Alternatively, other points of a road network subzone are evaluated for determining whether it overlaps an intersection reference point includes: any point of a road network subzone overlaps, all vertices overap, a predefined portion of vertices overlap, for example, at least 2 vertices must overlap, a minimum predefined portion of a road network subzone area of a road network overlaps, a minimum of 50% of a road network subzone's area overlaps with an intersection reference are for example, or any combination thereof.

Figure 48:
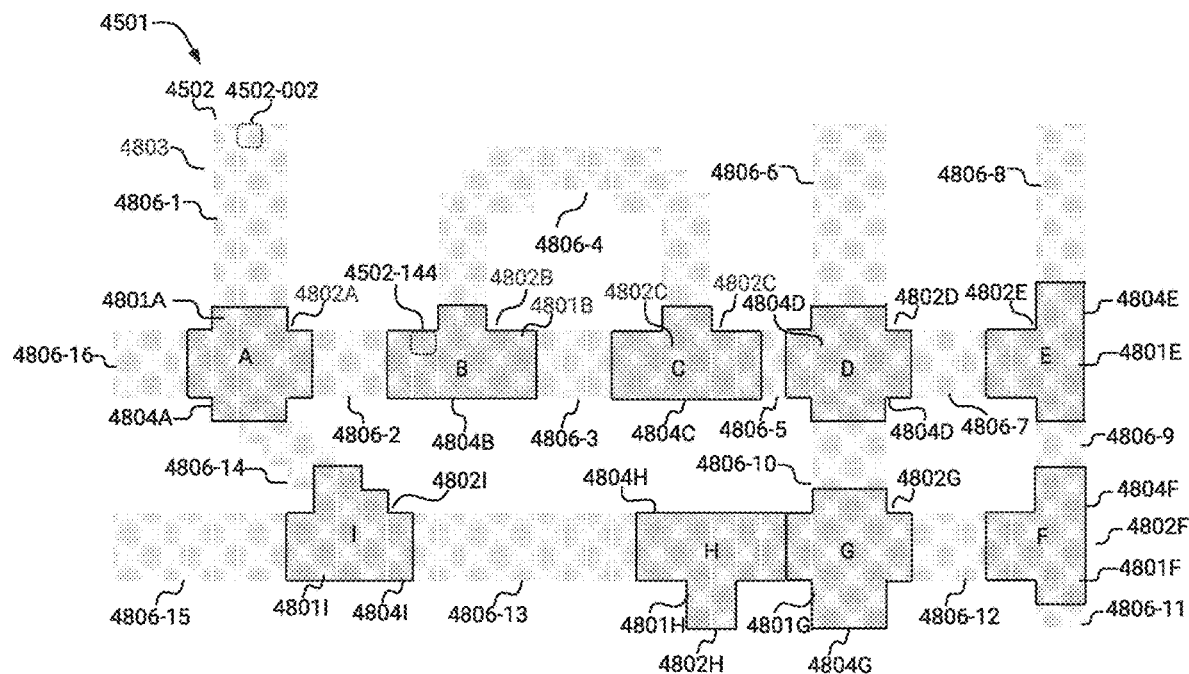

Shown in FIG. 48 is another conceptual diagram of the first plurality of road network subzones 4501 including a first plurality of core subzones 4801 and the first plurality of non-core subzones 4803 identified by traffic analytics system 104a. Also shown in FIG. 48 are intersection cores 4804, each including a subset of the first plurality of core subzones 4801 and uniquely associated with a corresponding intersection.

For example, core subzones 4801A of intersection core 4804A are uniquely associated with intersection 4802A. Similarly, each core subzone 4801 of intersection cores 4804B, 4804C, 4804D, 4804D, 4804E, 4804F, 4804G, 4804H, and 4802I is uniquely associated with intersection 4802B, 4802C, 4802D, 4802D, 4802E, 4802F, 4802G, 4802H, and 4802I, respectively. For ease of description, intersections 4802A, 4802B, 4802C, 4802D, 4802D, 4802E, 4802F, 4802G, 4802H, and 4802I, are also referred to herein as intersections A, B, C, D, E, F, G, H, and I. For clarity, the letters, A, B, C, D, E, F, G, H and I, are superposed on intersection cores 4804A, 4804B, 4804C, 4804D, 4804D, 4804E, 4804F, 4804G, 4804H, and 4802I respectively.

FIG. 48 also illustrates a plurality of road sections 4806-1 to 4806-15 and the first plurality of non-core subzones 4803. The first plurality of non-core subzones 4803 represents a geographic location(s) of the plurality of road sections 4806 of road network 4500.

Block 4606—Modify First Road Network Data

Returning now to process 4600, at block 4606 process 4600 includes modifying first road network data to include road network subzone label data and intersection mapping data indicating a road network subzone is a core subzone or a non-core subzone, and an intersection to which the road network subzone is mapped, respectively.

Traffic analytics system 104a generates modified first road network data by adding road network subzone label data and intersection mapping data to road network data 4510. Exemplary first road network data 4900 modified by traffic analytics system 104a is shown in FIGS. 49A, 49B and 49C. First road network data 4900 includes road network subzone ID data 4514, road network subzone location data 4512, road network subzone label data 4902 indicating the subzone is a core subzone or non-core subzone, and intersection mapping data 4904 indicating an intersection(s) to which a road network subzone is mapped, if any.

For example, modified first road network data instance 4900-2 includes road network subzone location data 4512 indicating a Geohash string, GeohashString-002, which identifies a location of road network subzone 4502-002 shown in FIG. 48. First road network data instance 4900-2 also includes road network subzone label data 4902 indicating road network subzone 4502-002 is a non-core subzone. Road network instance 4900-2 also includes intersection mapping data 4904 indicating that road network subzone 4502-002 is not presently associated with an intersection, and road network subzone ID data indicating road network identifier of 002. Road network subzone 4502-002 is a non-core subzone of road section 4806-1, as shown in FIG. 48 and FIG. 49A.

In a second example, road network instance 4900-144 includes road network subzone location data 4512 indicating a Geohash string, GeohashString-144, identifying a location of road network subzone 4502-144, as shown in FIG. 48. First road network data instance 4900-144 also includes road network subzone label data 4902 indicating road network subzone 4502-144 is a core subzone. Road network instance 4900-144 also includes intersection mapping data 4904 indicating that road network subzone 4502-144 is mapped to intersection 4802B.

Block 4608

Next, at block 4608, process 4600 includes mapping each non-core subzone of the first plurality of non-core subzones with at least an intersection of the road network. Firstly, process 4600 includes forming representative point data for each road network subzone of the first plurality of road network subzones of the road network. Representative point data indicates a location (e.g., LAT/LONG coordinates, GPS coordinates) representing a location of a road network subzone.

Next, process 4600 includes, for each intersection core of the road network, processing representative point data for a subset of core subzones corresponding to an thereto and processing representative point data of the first plurality of non-core subzones, for clustering representative points into groups based on geography thereof. In some embodiments, processing includes processing representative point data using a spatial clustering algorithm.

Finally, process 4600 includes mapping each non-core subzone of the first plurality of non-core subzones with one or more intersections dependent on clustering of a corresponding representative point in a same group with a subset of core subzones corresponding to an intersection core. In some instances, a non-core subzone is associated with more than one intersection.

For example, traffic analytics system 104a determines a representative point representing a location of each road network subzone 4502 of the first plurality of road network subzones 4501 of road network 4500. For instance, traffic analytics system 104a processes road network subzone location data 4512 of first road network data 4900 representing a Geohash string with a Geohash decode function, such as decode function 1110 of FIG. 11C. Function 1110 resolves Geohash strings 4512 to a centre point of a corresponding Geohash 4502. In this example, function 1110 defines a location, e.g., LAT/LONG coordinates, of a centre point of a Geohash. In this example, the location of the centre point of the Geohash represents the Geohash's location.

FIG. 50A is a conceptual diagram of exemplary representative points 5001 determined by traffic analytics system 104a superposed on respective road network subzones 4502 of the first plurality of road network subzones. FIG. 50A also shows the first plurality of non-core subzones 4803 and the first plurality of core subzones 4801.

Next, traffic analytics system 104a processes representative point data for representative points 5001 of the first plurality of non-core subzones 4803 and a subset of the first plurality of core subzones 4801 of intersection core 4804A with a spatial-clustering algorithm, such as, density-based spatial clustering of applications with noise (DBSCAN). Traffic analytics system 104a sets DBSCAN parameters £, epsilon, specifying a distance measure for locating points in the neighborhood of any point, and minPts, minimum points, specifying a minimum number of points clustered together for a region to be considered dense. For example, if there are at least 'minPts' points within a radius of '£' to a point then all of these points are to be considered part of a same group. In this example, Geohashes 4802 have precision 9 and are 4.77 m×4.77 m in size. Traffic analytics system 104a sets DBSCAN parameter £, as 5 an exemplary implementation, the inventor determined DBSCAN parameter c is defined as 5 m to evaluate any adjacent geohashes and parameter minPts as 1. In this example traffic analytics system 104a calculates distance between representing points when implementing DBSCAN, by implementing, for instance, haversine. Alternatively, other formulas are used. A POS will appreciate that there are various methods of calculating accurate distance between lat/lon coordinates.

Alternatively, traffic analytics system 104a processes representative point data for representative points 5001 of the first plurality of non-core subzones 4803 and a subset of the first plurality of core subzones 4801 of intersection core 4804A for clustering road network subzones 4502 into groups, such as, performing recursive adjacency checks.

Representative points 5001 indicate locations of road network subzones 4502, as such, DBSCAN evaluates relative distance therebetween for clustering representative points 5001 into groups.

FIG. 50A illustrates a conceptual diagram of representative points 5001 superposed on corresponding road network subzones 4502 of the first plurality of road network subzones 4501. FIG. 50A also shows the first plurality of non-core subzones 4803 and the first plurality of core subzones 4801, including core subzones 4801A, 4801B, 4801C, 4801D, 4801E, 4801F, 4801G, 4801H, and 4801I corresponding to cores 4804A, 4804B, 4804C, 4804D, 4804E, 4804F, 4804G, 4804H, and 4804I, respectively.

Next, traffic analytics system 104a clusters representative points 5001 corresponding to the first plurality of non-core subzones 4803 and core subzones 4801A of core 4804A including processing corresponding representative point data using DBSCAN. In this instance, representative points 5001 corresponding to core subzones of cores 4804B, 4804C, 4804D, 4804E, 4804F, 4804G, 4804H, and 4804I are not processed by traffic analytics system 104a.

FIG. 50B shows exemplary groups 5002 of representative points 5001 as grouped by traffic analytics system 104a. Representative points 5001 for non-core subzones 4803 of road sections 4806-1, 4806-2, 4806-14 and 4806-16 are clustered in the same group 5002-1, with representative points 5001 of core subzones 4801A of core 4804A, as shown. As such, traffic analytics system 104a maps each non-core subzone 4803 of road sections 4806-1, 4806-2, 4806-14 and 4806-16 with intersection 4802A.

Next, traffic analytics system 104a clusters representative points 5001 corresponding to the first plurality of non-core subzones 4803 and core subzones 4801B of core 4804B in a similar manner as described above.

FIG. 50C illustrates a conceptual diagram of representative points 5001 corresponding to the first plurality of non-core subzones 4803 and core subzones 4801B of core 4804B superposed on corresponding road network subzones 4502. In this instance, representative points 5001 corresponding to core subzones of cores 4804A, 4804C, 4804D, 4804E, 4804F, 4804G, 4804H, and 4804I are not processed by traffic analytics system 104a.

FIG. 50C further shows group 5004 as determined by traffic analytics system 104a. Representative points 5001 for non-core subzones 4803 of road sections 4806-2, 4806-3 and 4806-4 are clustered in the same group 5004 with representative points 5001 of core subzones 4801B of core 4804B, as shown. As such, traffic analytics system 104a associates each non-core subzone 4803 of road sections 4806-2, 4806-3 and 4806-4 with intersection 4802B.

In the present example, representative points 5001 corresponding to non-core subzones 4803 of road sections 4806-2 are clustered with representative points 5001 corresponding to core subzones 4801 of core 4804A in group 5002A and with representative points 5001 corresponding to core subzones 4801 of core 4804B in cluster 5004. As such, non-core subzones 4803 of road sections 4806-2 are associated with two intersections, namely with intersections 4802A and 4802B.

Next, traffic analytics system 104a clusters representative points 5001 corresponding to the first plurality of non-core subzones 4803 and core subzones 4801 of cores 4804C, 4804D, 4804E, 4804F, 4804G, 4804H, and 4804I, respectively, in a same manner as described above.

FIGS. 50D and 50E are exemplary conceptual diagrams of representative points 5001 corresponding to the first plurality of non-core subzones 4803 and core subzones of cores 4804C and 4804G, respectively, superimposed on corresponding road network subzones 4502.

FIG. 50D also shows group 5006 as determined by traffic analytics system 104a. Representative points 5001 for non-core subzones 4803 of road sections 4806-3, 4806-4, and 4806-5 are clustered in the same group 5006 with representative points 5001 of core subzones 4801 of core 4804C, as shown.

FIG. 50E also shows group 5008 as determined by traffic analytics system 104a. Representative points 5001 for non-core subzones 4803 of road sections 4806-3, 4806-4, and 4806-5 are clustered in the same group 5008 with representative points 5001 of core subzones 4801 of core 4804G, as shown.

Finally, traffic analytics system 104a maps non-core subzones 4803 with intersections based on representative points 5001 of the non-core subzones 4803 being grouped in a same cluster as representative points 5001 of core subzones 4803 of one or more of cores 4804C, 4804D, 4804E, 4804F, 4804G, 4804H, and 4804I.

Table 12 below provides a list of road sections 4806 and intersection(s) to which non-core subzones 4803 are mapped by traffic analytics system 104a.

TABLE 12

| ROAD SECTION | INTERSECTION(S) |
| --- | --- |
| 4806-1 | 4802A |
| 4806-2 | 4802A, 4802B |
| 4806-3 | 4802B, 4802C |
| 4806-4 | 4802B, 4802C |
| 4806-5 | 4802C, 4802D |
| 4806-6 | 4802D |
| 4806-7 | 4802D, 4802E |
| 4806-8 | 4802E |
| 4806-9 | 4802E, 4802F |
| 4806-10 | 4802G, 4802F |
| 4806-11 | 4802F |
| 4806-12 | 4802G, 4802F |
| 4806-13 | 4802H, 4802I |
| 4806-14 | 4802A, 4802B |
| 4806-15 | 4802I |
| 4806-16 | 4802A |

Referring now to FIG. 51, shown is another conceptual diagram of the first plurality of road network subzones 4501 indicating mapping of non-core subzones 4803 of road sections 4806-1 to 4806-16 to intersections 4802A to 4802I. For example, non-core subzones 4803 of road section 4806-7 are mapped to intersections 4802D and 4802E, as shown. In another example, non-core subzones 4803 of road section 4806-13 are mapped to intersections 4802H and 4802I, as shown.

Block 4610

Next, at block 4610, process 4600 includes creating second road network data for each road network subzone of the first plurality of road network subzones.

Exemplary second road network data 5200 created by traffic analytics system 104*a* is shown in FIGS. 52A, 52B, and 52C. Second road network data 5200 includes road network subzone ID data 4514, road network location subzone data 4512, road network subzone label data 4902, and intersection mapping data 5202. Traffic analytics system 104*a* modifies intersection mapping data 4904 of first road network data 4500 to include intersection mapping information for road network subzones having a label as non-core, as shown.

Block 4612

At block 4612, process 4600 includes creating journey data for a plurality of vehicles wherein journey data is indicative of a vehicle journey. Creating journey data includes selecting at least a first subset of temporally consecutive vehicle data instances from third vehicle data.

Third vehicle data may include raw vehicle data collected over a period of time (i.e., historical vehicle data), for example, historical vehicle data 404, and/or raw vehicle data collected over a period of time and vehicle data interpolated therefrom, such as, secondary historical vehicle data 2620. Third vehicle data includes temporally consecutive vehicle data instances indicative of vehicle operation over a period of time.

Specific and non-limiting examples of third vehicle data include, device ID data, position data indicating a location (e.g., LAT LONG coordinates), Ignition state data indicating whether the ignition is ON or OFF, DateTime data indicating the date and time vehicle data was logged by a monitoring device, speed data indicating speed of vehicle, VIN data indicating a Vehicle Identification Number, turn indicator state data indicating whether the turn indicator is ON or OFF, and the direction indicated is left or right. One of ordinary skill in the art will appreciate that raw vehicle data may comprise data indicative of numerous other vehicle operating conditions.

In some instances journey data may include all third vehicle data. For example, a first third vehicle data includes, device ID data, position data, Ignition state data, DateTime data speed data VIN data, turn indicator state data. A third vehicle data instance is selected from third vehicle data for forming a journey data instance. The journey instance includes device ID data, position data, Ignition state data, DateTime data speed data VIN data, turn indicator state data. Alternatively, the journey data instance includes a subset of device ID data, position data, Ignition state data, DateTime data speed data VIN data, turn indicator state data.

Referring now to FIG. 53A, shown is another simplified block diagram of traffic analytics system 104*a* including processing resource 302, datastore 304, and network interface 306.

In a first example, traffic analytics system 104 receives historical vehicle data 5302 from remote system 106 via communication network 110 and stores historical vehicle data 5302 in a database 5300 in datastore 304. In this example, third vehicle data includes historical vehicle data 5302.

In a second example, traffic analytics system 104 processes historical vehicle data 5302 for forming interpolated data therefrom. Traffic analytics system 104 forms third vehicle data 5306 including historical vehicle data 5302 and interpolated data, and stores third vehicle data 5306 in database 5304 in datastore 304.

In some instances, third vehicle data instances may be interpolated in dependence on the dimensions of road network subzones defining a road network. For example, third vehicle data instances may be interpolated such that there is approximately one of an interpolated instance or raw vehicle data instance corresponding to a location in each road network subzone.

For example, road network subzones 4802 of the first plurality of road network subzones are in the form of Geohashes having approximate dimension 4.77 m×4.77 m. In this example, third vehicle data instances are interpolated such that there is at least one of an interpolated instance or raw vehicle data instance corresponding to a location in each road network subzone along a vehicle's path.

Alternatively, vehicle data instances may be interpolated based on a minimum distance between vehicle positions indicated by consecutive third vehicle data instances. A specific and non-limiting example of a minimum distance includes 10 m. For example, third vehicle data instances are interpolated such that a distance of no more than 10 m is exceeded between vehicle positions indicated by consecutive third vehicle data instances.

In some instances, traffic analytics system 104 receives raw vehicle data from monitoring devices of one or more vehicle fleets and collects the raw vehicle data to form historical data. Third vehicle data includes this historical data and/or historical data and vehicle data interpolated therefrom.

Now referring to FIG. 53B, shown is a conceptual diagram of third vehicle data 5306 organized by device ID. For instance, vehicle-specific datasets 5311, 5312 and 5313 include third vehicle data instances of third vehicle data 5306 corresponding to device ID111, device ID112, and device ID113, respectively. Third vehicle data may be organized in numerous manners.

FIG. 53B also illustrates journey data 5334, 5335 and 5536 selected from third vehicle data 5306 by traffic analytics network 104*a*. For instance, journey data 5334, 5335 and 5536 are selected from vehicle-specific datasets 5311, 5312 and 5313, respectively.

For ease of description only three vehicle-specific datasets, 5311, 5312 and 5313, corresponding to three unique monitoring devices selected from third vehicle data 5306 are described in this example. In practise, however, third vehicle data may include vehicle data from any number of monitoring devices and thus include any number of vehicle-specific datasets. In one example, raw vehicle data is received by traffic analytics network 104*a* from hundreds devices, resulting in third vehicle data 5306 including thousands, tens of thousands or millions of vehicle data instances.

Referring now to FIG. 53C, shown is a conceptual diagram of vehicle paths 5314, 5315, and 5316 of vehicles corresponding to device ID111, device ID112, and device ID113, respectively. Vehicle paths 5314, 5315, and 5316 correspond to vehicle-specific datasets 5311, 5312 and 5313, respectively. Each vehicle path includes a plurality of vehicle-position points 5308 representing a position of a vehicle at a different point in time. Vehicles travel in the direction of arrows 5323, 5326 and 5329, on vehicle paths 5314, 5315, and 5316, as shown.

According to an embodiment, a vehicle journey begins when a vehicle transitions from an undriveable state, i.e., ignition status is OFF, to a driving state, i.e., ignition state is ON, and has a speed greater than 0 km/hr, and a vehicle journey ends when the vehicle transitions from a driving state to an undriveable state.

For instance, a beginning of a journey may be detected when a third vehicle data instance indicates the vehicle ignition state is OFF followed by a third vehicle data instance indicating the vehicle ignition state of the vehicle is ON and that the vehicle speed is greater than 0 km/h.

Alternatively, a vehicle journey begins in another way. For example, a vehicle may not start increasing in speed immediately after transitioning from an ignition OFF to ON state. In some instances a vehicle may idle for a period of time. A beginning of a journey may be detected when a third vehicle data instance indicates the vehicle ignition state is OFF followed by one or more third vehicle data instances indicating the vehicle ignition state of the vehicle is ON and has a vehicle speed 0 km/h, immediately followed by a third vehicle data instance indicating the vehicle ignition state of the vehicle is ON and has a vehicle speed is greater than 0 km/h. Alternatively, after a predefined period of idling, a journey may end and a new journey may begin when a speed greater than 0 km/h is detected. Further alternatively, a beginning vehicle journey may be detected (i.e, defined) in another way.

Forming journey data is described below with reference to FIGS. 53D and 53E. FIG. 53E is a conceptual diagram of vehicle journeys 5330, 5331, 5332A and 5332B corresponding to journey data 5334, 5335, and, 5336A and 5336B respectively. For clarity, some vehicle-position points 5308 on vehicle paths 5314, 5315, and 5316 are not shown in FIG. 53E.

In a first example, traffic analytics system 104a processes vehicle-specific dataset 5311 for forming journey data 5334 corresponding to a vehicle having device ID111. Traffic analytics system 104a may process third vehicle data instances in time consecutive order, beginning with a first third vehicle data instance of vehicle-specific dataset 5311 corresponding to a first vehicle-position point 5320 of vehicle path 5314. Alternatively, third vehicle data instances are processed in a non time consecutive order.

Traffic analytics system 104a processes vehicle-specific dataset 5313 in a time sequential manner searching for a beginning sequence of third vehicle data instances indicating the ignition status of the vehicle is OFF, immediately followed by a second instance that indicates the ignition status of the vehicle is ON and the vehicle has a speed greater than 0 km/h.

Additionally and/or optionally, a beginning sequence of third vehicle data instances indicates the ignition status of the vehicle is OFF, immediately followed by one or more a instances indicating the ignition status of the vehicle is ON and has a speed that is 0 km/h, and then is immediately followed by an instance indicating the ignition status of the vehicle is ON and the vehicle has a speed greater than 0 km/h.

Now referring to FIG. 53D, shown is exemplary journey data 5341 including journey data 5334, 5335, 5336A and 5336B formed by traffic analytics system 104a. For clarity, vehicle-position point data 5308 corresponding to the journey data are shown in FIG. 53D.

Third vehicle data instances are selected from vehicle-specific dataset 5311 by traffic analytics system 104a for forming journey data 5334. Traffic analytics system 104a identifies a beginning sequence of third vehicle data instances indicating a vehicle transitioning from an undriveable state to a driving state corresponding to vehicle-position points 5333A and 5333B, respectively, as shown in FIG. 54D. This beginning sequence of third vehicle data instances indicates the beginning of a vehicle journey and is selected from vehicle-specific dataset 5311 for forming journey data instances 5334A and 5334B of journey data 5334, as shown.

Traffic analytics system 104a continues processing vehicle-specific dataset 5311 in time consecutive order searching for a next third vehicle data instance indicating an end of the journey. A next consecutive third vehicle data instance indicating an ignition status OFF corresponds to vehicle-position point 5333E. This third vehicle data instance is selected by traffic analytics system 104a from vehicle-specific dataset 5311 for forming journey data instance 5334E.

Traffic analytics system 104a selects third vehicle data instances from vehicle-specific dataset 5311 corresponding to vehicle-position points 5333A and 5333E and all vehicle-position points 5308 therebetween, for forming journey data 5334 associated with journey 5330 shown in FIG. 53E.

Traffic analytics system 104a continues processing third vehicle data instances from vehicle-specific dataset 5311 to identify a beginning of another journey, however, none is found.

In a second example, traffic analytics system 104a processes vehicle-specific dataset 5312 for forming journey data 5335 corresponding to a vehicle having device ID112 in a same manner as described above. Third vehicle data instances are selected from vehicle-specific dataset 5312 by traffic analytics system 104a for forming journey data 5335. Traffic analytics system 104a identifies a beginning sequence of third vehicle data instances indicating a vehicle transitioning from an undriveable state to a driving state corresponding to vehicle-position points 5338 and 5350, respectively, as shown in FIG. 54D. This beginning sequence of third vehicle data instances indicates the beginning of a vehicle journey and is selected from vehicle-specific dataset 5312 for forming journey data instances 5335A and 5335B of journey data 5335, as shown.

Traffic analytics system 104a continues processing vehicle-specific dataset 5312 in time consecutive order searching for a next third vehicle data instance indicating an end of the journey. A next consecutive third vehicle data instance indicating an ignition status OFF corresponds to vehicle-position point 5337. This third vehicle data instance is selected by traffic analytics system 104a from vehicle-specific dataset 5312 for forming journey data instance 5335E.

Traffic analytics system 104a selects third vehicle data instances from vehicle-specific dataset 5312 corresponding to vehicle-position points 5338 and 5337 and all vehicle-position points 5308 therebetween, for forming journey data 5335 associated with journey 5331 shown in FIG. 53E.

Traffic analytics system 104a continues processing third vehicle data instances from vehicle-specific dataset 5312 to identify a beginning of another journey, however, none is found.

In a third example, traffic analytics system 104a processes vehicle-specific dataset 5313 for forming journey data 5336A corresponding to a vehicle having device ID113 in a same manner as described above. Third vehicle data instances are selected from vehicle-specific dataset 5313 by traffic analytics system 104a for forming journey data 5336A. Traffic analytics system 104a identifies a beginning sequence of third vehicle data instances indicating a vehicle transitioning from an undriveable state to a driving state corresponding to vehicle-position points 5342A and 5342B, respectively, as shown in FIG. 54D. This beginning sequence of third vehicle data instances indicates the beginning of a vehicle journey and is selected from vehicle-specific dataset 5313 for forming journey data instances 5336A and 5335B of journey data 5336, as shown.

Traffic analytics system 104a continues processing vehicle-specific dataset 5313 in time consecutive order searching for a next third vehicle data instance indicating an end of the journey. A next consecutive third vehicle data instance indicating an ignition status OFF corresponds to vehicle-position point 5342D. This third vehicle data instance is selected by traffic analytics system 104a from vehicle-specific dataset 5313 for forming journey data instance 5376D.

Traffic analytics system 104a selects third vehicle data instances from vehicle-specific dataset 5313 corresponding to vehicle-position points 5342A and 5342D and all vehicle-position points 5308 therebetween, for forming journey data 5336A associated with journey 5332A, shown in FIG. 53E.

Traffic analytics system 104a continues processing third vehicle data instances from vehicle-specific dataset 5313 to identify a beginning of another journey.

Third vehicle data instances are selected from vehicle-specific dataset 5313 by traffic analytics system 104a for forming journey data 5336B. Traffic analytics system 104a identifies a beginning sequence of third vehicle data instances indicating a vehicle transitioning from an undriveable state to a driving state corresponding to vehicle-position points 5342D and 5342E, respectively, as shown in FIG. 54D. This beginning sequence of third vehicle data instances indicates the beginning of a vehicle journey. Traffic analytics system 104a selects 5376D corresponding to vehicle-position point 5342D and third vehicle data instance from vehicle-specific dataset 5313 for forming journey data instances 5336F and 5335G of journey data 5336B, as shown.

Traffic analytics system 104a continues processing vehicle-specific dataset 5313 in time consecutive order searching for a next third vehicle data instance indicating an end of the journey. A next consecutive third vehicle data instance indicating an ignition status OFF corresponds to vehicle-position point 5342G. This third vehicle data instance is selected by traffic analytics system 104a from vehicle-specific dataset 5313 for forming journey data instance 5336G.

Traffic analytics system 104a selects third vehicle data instances from vehicle-specific dataset 5313 corresponding to vehicle-position points 5342D and 5342G and all vehicle-position points 5308 therebetween, for forming journey data 5336B associated with journey 5332B. Traffic analytics system 104a continues processing third vehicle data instances from vehicle-specific dataset 5313 to identify a beginning of another journey, however, none is found.

In this example, journey data 5341 includes device ID data 5341A, position data 5341B, (e.g., LAT/LONG coordinates), ignition state data 5341C, date and time data 5341C (e.g., timestamp), and speed data 5341D, as shown. For ease of description not all third data is shown in journey data 5403.

FIG. 53F is a conceptual diagram of exemplary vehicle journeys 5330, 5331, 5332A and 5332B superposed on the first plurality of road network subzones 4501. For ease of description, only 4 journeys are described in this example. In practise, however, the number of journeys may include hundreds, thousands, or more.

Block 4614

At block 4614, process 4600 includes processing second road network data and journey data for mapping each journey data instance thereof to a road network subzone and forming new journey data to include an indication of that mapping.

Shown in FIG. 54A is a conceptual diagram of portion 5400 of the first plurality of road network subzones 4501 defined by line A-A in FIG. 53F. FIG. 54A also shows vehicle-position points 5308 corresponding to vehicle journey 5331 superposed on portion 5400. FIG. 54B is an enlarged view of a portion 5401 of portion 5400 defined in FIG. 54A.

For example, traffic analytics system 104a processes second road network data 5200 and journey data 5335 corresponding to journey 5331 for mapping each journey data instance thereof to a road network subzone 4502 of the first plurality of road network subzones 4501.

In a first example, traffic analytics system 104a determines whether journey data instance 5335A associated with vehicle-position point 5338 corresponds to a road network subzone 4502 of the first plurality of road network subzones 4501. In the present example, road network subzones are defined according to the Geohash spatial hierarchy system. Traffic analytics system 104a implements Geohash encode function 1108 of FIG. 11B for mapping the location represented by vehicle-position point 5338 to a Geohash string indicative of the Geohash within which it is located. In this instance, function 1108 returns a first Geohash string, GeohashString-5402, corresponding to Geohash 5402, shown in FIG. 54A.

Next, traffic analytics system 104a processes second road network data 5200 for determining whether Geohash 5402 is included in the first plurality of road network subzones 4501. In particular, traffic analytics system 104a processes road network subzone location data 4512 searching for a Geohash string that indicates Geohash 5402. In this instance, a match is not found indicating journey data instance 5335A does not correspond to any road network subzone 4502.

FIG. 54C and FIG. 54D are conceptual diagrams of exemplary modified journey data 5403 formed by traffic analytics system 104a. For clarity, vehicle-position point data 5308 corresponding to the journey data are shown in FIG. 53D. For clarity, vehicle-position point data 5380 corresponding to the journey data are shown in FIG. 54C and FIG. 54D. For descriptive purposes only, a subset of data of each journey data instance is shown.

Next traffic analytics system 104a forms new journey data 5403 including journey data 5341 and an indication of a corresponding road network subzone ID, road network subzone location, road network subzone label, and intersection mapping associated with each instance thereof.

In the present example, traffic analytics system 104a forms journey data instance 5410 of journey data 5403 including journey data from journey data 5341 corresponding to road network subzone 5402. Journey data instance 5410 also includes road network subzone location data 5404B indicating a Geohash string, GeohashString-5402. As journey data instance 5334A does not correspond to any road network subzone 4502 road network subzone ID data 5404A, road network subzone label data 5404B and intersection mapping data 5404D of journey data instance 5335A have null values.

In a second example, traffic analytics system 104a determines, in a similar manner as described above, whether a journey data instance associated with vehicle-position point 5352 maps to a road network subzone 4502 of the first plurality of road network subzones 4501. In this example, the journey data instance of journey data 5341 associated with vehicle-position point 5352 maps to Geohash 5492, as shown in FIG. 54B.

Next, traffic analytics system 104a adds journey data instance 5411 to journey data 5403. Journey data instance 5411 includes the journey data instance from journey data 5341 corresponding to road network subzone 5492, road network subzone ID data 5404A, indicating ID 5492, road network subzone location data 5406, indicating Geohash-String-5492, road network subzone label data 5408 indicating a non-core subzone label, and intersection mapping data 5404D indicating intersection mapping 4802F, shown in FIG. 54C.

Traffic analytics system 104a processes second road network data 5200 and the remainder of journey data 5335, journey data 5334 and journey data 5336, and forms journey data 5403 in a similar manner as described above. FIGS. 54C and 54D show examples of other journey data instances of journey data 5335.

Block 4616

Next, at block 4616, process 4600 includes selecting at least a first sequence of journey data instances from journey data for forming trip data. According to some embodiments, the first sequence of journey data instances includes at least one journey data instance corresponding to a core subzone and is mapped to a first intersection and is immediately followed by a journey data instance mapped to a second intersection, wherein the second intersection and the first intersection are not the same intersection.

According to another embodiment, at block 4616, process 4600 includes identifying a first sequence of journey data instances and a second sequence of journey data instances for forming trip data based on the first sequence of journey data and the second sequence of journey data. A second sequence of journey data instances includes at least a journey data instance corresponding to a non-core subzone mapped to the first intersection immediately preceding the first sequence of journey data instances.

Forming trip data also includes mapping each trip data instance to the first intersection and storing an indication of the mapping therein.

In a first example, traffic analytics system 104a processes journey data 5403 for identifying a first sequence of journey data instances. Referring again to FIG. 54C, journey data instances 5413, 5415, 5417, 5419, 5421, 5429 and 5439 correspond to core subzones and are mapped to a first intersection, intersection 4802F. Journey data instances 5413, 5415, 5417, 5419, 5421, 5429 and 5439 also immediately precede journey data instance 5339 which corresponds to a non-core subzone mapped to a second intersection, intersection 4802G. As such, traffic analytics system 104a identifies a first sequence of journey data instances 5490 including journey data instances 5413, 5415, 5417, 5419, 5421, 5429 and 5439, each thereof corresponding to a core subzone mapped to a first intersection, (i.e., intersection 4802F) and is immediately followed by a journey data instance (i.e., instance 5339) mapped to a second intersection, intersection 4802G.

In this example, traffic analytics system 104a also identifies a second sequence of journey data instances 5491 shown in FIG. 54C. Journey data instance 5411 corresponds to a non-core subzone mapped to the first intersection, intersection 4802F, and immediately precedes the first sequence of journey data instances 5490. As such, traffic analytics system 104a identifies a second sequence of data journey instances 5491. In this example, the second sequence of journey data instance(s) 5491 includes a sequence of one journey data instance. In other instances, the second sequence of journey data instance(s) may include a plurality of journey data instances.

Next, traffic analytics system 104a forms trip data dependent on the first sequence of journey data instances 5490 and the second sequence of journey data instance(s) 5491. Exemplary trip data 5500 is shown in FIG. 55A, including position data 5502, date and time data 5504, speed data 5506, road network subzone ID data 5508, road network subzone location data 5510, and road network subzone label data 5512. Trip data 5500 further includes intersection mapping data 5514 corresponding to the first intersection, intersection 4802F. Alternatively, trip data is formed based on the first sequence of journey data instances. For clarity, vehicle-position point data 5516 corresponding to the trip data is shown in FIG. 55A.

A conceptual diagram of trip 5551 corresponding to trip data 5500 is shown in FIG. 55B. As described herein above, arrow 5326 indicates the direction of travel of the corresponding vehicle. In this example, trip 5551 begins in road section 4806-11, as indicated by vehicle-position point 5352, traverses intersection 4802F, as indicated by vehicle-position points 5353, 5354, 5355, 5356A, 5356B, 5356C, and ends just before entering road section 4806-12, as indicated by vehicle-position point 5357.

In a second example, traffic analytics system 104a processes journey data 5403 for identifying another first sequence of journey data instances. Referring now to FIG. 54D, each of journey data instances 5432, 5434, 5436, 5438, and 5440 corresponds to a core subzone mapped to a first intersection 4802G and immediately precedes journey data instance 5442 which corresponds to a non-core subzone mapped to a second intersection, intersection 4802F. As such, traffic analytics system 104a identifies a first sequence of journey data instances 5493 including journey data instances 5432, 5434, 5436, 5438, and 5440.

Traffic analytics system 104a also identifies a second sequence of journey data instances 5494 shown in FIG. 54D. Consecutive journey data instances 5339, 5428, and 5431, correspond to a non-core subzones mapped to the first intersection, intersection 4802G. Journey data instances 5439, 5428, and 5431, immediately precede the first sequence of journey data instances 5493, as shown. As such, traffic analytics system 104a identifies a second sequence of data journey instances 5494.

Next, traffic analytics system 104a forms trip data dependent on the first sequence of journey data instances 5493 and the second sequence of journey data instances 5494. Exemplary trip data 5570 is shown in FIG. 55C, including position data 5502, date and time data 5504, speed data 5506, road network subzoneID data 5508, road network subzone location data 5510, and road network subzone label data 5514. Trip data 5570 further includes intersection mapping data 5514 corresponding to the first intersection, intersection 4802G. As such, traffic analytics system 104a remaps journey data instances 5439, 5428 and 5431 to intersection 4802G only, as shown in FIG. 55C. For clarity, vehicle-position point data 5516 corresponding to the trip data is shown in FIG. 55C.

A conceptual diagram of a trip 5552 corresponding to trip data 5570 is shown in FIG. 55B. As described herein above, arrow 5326 indicates the direction of travel of the corresponding vehicle. In this example, trip 5552 begins in road section 4806-12, as indicated by vehicle-position point 5358, traverses road section 4806-12, as indicated by vehicle-position points 5359 and 5360, then traverses intersection 4802, as indicated by vehicle-position points 5361, 5362, 5363, 5364, and ends just before entering intersection 4802H, as indicated by vehicle-position point 5365.

Traffic analytics system 102a continues to process journey data 5570 for identifying other first sequences of journey data instances, and optionally, other second sequences of journey data instances for forming trip data as described hereinabove, and stores trip data, for example, in datastore 304.

FIG. 55D is a conceptual diagram of exemplary vehicle trips 5551, 5552, 5554, and 5556, indicative of trip data created by traffic analytics system 102 based on journey data 5403. Trip 5554 begins when the vehicle enters intersection core 4802H, as indicated by vehicle-position point 5366 and ends just before entering road section 4806-13, as indicated by vehicle-position point 5368.

Still referring to FIG. 55D, journey 5301 exits road network 4500 as indicated by vehicle-position point 5370 and returns thereto as indicated by vehicle-position point 5372. Trip 5556 begins where journey 5330 returns to road network 4500 at road section 4806-13 as indicated by vehicle-position point 5372, and ends just before entering road section 4806-15, as indicated by vehicle-position point 5375. Traffic analytics system 104a associates trips 5554, and 5556 with intersections H and I, respectively.

Traffic analytics system 102a processes remaining journey data, i.e., modified journey data 5334 and 5536, for identifying other first sequences of journey data instances, and optionally, other second sequences of journey data instances for forming trip data as described hereinabove, and stores trip data, for example, in datastore 304. FIG. 55E shows conceptual diagrams of exemplary vehicle trips 5560, 5561, 5562, 5563, 5564 and 5565, indicative of trip data created by traffic analytics system 104a after processing remaining journey data, i.e., modified journey data 5334 and 5536.

For ease of description, only ten trips are described in this example. In practise, however, the number of trips may include hundreds, thousands, or more.

In some embodiments, a vehicle may depart from the road network during a trip and should the vehicle remain outside the road network for a period exceeding a predefined length time corresponding journey data instances are ignored. A specific and non-limiting example of a predefined length time includes 10 s. In this example, should a vehicle exit the road network for more than 10 s, journey data instances associated with the vehicle while outside the road network will be ignored when journey data is processed for creating trip data therefrom.

Referring now to FIG. 56A, shown is a conceptual diagram of exemplary trip data 5600 created by traffic analytics system 102a and stored thereby, for example, in a datastore 304. For clarity, trip data 5600 is shown organized according to the intersection to which the trip data is mapped. For instance, trip data 5600 includes trip data 5600A, 5600B, 5600C, 5600D, 5600E, 5600F, 5600G, 5600H, and 5600I, including trip data mapped to intersections A, B, C, D, E, F, H and I, respectively. For example, trip data 5600F includes trip data 5500 corresponding to trip 5551 and trip data 5600G includes trip data 5570 corresponding to trip 5552. One of ordinary skill appreciates that trip data may be organized in numerous manners.

Block 4618—Trip Metadata

Next, at block 4618, process 4600 includes processing trip data for creating trip metadata. Specific and non-limiting examples of trip data are provided in Table 13 below.

TABLE 13

| Trip Metadata | |
|---|---|
| Trip Metadata | Description |
| HardwareId | indicates a deviceID |
| Vin | indicates a Vehicle Identification Number |
| Make | indicates a make of the vehicle |
| Model | indicates a model of the vehicle |
| VehicleYear | indicates a year of the vehicle |
| WeightClass | indicates a maximum loaded rate of vehicle, for example, |
| | Class A (3000 lbs and under) |
| | Class B (3001-4000 lbs) |
| | Class C (4001-5000 lbs) |
| | Class D (5001-6000 lbs) |
| | Class E (6001-7000 lbs) |
| | Class F (7001-8000 lbs) |
| | Class G (8001-9000 lbs) |
| | Class H (9001-10,000 lbs) |
| | Class 3 (10,001-14,000 lbs) |
| | Class 4 (14,001-16,000 lbs) |
| | Class 5 (16,001-19,500 lbs) |
| | Class 6 (19,501-26,000 lbs) |
| | Class 7 (26,001-33,000 lbs) |
| | Class 8 (33,001 and over) |
| VehicleType | indicates a type of vehicle, for example, |
| | passenger car |
| | minivan |
| | truck |
| | bus |
| | limo |
| | other |
| Vocation | indicates a vocation of the vehicle routed delivery, hub-and-spoke, patroller, etc. |
| TripID | indicates a unique trip ID assigned to each trip |
| IntersectionId | indicates a unique intersection ID |
| TimezoneName | indicates a timezone in which intersection resides, e.g., AST, EST, CST, PST, etc. |
| EventStartTimeUTC | indicates time a trip begins in coordinated universal time (UTC) |
| EventEndTimeUTC | indicates time a trip ends in coordinated universal time (UTC) |
| EventStartTimeLocal | indicates time a trip begins in time zone in which intersection resides |
| EventEndTimeLocal | indicates time a trip ends in time zone in which intersection resides |
| StartingLocation | indicates a location trip starts, examples include, LAT/LONG coordinates, GPS coordinates |
| EntryCardinal | indicates a direction vehicle is heading when it enters an intersection, e.g., N, NE, E, SE, SW, W, NW |
| ExitCardinal | indicates a direction vehicle is heading when it exits an intersection, e.g., N, NE, E, SE, SW, W, NW |
| TravelTime | indicates a total travel time of the trip (EventEndTimeUTC − EventStartTimeUTC) |
| TravelDistance | indicates a total travel distance travelled by the vehicle during the trip |
| TravelSpeed | indicates a travel speed of the trip (TravelDistance/TravelTime) |
| RunningTime | indicates a total amount of time vehicle is moving during the trip |
| RunningSpeed | indicates TravelDistance/RunningTime |
| StopTimeTotal | indicates a total amount of time vehicle was stopped during trip, i.e., speed was 0 km/h |
| NumberOfStops | indicates a total number of stops during the trip |
| TimeFromFirstStop | indicates a time elapsed from the first stop to the end of the trip |
| DistanceFromFirstStop | indicates a distance from a center of the intersection to a first stop location |

According to an embodiment a portion of trip metadata is available in pre-compiled VIN look up tables. For example, traffic analytics system 104a accesses pre-compiled VIN look up table(s) including manufacturer data, and vocation data associated with a vehicle's VIN. Traffic analytics system 104a system may store VIN look up tables, for example in datastore 304. Alternatively, and/or additionally, a VIN look up table(s) is available on a remote server(s) accessible by traffic analytics system 104a via communication network 110. Alternatively, and/or additionally trip metadata is accessible by traffic analytics system 104 in another manner.

For example, traffic analytics system 104a accesses a VIN look up table stored in datastore 302 for obtaining manufacturer data, and vocation data and of a vehicle corresponding to VIN 19ABA65576A061968, as indicated by a trip data instance. Exemplary manufacturer data obtained by traffic analytics system 104a includes vehicle type data, make data, model data, year data, weight class data. Manufacturer data may include other vehicle specification and/or related data.

Vocation data indicates a vocation of a vehicle. Vocation of a vehicle can be automatically determined, for example as described in U.S. Pat. No. 10,928,277 issued to Geotab Inc., the contents of which are incorporated herein in their entirety.

In a first example, traffic analytics system 104a processes trip data 5600F for creating trip metadata relating to trips mapped to intersection 4802F. For instance, traffic analytics system 104a processes trip data 5500 associated with trip 5551 for forming trip metadata corresponding thereto.

Shown in FIG. 56C is exemplary trip metadata 5610F formed by traffic analytics system 104a, including tripID data 5610E-1 indicating a trip ID of 5551, HardwareId data 5610E-2 indicating device ID112, Vin data 5610E-4 indicating the corresponding vehicle VIN is 123456789101123456, make data 5610E-5 indicating the vehicle make is Mercedes-Benz, model data 5610E-6 indicating the vehicle model is Powertrain, VehicleYear data 5610E-7 indicating the vehicle year is 2020, WeightClass data 5610E-8 indicating the corresponding vehicle is categorized as a class 4 vehicle, VehicleType data 5610E-9 indicating the vehicle is a truck, Vocation data 5610E-10 indicating the vehicle's vocation is 'delivery', IntersectionId data 5610E-13 indicating the trip is mapped to intersection 4802F. In this example, traffic analytics system 104a accesses a pre-compiled VIN look up table(s) stored in datastore 304 for obtaining make data, model data, year data, WeightClass data, VehicleType data and Vocation data.

In some instances, traffic analytics system 104a receives a timezone shapefile, from, for example, a publicly accessible server of a government geoscientific agency. For instance, the shapefile indicates boundaries of world timezones with attributes giving the identity of each timezone and UTC offset. Traffic analytics system 104a reverse geocodes all geohashes in each timezone and determines the name of the time zone the intersection is located and UTC offset by mapping at least a core subzone (i.e., geohash) from each intersection core to a timezone subzone. In the present example, traffic analytics system has mapped intersection 4802F to the Eastern Standard Timezone.

Trip metadata 5610F for trip 5551 also includes EventStartTimeUTC data 5610E-26 indicating the trip began 23/01/18-14:35:44 in UTC, EventEndTimeUTC data 5610E-27 indicating the trip ended 23/01/18-14:37:08 UTC. EventStartTimeLocal data 5610E-28 indicating the trip started 23/01/18-10:35:44 EST, EventEndTimeLocal data 5610E-29 indicating trip 5500 ended 23/01/18-10:37:08 EST. To generate EventStartTimeLocal data 5610E-28 and EventEndTimeLocal data 5610E-29, traffic analytics converts EventStartTimeLocal data 5610E-28 and EventEndTimeLocal data 5610E-29 from UTC to EST.

Trip metadata 5610F also includes StartingLocation data 5610E-30 indicating trip 5500 started at the location 43o12'37.05" N 79o46'58.879" W.

Trip metadata 5610F also includes TravelTime data 5610E-37 indicating the total travel time of the vehicle during the trip was 34 s, TravelDistance data 5610E-38 indicating the vehicle travelled 89 m during the trip, TravelSpeed data 5610E-38 indicating the average speed of the vehicle during the trip was 2.7 km/h, RunningTime data 5610E-40 indicating the total amount of time the vehicle was moving during the trip was 34 s, RunningSpeed data 5610E-41 indicating DistanceTravelled/RunningTime was 2.7 km/h, StopTimeTotal data 5610E-44 indicating the total amount of time the vehicle was stopped during the trip was 0 s, NumberOfStops data 5610E-45 indicating the total number of stops during the trip was 0, TimeFromFirstStop data 5610E-56 indicating the elapsed time between the first stop to the end of the trip is null since the vehicle never stopped, and DistanceFromFirstStop data 5610E-47 indicating the distance from the centre of the intersection to the first stop location was null since the vehicle never stopped. A center of the intersection may be determined by using the corresponding intersection reference point 4718G.

Trip metadata 5610F also includes EntryCardinal data 5610E-31 indicating the direction the vehicle was heading when it entered the intersection was N, and ExitCardinal data 5610E-32 indicating the direction the vehicle was heading when it exited the intersection was W.

A description of A method for determining EntryCardinal and ExitCardinal is described below with reference to FIG. 56B.

According to an embodiment, there is a process for determining an entry cardinal of a vehicle entering an intersection including processing position data of the first instance of trip data located in the core and processing position data of an immediately preceding instance of journey data. In particular, processing includes determining the bearing, i.e., heading angle, between position data corresponding to the first instance of trip data located in the core and the immediately preceding instance of journey data.

For example, traffic analytics system 104a calculates the bearing, $\beta$, with formula:

$$\beta = a\tan 2(X, Y),$$

X is defined as, $X = \cos\theta b * \sin \Delta L$

Y is defined as, $Y = \cos\theta a * \sin\theta b - \sin\theta a * \cos\theta b * \cos \Delta L$ 'L' is defined as longitude in decimal format form, '$\theta$' is defined as latitude in decimal format form.

Bearing, is measured from the North direction. In this example, 0° bearing means N, 45° bearing means NE, 90° bearing is E, 135° bearing is SE, 180° bearing is S, 225° bearing is SW, 270° bearing is W, and 315° bearing is NW. Referring now to FIG. 56B, is a table 5601 showing assigned cardinal direction based on the bearing. For example, a bearing of 346.5° is assigned cardinal direction N.

In a first example, traffic analytics system 104a calculates the entry bearing trip 5552. Referring again to FIG. 55B, the first instance of trip data located in the core of trip 5552 is associated with vehicle-position point 5361 and the immediately preceding instance of journey data is associated with vehicle-position point 5360, as shown. In this example, the immediately preceding instance of journey data associated with vehicle-position point 5360 corresponds to trip data instance 5431.

Position data 5502 corresponding to trip data instance 5342 is 43o 12'39"N, 79o 4731"W and position data 5502 corresponding to trip data instance 5341 is 43o 12'38"N, 79o 47'20"W. Traffic analytics system 104a determines the heading angle, between the points indicated by 43o 12'39"N, 79o 4731"W and 43o 12'38"N, 79o 47'20"W.

Firstly, traffic analytics system 104a converts point a, 43o 12'38"N, 79o 47'20"W and point b 43o 12'39"N, 79o 47'31"W into decimal degree format. For instance, point a, 43o 12'38"N, 79o 47'20"W converted to decimal format is 43.210556, 79.791667. Point b, 43o 12'39"N, 79o 4731"W converted to decimal format is 43.210833, 79.784167.

Next, traffic analytics system 104a determines X wherein $$X = \cos \theta b * \sin \Delta L$$

$$\Delta L = 79.791667 - 79.784167 = 0.0075$$

$$X = \cos(43.210833) * \sin(0.0075)$$

$$Y = \cos \theta a * \sin \theta b - \sin \theta a * \cos \theta b * \cos \Delta L$$

$$\beta = a\tan 2((\cos(43.210833)*\sin(0.0075)),(\cos(430.210556)*\sin(430.210833) - \sin(43.210556)*\cos(43.210833)*\cos(0.0075)))$$

$$\beta = 272.9°$$

Referring again to table 5601 in FIG. 55B, a bearing of 272.9o corresponds to a cardinal direction of table 5601, traffic analytics system assigns a cardinal entry of W. As such, traffic analytics system 104a creates EntryCardinal data for trip metadata to indicate an EntryCardinal of West. For instance, the vehicle corresponding to trip ID 5552 enters the intersection heading west, as shown in FIG. 55B.

According to an embodiment, there is a process for determining an exit cardinal of a vehicle exiting an intersection including processing position data of the last instance of trip data located in the core and processing position data of an immediately following instance of journey data. In particular, processing includes determining the bearing, i.e., heading angle, between position data corresponding to the last instance of trip data located in the core and the immediately following instance of journey data.

For example, traffic analytics system 104a calculates the exit bearing metadata for trip 5552. Referring again to FIG. 55C, the last instance of trip data located in the core of trip 5552 is associated with vehicle-position point 5365 and the immediately following instance of journey data is associated with vehicle-position point 5366, as shown.

Traffic analytics system 104a processes the position data of the trip data instance associated with trip data 5440, trip data instance 5440, and position data of journey data instance corresponding to vehicle-position point 5366 in a same manner as described above.

Traffic analytics system 104a calculates a bearing, $\beta = 271o$. Referring again to table 5601 in FIG. 55B, a bearing of 271° corresponds to a cardinal direction W. As such, traffic analytics system 104a creates ExitCardinal data for trip metadata to indicate an ExitCardinal of West. For instance, the vehicle corresponding to trip ID 5552 exits the intersection heading west.

Traffic analytics system 104a processes remaining trip data for forming trip metadata. Shown in FIG. 57A is exemplary trip metadata 5700 generated by traffic analytics system 104 and stored, for example, in datastore 304. Trip metadata 5700 is shown organized according to an intersection to which it is mapped, however, trip metadata may be organized in any manner.

Additionally/optionally, other trip metadata is formed, such as,

| | |
|---|---|
| MaxAcceleration | indicating a maximum acceleration of vehicle during trip |
| MinAcceleration | indicating a minimum acceleration of vehicle during trip |
| MaxSpeed | indicating a maximum speed of vehicle during trip |
| MinSpeed | indicating a minimum speed of vehicle during trip |
| SignalUsed | indicating whether a turn signal was used (true) or not used (false) during the trip |
| TurnSignals | indicating the direction of the turn signal (left or right) and a timestamp |
| StreetNameEntry | indicating a street name from which the vehicle entered the intersection |
| StreetNameExit | indicating a street name onto which the vehicle exited the intersection |

Additionally, and/or optionally, traffic analytics system 104a maps core subzones to a street name of a street that is determined to be the nearest street thereto. For example, traffic analytics system 104a forms a shape file based on the area occupied by core subzones of an intersection core. Using data from the shape file obtains road data from an OSM server relating to roads overlapping the shape in the shape file. Next, traffic analytics system 104a maps each core subzone of an intersection core to the nearest road within boundaries of the shape of the shapefile and stores an indication of the second road network data. During trip metadata generation, in block 4618, traffic analytics system 104a generates StreetNameEntry data indicating the name of the road associated with the first core subzone of the trip. Next, traffic analytics system 104a generates StreetNameExit data indicating the name of the road associated with the last core subzone of the trip.

Block 4620

Finally, at block 4620, process 4600 includes processing trip metadata for forming intersection metrics data. In some embodiments, processing trip metadata includes processing trip metadata and filter data. In some embodiments, processing trip metadata includes processing trip metadata, trip data and filter data.

Specific and non-limiting examples of intersection metrics are provided in Table 14 below.

TABLE 14

| Intersection Metrics | |
|---|---|
| Percentage Stopping data | Percentage of vehicles which came to at least one complete stop before passing through the intersection |
| AvgTravelSpeed data | Average travel speed through the intersection (total distance over total time) |
| AvgRunningSpeed data | Average running speed through the intersection (total distance over moving time) |
| AvgTotalTimeStopped data | Average total time spent at zero speed |
| AvgTotalTimeStoppedNoZero data | Average total time spent at zero speed (excluding vehicles which did not stop) |
| AvgTravelTime data | Average total travel time through the intersection |
| AvgTimeFromFirstStop data | Average time from the first stop to travelling through the intersection |
| AvgNumberOfStops data | Average number of stops made before passing through the intersection |

TABLE 14-continued

Intersection Metrics

| | |
|---|---|
| AvgNumberOfStopsNoZero data | Average number of stops made before passing through the intersection (excluding vehicles which did not stop) |
| AvgDistanceFromIntersection-ToFirstStop data | Average distance from the first stop to travelling through the intersection |
| PercentOfVolumeByVehicleClass data | Percent of the total volume through the intersection, broken down by class of vehicle |
| NumberOfTrips data | Total number of trips through the intersection |

Filter data indicates which trip metadata is to be processed for generating intersection metrics. Exemplary filter data 5702 is shown in FIG. 57B. In this example, filter data is provided by a user via a user interface. Alternatively, filter data is provided in file format and received, for example, via network interface 306.

Filter data 5702 includes intersectionID data 5702A, EntryCardinal data 5702B, ExitCardinal data 5702C, EventStartTimeLocal data 5702D and EventStopTimeLocal data 5702E. Intersection ID data 5702A indicates intersection metrics for intersection 4802G are to be calculated. EntryCardinal data 5702B and ExitCardinal data 5702C indicate only trip metadata associated with a trip having a North entry bearing and an East exit bearing should be processed.

Finally, EventStartTimeLocal data 5702D and EventStopTimeLocal data 5702E indicate that only trip metadata corresponding to trips having a start time between Jan. 1, 2020 at 1 AM and Jan. 1, 2021 at 1 AM are to be processed for generating metrics.

Alternatively, filter data includes cross-streets data indicating the streets forming the intersection for indicating the intersection for which metrics are to be calculated. For instance, cross street data includes StreetNameEntry data and StreetNameExit data.

Alternatively, filter data includes one or more trip metadata. Some specific and non-limiting examples include vocation, direction of travel, make, model, vehicle year, weightclass and vehicle type.

Alternatively, filter data includes one or more days of the week.

Traffic analytics system 104*a* selects a subset of trip metadata based on filter data 5702 for forming filtered trip metadata 5703 shown in FIG. 57C. Next, traffic analytics system 104*a* processes filtered trip metadata 5703 for calculating intersection metrics data for intersection 4802G.

Exemplary intersection metrics data 5704 is shown in FIG. 57D including, NumberOfTrips data 5704A indicating the total number of filtered trip metadata instances included in filtered trip metadata is 10,000 i.e., the total number of trips represented by filtered trip metadata is 10,000 trips, AvgTravelSpeed data 5704B indicating the average travel speed through the intersection is 60 km/h. For example, traffic analytics system 104*a* calculates AvgTravelSpeed data by dividing the sum of TravelDistance indicated by each filtered trip data instance by the sum of TravelTime indicated by each filtered trip data instance, AvgRunningSpeed data 5704C indicating the average running speed through the intersection is 100 km/h. For example, traffic analytics system 104*a* calculates the AvgRunningSpeed by dividing the sum of TravelDistance indicated by each filtered trip data instance by the sum of TravelTime from each filtered trip data instance, AvgTravelTime data 5704D indicating the average trip time is 156 s. For example, traffic analytics system 104*a* calculates AvgTravelTime by dividing the sum of TravelTime indicated by each filtered trip data instance by the total number of trips, i.e., 10,000, PercentOfVolumeByVehicleClass data 5704E indicating the percentage volume of trips associated with each each vehicle class is: ClassA—5%, Class B—5%, Class C—7%, Class D—10%, Class E—3%, Class F—10%, Class G—5%, Class H—5%, Class 3—30%, Class 4—2%, Class 5—4%, Class 6—4%, Class 7—5%, Class 8—5%. For example, traffic analytics system 104*a* calculates PercentOfVolumeByVehicleClass by, for each vehicle class, dividing the sum of trips associated with each vehicle class by the total number of trips, i.e., 10,000, PercentageStopping data 5704F indicating the percentage of trips wherein the corresponding vehicle stopped at least once during the trip is 70%. For example, traffic analytics system 104*a* calculates PercentageStopping by dividing the sum of each filtered trip metadata instance indicating NumberofStops data is greater than zero the total number of trips, i.e., 10,000, AvgNumberOfStops data 5704G indicating the average number of times vehicles stopped during a trip is 2. For example, traffic analytics system 104*a* calculates AvgNumberOfStops by dividing the sum of NumberofStops Data indicated by each filtered trip metadata instance by the total number of trips, i.e., 10,000.

AvgDistanceFromIntersectionToFirstStop data 5704H indicating the average distance from the first location a vehicle stops from the intersection core to the time the vehicle enters the intersection core during a trip is 6m. For example, traffic analytics system 104*a* calculates AvgDistanceFromIntersectionToFirstStop by dividing the sum of DistanceFromFirstSTop indicated by each filtered trip metadata instance by the total number of trips, i.e., 10,000. Alternatively, another center location is determined to be a centre location of the intersection core, AvgTotalTimeStopped data 5704I indicating average total time a vehicle was stopped, i.e., speed was 0 km/h, is 50 s. For example, traffic analytics system 104*a* calculates AvgTotalTimeStopped by dividing the sum of StopTimeTotal indicated by each filtered trip metadata instance by the total number of trips, i.e., 10,000, AvgTimeFromFirstStop data 5704J indicating average time between a vehicle stoopin a first time to the time the vehicle exits the intersection core is 75 s. For example, traffic analytics system 104*a* calculates AvgTimeFromFirstStop by dividing the sum of TimeFromFirstStop indicated by each filtered trip metadata instance by the total number of trips, i.e., 10,000, AvgTotalTimeStoppedNoZero data 5704K indicating average total time a vehicle was stopped, i.e., speed was 0 km/h, (excluding vehicles which did not stop) during a trip is 40 s. For example, traffic analytics system 104*a* determines the total number of trips having NumberofStops greater than zero, for instance, 7,000 out of 10,000 filtered metadata instances indicated NumberofStops greater than zero. Next, traffic analytics system 104*a* calculates AvgTotalTimeStoppedNoZero by dividing the sum of TimeFromFirstStop indicated by each filtered trip metadata instance by the total number of trips having NumberofStops greater than zero, i.e., 7,000, AvgNumberOfStopsNoZero data 5704L indicating the average number of stops made during a trip before passing through the intersection (excluding vehicles which did not stop) is 3. For example, traffic analytics system 104*a* determines the total number of trips having NumberofStops greater than zero, for instance, 7,000 out of 10,000 filtered metadata instances indicated NumberofStops greater than zero. Next traffic analytics system 104a calculates AvgNumberOfStopsNoZero by dividing the sum of NumberofStops Data indicated by each filtered trip metadata instance by the total number of trips having NumberofStops greater than zero, i.e., 7,000.

Additionally and/or optionally, other intersection metrics are calculated based on trip metadata and corresponding intersection metrics data is formed.

Next, traffic analytics system 104a provides intersection metrics data, for example, to a user via a user interface. Alternatively, intersection metrics data is stored in a data file, for instance, in datastore 304, for future use.

Corridor Metrics

Process 5800

According to an embodiment there is a process for determining corridor metrics for a road network corridor. A network corridor includes a plurality of contiguously connected intersections. FIG. 58A shows a flow diagram of a process 5800 for determining corridor metrics for a road network corridor.

Process 5800 includes blocks 4602 to block 4620 of process 4600.

Once intersection metrics data has been formed, process 5800 proceeds at block 5802. At block 5802, intersection metrics data and corridor data are processed for forming corridor metrics data. Corridor data indicates the intersections that form a corridor for which metrics are to be calculated.

For example, corridor data is provided to traffic analytics system 104a by a user, for example, via a user interface. Alternatively, traffic analytics system 104a receives corridor data in a data file, for example, via network interface 306. In this example, a user specifies in corridor data that the corridor includes intersections 4802A, 4802B, 4802C, 4802D, 4802G and 4802F, i.e., intersections A, B, C, D, G, and F of road network 4501. Shown in FIG. 58B is a conceptual diagram of an exemplary corridor 5804 including intersections 4802A, 4802B, 4802C, 4802D, 4802G and 4802F, i.e., intersections A, B, C, D, G, and F. In this example, a corridor includes 6 intersections, however, a corridor may include 2 intersections or more.

Next, traffic analytics system 104a processes trip metadata 5700 for forming intersection metrics data 5806 including, 5806A, 5806B, 5806C, 5806D, 5806G, and 5806F, for each intersection A, B, C, D, G, and F, respectively, of corridor 5804, as shown in FIG. 58C. In this example, Exemplary intersection metrics 5806A for intersection A are shown in FIG. 58D.

Next, traffic analytics system 104a processes intersection metrics data 5806A, 5806B, 5806C, 5806D, 5806G, and 5806F, for generating corridor metrics for corridor 5804.

Specific and non-limiting examples of corridor metrics are provided in Table 15 below.

TABLE 15

| Corridor Metrics | |
|---|---|
| Corridor Percentage Stopping data | Percentage of vehicles which came to at least one complete stop before passing through the corridor |
| Corridor AvgTravelSpeed data | Average travel speed through the corridor (total distance over total time) |
| Corridor AvgRunningSpeed data | Average running speed through the corridor (total distance over moving time) |
| Corridor AvgTotalTimeStopped data | Average total time spent at zero speed |
| Corridor AvgTotalTimeStoppedNoZero data | Average total time spent at zero speed (excluding vehicles which did not stop) |
| Corridor AvgTravelTime data | Average total travel time through the corridor |
| Corridor AvgTimeFromFirstStop data | Average time from the first stop to travelling through the corridor |
| Corridor AvgNumberOfStops data | Average number of stops made before passing through the corridor |
| Corridor AvgNumberOfStopsNoZero data | Average number of stops made before passing through the corridor (excluding vehicles which did not stop) |
| Corridor AvgDistanceFromIntersectionToFirstStop data | Average distance from the first stop to travelling through the corridor |
| Corridor PercentOfVolumeByVehicleClass data | Percent of the total volume through the corridor, broken down by class of vehicle |
| Corridor NumberOfTrips data | Total number of trips through the corridor |

For example, traffic analytics system 104a divides the sum of an intersection metric of all intersections A, B, C, D, G, and F, by the number of intersections, i.e., 6, for determining a corresponding corridor metric. For instance, traffic analytics system 104a sums PercentageStopping metrics from intersections A, B, C, D, G, and F and divides that sum by 6 to calculate a Corridor PercentageStopping metric and forms corresponding corridor PercentageStopping metric data.

Traffic analytics system 104a processes the remainder of intersection metrics data 5806 for forming corridor metrics for corridor ABCDGF. Exemplary corridor metrics 5808 for corridor ABCDGF is shown in FIG. 58E.

Additionally, and/or optionally, traffic metrics between one or more pairs of contiguous intersections of a corridor is determined. A contiguous pair of intersections includes two intersections connected in a road network via a road section. In other words, there is no other intersection between the path of a vehicle from a first intersection of the pair to the second intersection of the pair. Examples of contiguous pairs include AB, BC, CD, DG and GF.

For example, traffic analytics system 104a divides the sum of an intersection metric of intersections A and B, by the number of intersections, i.e., 2, for determining a corresponding traffic metric therebetween. For instance, traffic analytics system 104a sums PercentageStopping metrics from intersections A and B, and divides that sum by 2 to calculate AB PercentageStopping metric and forms corresponding AB PercentageStopping metric data.

Traffic analytics system 104a processes intersection metrics data 5806A and 5806B for forming AB traffic metrics data 5810AB, intersection metrics data 5806B and 5806C for forming BC traffic metrics data 5810BC, intersection metrics data 5806C and 5806D for forming CD traffic metrics data 5810CD, intersection metrics data 5806D and 5806G for forming DG traffic metrics data 5810DG, and intersection metrics data 5806G and 5806F for forming GF traffic metrics data 5810GF, shown in FIG. 58F.

Additionally, and/or optionally, cumulative corridor metrics including corridor metrics for sequences of contiguous intersections of a corridor. Examples of sequences of contiguous intersections of corridor 5804 include intersections ABC, ABCD, and ABCDG.

For example, traffic analytics system 104a divides the sum of an intersection metric of intersections A, B and C, by the number of intersections, i.e., 3, for determining a cumulative metric. For instance, traffic analytics system 104a sums PercentageStopping metrics from intersections A, B and C, and divides that sum by 3 to calculate ABC cumulative metric PercentageStopping and forms corresponding ABC PercentageStopping metric data. Exemplary ABC cumulative metric data 5814ABC for sequence ABC is shown in FIG. 58G.

Traffic analytics system 104a processes intersection metrics data 5806A, 5806B and 5806C for forming ABC cumulative metric data 5814ABC, intersection metrics data 5806A, 5806B, 5806C and 5806D for forming ABCD cumulative metric data 5814ABCD, intersection metrics data 5806A, 5806B, 5806C, 5806D and 5606G for forming ABCDG cumulative metric data 5814ABCDG, shown in FIG. 58H.

For ease of description in the discussion above, monitoring device is described as a physical device, however, it may be a component of a larger system, such as a vehicle communication system. Alternatively, the monitoring device is not a physical device and is integrated into a component of a larger system configured to perform operations/processes described herein. Further alternatively, the monitoring device may operate as a virtual device of a system.

One of ordinary skill in the art will appreciate that there are various techniques for defining data indicative of geographical coordinates of boundaries of a road network.

Included in the discussion above are a series of flow charts showing the steps and acts of various processes. The processing and decision blocks of the flow charts above represent steps and acts that may be included in algorithms that carry out these various processes. Algorithms derived from these processes may be implemented as software integrated with and directing the operation of one or more processors, may be implemented as functionally-equivalent circuits such as a Digital Signal Processing (DSP) circuit, a Field Programmable Gate Array (FPGA), an Application-Specific Integrated Circuit (ASIC), or may be implemented in any other suitable manner. It should be appreciated that the flow charts included herein do not depict the syntax or operation of any circuit or of any programming language or type of programming language. Rather, the flow charts illustrate the functional information one skilled in the art may use to fabricate circuits or to implement computer software algorithms to perform the processing of an apparatus carrying out the types of techniques described herein. It should also be appreciated that, unless otherwise indicated herein, the sequence of steps and/or acts described in each flow chart is merely illustrative of the algorithms that may be implemented and can be varied in implementations and embodiments of the principles described herein. Accordingly, in some embodiments, the techniques described herein may be embodied in computer-executable instructions implemented as software, including as application software, system software, firmware, middleware, embedded code, or any other suitable type of computer code. Such computer-executable instructions may be written using any of several suitable programming languages and/or programming or scripting tools and may be compiled as executable machine language code or intermediate code that is executed on a framework or virtual machine.

Computer-executable instructions implementing the techniques described herein may, in some embodiments, be encoded on one or more computer-readable media to provide functionality to the media. Computer-readable media include magnetic media such as a hard disk drive, optical media such as a Compact Disk (CD) or a Digital Versatile Disk (DVD), Blu-Ray disk, a persistent or non-persistent solid-state memory (e.g., Flash memory, Magnetic RAM, etc.), or any other suitable storage media. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

While not illustrated in FIGS. 3A, 3B, 5A, and 5B, traffic analytics system 104a, 104b and intelligent telematics system 500a, 500b may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, traffic analytics system 104a, 104b and intelligent telematics system 500a, 500b may receive input information through speech recognition or in other audible format.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Embodiments of the present invention provide one or more technical effects. In particular, the ability to repurpose raw vehicle data indicative of vehicle operating conditions originally intended for fleet management for use by a traffic analytics system and/or an intelligent telematics system for defining road networks. Using speed data and ignition state data of raw vehicle data for defining geographical boundaries of road networks. Implementing machine learning techniques using raw vehicle data to define the location of road networks. Provides alternative techniques compared to prior art for locating road networks. Such as, image and video capture and processing, GIS measurement techniques, gathering position data from targeted GPS devices, and gathering data uploaded data by the public. Ability to define locations of road networks without obtaining location data from 3rd party, performing complex imagine processing or extracting road network location data from a 3rd party website. Once locations of vehicle ways are determined, the ability to obtain traffic data and/or traffic metrics related to the vehicle way.

Nomenclature

Vehicle: a transportation asset, some examples include: a car, truck, recreational vehicle, heavy equipment, tractor, and snowmobile.

Vehicle way: an area frequently used by vehicles, i.e., an area on the Earth's surface repeatedly employed by vehicles. A vehicle way may include an area employed by vehicles for movement and/or parking.

Location: a unique geographic location of an object on the Earth's surface.

Point location/Location of a point: defines a unique two-dimensional location of a point on the Earth's surface, for example, geographic coordinate pair, latitude/longitude.

Area location/Location of an area: a unique two-dimensional space on the Earth's surface.

Known area: an area of which the location thereof is defined.

Monitoring device: a device onboard a vehicle for detecting environmental operating conditions associated with a vehicle and transmitting raw vehicle data indicative thereof.

Raw vehicle data: data including vehicle operation information indicative of vehicle operating conditions and the date and time vehicle operating conditions were logged. Raw vehicle data may include information for identifying an onboard monitoring device and/or a vehicle the monitoring device is aboard.

Second historical vehicle data/Historical vehicle data: raw vehicle data collected over a period of time.

Second vehicle data/Vehicle data: raw vehicle data and data interpolated therefrom or raw vehicle data.

Zone: an area encompassing an associated vehicle way.

Road Network Zone: an area encompassing a road network.

Subzone/Second subzone: portion of a zone/portion of a road network zone.

Classifier: a classification model defined by using a machine learning technique for classifying an object. In context of this application, a classifier classifies a subzone (e.g., a known area) as a vehicle way class or not-vehicle way class.

Feature: data indicative of variables/attributes, or measurements of properties of a phenomenon being observed and/or data derived therefrom. In context of this application, a feature is a numerical representation of a subzone.

What is claimed is:

1. A method for providing traffic metrics for a corridor of a road network comprising:
    providing first road network data indicating a first plurality of road network subzones defining a geographic area occupied by the road network, the road network including a plurality of intersections;
    processing the first road network data for labelling each road network subzone as one of a core subzone and a non-core subzone for forming a first plurality of core subzones and a first plurality of non-core subzones and storing an indication thereof in the first road network data;
    mapping each of the first plurality of core subzones to an intersection of the plurality of intersections of the road network and storing an indication thereof in the first road network data;
    forming a plurality of subsets of core subzones of the first plurality of core subzones, each thereof defining a geographic area occupied by an intersection core of an intersection of the plurality of intersections;
    processing the first road network data for mapping each non-core subzone of the first plurality of non-core subzones to at least one intersection of the plurality of intersections;
    forming second road network data including the first road network data and an indication of the at least one intersection of the plurality of intersections of the road network to which each non-core subzone of the first plurality of non-core subzones is mapped;
    forming trip metadata dependent on second road network data and third vehicle data corresponding to the first plurality of road network subzones; and
    processing the trip metadata associated with a plurality of contiguous intersections of the plurality of intersections of the road network defining the corridor for forming corridor metrics data indicative of corridor metrics for the corridor.

2. The method of claim 1 wherein forming the corridor metrics data includes forming traffic metrics data for each pair of contiguous intersections of the plurality of contiguous intersections indicative of traffic metrics for each pair of contiguous intersections.

3. The method of claim 1 wherein forming the corridor metrics data includes forming cumulative metric data indicative of one or more sequences of contiguous intersections of the plurality of contiguous intersections indicative of traffic metrics for the one or more sequences of contiguous intersections.

4. The method of claim 1 wherein processing the trip metadata associated with the plurality of contiguous intersections of the plurality of intersections defining the corridor for forming corridor metrics data indicative of the corridor metrics for the corridor includes processing the trip metadata and corridor data, the corridor data indicative of the plurality of intersections defining the corridor.

5. The method of claim 4 wherein the corridor data is provided by a user.

6. The method of claim 1 wherein processing the trip metadata associated with the plurality of contiguous intersections of the plurality of intersections of the road network defining the corridor for forming traffic metrics data indicative of the corridor metrics for the corridor includes,
    processing the trip metadata associated with each contiguous intersection of the plurality of contiguous intersections for forming intersection metrics data indicative of intersection metrics for each thereof; and
    processing the intersection metrics data for each contiguous intersection of the plurality of contiguous intersections for forming the corridor metrics data.

7. The method of claim 1 wherein processing the first road network data for mapping each non-core subzone of the first plurality of non-core subzones to the at least one intersection of the plurality of intersections of the road network includes,
    for each road network subzone of the first plurality of road network subzones, processing road network data for forming point data indicating a point representing a location of the road network subzone;
    for each intersection of the plurality of intersections, processing point data of a corresponding intersection core and point data of the first plurality of non-core subzones for clustering corresponding points into groups; and for each point of a non-core subzone of the first plurality of non-core subzones grouped in a same group as points of an intersection core, mapping the non-core subzone to a corresponding intersection of the intersection core.

8. The method of claim 7 wherein processing the point data of the corresponding intersection core and the point data of the first plurality of non-core subzones for clustering corresponding points into groups includes, for at least a road network subzone, processing road network data for determining a centre point of the road network subzone.

9. The method of claim 7 wherein processing the point data of the corresponding intersection core and the point data of the first plurality of non-core subzones for clustering corresponding points into groups includes clustering the corresponding points into groups using a spatial clustering algorithm.

10. The method of claim 1 wherein forming the trip metadata dependent on the second road network data and the third vehicle data corresponding to the first plurality of road network subzones includes, for each vehicle of a plurality of vehicles corresponding to the third vehicle data, selecting at least a first subset of temporally consecutive third vehicle data instances indicating the vehicle transitions from a first undrivable state to a second drivable state to a third undrivable state for forming journey data;

processing the journey data and road network data for mapping each instance of journey data to a road network subzone of the first plurality of road network subzones based on a journey data instance corresponding to a road network subzone of the first plurality of road network subzones and storing an indication of a location of the road network subzone, a label of the road network subzone, and intersection mapping of the road network subzone in the journey data;

selecting subsets of journey data instances for forming trip data indicative of vehicle trips and mapping the trip data to an intersection of the plurality of intersections of the road network; and processing each trip data instance of trip data for forming the trip metadata.

11. The method of claim 10 wherein for each vehicle of the plurality of vehicles corresponding to the third vehicle data, selecting at least the first subset of temporally consecutive third vehicle data instances indicating the vehicle transitions from the first undrivable state to the second drivable state to the third undrivable state for forming the journey data includes, for at least a vehicle, selecting at least a sequence of third vehicle data instances including a third vehicle data instance indicating an ignition status of the vehicle is OFF, immediately followed by a third vehicle data instance indicating the ignition status of the vehicle is ON and the vehicle has a speed greater than 0 kilometers per hour (km/h), immediately followed by one or more third vehicle data instances indicating the ignition status of the vehicle is ON, immediately followed by a third vehicle data instance indicating the ignition status of the vehicle is OFF.

12. The method of claim 10 wherein selecting the subsets of journey data instances for forming the trip data indicative of vehicle trips includes, selecting at least one first sequence of journey data instances from the journey data for forming the trip data, the at least one first sequence of journey data instances including at least one journey data instance corresponding to a core subzone that is mapped to a first intersection immediately followed by a journey data instance mapped to a second intersection, wherein the second intersection and the first intersection are not a same intersection; and mapping each trip data instance to the first intersection and storing an indication of the mapping therein.

13. The method of claim 10 wherein selecting the subsets of journey data instances for forming the trip data indicative of vehicle trips includes, selecting at least one first sequence of journey data instances from the journey data including at least one journey data instance corresponding to a core subzone that is mapped to a first intersection immediately followed by a journey data instance mapped to a second intersection, wherein the second intersection and the first intersection are not a same intersection;

selecting a second sequence of journey data instances including at least a journey data instance corresponding to a non-core subzone mapped to the first intersection immediately preceding the at least one first sequence of journey data instances;

forming the trip data based on the first sequence of journey data instances and the second sequence of journey data instances; and mapping each trip data instance to the first intersection and storing an indication of the mapping therein.

14. The method of claim 10 wherein forming the trip metadata comprises forming the trip metadata including one or more of: Hardware identification (ID) data, vehicle identification number (VIN) data, Make data, Model data, Vehicle Year data, Weight Class data, Vehicle Type data, Vocation data, Trip ID data, Intersection ID data, Time Zone Name data, Event Start Time Coordinated Universal Time (UTC) data, Event End Time UTC data, Event Start Time Local data, Event End Time Local data, Starting Location data, Entry Cardinal data, Exit Cardinal data, Street Name Entry data, Street Name Exit data, Signal Used data, Turn Signals data, Travel Time data, Travel Distance data, Travel Speed data, Running Time data, Running Speed data, Maximum (Max) Speed data, Minimum (Min) Speed data, Stop Time Total data, Number of Stops data, Time From First Stop data, Distance From First Stop data, Core Distance data, Max Acceleration data, and Min Acceleration data.

15. The method of claim 14 wherein forming the Entry Cardinal data comprises determining a bearing between position data corresponding to a first instance of corresponding trip data located in an intersection core and an immediately preceding instance of corresponding journey data and creating the Entry Cardinal data indicative of the bearing.

16. The method of claim 14 wherein forming the Exit Cardinal data includes, determining a bearing between position data corresponding to a last instance of corresponding trip data located in an intersection core and an immediately following instance of corresponding journey data; and creating the Exit Cardinal data indicative of the bearing.

17. The method of claim 6 wherein processing the trip metadata associated with each contiguous intersection of the plurality of contiguous intersections for forming the intersection metrics data indicative of the intersection metrics for each thereof includes, selecting at least one subset of trip metadata based on filter data for forming filtered trip metadata, each subset of trip metadata associated with at least one intersection of the plurality of intersections; and processing the filtered trip metadata for providing traffic metrics for the plurality of contiguous intersections.

18. The method of claim 17 wherein selecting the subset of trip metadata based on the filter data for forming the filtered trip metadata includes selecting the subset of trip metadata based on the filter data including one or more of: Hardward Identification (ID) data, Vehicle Identification Number (VIN) data, Make data, Model data, Vehicle Year data, Weight Class data, Vehicle Type data, Vocation data, Intersection ID data, Time Zone Name data, Event Start Time Coordinated Universal Time (UTC) data, Event End Time UTC data, Event Start Time Local data, Event End Time Local data, Starting Location data, Entry Cardinal data, Exit Cardinal data, Street Name Entry data, Street Name Exit data, Signal Used data, Turn Signals data, Travel Time data, Travel Distance data, Travel Speed data, Running Time data, Running Speed data, Maximum (Max) Speed data, Minimum (Min) Speed data, Stop Time Total data, Number of Stops data, Time From First Stop data, Distance From First Stop data, Core Distance data, Max Acceleration data, and Min Acceleration data.

19. The method of claim 6 wherein forming the intersection metrics data comprises forming the intersection metrics data including one or more of: Percentage Stopping, Average Travel Speed, Average Running Speed, Average Total Time Stopped, Average Total Time Stopped No Zero, Average Travel Time, Average Time From First Stop, Average Number of Stops, Average Number of Stops No Zero, Average Distance From Intersection to First Stop, Percent of Volume by Vehicle Class, and Number of Trip.

20. The method of claim 18 wherein forming the corridor metrics data includes forming the corridor metrics including one or more of: corridor Percentage Stopping, corridor Average Travel Speed, corridor Average Running Speed, corridor Average Total Time Stopped, corridor Average Total Time Stopped No Zero, corridor Average Travel Time, corridor Average Time From First Stop, corridor Average Number of Stops, corridor Average Number of Stops No Zero, corridor Average Distance From Intersection To First Stop, corridor Percent Of Volume By Vehicle Class, and corridor Number of Trips.

* * * * *

UNITED STATES PATENT AND TRADEMARK OFFICE
CERTIFICATE OF CORRECTION

PATENT NO. : 11,710,073 B2
APPLICATION NO. : 17/381330
DATED : July 25, 2023
INVENTOR(S) : Daniel Jacob Lewis et al.

It is certified that error appears in the above-identified patent and that said Letters Patent is hereby corrected as shown below:

On the Title Page

Item (73), Assignee: "Geo tab Inc., Oakville (CA)" should read -- Geotab Inc., Oakville (CA) --.

Signed and Sealed this
Fifth Day of September, 2023

Katherine Kelly Vidal
*Director of the United States Patent and Trademark Office*